United States Patent
Kim et al.

(10) Patent No.: US 10,613,721 B2
(45) Date of Patent: Apr. 7, 2020

(54) USER TERMINAL DEVICE AND DISPLAYING METHOD THEREOF

(71) Applicant: SAMSUNG ELECTRONICS CO., LTD., Suwon-si (KR)

(72) Inventors: Yun-kyung Kim, Suwon-si (KR); Yong-yeon Lee, Suwon-si (KR); Hae-yoon Park, Seoul (KR); Ji-yeon Kwak, Seoul (KR); Hyun-jin Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 362 days.

(21) Appl. No.: 14/622,041

(22) Filed: Feb. 13, 2015

(65) Prior Publication Data

US 2015/0227298 A1    Aug. 13, 2015

Related U.S. Application Data

(60) Provisional application No. 61/939,380, filed on Feb. 13, 2014.

(30) Foreign Application Priority Data

Jul. 15, 2014    (KR) .................. 10-2014-0088919

(51) Int. Cl.
*G06F 3/0484* (2013.01)
*G06F 3/0488* (2013.01)
(Continued)

(52) U.S. Cl.
CPC ........ *G06F 3/04845* (2013.01); *G06F 1/1641* (2013.01); *G06F 1/1652* (2013.01);
(Continued)

(58) Field of Classification Search
CPC .......... G06F 3/041; G06F 3/017; G06F 3/048; G09G 2320/08; G09G 2340/0492; G09G 5/14

See application file for complete search history.

(56) References Cited

U.S. PATENT DOCUMENTS

| 6,115,025 A | 9/2000 | Buxton et al. |
| 6,628,310 B1 | 9/2003 | Hiura et al. |

(Continued)

FOREIGN PATENT DOCUMENTS

| EP | 2685341 A1 * | 1/2014 | .......... G06F 1/1694 |
| KR | 10-0667848 B1 | 1/2007 | |

(Continued)

OTHER PUBLICATIONS

Communication dated Oct. 22, 2018, issued by the Korean Intellectual Property Office in counterpart Korean Patent Application No. 10-2014-0088919.

(Continued)

*Primary Examiner* — Sang H Kim
(74) *Attorney, Agent, or Firm* — Sughrue Mion, PLLC

(57) ABSTRACT

A displaying method of a user terminal device including displaying a first screen on a display of the user terminal device, detecting a user interaction by the user terminal device, and rotating the at least two screens based on the first user interaction, changing a display orientation of the at least two screens.

8 Claims, 158 Drawing Sheets

(51) Int. Cl.
  *G06F 1/16* (2006.01)
  *G06F 3/01* (2006.01)
  *G06F 1/3206* (2019.01)

(52) U.S. Cl.
  CPC .......... *G06F 1/1694* (2013.01); *G06F 1/3206* (2013.01); *G06F 3/017* (2013.01); *G06F 3/0488* (2013.01); *G06F 2200/1614* (2013.01); *G06F 2203/04803* (2013.01)

(56) References Cited

U.S. PATENT DOCUMENTS

| | | |
|---|---|---|
| 6,982,728 B1 | 1/2006 | Nicolas et al. |
| 7,109,977 B2 | 9/2006 | Durso |
| 7,814,419 B2 | 10/2010 | Fabritius |
| 7,978,176 B2 | 7/2011 | Forstall et al. |
| 8,072,427 B2 | 12/2011 | Pletikosa et al. |
| 8,185,169 B2 | 5/2012 | Griffin et al. |
| 8,255,825 B2 | 8/2012 | Morris |
| 8,531,486 B2 | 9/2013 | Laine et al. |
| 8,639,102 B2 | 1/2014 | Seo et al. |
| 8,726,190 B2 | 5/2014 | Clark et al. |
| 8,872,855 B2 | 10/2014 | Doll |
| 9,092,070 B2 | 7/2015 | Jung et al. |
| 9,170,659 B2 | 10/2015 | Kim et al. |
| 9,177,356 B2 | 11/2015 | Van Osten et al. |
| 9,182,900 B2 | 11/2015 | Choi |
| 9,457,848 B2 | 10/2016 | Song et al. |
| 9,489,080 B2 | 11/2016 | Seo et al. |
| 9,721,375 B1 | 8/2017 | Rivard et al. |
| 9,727,292 B1 | 8/2017 | Kudryashov et al. |
| 9,766,788 B2 | 9/2017 | Kerr et al. |
| 9,811,507 B2 | 11/2017 | Cranfill et al. |
| 10,061,760 B2 | 8/2018 | Brant |
| 10,152,460 B2 | 12/2018 | Kennedy, Jr. |
| 10,410,605 B2 | 9/2019 | Gardenfors et al. |
| 2001/0026379 A1 | 10/2001 | Collard et al. |
| 2005/0064917 A1 | 3/2005 | Peng et al. |
| 2005/0073504 A1 | 4/2005 | Durso |
| 2005/0114788 A1 | 5/2005 | Fabritius |
| 2006/0126284 A1 | 6/2006 | Moscovitch |
| 2006/0152497 A1* | 7/2006 | Rekimoto ............. G06F 1/1616 345/173 |
| 2006/0284852 A1 | 12/2006 | Hofmeister et al. |
| 2007/0064288 A1 | 3/2007 | Lee |
| 2007/0146347 A1 | 6/2007 | Rosenberg |
| 2007/0220444 A1* | 9/2007 | Sunday ................. G06F 3/0488 715/788 |
| 2008/0074442 A1 | 3/2008 | Taniguchi et al. |
| 2008/0165144 A1 | 7/2008 | Forstall et al. |
| 2008/0229224 A1 | 9/2008 | Kake |
| 2009/0058820 A1 | 3/2009 | Hinckley |
| 2009/0058882 A1 | 3/2009 | Adachi et al. |
| 2009/0094562 A1 | 4/2009 | Jeong et al. |
| 2009/0262074 A1 | 10/2009 | Nasiri et al. |
| 2010/0037167 A1 | 2/2010 | Son et al. |
| 2010/0081475 A1* | 4/2010 | Chiang ................. G06F 3/0483 455/564 |
| 2010/0088630 A1 | 4/2010 | Morris |
| 2010/0097322 A1 | 4/2010 | Hu et al. |
| 2010/0203925 A1 | 8/2010 | Nagai |
| 2010/0265269 A1 | 10/2010 | Matsuda |
| 2011/0016165 A1 | 1/2011 | Uejima |
| 2011/0261075 A1 | 10/2011 | Tanaka |
| 2012/0028688 A1 | 2/2012 | Vartanian |
| 2012/0081277 A1* | 4/2012 | de Paz ................... G06F 1/1616 345/156 |
| 2012/0084674 A1* | 4/2012 | Visosky ................ G06F 1/1616 715/761 |
| 2012/0180001 A1 | 7/2012 | Griffin et al. |
| 2012/0221966 A1 | 8/2012 | Inami et al. |
| 2012/0222243 A1 | 9/2012 | Conrad |
| 2012/0229399 A1 | 9/2012 | Kobayashi et al. |
| 2012/0235930 A1 | 9/2012 | Lizaridis et al. |
| 2012/0252410 A1* | 10/2012 | Williams ................ G06F 21/36 455/411 |
| 2012/0274663 A1 | 11/2012 | Laine et al. |
| 2012/0304107 A1 | 11/2012 | Nan et al. |
| 2012/0311438 A1 | 12/2012 | Cranfill et al. |
| 2013/0019201 A1 | 1/2013 | Cabrera-Cordon et al. |
| 2013/0021377 A1 | 1/2013 | Doll |
| 2013/0024812 A1 | 1/2013 | Reeves et al. |
| 2013/0027613 A1 | 1/2013 | Kim et al. |
| 2013/0069987 A1 | 3/2013 | Choe |
| 2013/0097452 A1 | 4/2013 | Cheng et al. |
| 2013/0125045 A1 | 5/2013 | Sun et al. |
| 2013/0128016 A2 | 5/2013 | Keys |
| 2013/0147795 A1* | 6/2013 | Kim ........................ G06F 21/36 345/419 |
| 2013/0154947 A1* | 6/2013 | Abrams ................ G06F 1/1626 345/173 |
| 2013/0176248 A1 | 7/2013 | Shin et al. |
| 2013/0194309 A1 | 8/2013 | Seo et al. |
| 2013/0222243 A1 | 8/2013 | Jung et al. |
| 2013/0298054 A1 | 11/2013 | Nakazawa et al. |
| 2013/0321654 A1 | 12/2013 | Shintani et al. |
| 2014/0009418 A1* | 1/2014 | Sugimoto ............. G06F 3/0412 345/173 |
| 2014/0009499 A1 | 1/2014 | Gardenfors et al. |
| 2014/0033127 A1 | 1/2014 | Choi |
| 2014/0043265 A1 | 2/2014 | Chang et al. |
| 2014/0129975 A1 | 5/2014 | Ramachandran et al. |
| 2014/0155165 A1 | 6/2014 | Hammontree et al. |
| 2014/0173483 A1 | 6/2014 | Hicks |
| 2014/0173495 A1 | 6/2014 | Chang et al. |
| 2014/0189395 A1* | 7/2014 | Kp ........................ G06F 1/3231 713/320 |
| 2014/0208128 A1* | 7/2014 | Gyorfi .................... G06F 9/542 713/300 |
| 2014/0282214 A1 | 9/2014 | Shirzadi et al. |
| 2014/0304645 A1 | 10/2014 | Osman et al. |
| 2014/0359541 A1 | 12/2014 | Park |
| 2014/0365909 A1 | 12/2014 | Kerr et al. |
| 2014/0368422 A1* | 12/2014 | Gupta ................... G06F 3/0304 345/156 |
| 2014/0380247 A1 | 12/2014 | Tecarro et al. |
| 2015/0113446 A1 | 4/2015 | Penha et al. |
| 2015/0186037 A1 | 7/2015 | Kanatani et al. |
| 2015/0228255 A1 | 8/2015 | Takasu |
| 2015/0277847 A1 | 10/2015 | Yliaho et al. |
| 2015/0293656 A1 | 10/2015 | Jung et al. |
| 2015/0309691 A1 | 10/2015 | Seo et al. |
| 2015/0317060 A1 | 11/2015 | Debets et al. |
| 2016/0041709 A1 | 2/2016 | Choi |
| 2016/0217554 A1 | 7/2016 | Nguyen et al. |
| 2016/0224119 A1* | 8/2016 | Wu ........................ G06F 3/0488 |
| 2018/0048752 A1 | 2/2018 | Zhou |
| 2019/0012051 A1 | 1/2019 | Jeon |

FOREIGN PATENT DOCUMENTS

| | | |
|---|---|---|
| KR | 10-2008-0086292 A | 9/2008 |
| KR | 10-1135071 B1 | 4/2012 |
| KR | 10-2013-0054042 A | 5/2013 |
| KR | 10-2014-0013547 A | 2/2014 |

OTHER PUBLICATIONS

Office Action dated Dec. 15, 2016, issued by the United States Patent and Trademark Office in U.S. Appl. No. 14/621,597.
Office Action dated Mar. 24, 2017, issued by the United States Patent and Trademark Office in U.S. Appl. No. 14/621,985.
Office Action dated Jun. 8, 2017, issued by the United States Patent and Trademark Office in U.S. Appl. No. 14/621,597.
Office Action dated Sep. 20, 2017, issued by the United States Patent and Trademark Office in U.S. Appl. No. 14/621,597.
Office Action dated Feb. 2, 2018, issued by the United States Patent and Trademark Office in U.S. Appl. No. 14/621,985.
Office Action dated Mar. 9, 2018, issued by the United States Patent and Trademark Office in U.S. Appl. No. 14/621,597.

(56) References Cited

OTHER PUBLICATIONS

Office Action dated Aug. 27, 2018, issued by the United States Patent and Trademark Office in U.S. Appl. No. 14/621,597.
Communication dated Oct. 22, 2018, issued by the Korean Intellectual Property Office in counterpart Korean Application No. 10-2014-0088924.
Communication dated Jan. 9, 2019, issued by the Korean Intellectual Property Office in counterpart Korean Application No. 10-2014-0089060.
Office Action dated Feb. 19, 2019, issued by the United States Patent and Trademark Office in U.S. Appl. No. 14/621,985.
Office Action dated Feb. 26, 2019, issued by the United States Patent and Trademark Office in U.S. Appl. No. 14/621,597.
Office Action dated Jul. 3, 2019 issued by the United States Patent and Trademark Office in U.S. Appl. No. 14/621,985.
Communication dated Apr. 24, 2019 issued by the Korean Intellectual Property Office in counterpart Korean Application No. 10-2014-0088924.
Communication dated Apr. 29, 2019 issued by the Korean Intellectual Property Office in counterpart Korean Application No. 10-2014-0088919.
Office Action dated Oct. 2, 2019, issued by the United States Patent and Trademark Office in U.S. Appl. No. 14/621,985.
Communication dated Oct. 31, 2019, issued by the Korean Intellectual Property Office in counterpart Korean Patent Application No. 10-2014-0088924.
Notice of Decision of Rejection dated Nov. 27, 2019, issued by the Korean Intellectual Property Office in counterpart Korean Patent Application No. 10-2014-0088919 filed on Jul. 15, 2014.
Office Action dated Nov. 27, 2019, issued by the United States Patent and Trademark Office in U.S. Appl. No. 14/621,597.
Office Action dated Feb. 21, 2020 issued by the U.S. Patent and Trademark Office in U.S. Appl. No. 14/621,985.

* cited by examiner 1510  1520

| 1 | | | |
|---|---|---|---|
| 9 | 10 | 11 | 12 |
| 13 | 14 | 15 | 16 |

3110

3120

3130

3140

3200a-1                  3200a-2

4200b-1 folding 4200b-2

4220

4300b-1 folding 4300b-2

4320

5200b-1

— 5231

5242 — 9:03 AM
JUN 2 THU 5200b-2

5241

USER TERMINAL DEVICE AND DISPLAYING METHOD THEREOF

CROSS-REFERENCE TO RELATED APPLICATIONS

This application claims priority from Korean Patent Application No. 10-2014-0088919, filed on Jul. 15, 2014 in the Korean Intellectual Property Office, and U.S. Provisional Application No. 61/939,380, filed on Feb. 13, 2014, the disclosures of which are incorporated herein by reference in their entireties.

BACKGROUND

1. Field

Apparatuses and methods consistent with exemplary embodiments relate to a user terminal device and a displaying method thereof, and more particularly, to a user terminal a user terminal device including a display panel in a square shape and a displaying method thereof.

2. Description of the Related Art

With the development of electronic technology, various types of user terminal devices have been developed and distributed. Recently, a size of user terminal devices has been minimized, but the functions of the user terminal devices have become more diverse, and, therefore, the demands for the user terminal devices have been increasing.

A user terminal device may provide various content, such as multimedia contents and application screens, upon a request of a user. A user may select a desired function using a button or a touch screen provided on a user terminal device. A user terminal device may selectively execute a program according to a user interaction between a user and the device, and display the result thereof.

As more diverse functions are provided by a user terminal device, there is a need for a method of displaying content or a user interface method. That is, as the method of displaying content has changed and the type and function of the content have been increasing, the related art interaction methods such as selecting a button or touching a screen may be insufficient to perform various functions of a user terminal device.

Thus, there is a need of user interaction technology which enables a user to use a user terminal device more conveniently.

SUMMARY

Exemplary embodiments may overcome the above disadvantages and other disadvantages not described above. However, it is understood that exemplary embodiments are not required to overcome the disadvantages described above, and may not overcome any of the problems described above.

One or more exemplary embodiments are related to a user terminal device which may perform various functions through a user interaction in a diagonal direction and a displaying method thereof.

One or more exemplary embodiments are also related to a user terminal device having a display panel in a square shape which may provide a user terminal device that displays a plurality of objects on a grid screen including a plurality of square cells, and provides various functions on a plurality of objects according to a user interaction, and a displaying method thereof.

According to an aspect of an exemplary embodiment, there is provided a displaying method of a user terminal device, including: displaying at least two screens in at least two areas of a display of the user terminal device; detecting a first user interaction by the user terminal device; rotating the at least two screens based on the first user interaction; and changing a display orientation of the at least two screens.

The method may further include detecting a second user interaction in one of the at least two areas; and changing a display orientation of the screen of the at least two screens which is displayed in the one of the at least two areas based on the second user interaction.

The first user interaction may include a vibration interaction, and the changing the display orientation may include: determining a location where the vibration interaction occurs; and determining the display orientation of the at least two screens based on the determined location of the vibration interaction.

The first user interaction may include a touch interaction, and the changing the display orientation may include: determining a direction of the touch interaction; and determining the display orientation of the at least two screens based on the determined direction of the touch interaction.

The method may further include maintaining a layout of the at least two screens even when the display orientation of the at least two screens changes.

The display and the at least two screens may be substantially square.

According to an aspect of another exemplary embodiment, a displaying method of a user terminal device includes detecting, while a screen of the user terminal device is in a powered-off state, a user interaction; determining a display orientation of the screen based on the user interaction; and changing the screen to a powered-on state in the determined display orientation.

The detecting may include detecting a rotation state of the user terminal device, and the changing includes: determining the display orientation based on the rotation state of the user terminal; and changing the screen to a powered-on state in the determined display orientation.

According to an aspect of another exemplary embodiment, a displaying method of a user terminal device includes: displaying a display screen; detecting a first user interaction and a second user interaction on the display screen; determining a direction of the first user interaction and a direction of the second user interaction; dividing the display screen into a first area and a second area based on the direction of the first user interaction and the direction of the second user interaction; determining a display orientation of the first screen which is to be displayed on the first area based on the direction of the first user interaction; displaying the first screen on the first area, determining a display orientation of the second screen which is to be displayed on the second area based on the direction of the second user interaction; and displaying the second screen on the second area.

The display screen may be in a substantially square shape, and the dividing may include: in response to at least one of the direction of the first user interaction and the direction of second user interaction being toward a corner of the display screen, dividing the display screen into substantially triangular first and second areas.

The dividing may include, in response to at least one of the direction of the first user interaction and the direction of the second user interaction being toward a side of the display screen, dividing the display screen into substantially rectangular first and second areas.

According to an aspect of another exemplary embodiment, a displaying method of a user terminal device includes: displaying a first screen; detecting a first user interaction and a second user interaction at overlapping times, wherein the first user interaction and the second user interaction include respective touch interactions on a front side and a back side of the user terminal device; determining a direction of the first user interaction and a direction of the second user interaction; dividing the first screen into a first area and a second area based on the direction of the first user interaction and the direction of the second user interaction; determining a display orientation of a second screen which is to be displayed on the first area based on the direction of the first user interaction; displaying the second screen on the first area; determining a display orientation of a third screen which is to be displayed on the second area based on the direction of the second user interaction; and displaying the third screen on the second area.

According to an aspect of another exemplary embodiment, a displaying method of a user terminal device includes: displaying a first screen; detecting, while the first screen is displayed, a user interaction; determining a display orientation of a second screen based on the user interaction; and displaying the second screen in the determined display orientation.

The first screen may be a lock screen or a notification screen.

A display orientation of the first screen may be determined based on a display orientation before the first screen is displayed.

According to an aspect of another exemplary embodiment, a user terminal device includes: a display configured to display at least two screens in at least two areas of the display respectively; a detector configured to detect a first user interaction; and a controller configured to control the display to rotate the at least two screens based on the first user interaction detected by the detector, and to change a display orientation of the at least two screens.

The detector may be further configured to detect a second user interaction, and the controller may, in response to the second user interaction being detected in one of the at least two areas, control the display to change the display orientation of the of the at least two screens which is displayed in the one the of the at least two areas based on the second user interaction.

The first user interaction may include a vibration interaction, and the controller may determine a location where the vibration interaction occurs, and determine the display orientation of the at least two screens based on the determined location of the vibration interaction.

The first user interaction may include a touch interaction, and the controller may determine a direction of the touch interaction, and determine the display orientation of the at least two screens based on the determined direction of the touch interaction.

The controller may control the display to maintain a layout of the at least two screens even when the display orientation of the at least two screens is changed.

The display and each of the at least two screens may be in a substantially square shape.

According to an aspect of another exemplary embodiment, a user terminal device includes a display configured to display a screen; a detector configured to detect a user interaction; and a controller configured to, in response to the user interaction being detected while the screen of the user terminal device is in a powered-off state, determine a display orientation of the screen based on the user interaction, and change the screen to be in a powered-on state in the determined display orientation.

The detector may detect a rotation state of the user terminal, and the controller may determine the display orientation based on the rotation state of the user terminal device and control the display to control the screen to be in a powered-on state in the determined display orientation.

According to an aspect of another exemplary embodiment, a user terminal device includes: a display configured to display a first screen, a second screen, and a third screen; a detector configured to detect a first user interaction and a second user interaction; and a controller configured to divide the first screen into a first area and a second area based on the first user interaction and the second user interaction detected through the detector while the first screen is displayed on the display, determine a display orientation of the second screen which is to be displayed on the first area based on a direction of the first user interaction, determine a display orientation of the third screen which is to be displayed on the second area based on a direction of the second user interaction, and control the display to display the second screen in the first area and the third screen in the second area.

The first screen may be in a square shape, and the controller, in response to at least one of the direction of the first user interaction and the direction of the second user interaction being toward a corner of the display, may control the display to divide the first display screen into substantially triangular first and second areas.

The controller, in response to at least one of the direction of the first user interaction and the direction of the second user interaction being toward a side of the display, may control the display to divide the first screen into substantially rectangular first and second areas.

According to an aspect of an exemplary embodiment, a user terminal device includes: a display configured to display a first screen; a detector configured to detect a first user interaction and a second user interaction, wherein the first user interaction and the second user interaction include respective touch interactions on a front side and a back side of the user terminal device; and a controller configured to, in response to the detector detecting the first and second user interactions concurrently, control the display to divide the first screen into a first area and a second area based on the first user interaction and the second user interaction, determine a display orientation of a second screen which is to be displayed on the first area based on a direction of the first user interaction, determine a display orientation of a third screen which is to be displayed on the second area based on a direction of the second user interaction, and control the display to display the second screen on the first area and the third screen on the second area.

According to an aspect of an exemplary embodiment, a user terminal device includes a display configured to display a first screen; a detector configured to detect a user interaction; and a controller configured to, in response to the detector detecting the user interaction while the first screen is displayed, determine a display orientation of a second screen based on the user interaction, and control the display to display the second screen in the determined display orientation.

The first screen may be a lock screen or a notification screen.

A display orientation of the firs screen may be determined based on a display orientation prior to the first screen being displayed.

According to an aspect of another exemplary embodiment, a displaying method of a terminal includes: displaying a first screens on a display of the terminal; detecting a user input near a corner of the user terminal device; moving a portion of the first screen in accordance with the user input; and displaying a second screen on the area from which the portion for the first screen was moved.

The moving the portion of the first screen may include folding the first screen relative to the corner of the user terminal device, creating a folded area. The displaying the second screen may include displaying the second screen in the folded area.

The moving the portion of the first screen may include shifting the first screen relative to the display based on a direction and distance of the user input.

According to an aspect of an exemplary embodiment, a user terminal includes: a display; a detector configured to detect a user input; and a controller configured to, in response to the user input being detected near the corner of the display while a first screen is displayed on the display, control the display to move a portion of the first screen in accordance with the user input, and control the display to display a second screen on the area from which the portion for the first screen was moved.

The controller may be further configured to, in response to the user input being detected near the corner of the display while the first screen is displayed on the display, control the display to fold the first screen relative to the corner of the user terminal device where the user input was detected, creating a folded area, and control the display to display the second screen in the folded area.

the controller may be further configured to, in response to the user input being detected near the corner of the display while the first screen is displayed on the display, control the display to shift the first screen relative to the display based on a direction and distance of the user input.

As described above, according to the various exemplary embodiments, a user may perform various functions through a user terminal device having a display panel in a rectangular shape. Accordingly, user convenience and satisfaction may be improved.

BRIEF DESCRIPTION OF THE DRAWINGS

The above and/or other aspects will be more apparent by describing in detail exemplary embodiments, with reference to the accompanying drawings, in which.

DETAILED DESCRIPTION

Figure 1:
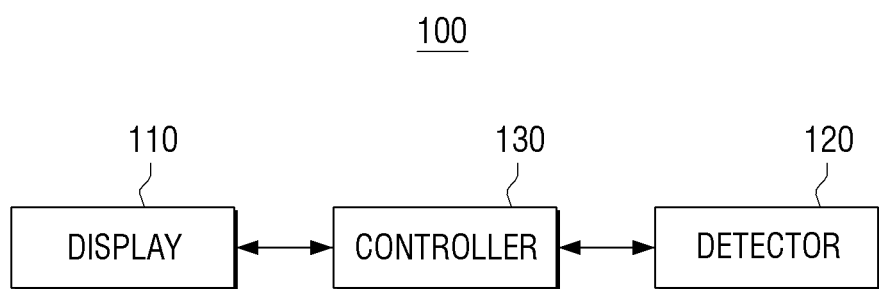
FIG. 1 is a block diagram illustrating a configuration of a user terminal device according to an exemplary embodiment.

In the following description, the same reference numerals are used for the same elements when they are depicted in different drawings. The matters defined in the description, such as detailed construction and elements, are provided to assist in a comprehensive understanding of the exemplary embodiments. Thus, it is apparent that exemplary embodiments can be carried out without those specifically defined matters. Also, functions or elements known in the related art are not described in detail since they would obscure the description of the one or more exemplary embodiments with unnecessary detail.

In the present disclosure, relational terms such as first and second, and the like, may be used to distinguish one entity from another, without necessarily implying any actual relationship or order between such entities.

The terms used in the present disclosure are provided to merely explain specific exemplary embodiment and are not intended to limit the scope of rights. A singular term includes a plural form unless clearly defined otherwise. The terms "include" and "configured to" in the description are used to indicate that there are features, numbers, steps, operations, elements, parts or combination thereof, and they should not exclude the possibility of combination or addition of one or more features, numbers, steps, operations, elements, parts, or combination thereof.

In an exemplary embodiment, 'a module' or 'a unit' may perform at least one function or operation, and may be realized as hardware, software, or combination thereof. In addition, a plurality of 'modules' or 'units' may be integrated into at least one module and may be realized as at least one process or processor (not shown) except for 'modules' or 'units' that should be realized in specific hardware.

Hereinafter, exemplary embodiments will be described in more detail with reference to the accompanying drawings.

FIG. 1 is a block diagram illustrating a configuration of a user terminal device 100 according to an exemplary embodiment. As illustrated in FIG. 1, the user terminal device 100 includes a display 110, a detector 120, and a controller 130. The user terminal device 100 may be implemented as a television (TV), personal computer (PC), laptop PC, cellular phone, tablet PC, a personal digital assistant (PDA), an MPEG audio layer-3 (MP3) player, a kiosk, a digital photo frame, a table display apparatus, or the like. When a user terminal device is implemented as a portable type apparatus such as a cellular phone, tablet PC, PDA, MP3 player, laptop PC, or the like, a user terminal device may be called a mobile device, but it may be referred to as a user terminal device in the present disclosure.

The display 110 displays various image data and user interfaces (UI). In particular, the display 110 may include a square-shaped display panel, and display at least one object having a square shape on the square-shaped display panel. In addition, the display 110 may provide various UIs and screens according to a user interaction detected through the detector 120. The shape of the display panel and the at least one object may be approximately, substantially, or predominantly square, but this is merely an example.

Meanwhile, the display 110 may be combined with a touch detector included in the detector 120, and may be realized as a touch screen.

The detector 120 detects a user interaction, i.e. a user input. In particular, the detector 120 may include a touch detector which detects a user touch. In addition, the detector 120 may detect a dragging interaction of dragging one of a plurality of points of interest, such as interactive points, corners, or apexes, included in the display 110 in a diagonal direction. Points of interest will be referred to as apexes.

The controller 130 controls overall operations of the user terminal device 100. In particular, the controller 130 may control the user terminal device 100 which has a display 110 according to various user interactions which are detected through the detector 120.

In an exemplary embodiment, while the display 110 displays a first screen, when a user interaction dragging from one of the apexes on the first screen in a diagonal direction is detected, the controller 130 may control the display 110 to display a second screen in an area of the one apex, i.e. the apex area.

To be specific, the display 110 which includes a square-shaped display panel may display a square-shaped first screen. In this case, when a user interaction to drag a first of the four apexes on the first screen in a diagonal direction is detected through the detector 120, the controller 130 may control the display 110 to display the first screen folded in the corner area and display the second screen in the folded area.

In this case, the second screen which is displayed in the apex area may include different information in accordance with the location of the apex area in which a user interaction is detected, from among the four apexes of the first screen. For example, the controller 130 may control the display 110 to display one of information on an application which is being executed, information to guide to a home screen, information on a status of a current terminal device, and information of quick access to an application designated by a user, according to a location of the first apex.

In addition, a size of the second screen which is displayed in the folded apex area may be different according to dragging amount of a user interaction. For example, the controller 130 may increase a size of the second screen in proportion to a length of the dragging.

In addition, the amount of information included in the second screen may be different in accordance with the size of the second screen. That is, the larger the size of the second screen, the greater the amount of information included in the second screen.

While a user interaction to drag in a diagonal direction is detected, when the user interaction is continued to an opposite apex area, the controller 130 may control the display 110 to replace the first screen which is displayed on the display 110 with the second screen. In other words, the controller 130 may control the display 110 to remove the first screen, and display the second screen as a full screen.

Meanwhile, the second screen may include different information according to types of image contents or applications displayed on the first screen. For example, when a screen displays a broadcast content, the second screen may control the display 110 to display information (for example, a program name, channel number, channel name, or the like) related to the displayed broadcast contents on the first screen. When the first screen displays a photo content, the second screen may display at least one icon which may perform various tasks regarding the photo content displayed on the first screen.

In addition, when an external message is received, the controller 130 may control the display 110 to display on the second screen at least one of an icon which indicates that a message is received or information corresponding to the received message.

As an another exemplary embodiment, while the display 110 displays a plurality of objects on a grid screen which includes a plurality of square cells, when a user interaction to touch and drag a first object from among the plurality of objects is detected through the detector 120, the controller 130 may adjust a size of the first object by adjusting the number of cells in which the first object is displayed in accordance with a length and direction of the dragging interaction of the user. Although the cells in the present exemplary embodiment are square, this is merely an example, and the cells may alternatively be different shapes, such as rectangular and triangular.

In particular, the display 110 may display on a display panel in a square shape a grid screen which includes a plurality of square-shaped cells. In this case, in the plurality of square cells, at least one object may be displayed. In this case, the object may occupy at least one square cell and may have a rectangular or square shape.

While the display 110 displays a grid screen, when a preset user interaction regarding the grid screen is detected through the detector 120, the controller 130 may change a mode of the user terminal device 100 to a grid editing mode.

During the editing mode, when a user interaction dragging a first object from among a plurality of objects is detected, the controller 130 may control the display 110 to determine a square cell in which the first object is displayed in accordance with a length and direction of dragging of the user interaction, adjust a size of the first object, and display the first object on the determined square cell.

For example, when a user interaction touching the first object and dragging the first object in an outward direction is detected, the controller 130 may increase the number of square cell areas in which the first object is displayed, increasing the size of the first object. In this case, the controller 130 may control the display 110 to move one or other objects of the plurality of objects to other square cell areas.

When a second user interaction touching the first object and dragging the first object in an inward direction of the first object is detected, the controller 130 may reduce the number of square cells in which the first object is displayed, reducing the size of the first object. In this case, the controller 130 may control the display 110 to move one or more other of the plurality of objects to another square cell area, and add one or more new objects to the screen.

The contents included in the first object may be different in accordance with the number of square cells in which the first object occupies. For example, when the first object is displayed on a square cell of a first number (for example, one), the first object may be an icon of an application which corresponds to the first object. In addition, when the first object is displayed in a second number of square cells (for example, four), the first object may include information regarding the corresponding application. Further, when the first object is displayed on a third number of square cells (for example, nine), the first object may include detailed information regarding the corresponding application. Further, if the first object is displayed on a fourth number of square cells (for example, sixteen), the first object may be an execution screen of the corresponding application.

In the aforementioned exemplary embodiment, four different types of contents are described according to four sizes of an object, but this is merely exemplary, and a plurality of different contents may be provided according to a plurality of object sizes.

When the first object has a square shape and is changed to a rectangular shape according to a user interaction, the controller 130 may control the display 110 to display a menu related to the first object among square cells in which the first object is displayed. In this case, the menu may have different shapes according to directions of a user interaction.

In addition, when a user interaction to drag one of the apexes included in the first object, from among a plurality of objects, in a diagonal direction is detected through the detector 120, the controller 130 may control the display 110 to display on an area where the first object is displayed a screen regarding an application which corresponds to the first object.

As described above, according to the various exemplary embodiments, a user may perform various functions through a user terminal device having a square-shaped display panel.

Hereinbelow, one or more exemplary embodiments will be explained in further detail with reference to FIGS. 2 to 46B.

Figure 2:
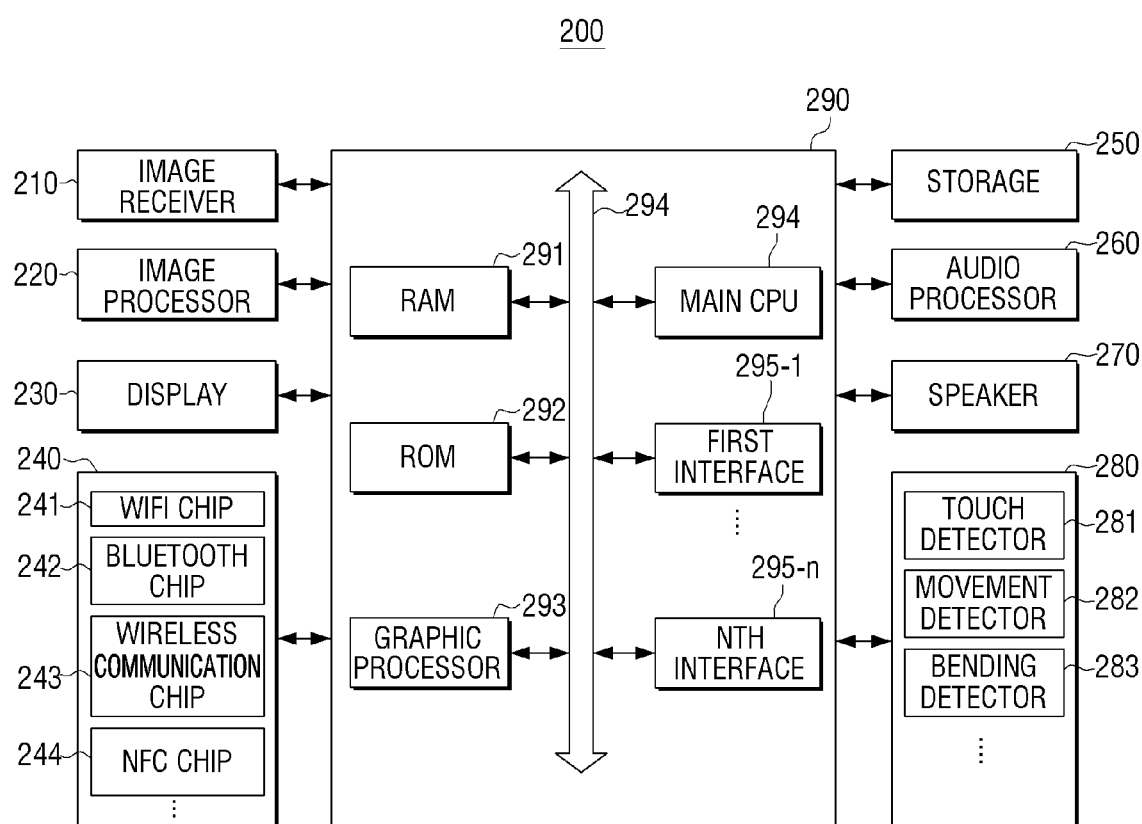
FIG. 2 is a block diagram illustrating a configuration of a user terminal device according to an exemplary embodiment.

FIG. 2 is a block diagram illustrating a configuration of a user terminal device 200 according to an exemplary embodiment. As illustrated in FIG. 2, the user terminal device 200 includes an image receiver 210, an image processor 220, a display 230, a communicator 240, a storage 250, an audio processor 260, a speaker 270, a detector 280, and a controller 290.

FIG. 2 illustrates various elements that provide various content and functions, such as a content providing function and a display function. However, one or more exemplary embodiments, may omit or change the elements illustrated in FIG. 2, or may include other components (not illustrated).

The image receiver 210 receives image data through various sources. For example, the image receiver 210 may receive broadcasting data from an external broadcasting station, receive video on demand (VOD) data from an external server on a real-time basis, and receive image data from an external device.

The image processor 220 which processes image data received from the image receiver 210. The image processor 220 may perform various image processing functions with respect to image data, such as decoding, scaling, noise filtering, frame rate conversion, and resolution conversion.

The display 230 displays at least one of a video frame which is generated as the image processor 220 processes image data received from the image receiver 220 and various screens generated by a graphic processor 293.

Figure 3A:
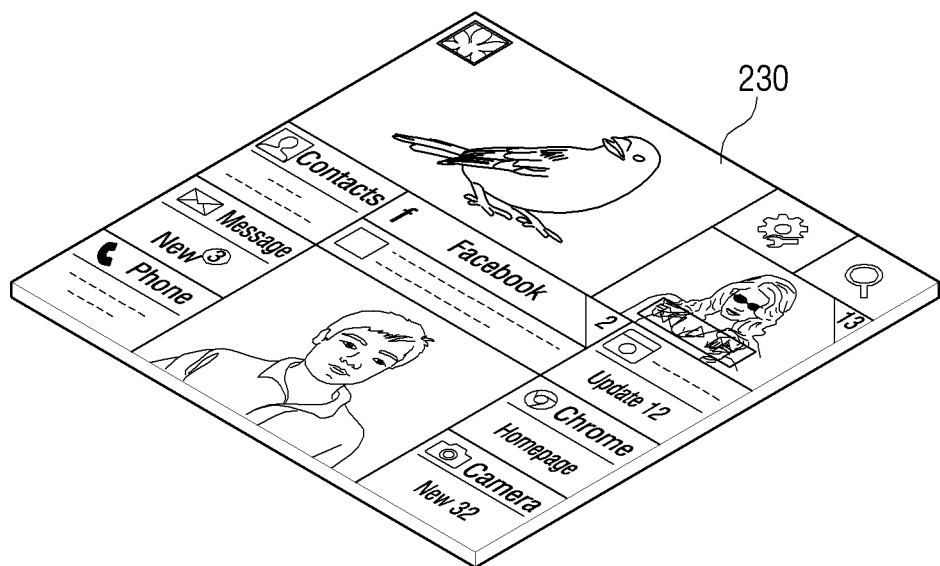
FIGS. 3A and 3B are views illustrating a user terminal device which has a square-shaped display panel according to an exemplary embodiment.
Figure 3B:
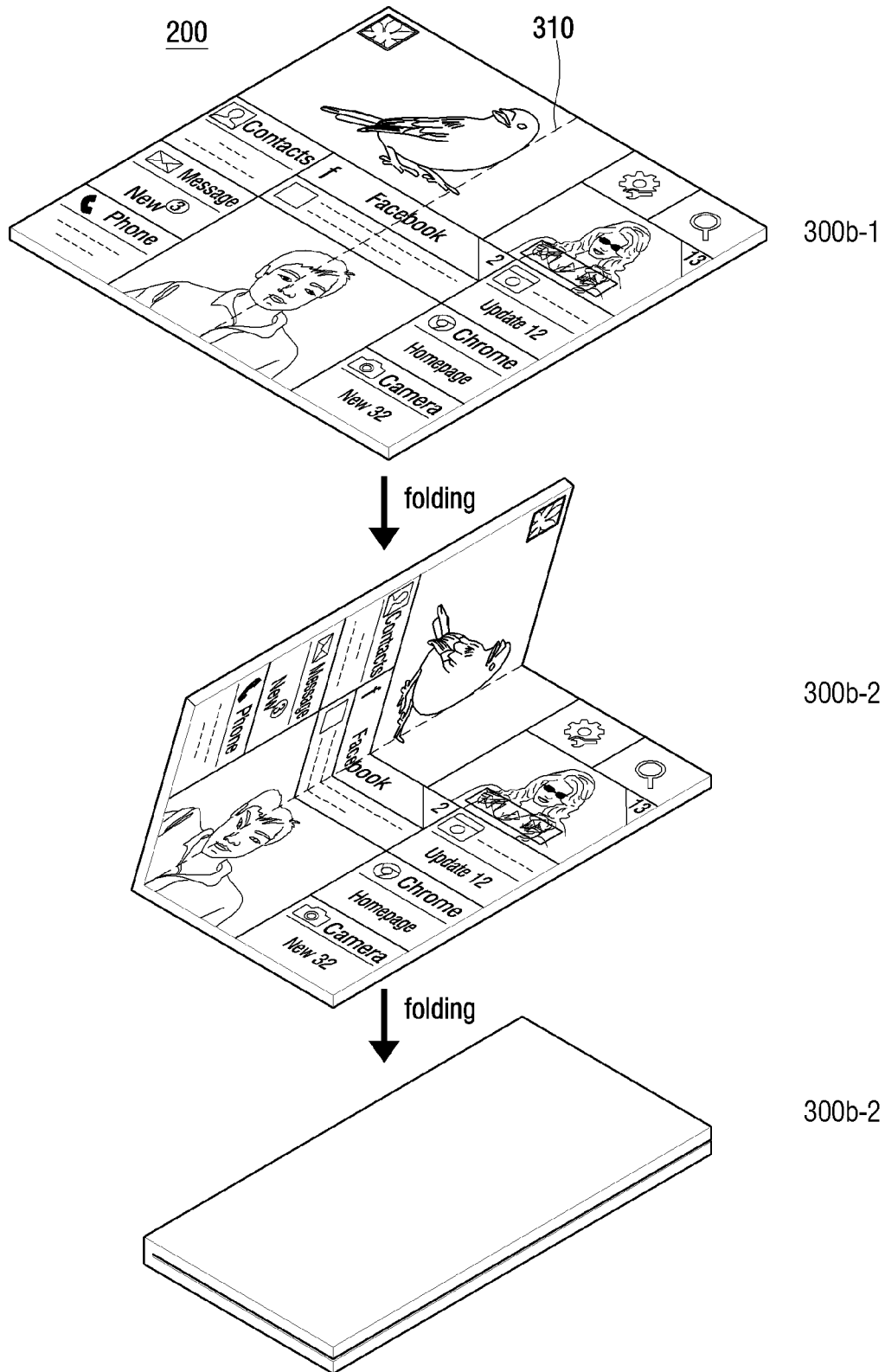

In particular, the display 230 may include a display panel to output image data and a driver to drive a display panel. In this case, the display panel may have square shape as illustrated in FIG. 3A. In addition, as illustrated in 300b-1, 300b-2, and 300b-3 or FIG. 3B, the display panel may include a hinge 310 at a center of the square-shaped display panel and may be folded around the hinge 310.

The communicator 240 is configured to communicate with various types of external devices according to various types of communication methods. The communicator 240 includes a Wi-Fi chip 241, a Bluetooth chip 242, a wireless communication chip 243, and an NFC chip 244. The controller 290 performs communication with various external devices using the communicator 240.

The Wi-Fi chip 241 and the Bluetooth chip 242 perform communication using a Wi-Fi method and a Bluetooth method respectively. In case of using the Wi-Fi chip 241 or the Bluetooth chip 242, connection information such as a service set identification (SSID) and a session key may be received and transmitted first, and communication may be connected using the connection information, and then, various information may be received and transmitted. The wireless communication chip 243 indicates a chip which performs communication in accordance with various communication standards such as IEEE, ZigBee, 3rd generation (3G), 3rd generation partnership project (3GPP), long term evolution (LTE), and the like. The NFC chip 244 indicates a chip which operates using near field communication (NFC) method, such as using a 13.56 MHz band from among RF-ID frequency bands such as 135 kHz, 13.56 MHz, 433 MHz, 860~960 MHz, and 2.45 GHz.

Figure 4:
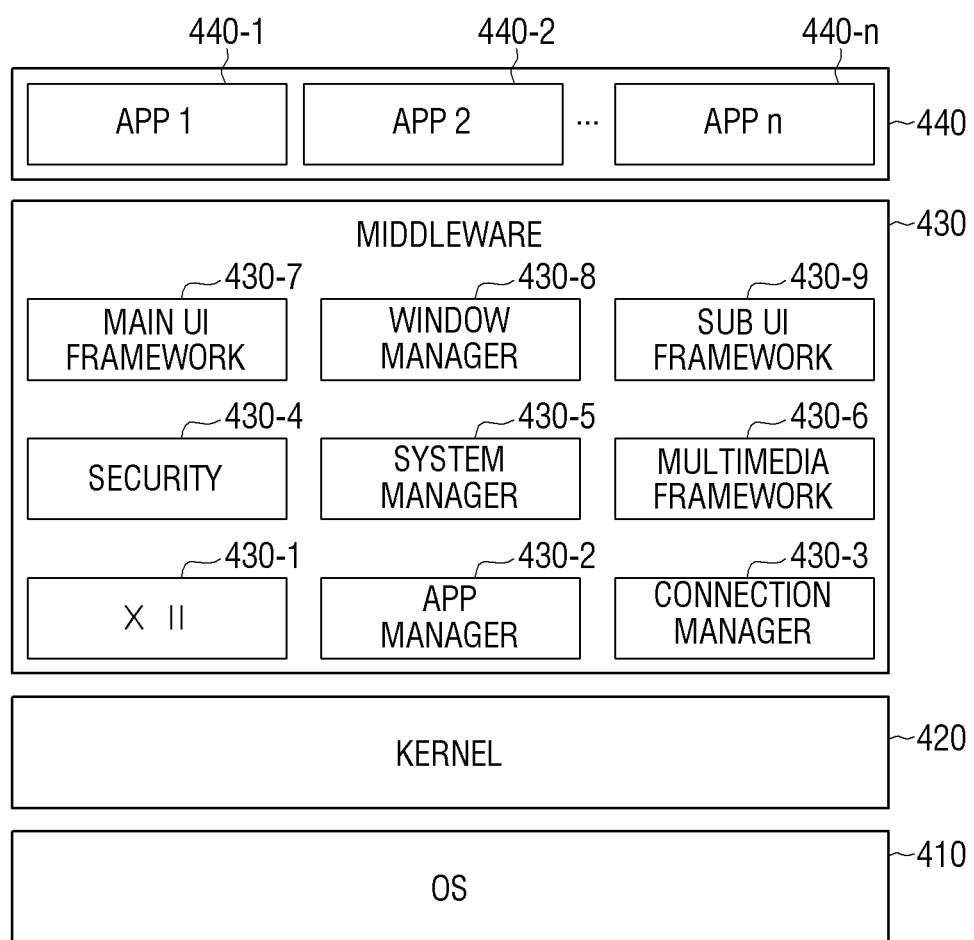
FIG. 4 is a view illustrating a configuration of software stored in a storage according to an exemplary embodiment.

The storage 250 may store various programs and data required for the operations of the user terminal device 200. To be specific, the storage 250 may store programs and data to configure various screens which are to be displayed on a main area and a sub area. Hereinbelow, FIG. 4 is illustrating a configuration of software stored in the user terminal device 200, according to an exemplary embodiment. According to FIG. 4, the storage 250 may store software including an OS 410, a kernel 420, a middleware 430, and an application 440.

An operating system (OS) 410 controls and manages overall operations of hardware. In other words, the OS 410 manages hardware and is responsible for basic functions such as memory and security.

The kernel 420 plays a role as a path which transmits various signals including a touch signal detected by the display 230 to the middleware 430.

The middleware 430 includes various software modules which control the operations of the user terminal device 200. According to FIG. 4, the middleware 430 includes an X11 module 430-1, an APP manager 430-2, a connection manager 430-3, a security module 430-4, a system manager 430-5, a multimedia framework 430-6, a main UI framework 430-7, a window manager 430-8, and a sub UI framework 430-9.

The X11 module 430-1 is a module which receives various event signals from various hardware provided in the user terminal device 200. Here, an event may occur in various manners such as an event to sense a user gesture, an event to generate a system alarm, and an event to execute or terminate a specific program.

The APP manager 430-2 is a module which manages execution status of various applications 440 installed in the storage 250. The APP manager 430-2 calls and executes an application which corresponds to this event when an event to execute an application is detected by the X11 module 430-1.

The connection manager 430-3 is a module supporting wired or wireless network connection. The connection manager 430-3 may include various sub modules such as a DNET module (not shown) and a universal plug and play (UPnP) module (not shown).

The security module 430-4 is a module which supports certification, permission, and security storage with respect to hardware.

The system manager 430-5 monitors a state of each element within the user terminal device 200, and provides a result of the monitoring to other modules. For example, when remaining battery is not sufficient, an error occurs, or a communication connection breaks down, the system manager 430-5 provides a monitoring result to the main UI framework 430-7 or the sub UI framework 430-9, and outputs an alarm message or an alarm sound.

The multimedia framework 430-6 is a module to play back multimedia contents stored in the user terminal device 200 or provided from an external source. The multimedia framework 430-6 may include a player module (not shown), a camcorder module (not shown), and a sound processing module (not shown). Accordingly, the multimedia framework 430-6 may reproduce various multimedia contents and play back screens and sounds.

The main UI framework 430-7 is a module that provide various use interfaces (UIs) displayed on a main area and on one or more sub areas of a bended touch screen 100. The main UI framework 430-7 and the sub UI framework 430-9 may include an image compositor module (not shown) which constitute various objects, a coordinate compositor module (not shown) which calculates coordinates to display an object, a rendering module (not shown) which renders the constituted object on the calculated coordinate, and a 2D/3D UI toolkit (not shown) which provides tools to generate a UI in a two-dimensional (2D) or a three-dimensional (3D) format, or the like.

The window manager 430-8 may sense a touch event of a body or a pen of a user or other input events. The window manager 430-8 may transmit an event signal to the main UI framework 430-7 or the sub UI framework 430-9 when an event is detected, so that an operation corresponding to the event may be performed.

In addition, a writing module (not shown) to draw when a user touches and drags a screen, a line following a drag trace, and various program modules (not shown) to calculate pitch angle, roll angle, yaw angle based on a detector value detected by the movement detector 282 may be included in the middleware 430.

The application module 440 include applications 440-1~440-n to support various functions. For example, a program module to provide various services such as a navigator program module (not shown), a game module (not shown), an e-book module (not shown), a calendar module (not shown), an alarm management module (not shown), or the like may be included. These applications may be installed by default or may be arbitrarily installed by a user in the midst of using the applications. The main CPU 294, when an object is selected, may execute an application which corresponds to a selected object using the application module 440.

The software structure illustrated in FIG. 4 is merely exemplary, and is not limiting. Therefore, there may be omissions, modifications, and additions to the exemplary embodiments. For example, various programs may be additionally stored in the storage 250 such as a sensing module (not shown) to analyze signals detected by various detectors, a messaging module (not shown) such as a messenger program, a short message service (SMS) & multimedia message service (MMS) program (not shown), an e-mail program (not shown), a call info aggregator program module (not shown), voice over internet protocol (VoIP) module (not shown), a web browser module (not shown), or the like.

Referring back to FIG. 2, the audio processor 260 is an element to process audio data of an image content. In the audio processor 260, various processes such as decoding, amplification, and noise filtering of audio data may be performed. The audio data processed by the audio processor 260 may be output to the audio outputter 270.

The audio outputter 270 has a configuration to output not only various audio data for which various processes such as decoding, amplification, and noise filtering are performed by the audio processor 260, but also various alarm sounds or an audio message. In particular, the audio outputter 270 may be implemented as a speaker, but this is merely exemplary, and may be realized as an output terminal which may output audio data.

The detector 280 senses various user interactions. In particular, the detector 280, as illustrated in FIG. 2, may include the touch detector 281, the movement detector 282, and the bending detector 283.

The touch detector 281 may sense a user's touch interaction using a touch panel attached to a back of a display panel. The movement detector 282 may sense movements (for example, rotational movement, or the like) of the user terminal device 100 using at least one of an acceleration detector (not shown), a terrestrial magnetism detector (not shown), and a Gyro detector (not shown). The bending detector 283 may sense whether a user terminal device is folded around the hinge 310, by using a bending sensor (not shown), such as an illumination detector (not shown), or the like.

The controller 290 controls an overall operation of the user terminal device 200 using various programs stored in the storage 250.

The controller 290, as illustrated in FIG. 2, includes a RAM 291, a ROM 292, a graphic processor 293, a main CPU 294, first to nth interface 295-1~295-n, and bus 296. In this case, the RAM 291, the ROM 292, the graphic processor 293, the main CPU 294, and the first to the nth interface 295-1~295-n may be connected with each other through the bus 296, or the like.

In the ROM 292, a command set for system booting is stored. When a turn-on command is input and power is supplied, the main CPU 294 copies an operating system (O/S) stored in the storage 250 according to a command stored in the ROM 292 to the RAM 291, executes the O/S, and boots the system. When booting is completed, the main CPU 294 copies various application programs stored in the storage 250 to the RAM 291, executes the application programs copied to the RAM 291, and perform various operations.

The graphic processor 293, by using a calculator (not shown) and a renderer (not shown), generates a screen including various objects such as an item, an image, a text, or the like. The calculator, by using a control command received from the detector 280, calculates attribute values such as a coordinate value to which each object is displayed according to a layout of a screen, type, size, or color. The renderer generates a screen of various layouts including objects based on the attribute values calculated by the calculator. The screen generated by the renderer is displayed within a display area of the display 230.

The main CPU 294, by accessing the storage 250, performs booting using the O/S stored in the storage 250. In addition, the main CPU 294 performs various operations using various programs, contents, and data stored in the storage 250.

The first to the nth interface 295-1 to 295-n are connected to the above-described various elements. One of the interfaces may be a network interface which is connected to the external apparatus through network.

In particular, the controller 290 may provide various functions regarding the user terminal device 200 having a display panel in a rectangular shape.

<Diagonal Interaction>

According to an exemplary embodiment, while the display 230 displays the first screen, when a user interaction (hereinafter a "diagonal interaction") to drag one of the apexes on the first screen in a diagonal direction is detected through the detector 280, the controller 290 may control the display 230 to display the second screen on the apex area where the diagonal interaction is detected. Hereinbelow, with reference to FIGS. 5A to 18C, various functions provided by the user terminal device 200 according to the diagonal interaction will be described.

Figure 5A:
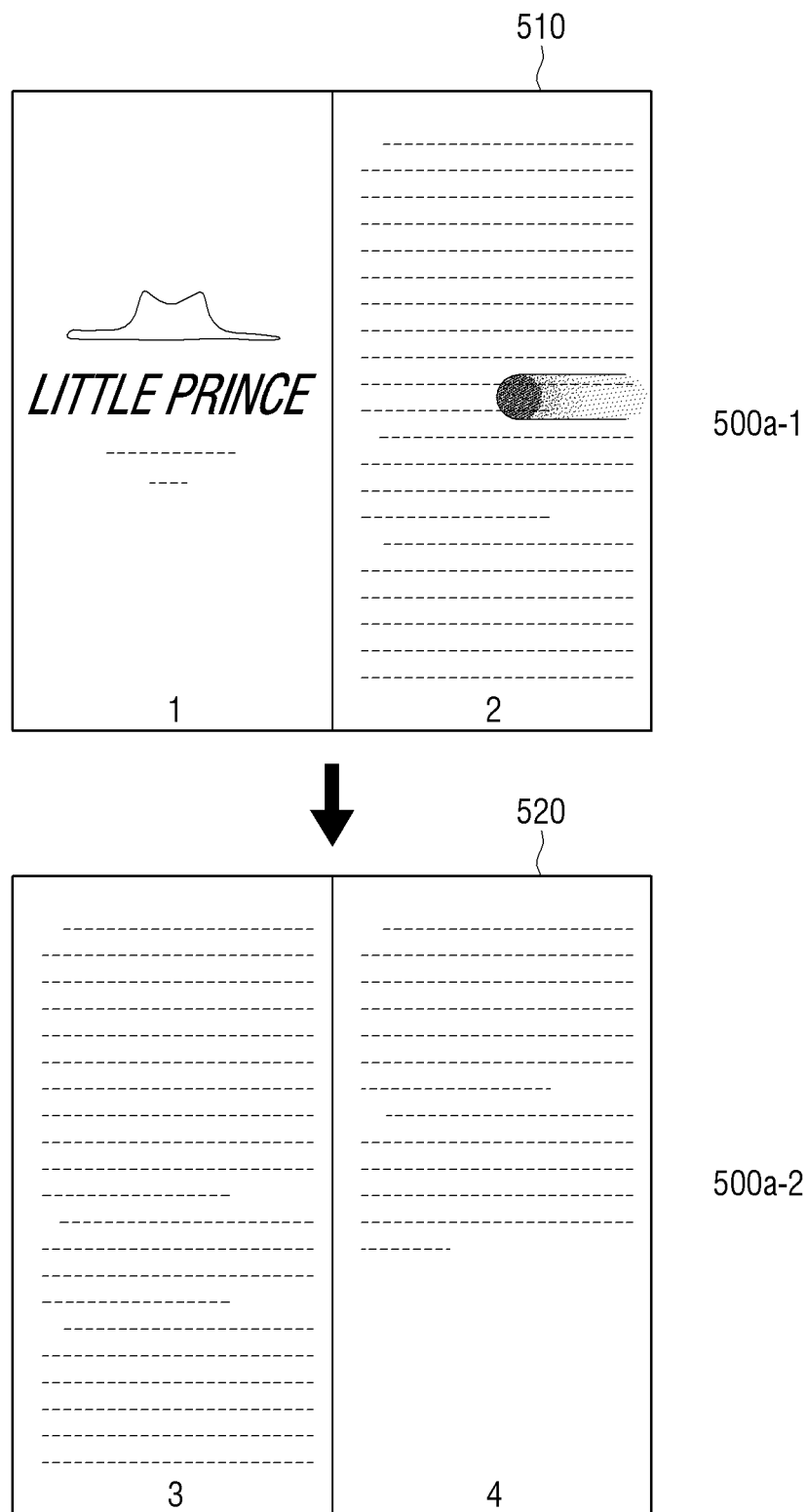
FIGS. 5A to 18C are views illustrating various user terminal devices which perform various functions according to a user interaction in a diagonal direction, according to one or more exemplary embodiments.
Figure 5B:
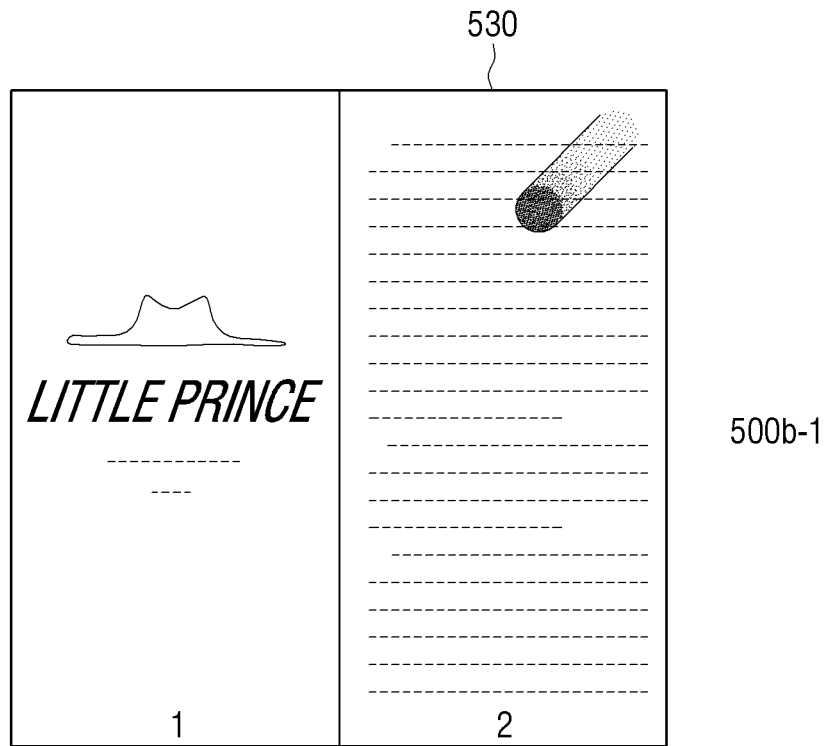
Figure 5B:
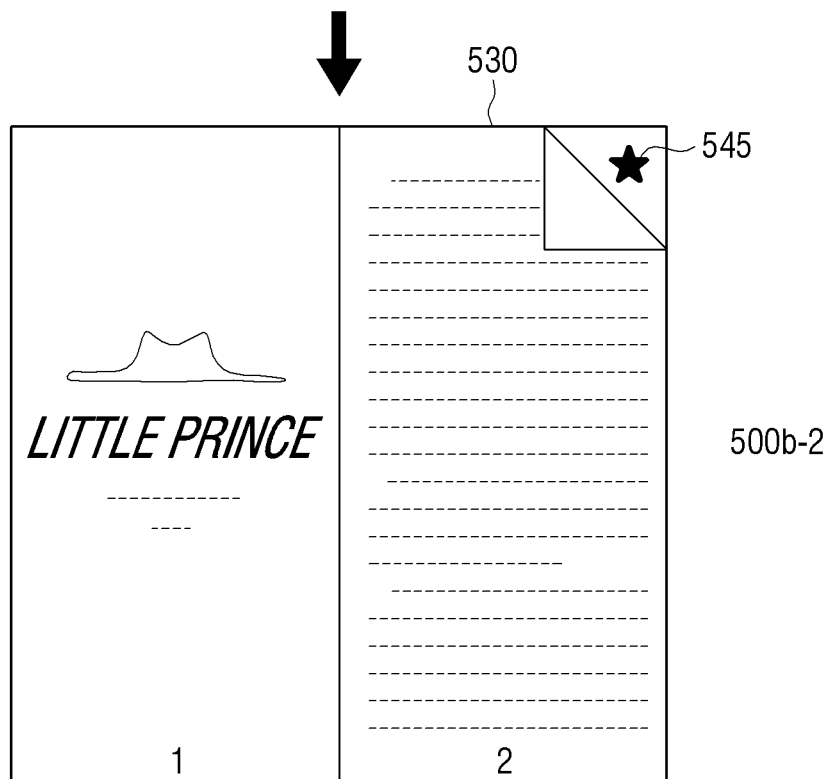

FIGS. 5A and 5B are views illustrating a function provided by the user terminal device 200, when a user interaction in a width direction and a diagonal interaction are detected.

As illustrated in FIG. 5A, while a first page 510 of the e-book contents is displayed on a screen, when a user interaction to drag from a plurality of apexes included in the screen in a width direction (in particular, a left direction) is detected (500a-1), the controller 290 may control the display 230 to convert a page of the e-book contents to a second page 520 of the e-book contents (500a-2).

As illustrated in FIG. 5B, while a third page 530 of the e-book contents is displayed on a screen, when a diagonal interaction is detected at one of a plurality of apex areas included in the screen (500b-1), the controller 290 may control the display 230 to maintain a current page screen, provide an image effect where the diagonal interaction is detected where the corner area appears folded, and display a bookmark icon 545 at the folded area (500b-2).

That is, the controller 290 may provide different functions through a horizontal user interaction and a diagonal interaction.

In addition, the controller 290 may include information on a function which the user terminal device 200 may provide on the second screen according to a position of the apex area where the diagonal interaction is detected.

Figure 6A:
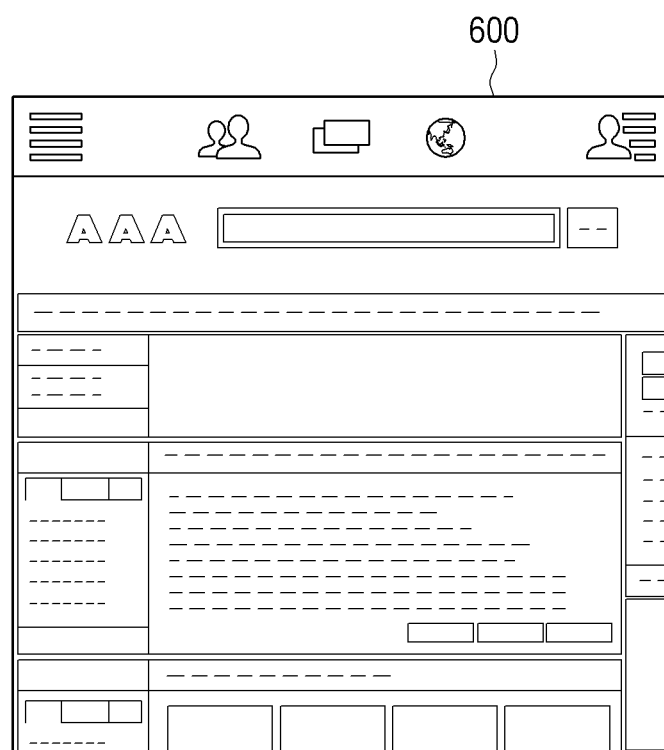

As illustrated in FIG. 6A, the controller 290 may control the display 230 to display image contents 600.

Figure 6B:
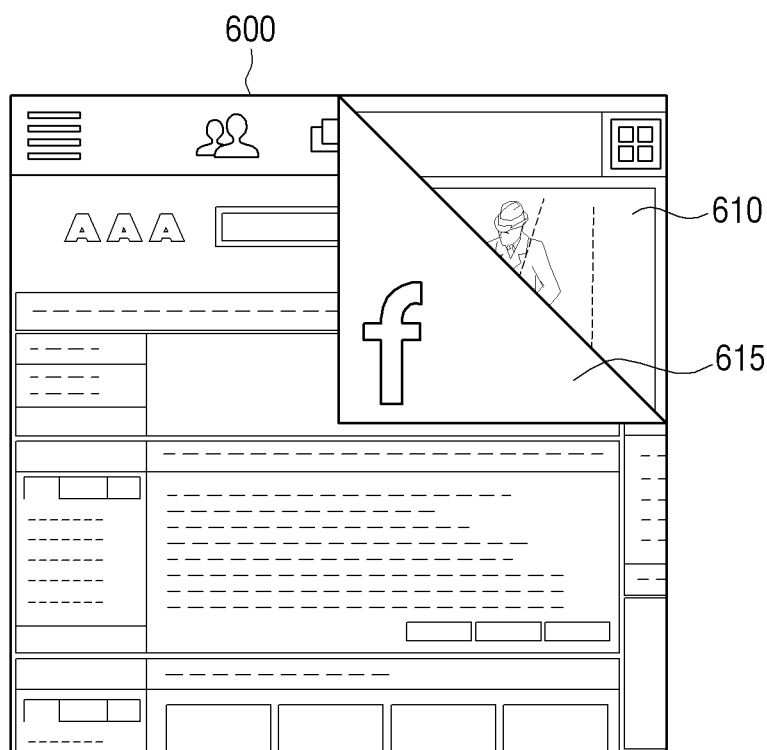

While the image contents 600 are displayed, when a diagonal interaction is detected at an apex area in a right upper end portion, the controller 290, as illustrated in FIG. 6B, may control the display 230 to display information 615 (for example, an icon, a recently-executed screen, or the like) on the most recently executed application at the apex area in a right upper end portion where the diagonal interaction is detected. While the information 615 on the most recently executed application is displayed along with the image contents 600, when the diagonal interactions are sequentially detected at an apex area in a right upper end portion, the controller 290 may control the display 230 to display information 1610 on the second most recent application at an apex in a right upper end where the diagonal interaction is detected.

Figure 6C:
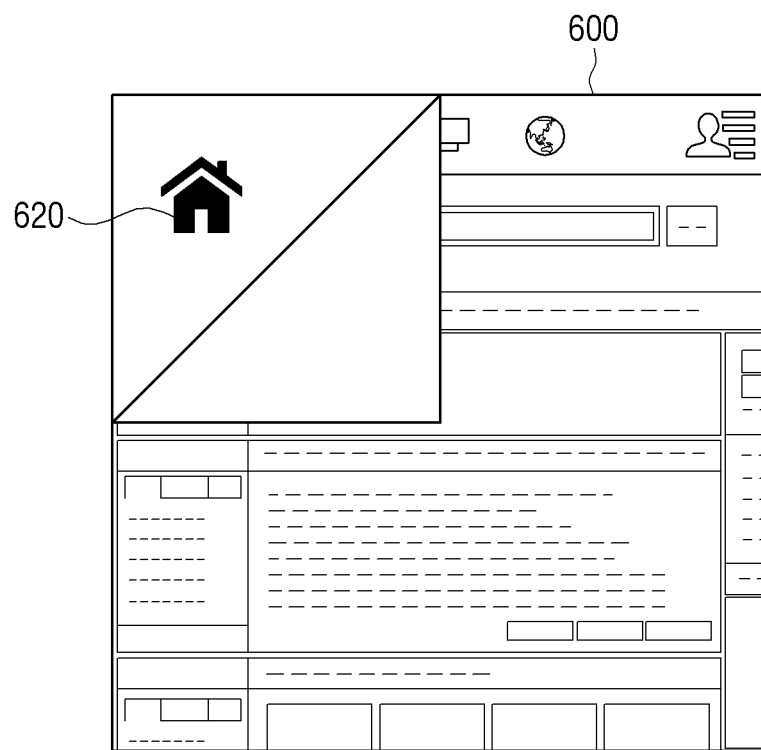

While the image contents 600 are displayed, when the diagonal interaction is detected at an apex area in a left upper end portion, the controller 290, as illustrated in FIG. 6C, may control the display 230 to display information 620 (for example, an icon) which indicates that moving to a home screen is available at the apex area in a left upper end portion where a diagonal interaction is detected.

Figure 6D:
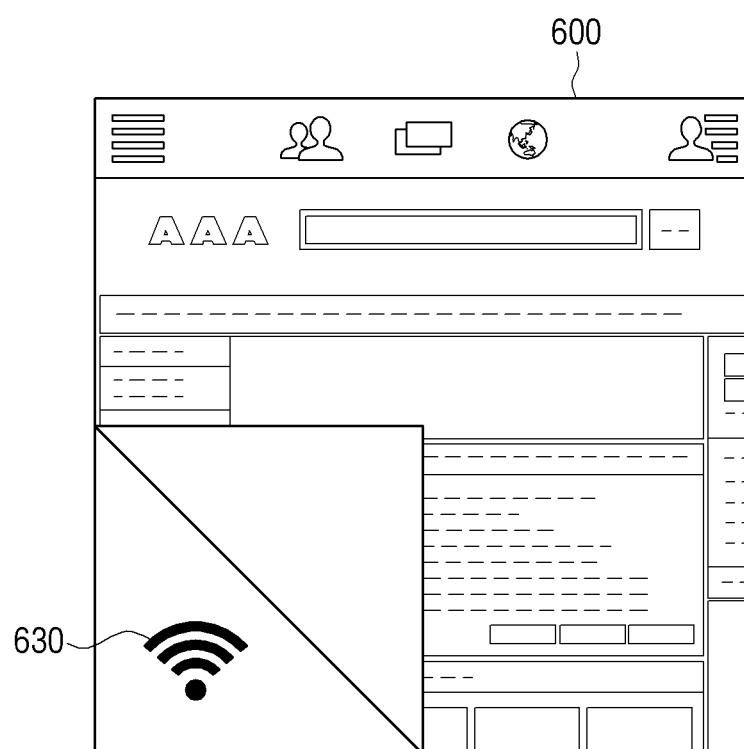

While the image contents 600 are displayed, when a diagonal interaction is detected at an apex area in a left lower end portion, the controller 290, as illustrated in FIG. 6D, may control the display 230 to display status information (for example, network information, battery information, etc.) of the user terminal device 100 in the left lower end apex area where the diagonal interaction is detected.

Figure 6E:
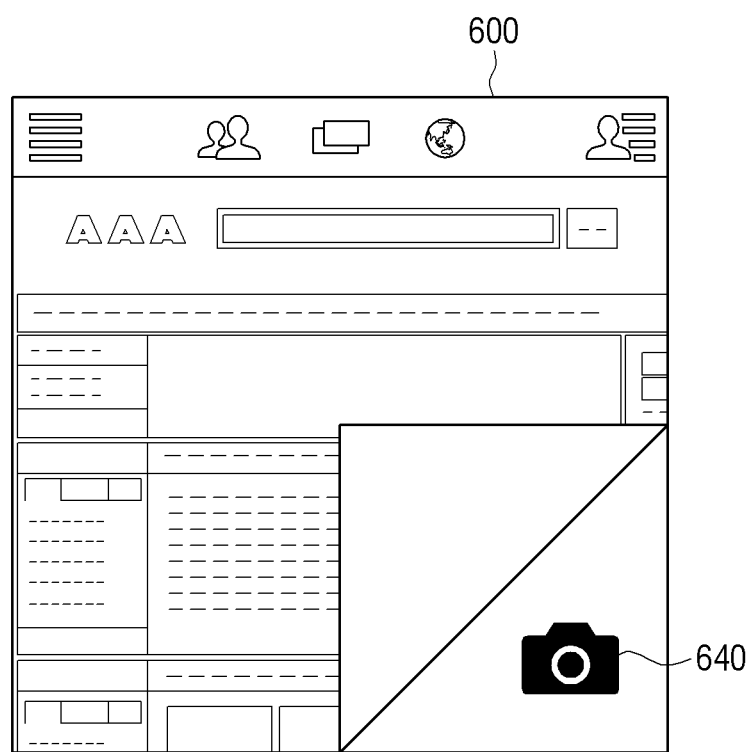

While the image contents 600 are displayed, when the diagonal interaction is detected at an apex area in a right lower apex area, the controller 290, as illustrated in FIG. 6E, may control the display 230 to display quick access information 640 (for example, an icon corresponding to the camera application) on the application designated by a user in a right lower apex area where the diagonal interaction is detected.

In addition, when the diagonal interaction is detected at a lock screen, the controller 290 may control the display 230 to display information on an object regarding which the diagonal interaction is detected at a lock screen.

Figure 7A:
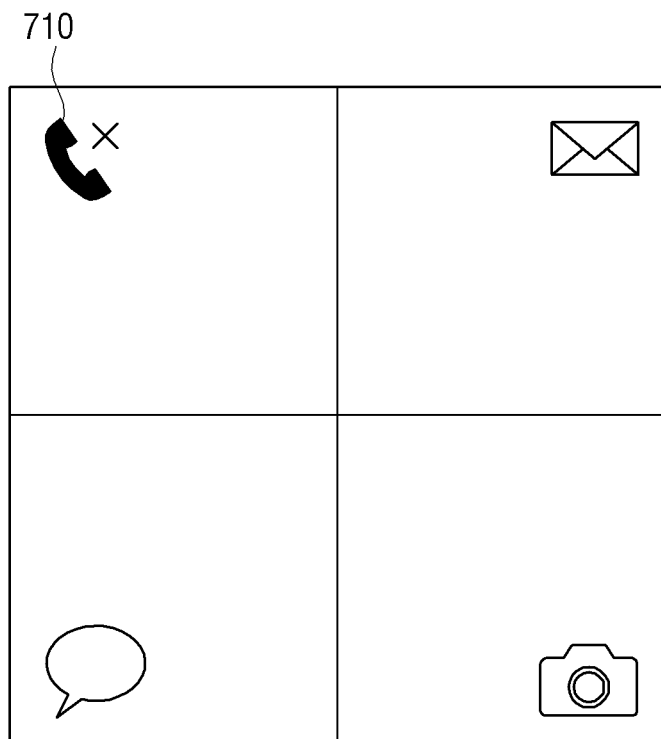
Figure 7B:
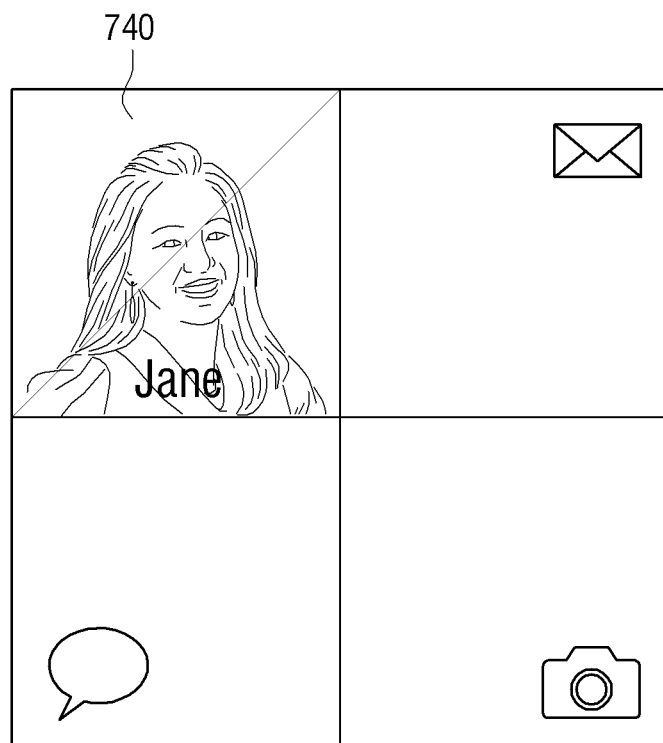

As illustrated in FIG. 7A, while four objects are displayed on a lock screen, when the diagonal interaction is detected at the first object 710 which indicates a missed call, the controller 290, as illustrated in FIG. 7B, may control the display 230 to display information 720 (such as information on a caller of the missed call) regarding the missed call at an area where the first object 710 is displayed.

However, as described in FIGS. 7A and 7B, the feature of providing information about an absent call on a lock screen by the controller 290 is merely an example, and various information and functions may be provided on a lock screen through the diagonal interaction. For example, the controller 290 may provide information about a received message through diagonal interaction at a lock screen, and provide a quick access function regarding a camera application.

In addition, the controller 290, from among four apex areas of the first screen, may include information regarding the functions which the user terminal device 200 may provide according to location of an apex area where the diagonal interaction is detected, and application functions, on the second screen.

Figure 8A:
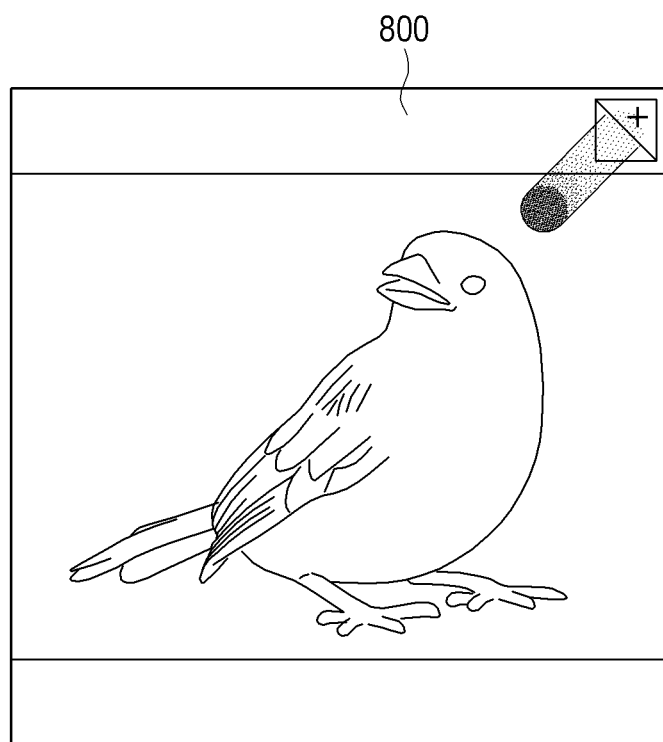

As illustrated in FIG. 8A, the controller 290 may control the display 230 to display a photo 800, or a photo content.

Figure 8B:
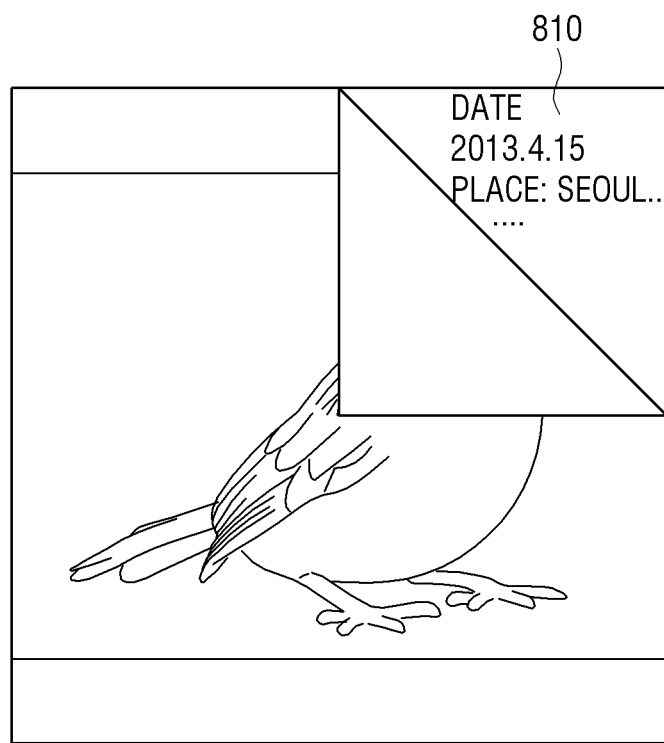
Figure 8C:
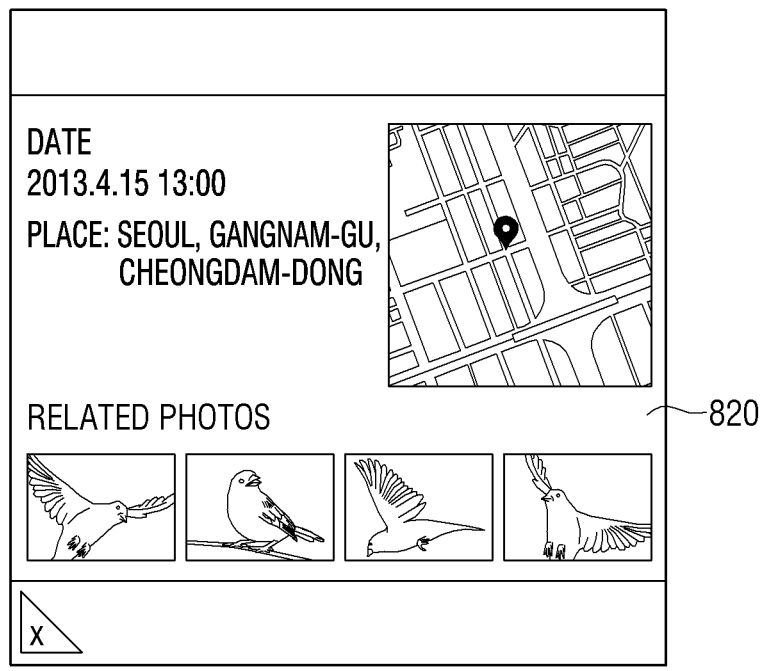

While the photo 800 is displayed, when the diagonal interaction is detected at an apex area in a right upper end portion, the controller 290, as illustrated in FIG. 8B, may control the display 230 to fold the apex in a right upper end where the diagonal interaction is detected, and display the information 810 (for example, a photographing date, a photographing place, etc.) related to the photo on the folded area. When the diagonal interaction continues to an apex area in a left lower end, the controller 290, may control the display 230 to display information 820 (for example, the photographing data, the photographing place, map information of the photographing place, other relevant photo information, etc.) on the screen, as illustrated in FIG. 8C.

Figure 9A:
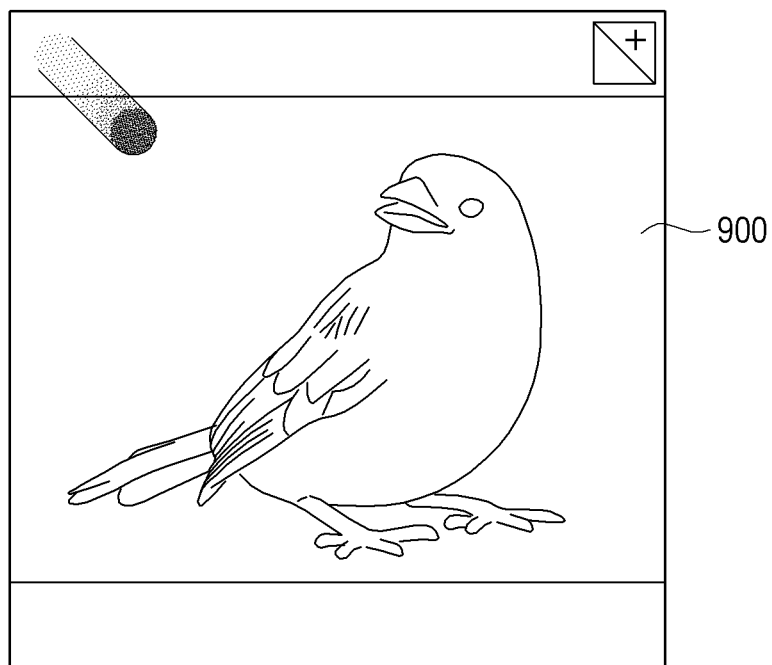
Figure 9B:
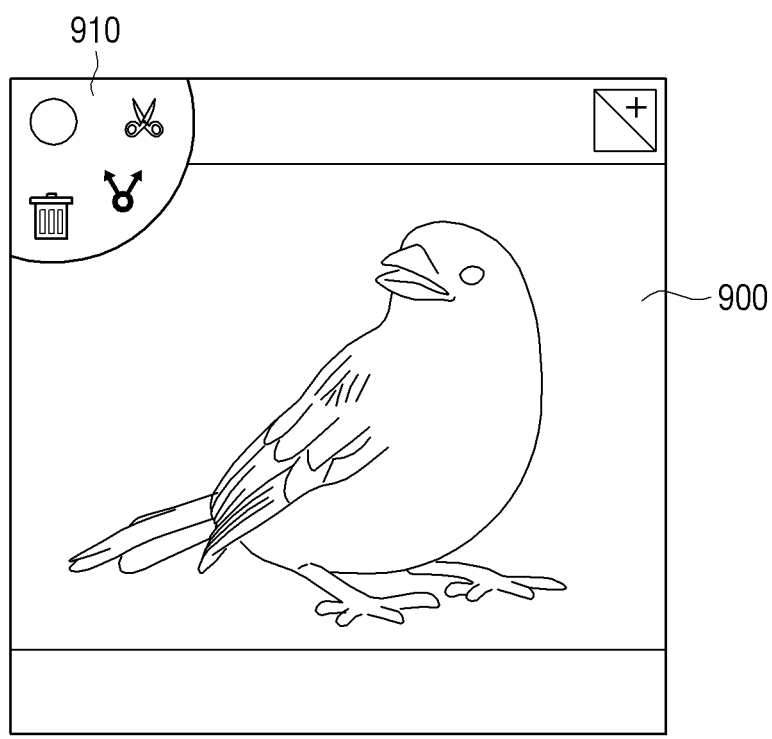

As illustrated in FIG. 9A, while the photo 800 is displayed, when the diagonal interaction is detected at an apex area in a left upper end portion, the controller 290, as illustrated in FIG. 9B, may control the display 230 to display a menu 910 (for example, deleting, editing, sharing, etc.) which may provide various tasks regarding the photo in the left upper apex area where the diagonal interaction is detected.

Figure 10A:
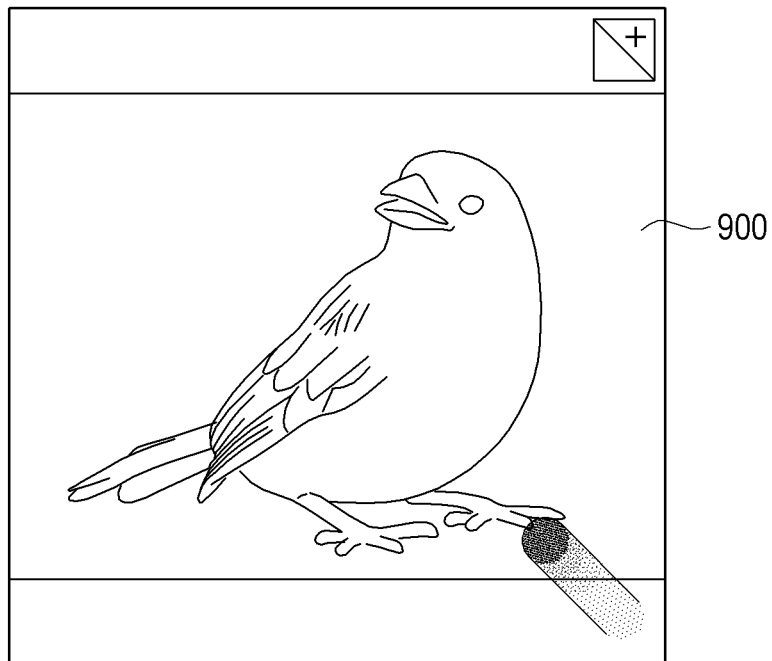
Figure 10B:
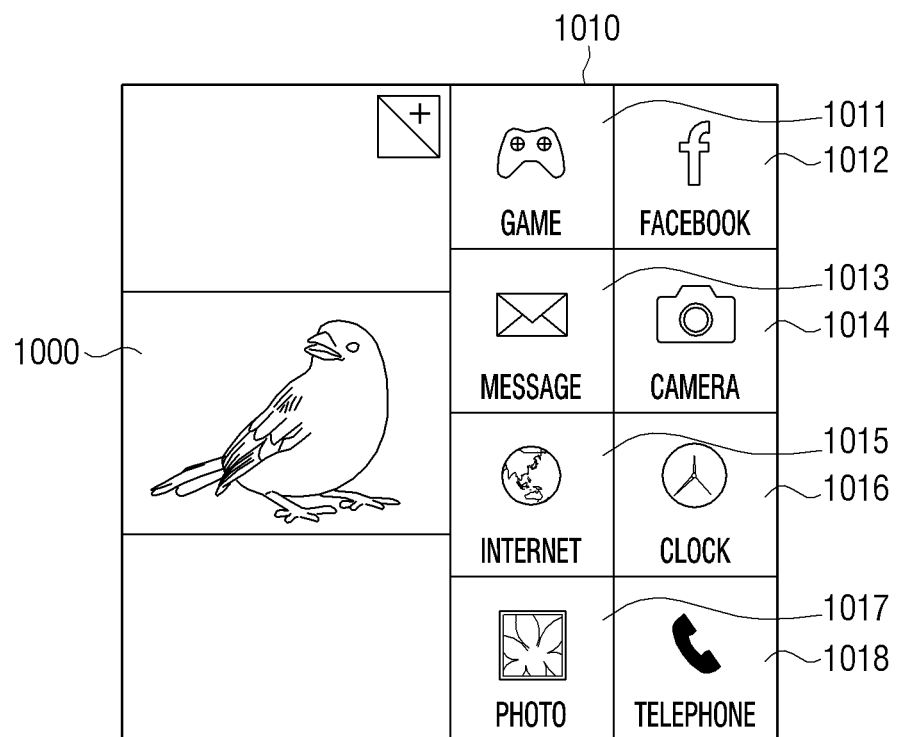
Figure 10C:
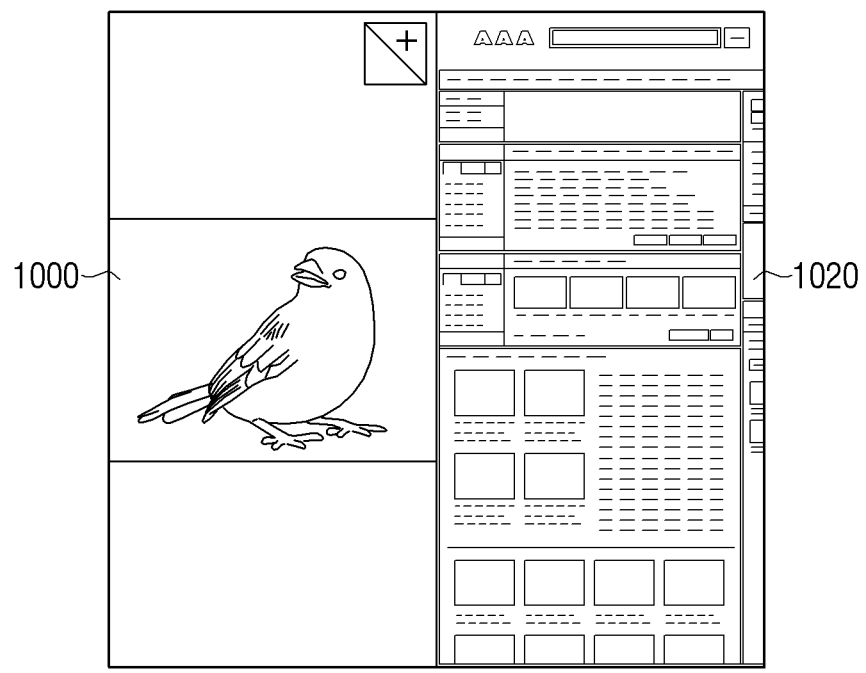

As illustrated in FIG. 10A, while the photo 800 is displayed, when the diagonal interaction is detected at an apex area in a right lower end portion, the controller 290, as illustrated in FIG. 10B, may control the display 230 to decrease the photo 1000 and display the photo on a left side of the screen. In addition, the controller 290 may control the display 230 to display a menu window 1010 including a plurality of icons 1011-1018 which may perform various functions of the user terminal device 100 on a left area of the screen. For example, when the fifth icon 1015 is selected from among a plurality of icons 1011-1018 included in the menu window 1010, the controller 290 may control the display 230 to display an internet browsing screen 1020 which corresponds to the fifth icon 1015, as shown in FIG. 10C.

As described above, a user, while a photo is displayed, may be provided with various functions according to a position of an apex area where the diagonal interaction is detected.

The controller 290 may change a size of the second screen according to a dragging amount of the diagonal interaction, and change a quantity of information included in the second screen according to the size of the second screen.

For example, as illustrated in FIGS. 11A to 11D, when a message is received while displaying content 1000, if the diagonal direction is detected at an apex area in a right upper end portion, the controller 290 may control the display 230 to display information on the received message.

Figure 11A:
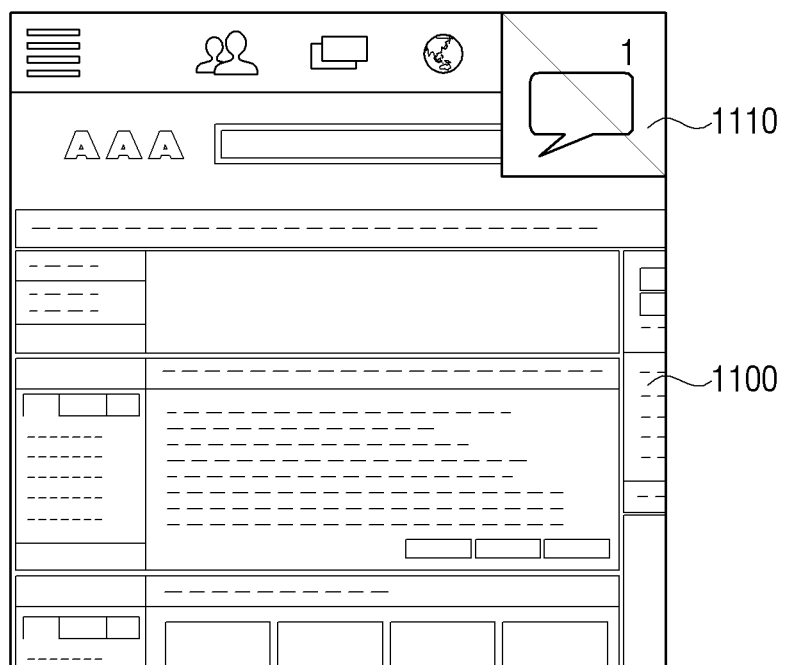
Figure 11B:
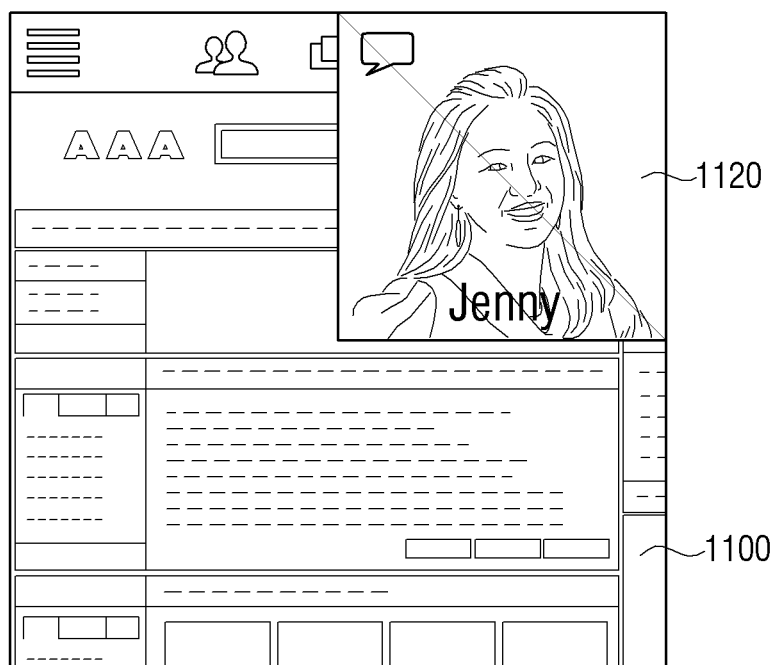

In particular, when a dragging amount of the diagonal interaction is less than a first value, the controller 290, as illustrated in FIG. 11A, may control the display 230 to display the icon indicting that a message is received on the second screen 1110.

In addition, as illustrated in FIG. 11, when the dragging amount of the diagonal interaction is not less than the first value and less than the second value, the controller 290 may control the display 230 to display the second screen 1120 including information on a caller (for example, name of a caller, a photo of a caller, etc.).

Figure 11C:
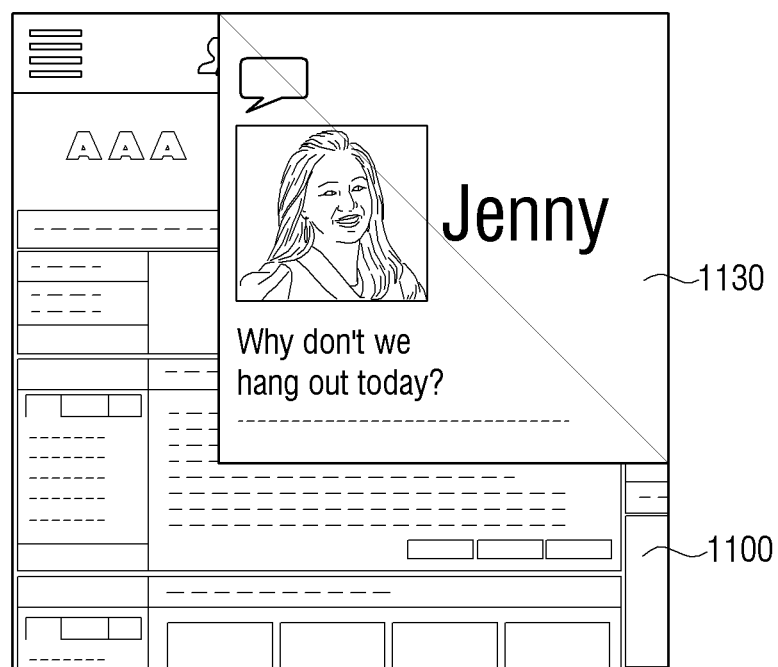

Further, as illustrated in FIG. 11C, when the dragging amount of the diagonal interaction is not less than the second value and less than the third value, the controller 290 may control the display 230 to display the second screen 1130 including at least a part of the information on a caller and a part of the contents of the message.

Figure 11D:
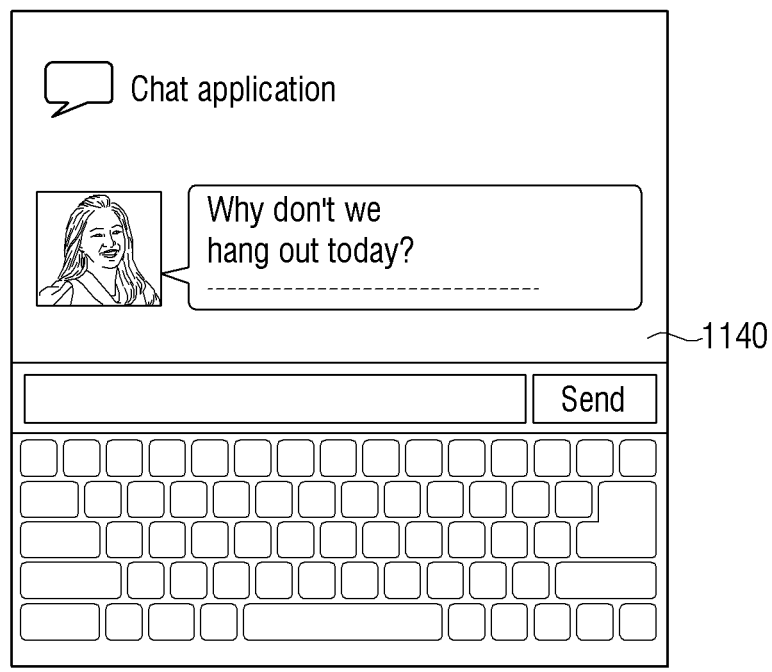

In addition, as illustrated in FIG. 11D, when the dragging amount of the dragging interaction is not less than the third value, the controller 290 may control the display 230 to display a chatting screen 1140 to respond to the received message.

In addition, when a plurality of successive diagonal interactions are detected at the same apex area, the controller 290 may provide different or additional information corresponding to the same apex area according to the diagonal interactions.

Figure 12A:
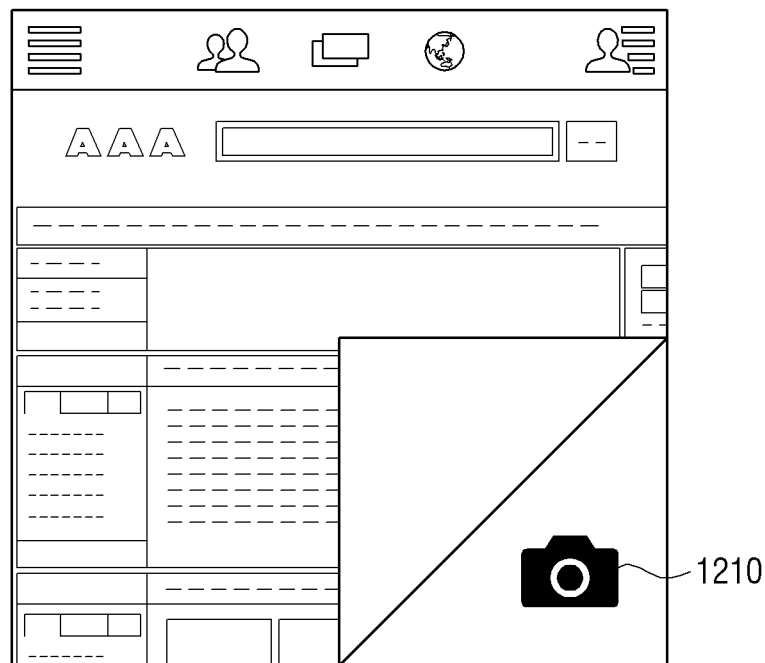

For example, as illustrated in FIG. 12A, when the diagonal interaction is detected at an apex area in a right lower end portion while content is displayed, the controller 290 may control the display 230 so that the right lower end apex where the diagonal interaction is detected is folded once, and quick access information 1210 on an application (for example, an icon corresponding to a camera application) is displayed.

Figure 12B:
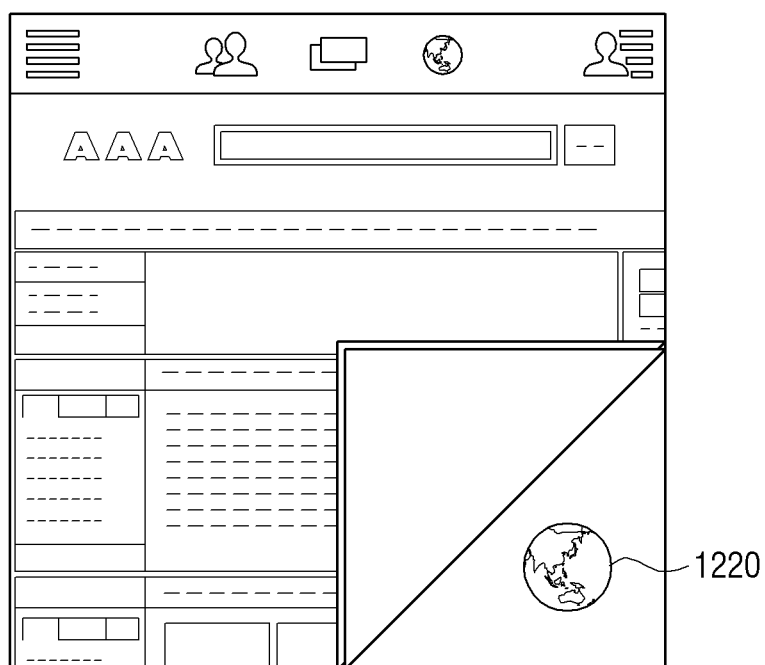

In addition, as illustrated in FIG. 12B, the diagonal interaction is detected again at a right lower end apex area while the image content is displayed along with the quick access information 1210, the controller 290 may control the display 230 so that the apex area in a right lower end portion where the diagonal interaction is detected is folded twice, and quick access information 1220 on another application (for example, an icon corresponding to internet application designated by a user).

Figure 13A:
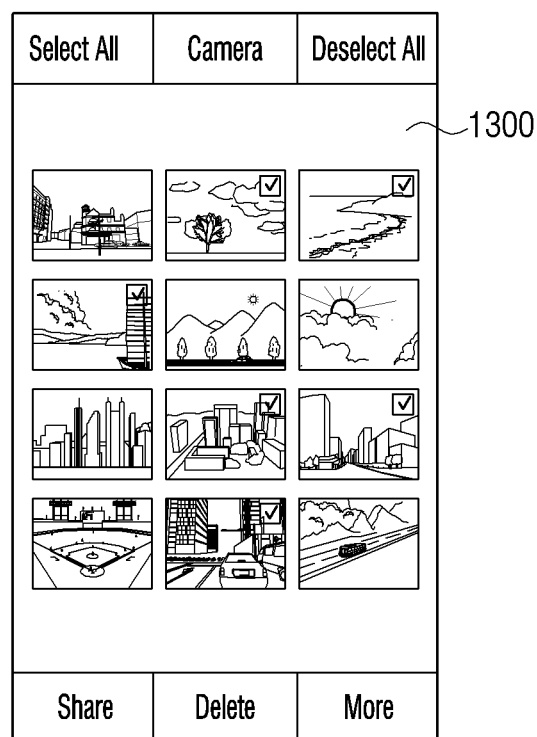

In addition, the controller 290 may perform a checking function through the diagonal interaction. In particular, in the past, if a part of a plurality of items is selected, and one or more of a plurality of items is touched, the controller 290 may control the display 230 to display a check mark on a side of the one or more touched item, as illustrated in FIG. 13A. The check mark may be n an upper right border of the one or more touched item.

Figure 13B:
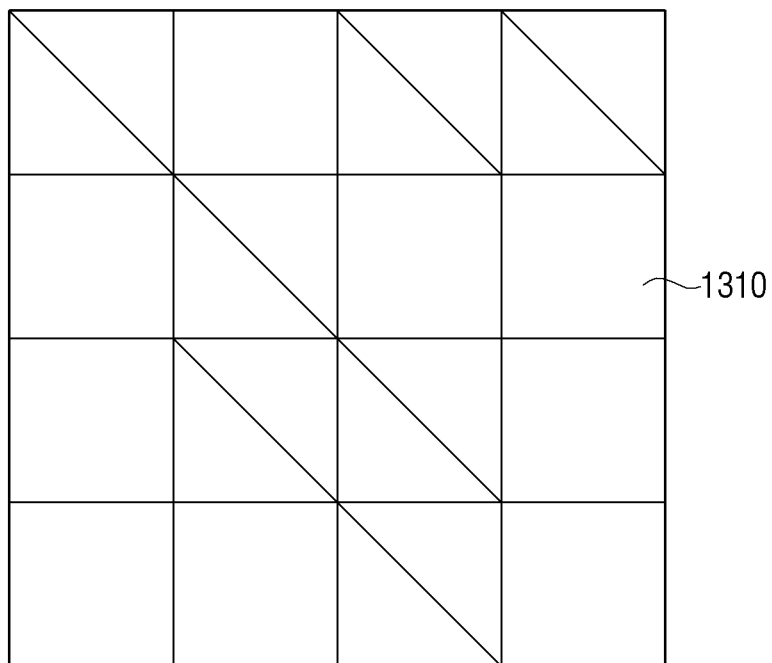

According to an exemplary embodiment, if a part of a plurality of items is selected, when the diagonal interaction is detected on a part of the plurality of items, the controller 290 may control the display 230 to provide an image effect so that a part of the selected items is folded, as illustrated in FIG. 13B.

Further, when the diagonal interaction is detected for at least one of a plurality of display items included in one screen, the controller 290 may control the display 230 to convert the at least one display item where the diagonal interaction is detected into another screen related to the at least one display item, and display the other screen.

Figure 14A:
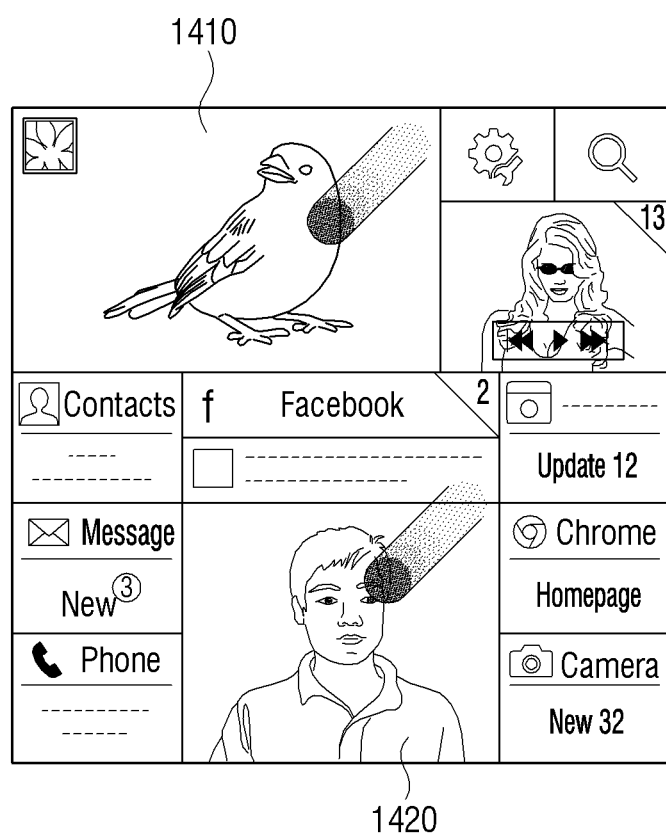

For example, as illustrated in FIG. 14A, the controller 290 may control the display 230 to display a home screen including an icon 1410 on a photo application and an icon 1420 on a social networking service (SNS) application.

Figure 14B:
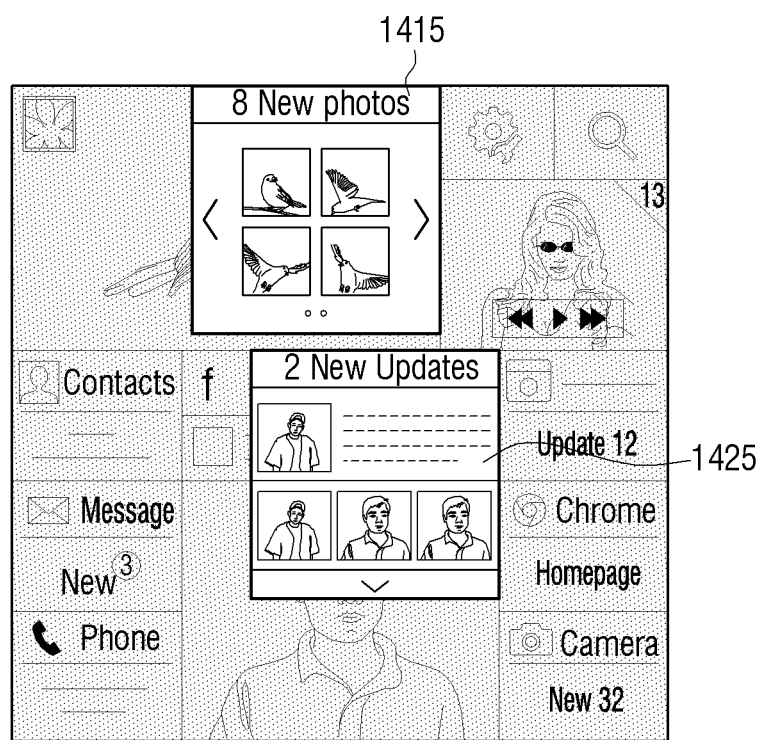
Figure 15A:
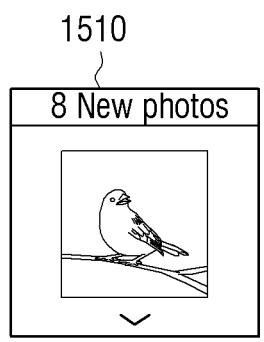
Figure 15A:
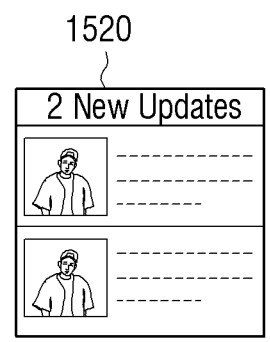
Figure 15B:
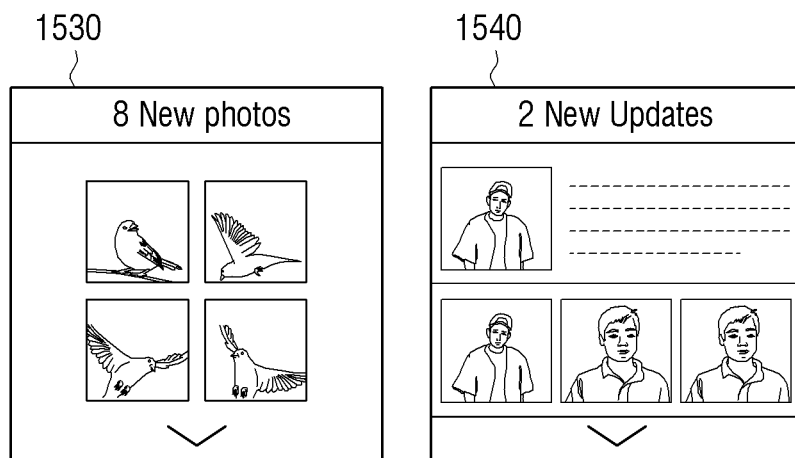

As sown in FIG. 14B, when the diagonal interaction is detected on the icon 1410 on a photo application and the icon 1420 on the SNS application, the controller 290 may control the display 230 to convert the icon 1410 on the photo application into a thumbnail image 1415 including information on the photo application (for example, information on new photo contents, etc.), and to convert the icon 1420 on an SNS application into a thumbnail image 1425 including information on an SNS application (for example, information on new mention, etc.).

The amount of information included with the converted thumbnail images 1415 and 1425 may differ according to a size of the display items. For example, as illustrated on the left of FIG. 15A, when the icon 1410 on the photo application in a first predetermined size is converted into a thumbnail image, the controller 290 may control the display 230 to display a thumbnail image 1510 in a first mode which displays only a recently-photographed photo. In addition, as illustrated on the right of FIG. 15A, when an icon 1420 on an SNS application with the first pre-determined size is converted into a thumbnail image, the controller 290 may control the display 230 to display the thumbnail image 1520 in the first mode including information on two updates. However, as illustrated on the left of FIG. 15B, when an icon 1410 on a photo application with the second predetermined size is converted into a thumbnail image, the controller 290 may control the display 230 to display a thumbnail image 1530 in the second mode which displays four recently photographed photos. In addition, as illustrated on the right of FIG. 15B, when an icon 1420 on the SNS application in the second predetermined size is converted into a thumbnail image, the controller 290 may control the display 230 to display the thumbnail image 1540 in the second mode including one new update and three update images.

When the user interaction touching one of a plurality of the apex areas included in the first mode thumbnail image 1510 and 1520 and dragging the touched area in an outward direction of the thumbnail image 1510 and 1520 is detected, the controller 290 may convert the first mode thumbnail image 1510 and 1520 into the second mode thumbnail image 1530 and 1540. In addition, when the user interaction touching one of a plurality of the apex areas included in the second mode thumbnail image 1530 and 1540, and dragging the touched area in an outward direction of the thumbnail image 1530 and 1540 is detected, the controller 290 may convert the second mode thumbnail image 1530 and 1540 to the first mode thumbnail image 1510 and 1520.

In addition, when the diagonal interaction is detected on a display item, the controller 290 may provide a folding image effect that a display item for which the diagonal interaction is detected is folded, and when providing the folding image effect, a shadow image effect may be provided for more realistic graphic expression.

In particular, the controller 290 may control the display 230 to display a screen 1600 which includes four display items 1610-1640 having rectangular shape. In addition, when the diagonal interaction is detected for at least one of the four display items 1610-1640, the controller 290 may provide a folding image effect that a display item for which the diagonal interaction is detected is folded, and the shadow image effect corresponding to a specific light source. In an exemplary embodiment, it is assumed that the specific light source is located at an upper part of the image.

Figure 16A:
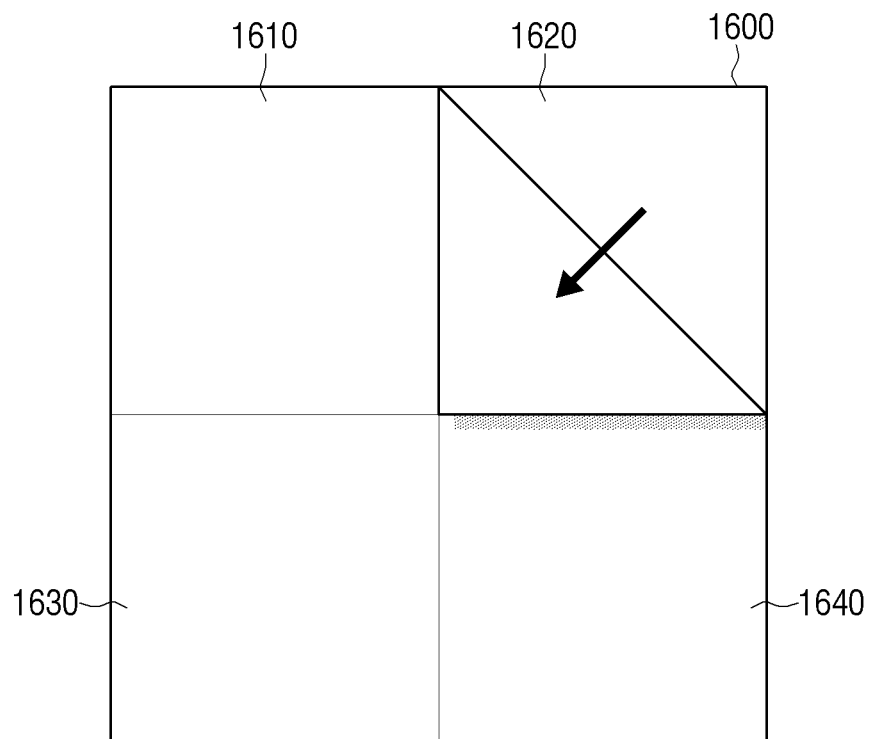
Figure 16B:
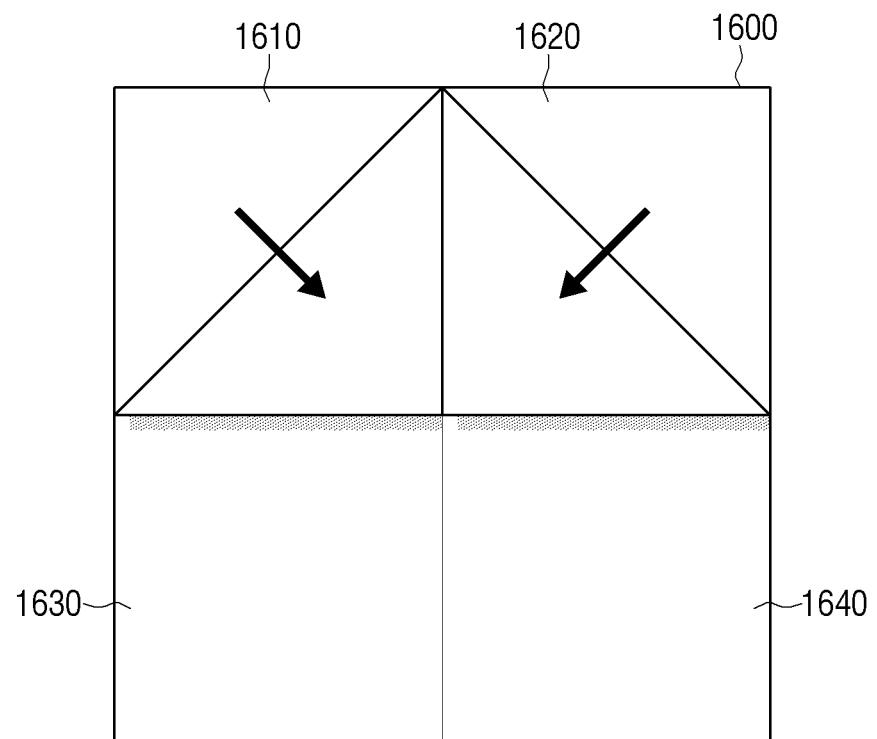
Figure 16C:
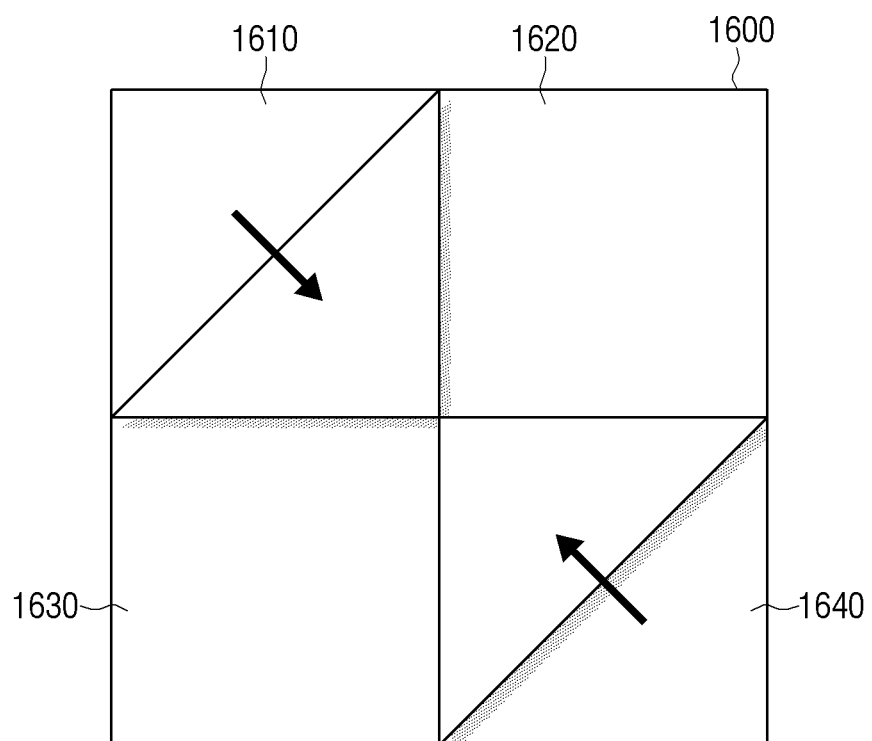

As illustrated in FIG. 16A, when the diagonal interaction is detected for a second display item 1620, the controller 290 may provide a folding image that the second display item 1620 is folded, and provide a shadow effect at a bottom side of the folded second display item 1620. In addition, as illustrated in FIG. 16B, when the diagonal interaction is detected for the first and second display items 1610 and 1620, the controller 290 may provide the folding image effect to fold the first and second display items 1610 and 1620, and provide a shadow effect on bottom sides of the folded first and second display items 1610 and 1620. In addition, as illustrated in FIG. 16C, when the diagonal interaction is detected for the first and fourth display item 1610 and 1640, the controller 290 may provide a folding image effect to fold the first and fourth display items 1610 and 1640, and provide a shadow effect on the bottom side of the folded first display item 1610 and on the diagonal line of the fourth display item 1640.

Figure 17:
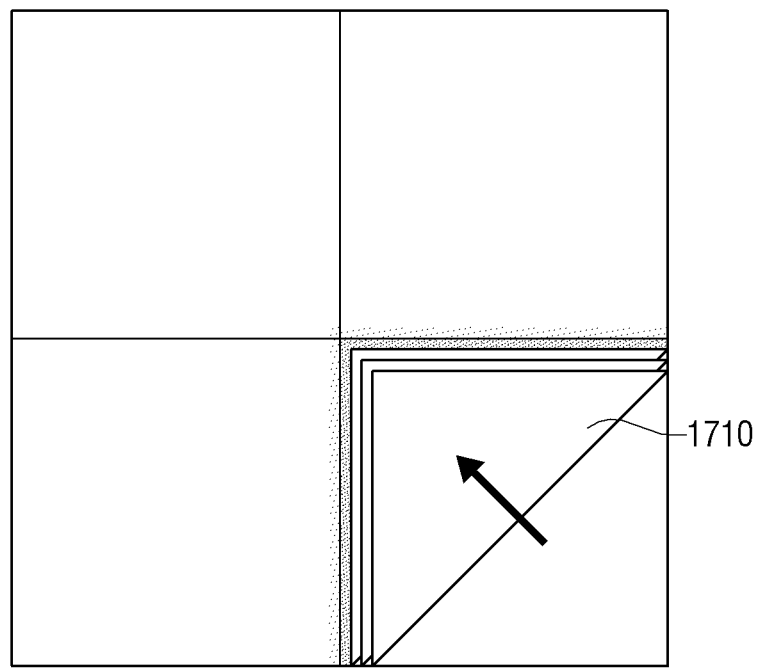

Further, when a plurality of diagonal interactions are detected for one display item, the controller 290 may control the display 230 to provide the image effect to fold the display item for which the plurality of diagonal interaction is detected. For example, when n times of diagonal interactions are detected for one display item 1710, the controller 290, as illustrated in FIG. 17, may control the display 230 to provide an image effect that the display item 1710 is folded for n times. In the exemplary embodiment illustrated in FIG. 17, n is equal to three (n=3). However, this is merely a non-limiting example.

In addition, when the diagonal interaction is detected on one apex area of the first screen, the controller 290 may control the display 230 to display a plurality of items at an apex area where the diagonal interaction is detected. In addition, when a direction of the drag interaction is changed, and a drag interaction toward one of a plurality of items is detected, the controller 290 may execute a function which corresponds to the item where the drag interaction is detected.

Figure 18A:
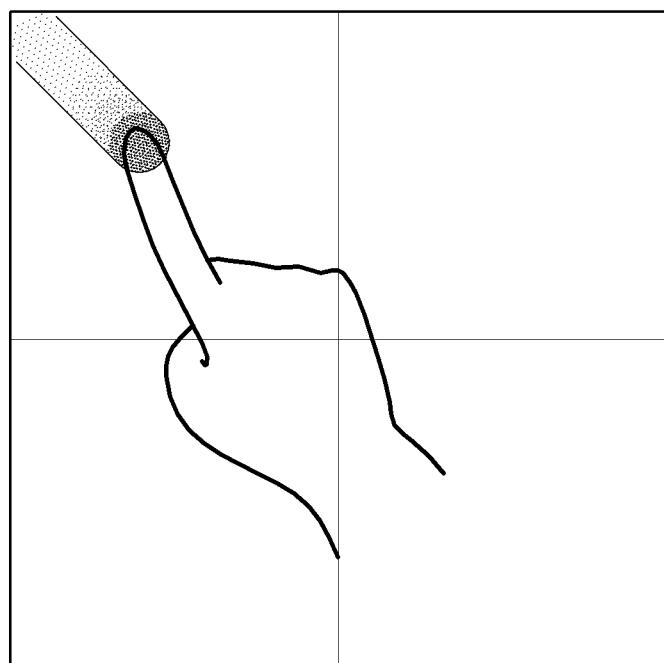
Figure 18B:
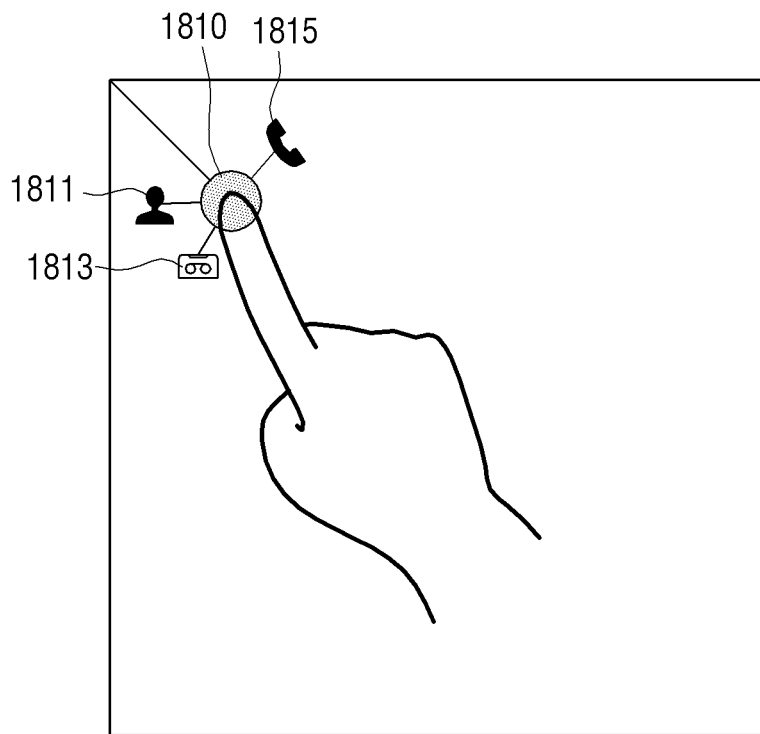

For example, as illustrated in FIG. 18A, when the diagonal interaction is detected at an apex area in a left upper end portion, the controller 290, as illustrated in FIG. 18B, may control the display 230 to display a menu 1810 which includes a contact list item 1811, a recording item 1813, and a phone item 1815 at the apex area in a left upper corner. In this case, the number of items included in the menu may differ according to a drag length of the diagonal interaction.

Figure 18C:
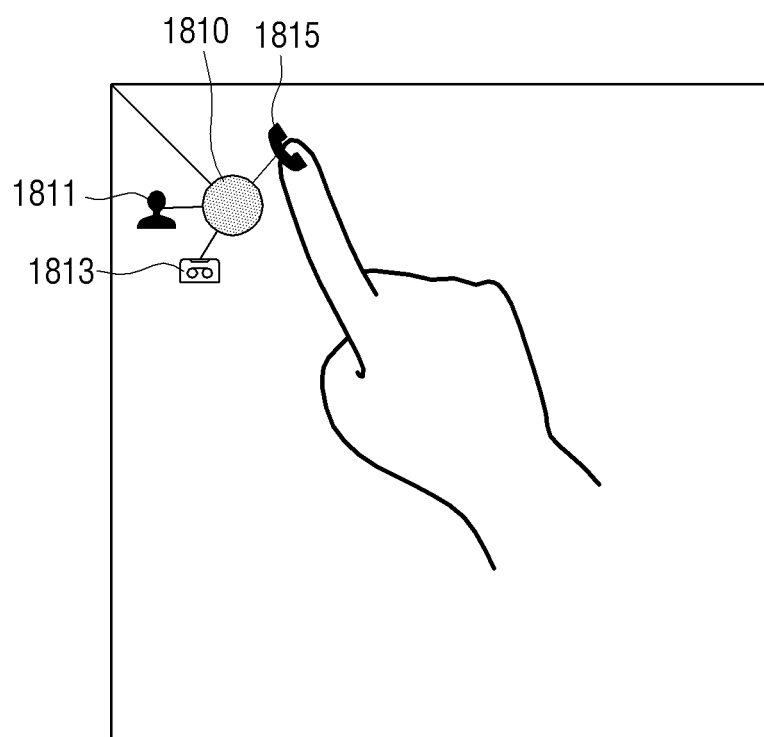

As illustrated in FIG. 18C, if a user changes a dragging direction toward a telephone item 1815 in a right upper end while a menu 1810 is displayed, the controller 290 may execute a telephone application which corresponds to the telephone item 1815.

As described above, displaying a menu and executing a function may be performed at the same time through the diagonal interaction and the drag interaction in which the direction is changed.

<Grid Screen>

According to another exemplary embodiment, the display 230 may display a grid screen that includes a plurality of square cells. In addition, the display 230 may display a plurality of objects on the plurality of square cells. In this case, each of the plurality of objects may be displayed on at least one of a plurality of square cells. In addition, when a user interaction to touch and drag a first object from among the plurality of objects is detected, the controller 290 may adjust a size of the first object by adjusting the number of cells on which the first object is displayed according to dragging distance and direction of the user interaction.

Figure 19A:
FIGS. 19A to 32C are views illustrating various user terminal devices which perform various functions on a grid screen composed of a plurality of square cells, according to one or more exemplary embodiments.

For example, as illustrated in FIG. 19A, the display 230 may display sixteen objects on each of a plurality of square cells included in the grid screen. In addition, when a preset user interaction (for example, an interaction to press the first object for a preset time) is detected on the first object, the controller 290 may change a mode of the user terminal device 200 to a grid editing mode. When the mode is changed to the grid editing mode, a size of the sixteen objects displayed on the square cell may decrease as illustrated in FIG. 19B.

Figure 19B:
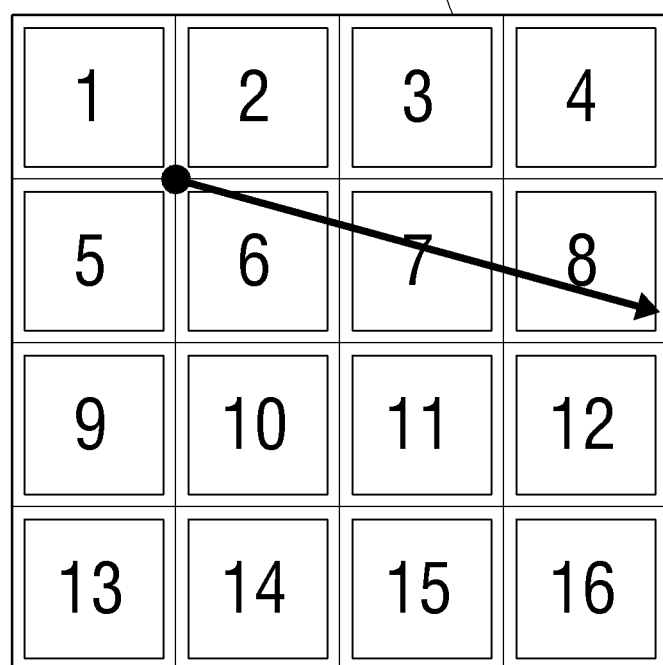
Figure 19C:
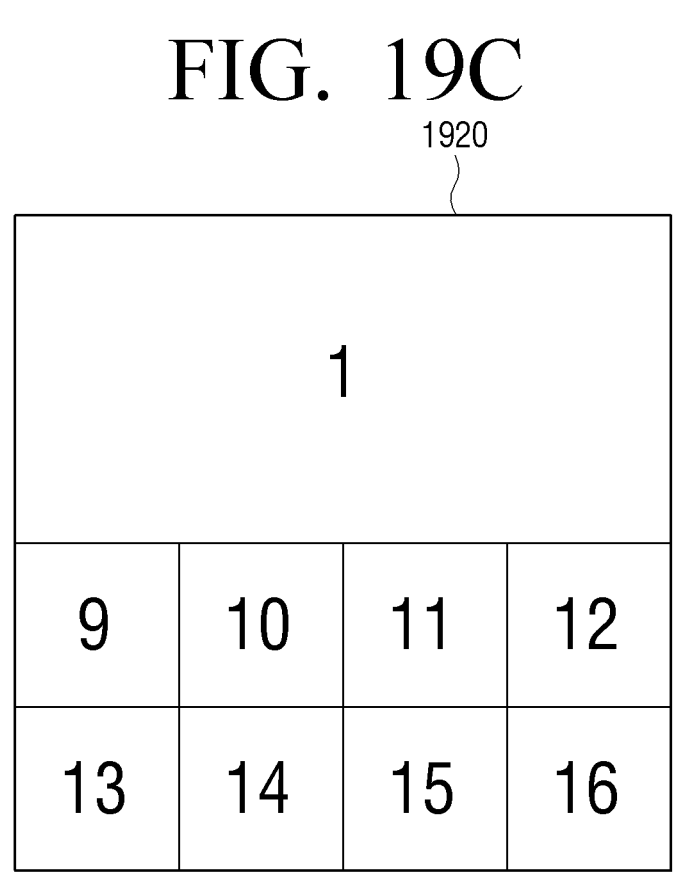

In addition, when a user action to touch and drag an interaction point among the first object, second object, fifth object, and sixth object in a direction of 4 o'clock is detected, as illustrated in FIG. 19B, the controller 290, as illustrated in FIG. 19C, may control the display 230 to determine that the square cell where the first object is displayed is to be in the first to eighth square cells, enlarge the first object so that the first object is displayed on the determined first to square eighth cells, and display the first object. As a non-limiting example, as illustrated in FIG. 19C, the tenth to sixteenth objects are deleted from the screen, and the second to ninth objects may change locations of the square cell in which they are displayed.

In particular, a first user interaction to touch and drag the first object in an outward direction is detected, the controller 290 may increase the number of square cell areas in which the first object is displayed, thereby increasing the size of the first object, move a part of the plurality of objects excluding the first object to another square cell, and delete another part from the screen. In addition, when a second user interaction to touch and drag the first object in an inward direction of the first object is detected, the controller 290 may decrease the number of square cell areas where the first object is displayed, thereby reducing size of the first object, move one or more objects into other square cell areas, and add one or more new objects to the screen.

Figure 20A:
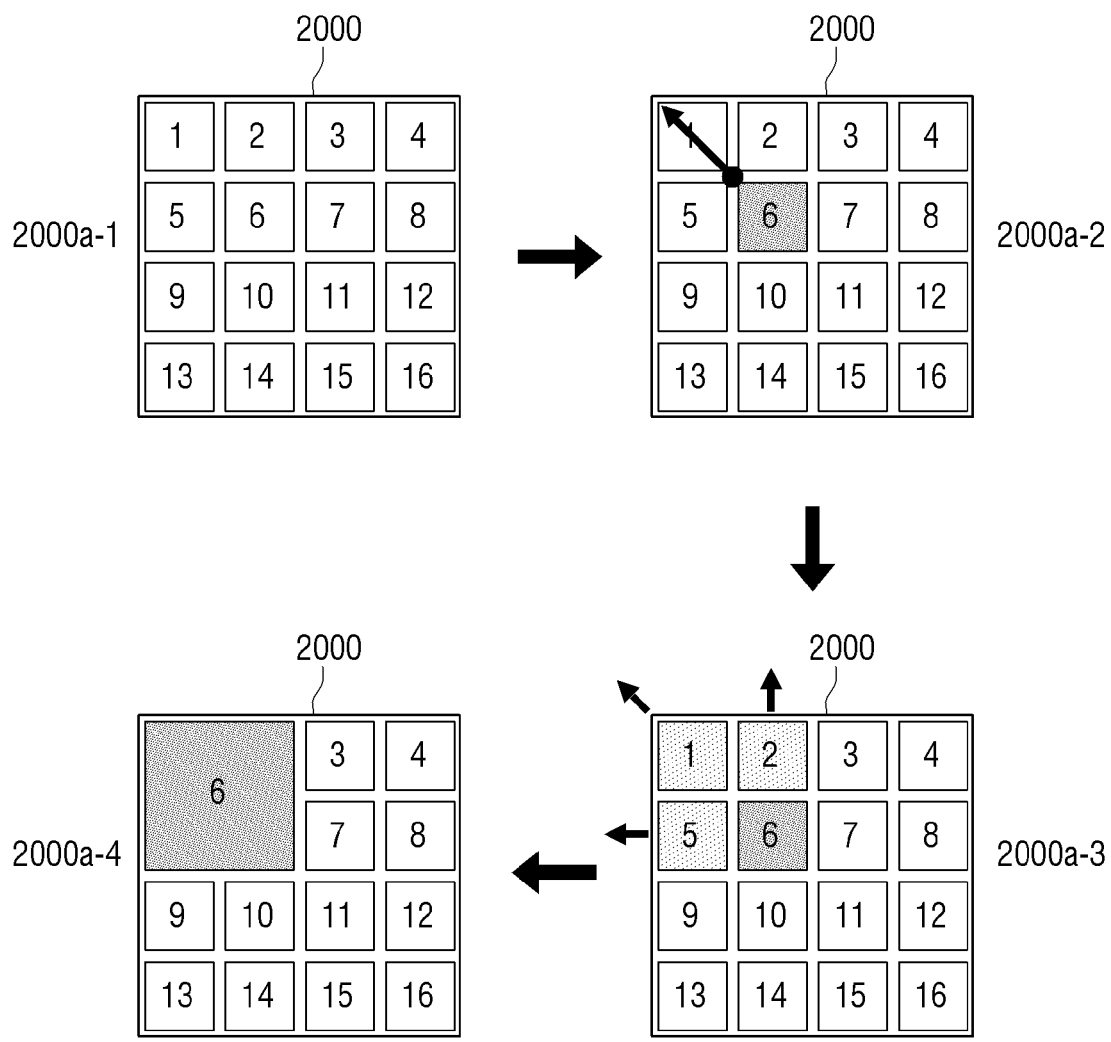

For example, as illustrated in 2000a-2 of FIG. 20A, while sixteen objects are displayed on each of the sixteen square cells included in the grid screen 2000, when a user interaction to touch and drag the sixth object in an outward direction of the sixth object toward a right upper end is detected, the controller 290 may delete the first object, the second object, and the fifth object from the screen and increase a size of the sixth object so that the sixth object is located on four square cells 2000a-3.

That is, an object of which a side or apex is in contact with the object of which size increases, the object may move in an opposite direction of the line or apex according to a user interaction. In addition, an object in which a square cell does not exist at a moved position may be deleted from the screen. In addition, when an object is generated later, the object which is deleted from the screen may be relocated according to a user interaction. For example, as illustrated in 2000a-4 of FIG. 20A, when a user interaction to drag the sixth object in an inward direction while the sixth object is located on four square cells is detected, the controller 290, as illustrated in 2000a-1 of FIG. 20A, may relocate the first object, the second object, and the fifth object which were removed from the screen.

Figure 20B:
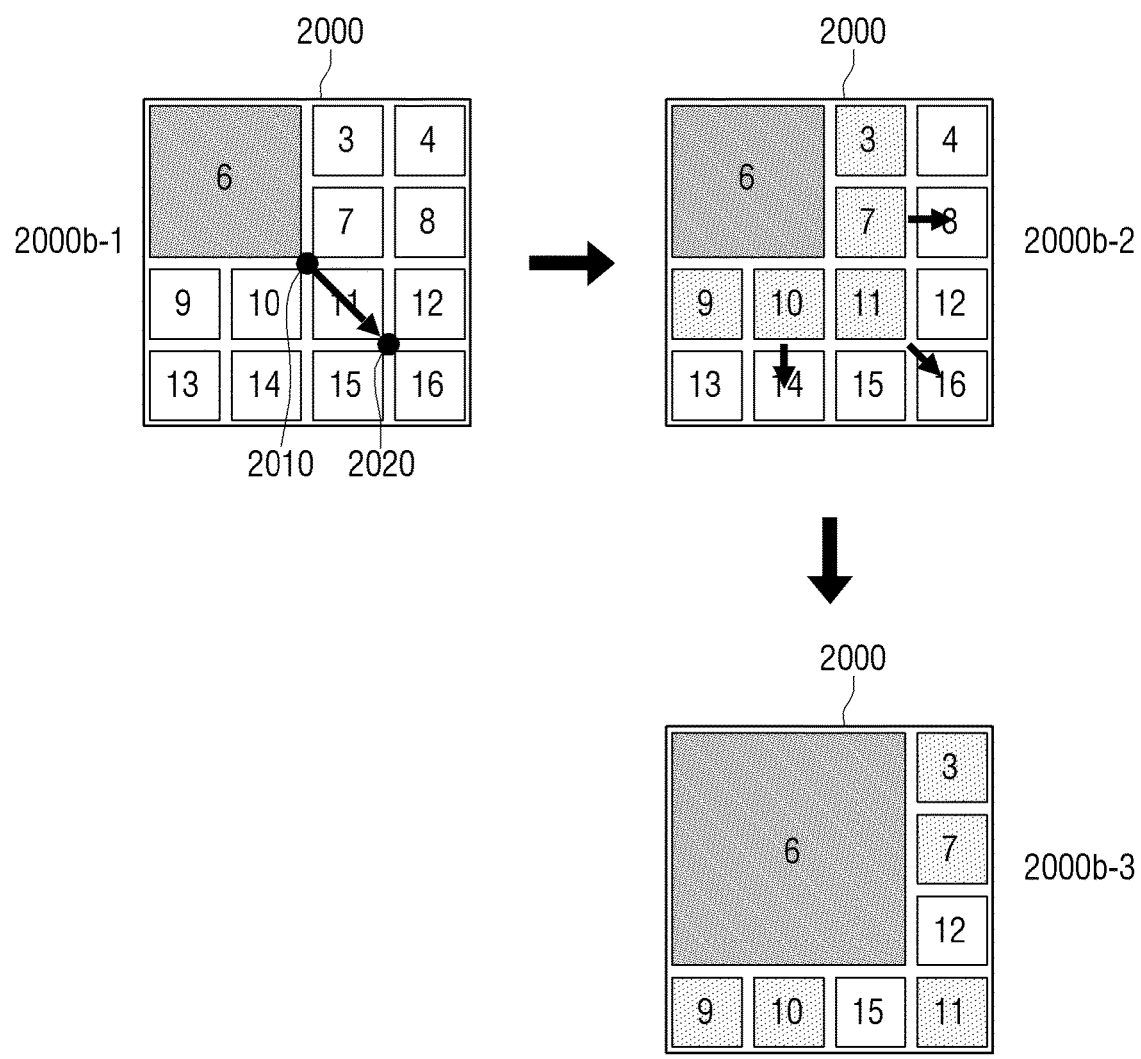

In addition, as illustrated in 2000b-1 of FIG. 20B, when a user touches and drags a first point 2010 to a second point 2020 in a right lower direction is detected, the controller 290, as illustrated in 2000b-3 of FIG. 20B, may control the display 230 to move the third object, the seventh object, tenth object, and the eleventh object with which a line or an apex of the sixth object is in contact to another location corresponding to a dragging direction (2000b-2), and delete from the screen the fourth object, eighth object, thirteenth object, fourteenth object, and sixteenth object.

If an object displayed on the display 230 is widget of an application, if a length of one line of the enlarged object is the same as length of one line of the display 230, the controller 290 may change the widget of an application to a screen to execute the application.

Figure 20C:
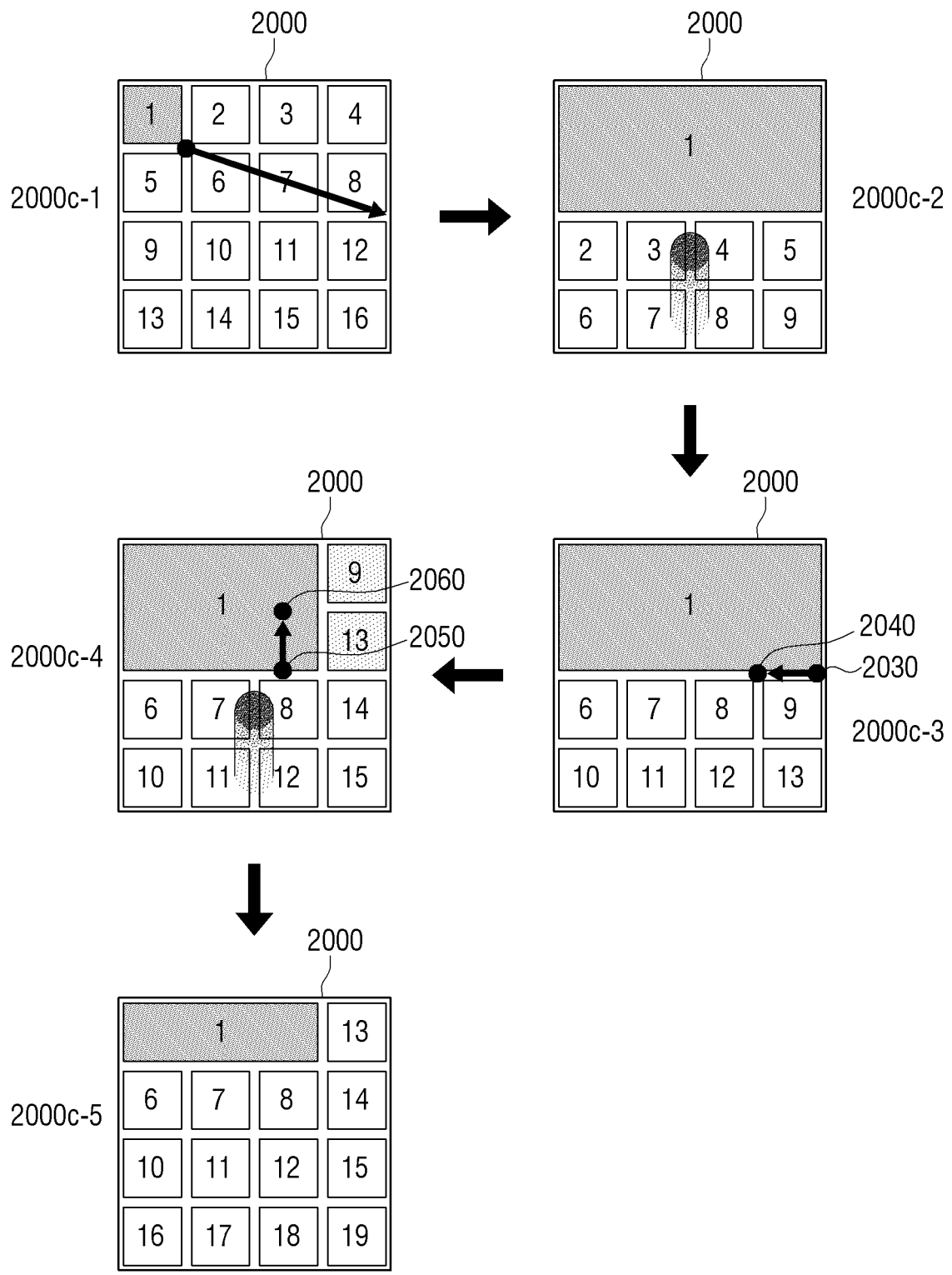

For example, as illustrated in 2000c-1 of FIG. 20C, when a user interaction of touching and dragging the first object in a widget type to an area where the eighth object is displayed is detected, the controller 290 may increase a size of the first object, and change the first object in a widget format to an application screen.

In addition, as illustrated in 2000c-2, when a user interaction of scrolling an area where the second to ninth objects are displayed is detected, the controller 290 may control the display 230 to fix the first object, remove the second to fifth objects from among the second to ninth objects from the screen, move the sixth to ninth objects in an upward direction, and add the tenth to thirteenth objects.

As illustrated in the 2000c-3 of FIG. 20C, when a user interaction of touching and dragging a third point 2030 of the first object to a fourth point 2040 is detected, the controller 290, as illustrated in a fourth drawing of FIG. 20C, may control the display 230 to decrease the size of the first object, move the ninth to thirteenth objects in an upward direction, and add the fourteenth and fifteenth objects.

In addition, as illustrated in 2000c-4 of FIG. 20C, when a user interaction of touching a fifth point 2050 of the first object and dragging toward a sixth point 2060 is detected, the controller 290, as illustrated in a 2000c-5 of FIG. 20C, may control the display 230 to decrease the size of the first object, remove the ninth object from the screen, move the sixth object, seventh object, eighth object, and tenth to fifteenth objects in an upward direction, and display sixteenth to nineteenth object which are new objects.

In addition, the controller 290 may change the contents included in the first object in accordance with the number of square cells which the first object takes in the grid screen.

Figure 21A:
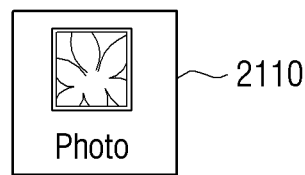

For example, when an object on a photo application is located on one square cell, the controller 290, as illustrated in FIG. 21A, may control the display 230 to display an icon corresponding to the photo application as an object 2110.

Figure 21B:
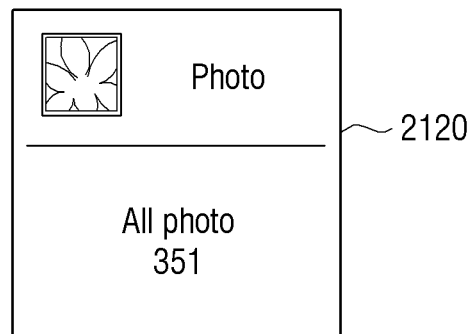

When an object on a photo application is located on four square cells, the controller 290, as illustrated in FIG. 21B, may control the display 230 to display an object 2120 that includes brief information of the photo application (for example, stored photo information).

Figure 21C:
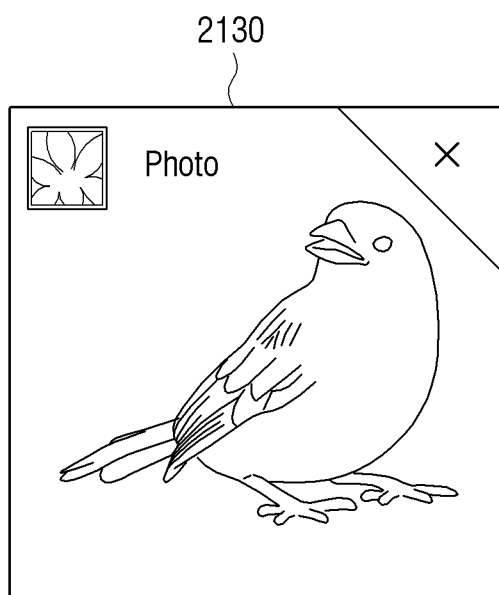

In addition, when an object on a photo application is located on nine square cells, the controller 290, as illustrated in FIG. 21C, may control the display 230 to display an object 2130 that includes detailed information of the photo application (for example, thumbnail image information on a photo recently taken, etc.).

Figure 21D:
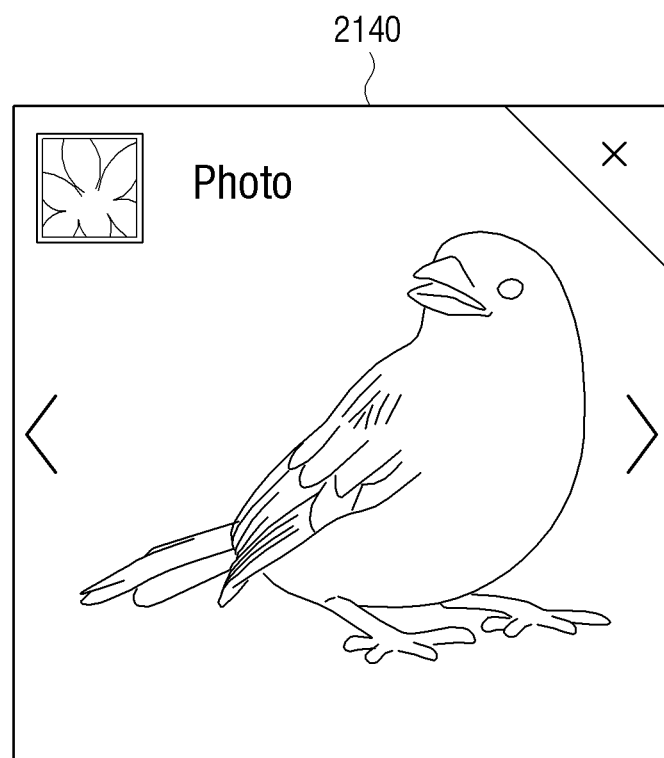

In addition, when an object on a photo application is located on sixteen square cells, the controller 290, as illustrated in FIG. 21D, may control the display 230 to display an object 2140 that includes a screen for executing the photo application (for example, a photo list, etc.).

As described above, there may be four different objects corresponding to the number of square cells corresponding to an object size of an object, but this is merely exemplary. For example, the controller 290 may differently display three different objects according to the number of square cells which an object occupy or size of an object.

Figure 22A:
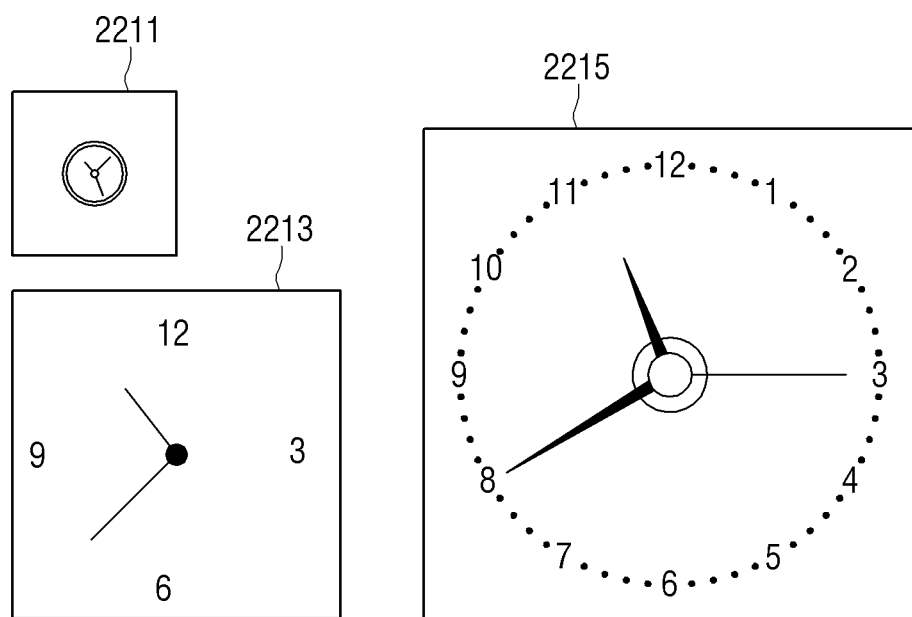

For example, as illustrated in FIG. 22A, for an object corresponding to a clock application, when a size of the object occupies a first number of square cells, the controller 290 may control the display 230 to display an object 2211 as an icon which corresponds to the clock application. In addition, when the size of the object occupies a second number of square cells, the controller 290 may control the display 230 to display an object 2213 as a simple clock. In addition, when the size of the object occupies a third number of square cells, the controller 290 may control the display 230 to display an object 2215 as a detailed clock (that is, a clock including a second hand and minute intervals).

Figure 22B:
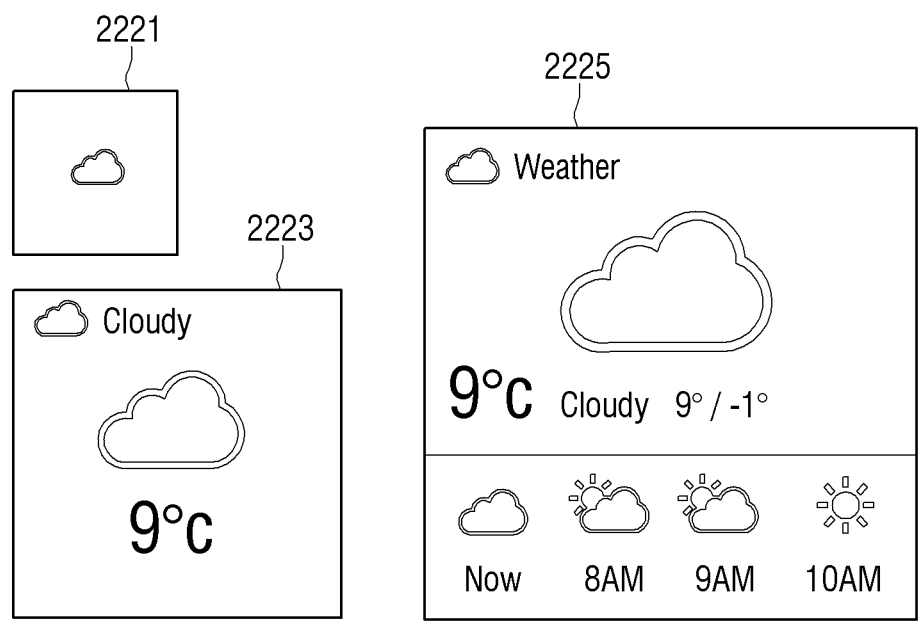

As illustrated in FIG. 22B, for an object corresponding to a weather application, if the object occupies a first number of square cells, the controller 290 may control the display 230 to display an object 2221 as an icon which corresponds to the weather application. In addition, if the object occupies a second number of square cells, the controller 290 may control the display 230 to display an object 2223 including brief weather information (for example, current weather of a region where a user is located). In addition, if the object occupies a third number of square cells, the controller 290 may control the display 230 to display an object 2225 that includes detailed weather information (for example, present weather information and future weather information).

Figure 22C:
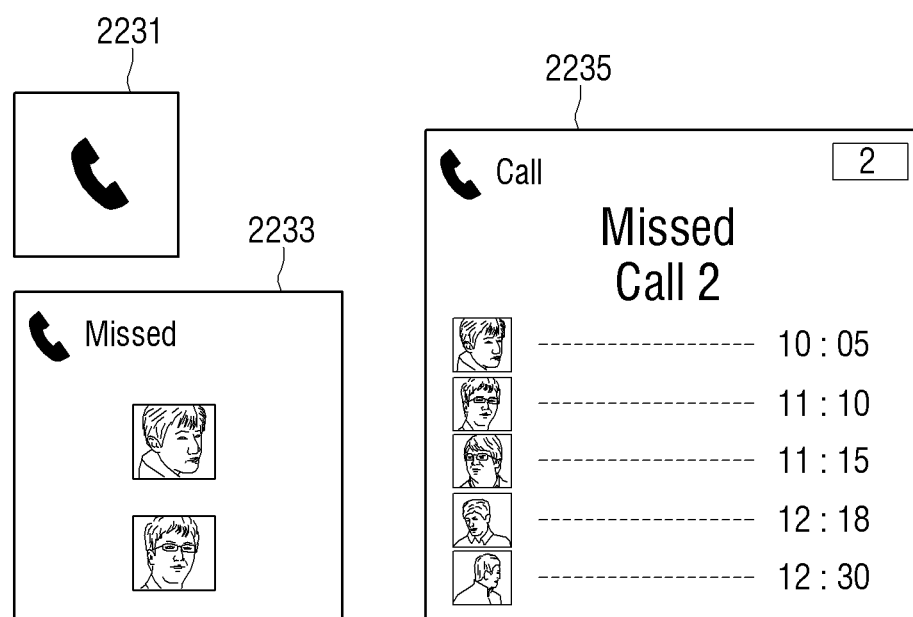

As illustrated in FIG. 22C, when an object corresponds to a telephone application, if the object occupies a square cell of the first number, the controller 290 may control the display 230 to display an object 2231 as an icon which corresponds to a telephone application. In addition, when the object occupies a square cell of the second number, the controller 290 may control the display 230 to display an object 2233 including two contact information. When the object occupies a square cell of the third number, the controller 290 may control the display 230 to display an object 2235 including a telephone screen which includes five contact information.

Figure 22D:
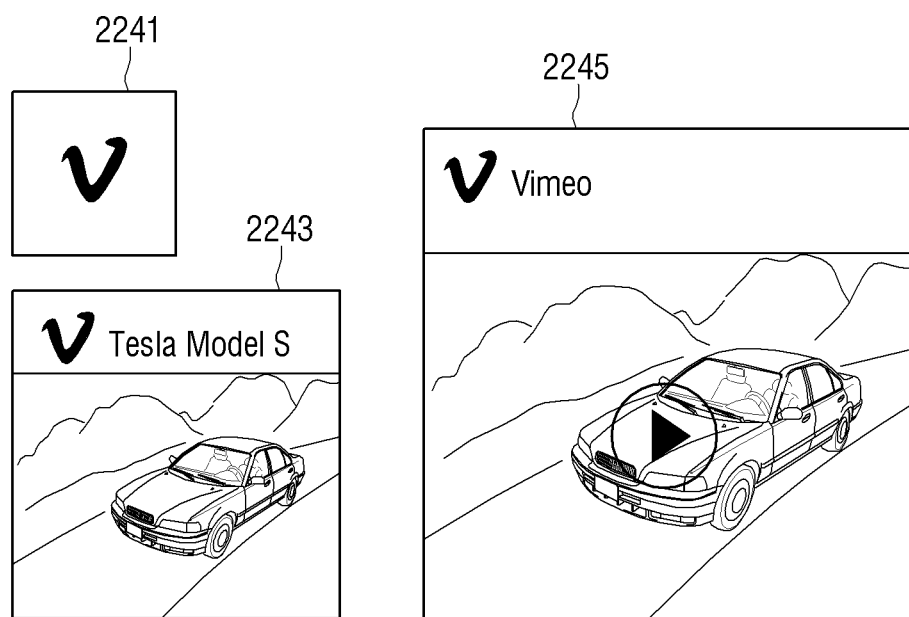

As illustrated in FIG. 22D, for an object corresponding to a video sharing application, if the object occupies a first number of square cells, the controller 290 may control the display 230 to display an object 2241 as an icon which corresponds to the video sharing application. In addition, when the object occupies a second number of square cells, the controller 290 may control the display 230 to display an object 2243 including a thumbnail image of a specific video. If the object occupies a third number of square cells, the controller 290 may control the display 230 to display an object 2245 which includes a screen for executing a video.

Figure 22E:
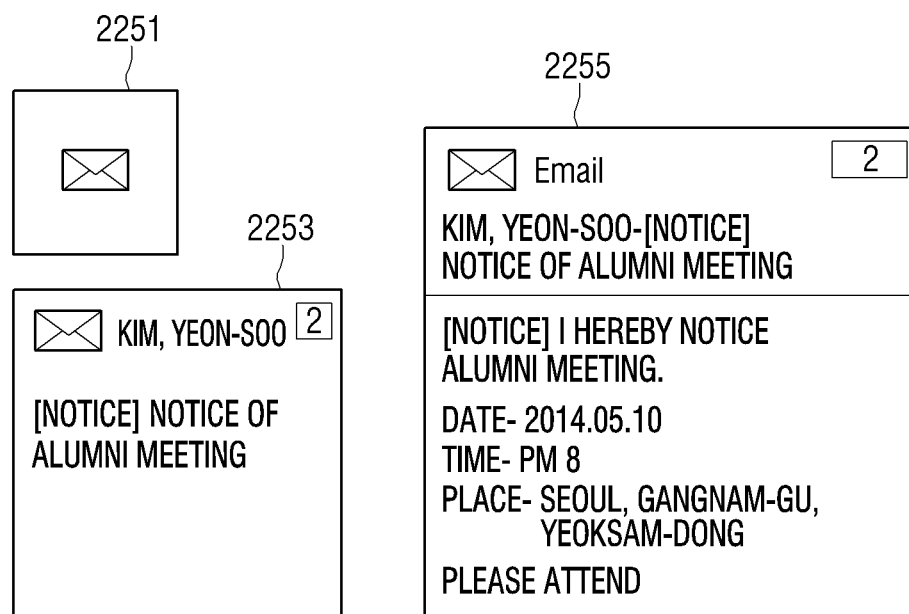

As illustrated in FIG. 22E, for an object corresponding to an e-mail application, if the object occupies a first number of square cells, the controller 290 may control the display 230 to display an object 2251 as an icon which corresponds to the e-mail application. When the object occupies a second number of square cells, the controller 290 may control the display 230 to display an object 2253 which includes brief information (for example, name of a sender, title, etc.) of the received e-mail. When the object occupies a third number of square cells, the controller 290 may control the display 230 to display an object 2255 which includes detailed information (for example, name of a sender, data of receipt, contents of e-mail, etc.) of the received e-mail.

Figure 22F:
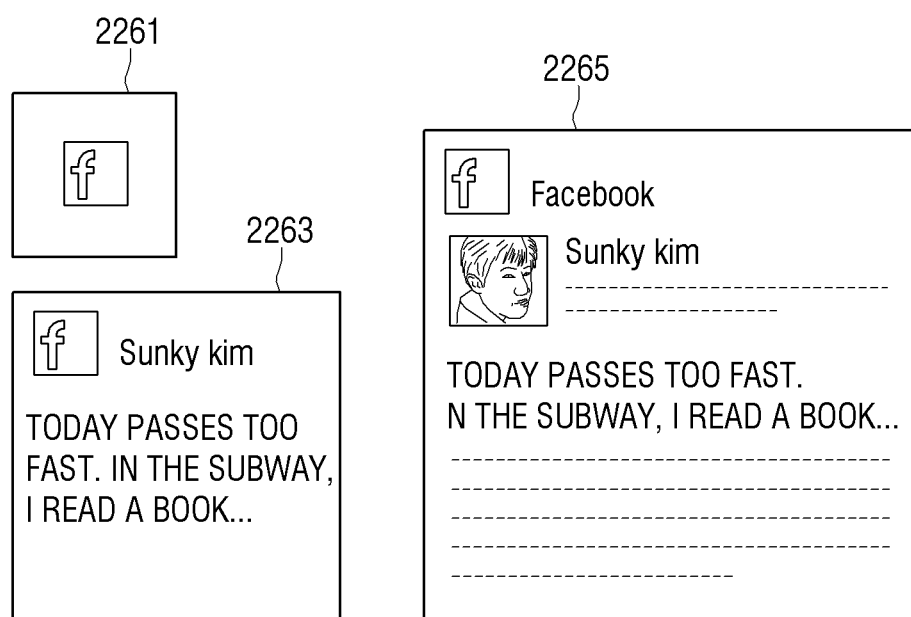

As illustrated in FIG. 22F, for an object corresponding to an SNS application, when the object occupies a first number of square cells, the controller 290 may control the display 230 to display an object 2261 as an icon which corresponds to the SNS application. In addition, when the object occupies a second number of square cells, the controller 290 may control the display 230 to display an object 2263 which includes brief information (for example, writer, contents of writing, etc.) of a recent update. Further, when the object occupies a third number of square cells, the controller 290 may control the display 230 to display an object 2265 which includes detailed information (for example, a profile image, a recommendation icon, a reply, etc.) of a recent update.

Hereinafter, with reference to FIGS. 23A to 23D, an example describing changing the number of square cells on a grid screen which an object occupies according to a user interaction, and changing contents displayed on the object of which the number of cells is adjusted.

Figure 23A:
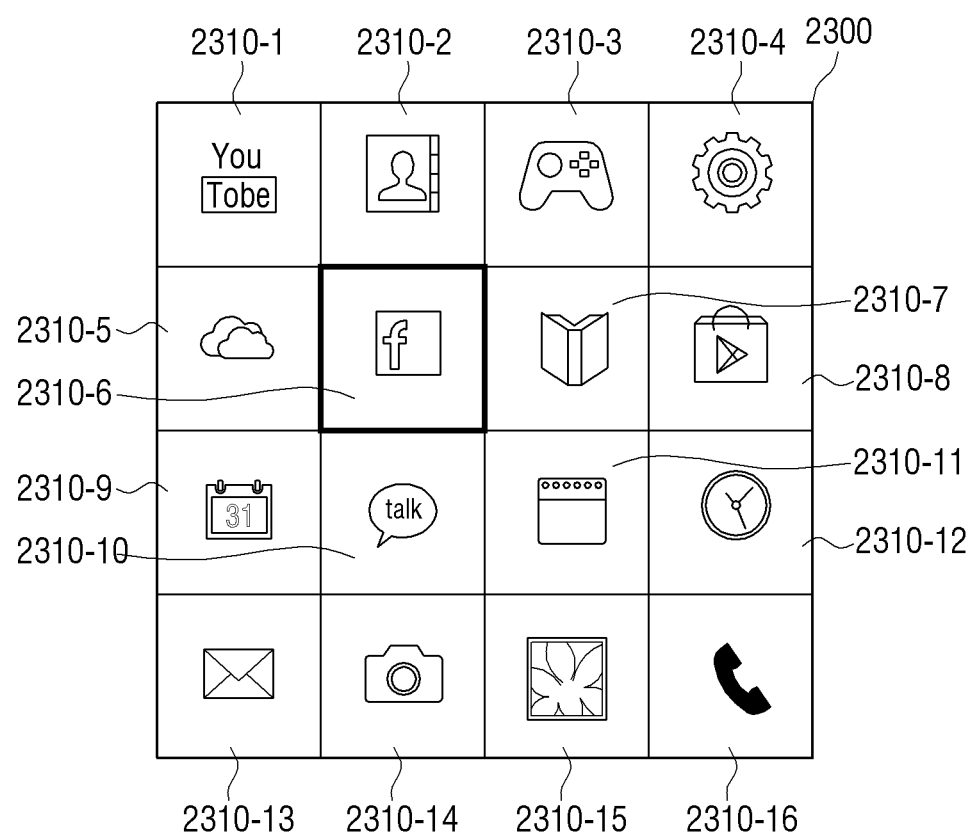

As illustrated in FIG. 23A, the display 230 displays sixteen objects 2310-1 to 2310-16 on a grid screen. In this case, the sixteen objects 2310-1 to 2310-16 may include icons of the corresponding applications respectively.

Figure 23B:
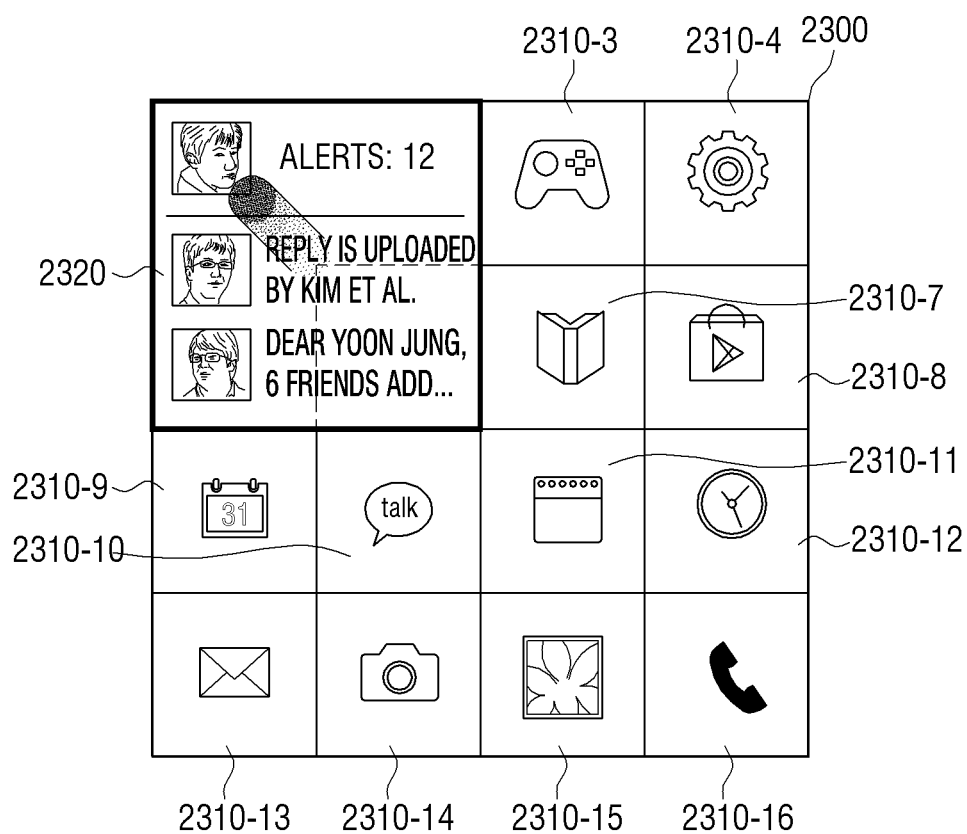

When a user touches a sixth object 2310 which corresponds to the SNS application from among the sixteen objects 2310-1 to 2310-16 and drags the object in a left upward direction, the controller 290 may, as shown in FIG. 23B, control the display 230 to increase a size of the sixth object 2310-6 to occupy four cells, and change and display the object to an object 2320 which includes brief information on a recent update. In this case, the controller 290 may control the display 230 to remove the first object 2310-1, the second object 2310-2, and the fifth object 2310-5 from the screen.

Figure 23C:
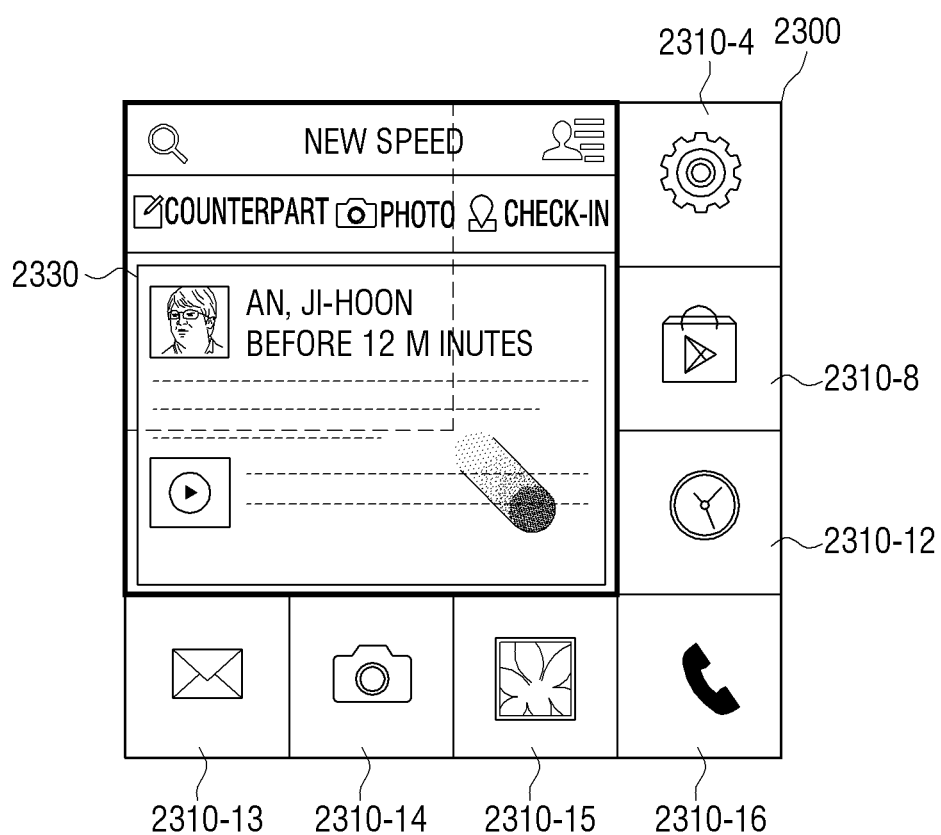

As illustrated in FIG. 23C, when a user drags the object 2320 which includes the brief information on a recent update in a downward right direction, the controller 290 may control the display 230 to increase a size of the sixth object 2320 so that the object 2320 which includes brief information occupies nine cells, and change the object 2320 which includes brief information to an object 2330 which includes detailed information on a recent update. At this time, the controller 290 may control the display 230 to remove the third object 2310-3, the seventh object 2310-7, the ninth object 2310-9, the tenth object 2310-10, and the eleventh object 2310-11 from the screen.

Figure 23D:
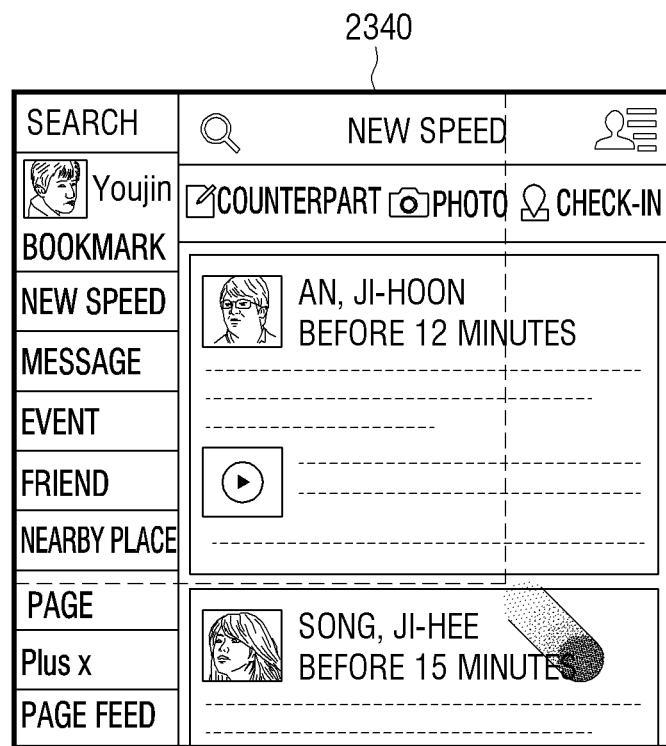

As illustrated in FIG. 23D, when a user drags the object in a downward right direction, the controller 290 may control the display 230 to increase a size of the sixth object 2330 so that the object 2330 which includes the detailed information occupies all the sixteen cells, change the object 2330 which includes the detailed information on a recently updated writing to an object 2340 which includes a screen for executing an SNS application, and display the object 2340. At this time, the controller 290 may control the display 230 to remove the fourth object 2310-4, the eighth object 2310-8, and the twelfth to sixteenth objects 2310-12~2310-15 from the screen.

In addition, when the number of square cells which occupies the object increases according to a user interaction, the controller 290 may change the size and content of the object using different methods according to a shape of an object which is displayed at a plurality of square cells.

Figure 24A:
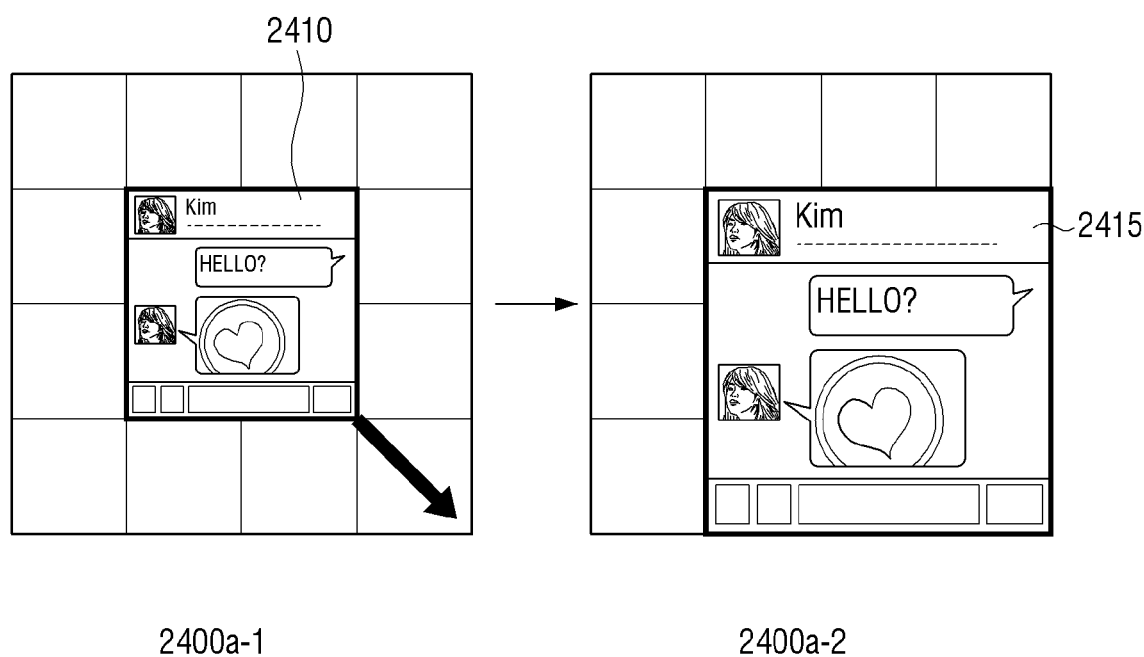

For example, as illustrated in FIG. 24A, when a user touches an object 2410 which displays a chat screen on four square cells and then drags the object in a downward right direction (2400a-1), the controller 290 may increase a size of the object 2415 to increase a screen ratio and display the chat screen on nine square cells without changing the contents of the chat screen.

Figure 24B:
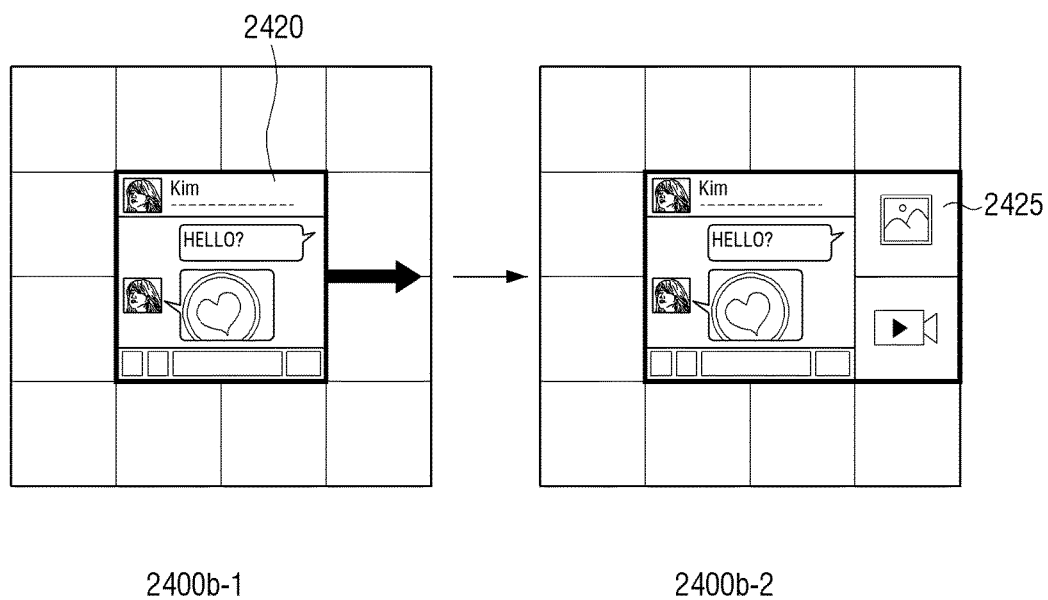

In addition, as illustrated in FIG. 24B, when a user interaction touching an object 2420 which displays a chatting screen on four square cells and then dragging the object in a right direction is detected (2400b-1), the controller 290 may increase a size of the object 2425 so as to display the chatting screen on four square cells and display a menu related to the chatting application on two cells (2400b-2).

Figure 24C:
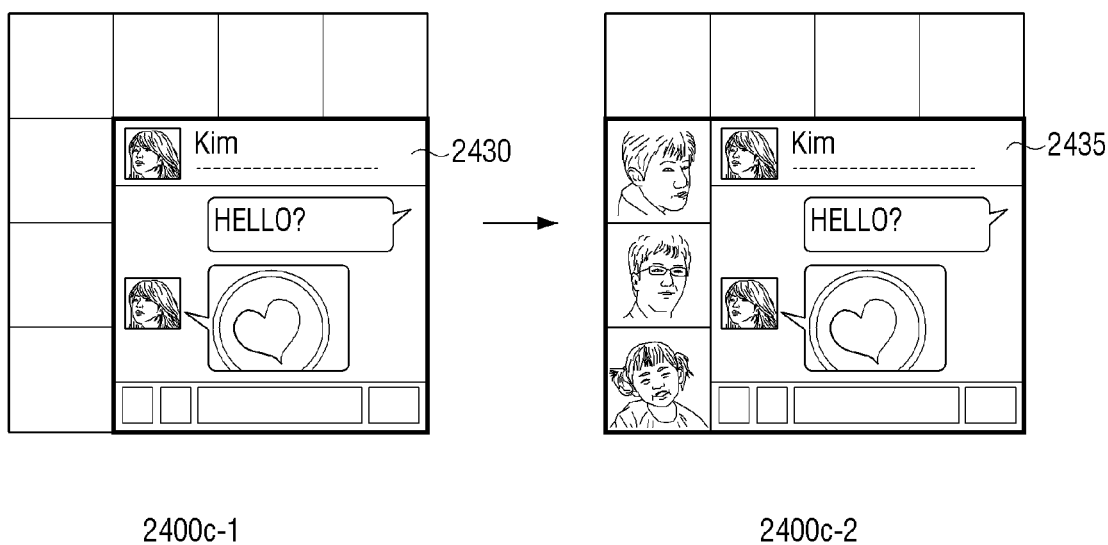

In addition, as illustrated in FIG. 24C, when a user interaction touching an object 2430 which displays a chat screen on nine square cells and then dragging the object in a left direction is detected (2400c-1), the controller 290 may increase the size of the object 2435 to so as to display the chat screen on nine square cells and display contacts on three cells (2400c-2).

Figure 24D:
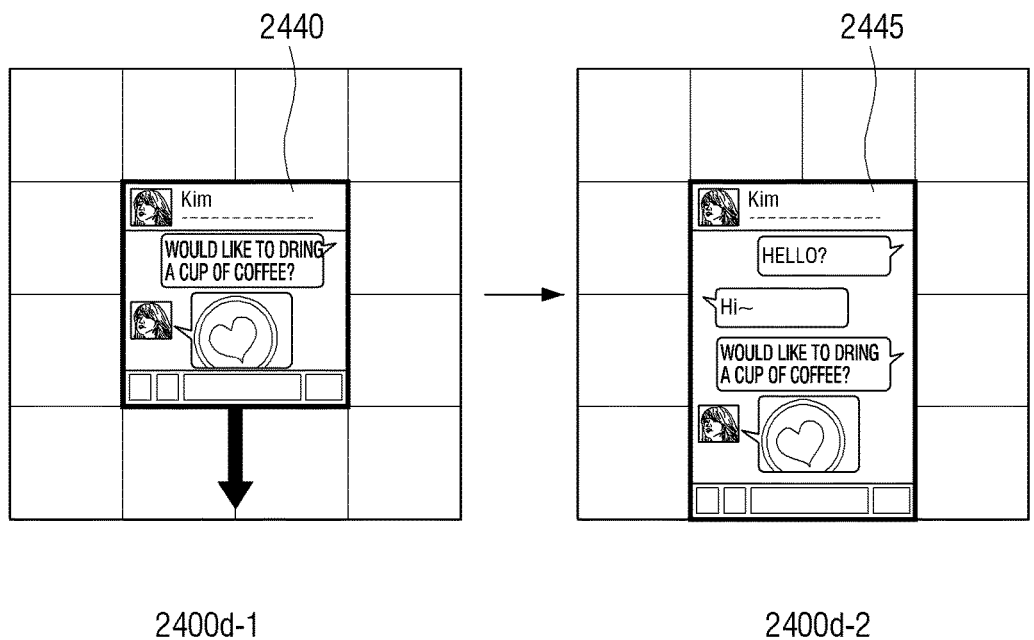

In addition, as illustrated in FIG. 24D, when a user interaction touching an object 2440 which displays a chat screen on four square cells and then dragging the object in a downward direction is detected (2400d-1), the controller 290 may increase a size of the object 2435 to display a chatting screen which may include more chatting contents (2400d-2).

Further, while displaying an image content on a plurality of square cells, when a user interaction is input, the controller 290 may enlarge or reduce the image content according to a location of the square cell to which a user interaction is input and a direction of a user interaction.

Figure 25A:
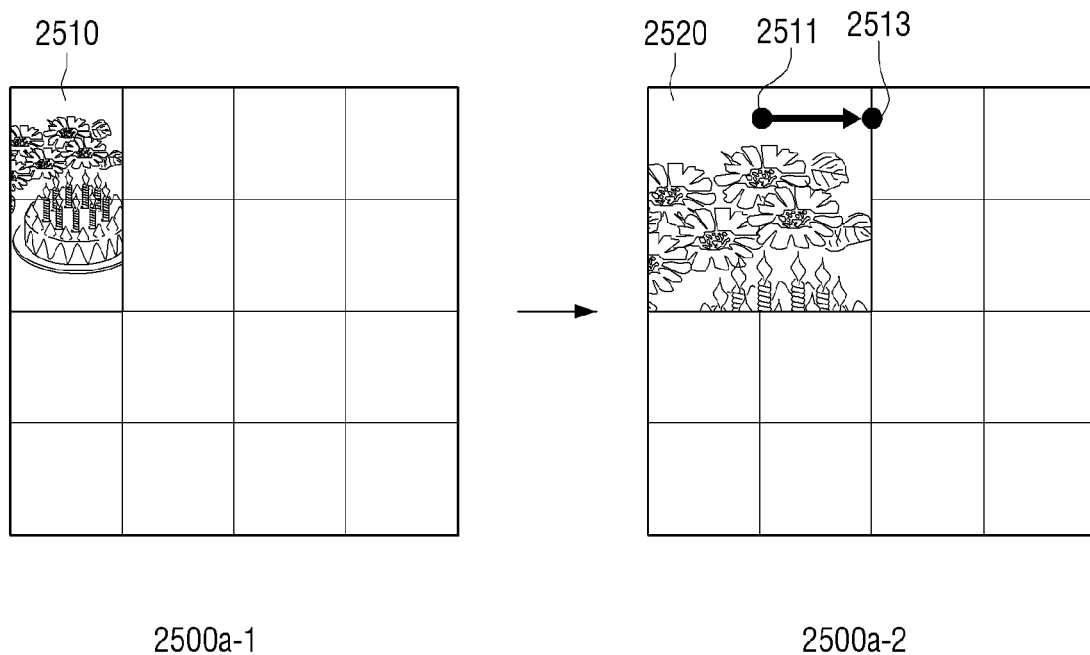

For example, as illustrated in FIG. 25A, if a photo content 2510 is displayed on two square cells (2500a-1), when a user touches a first point 2511 of the photo content and then drags the point in a right direction to a second point 2513 is detected, the controller 290, as illustrated in 2500a-2 of FIG. 25A, may control the display 230 to display an image 2520 which enlarges an upper portion of the photo content 2510.

Figure 25B:
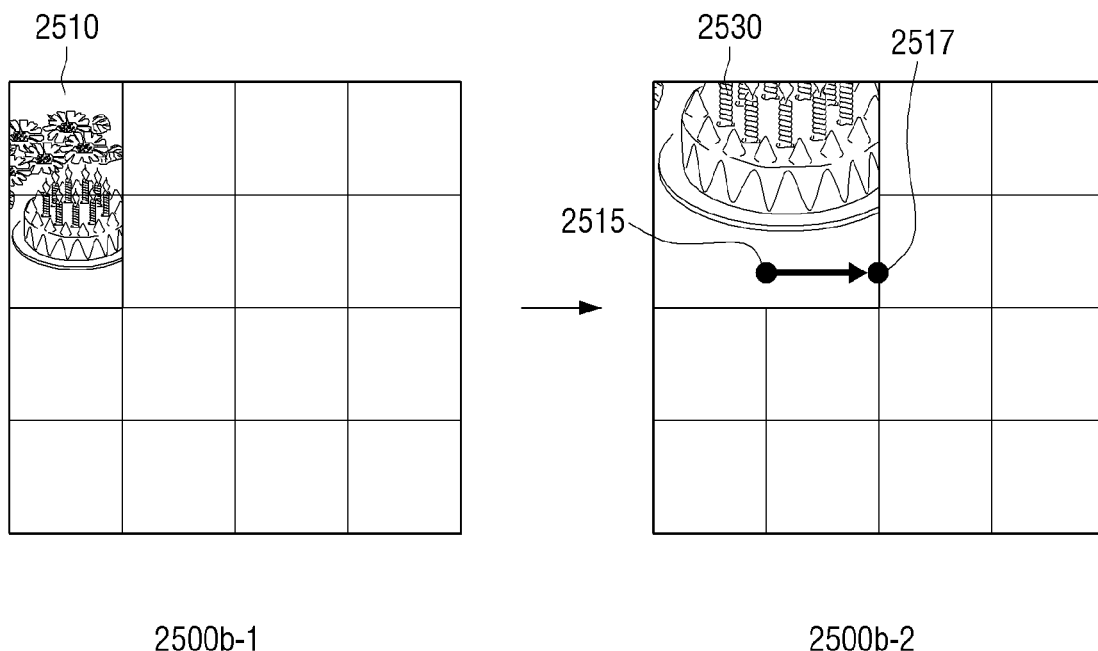

As illustrated in FIG. 25B, if a photo content 2510 is displayed on two square cells (2500b-1), when a user touches a third point 2515 of the photo content and then drags the point in a right direction to a fourth point 2517, the controller 290, as illustrated in 2500b-2 of FIG. 25B, may control the display 230 to display an image 2530 which enlarges a lower portion of the photo content 2510.

Figure 25C:
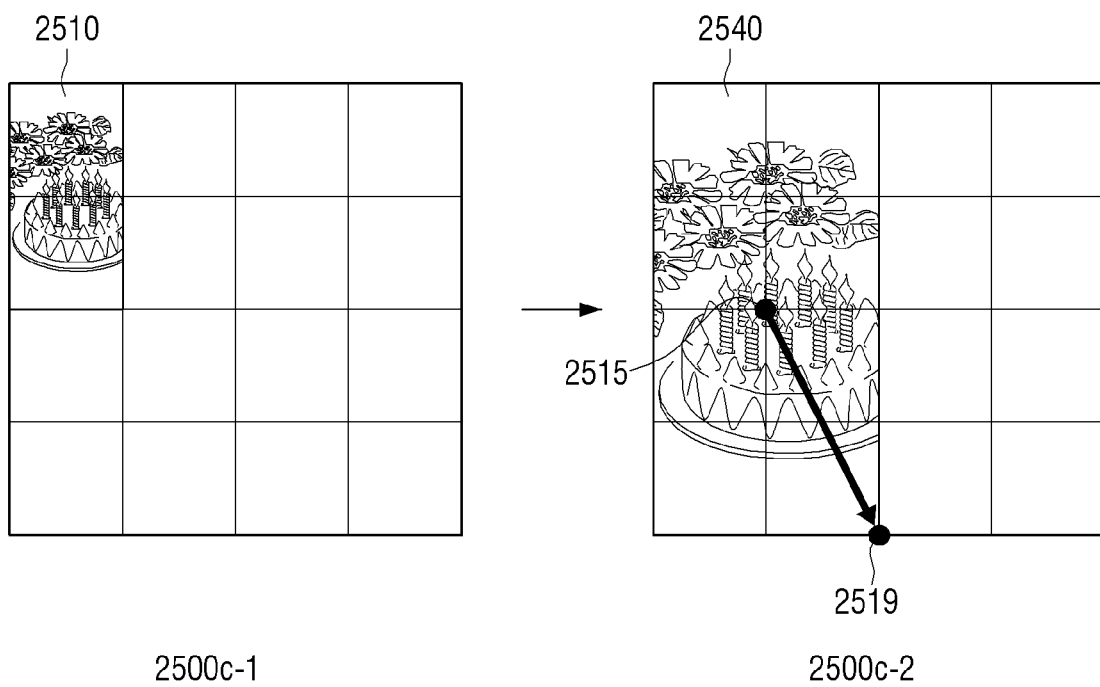
Figure 26:
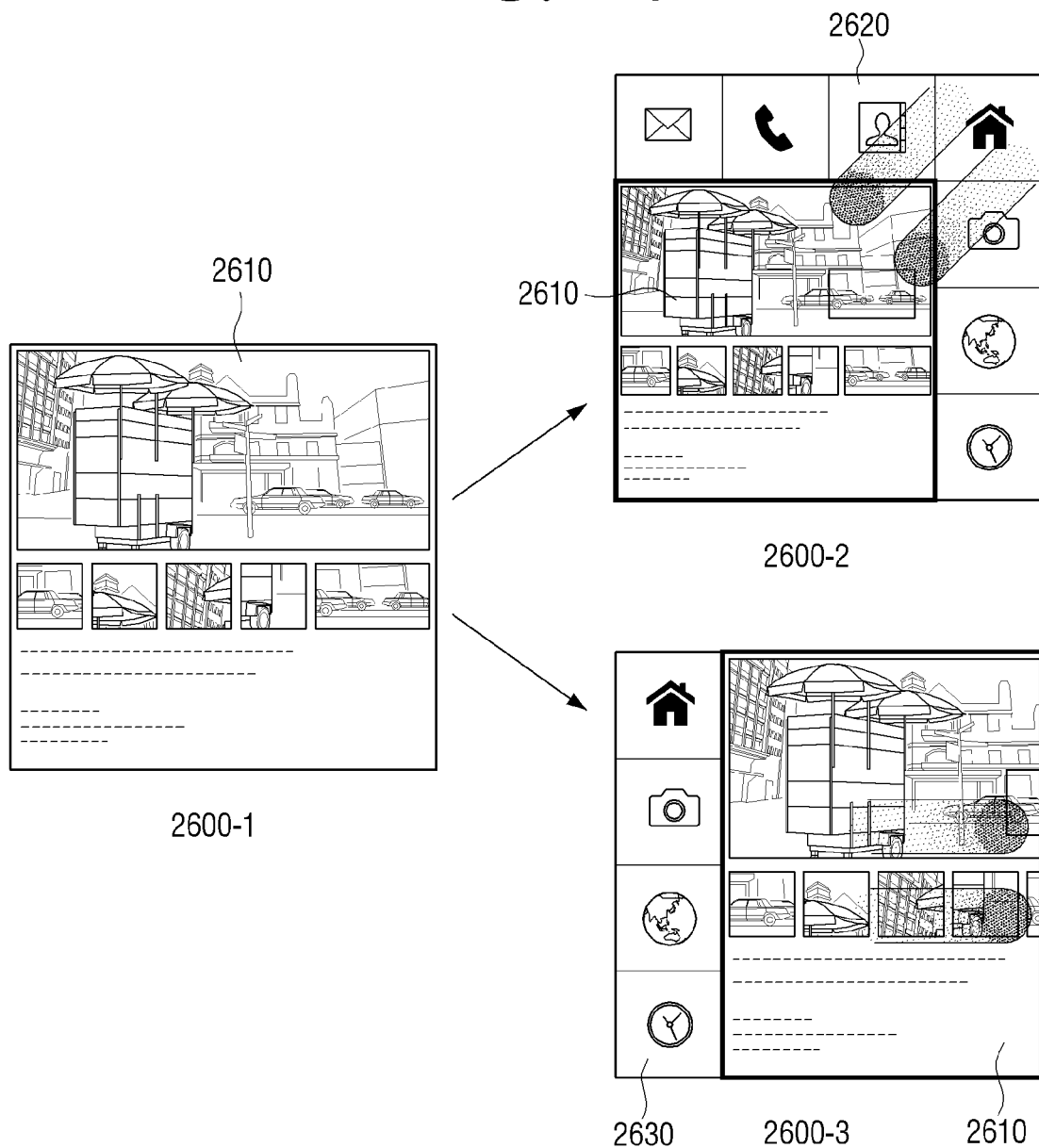

As illustrated in FIG. 25C, if a photo content 2510 is being displayed on two square cells (2500c-1), when a user touches a third point 2515 of the photo content and drags the point to a fifth point 2519 in a diagonal direction is detected, the controller 290, as illustrated in 2500c-2 of FIG. 25B, may control the display 230 to display an image 2540 which enlarges the photo content 2510 displayed on eight square cells.

In addition, when one object is being displayed on a grid screen, when a user touches and drags two fingers at the same time, the controller 290 may control the display 230 to move an object according to a user interaction and display a menu to control the user terminal device 100.

For example, as illustrated in FIG. 26A, while an application screen 2610 is displayed (2600-1), when a user touches the application screen 2610 with two fingers at the same time and drags in a downward left direction, the controller 290 may control the display 230 to move the application screen 2610 in a downward left direction, and display a menu 2620 which corresponds to various functions provided by the user terminal device at an upper end and right side of the screen (2600-2).

In addition, when a user touches the application screen 2610 with two fingers at the same time, and then drags in a rightward direction, the controller 290 may control the display 230 to move the application screen 2610 in the rightward direction and display a menu 2630 which corresponds to various functions provided by the user terminal device on a left side of the screen.

At this time, a menu which is generated according to moving of the specific application screen 2610 may include different menus according to a position of a display. For example, a menu which is displayed on an upper area may be a notification menu which notifies user of a received message, telephone call, e-mail, or the like, and a menu which is displayed at a right side or a left side is a menu which may execute frequently-used menu items, and a menu item which is displayed on an apex area may be a menu item to move to a home screen.

In addition, when a user touches and drags with two fingers a plurality of times, the controller 290 may control the display 230 to move the application screen according to a user interaction and display a new application screen.

Figure 27A:
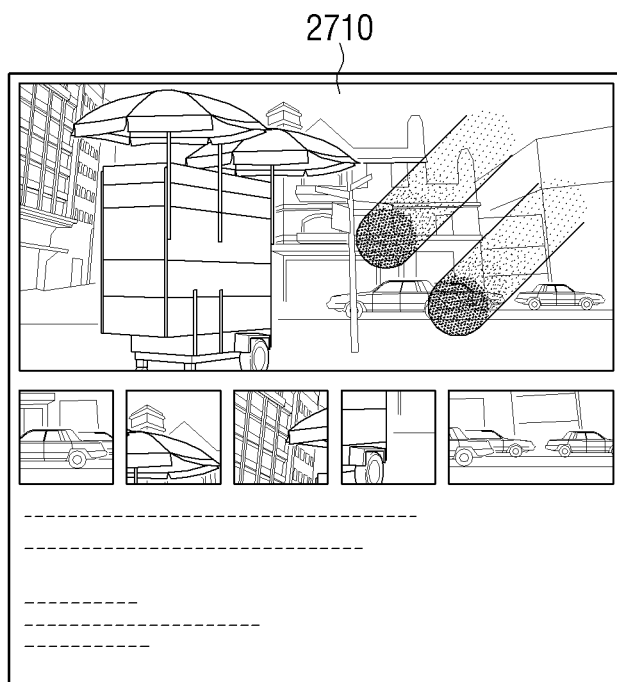
Figure 27B:
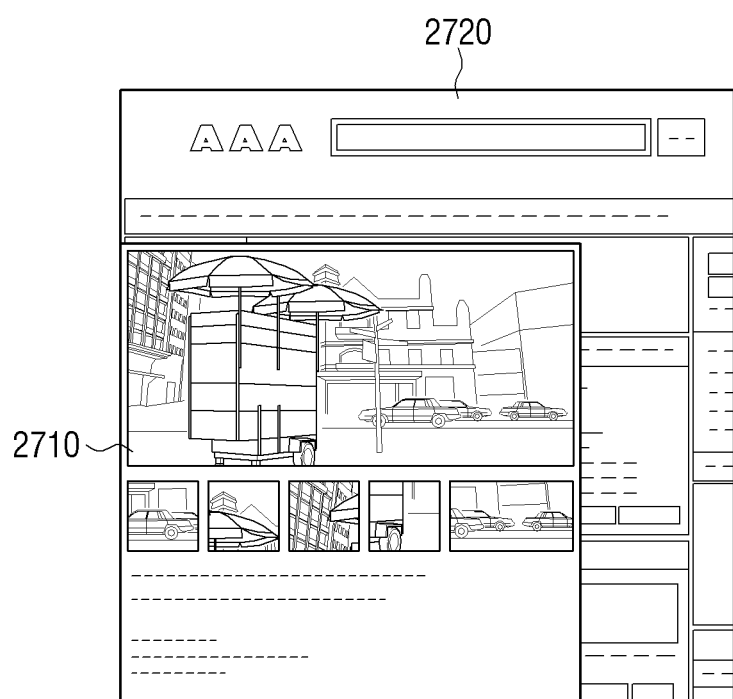

For example, as illustrated in FIG. 27A, while a first application screen 2710 is displayed, when a user touches the first application screen 2710 with two fingers at the same time and drags in a downward left direction, the controller 290, as illustrated in FIG. 27B, may control the display 230 to move a first application screen 2710' in a downward left direction and display a part of a second application screen 2720 on an upper end and right side of the screen. At this time, the second application may be an application which was executed prior to the first application.

Figure 27C:
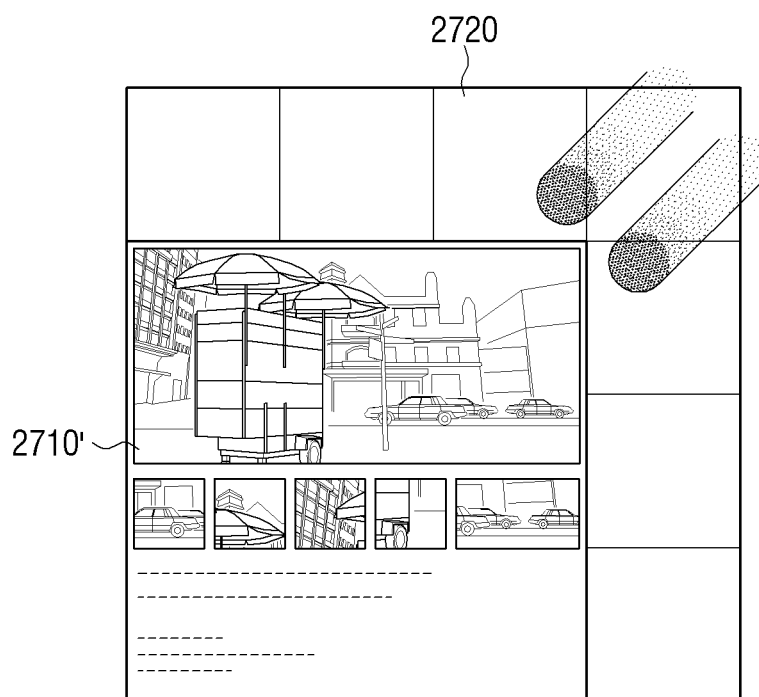
Figure 27D:
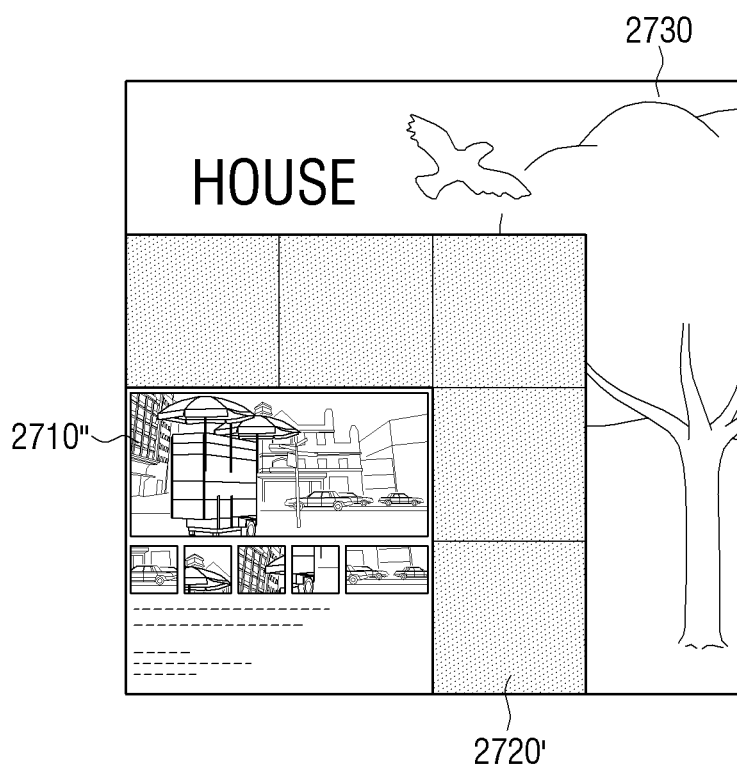

In addition, as illustrated in FIG. 27C, while the first application screen 2710' and a second application screen 2720 are displayed at the same time, when a user touches the second application screen 2720 with two fingers at the same time and drags in a downward left direction, the controller 290, as illustrated in FIG. 27D, may control the display 230 to move the first application screen 2710" and the second application screen 2720' in a downward left direction and display a part of a third application screen 2730 at upper and right areas of the screen. In this case, the third application may be an application which was executed prior to the second application.

Meanwhile, while the first application screen 2710' and the second application screen 2720 are displayed at the same time, when a user touches the first application screen 2710' with two fingers at the same time and drags in a downward left direction, the controller 290 may move the first application screen 2710' further in a downward left direction and enlarge an area where the second application screen 2720 is displayed.

When a user touches and drags an intersection point of an area where a plurality of objects are displayed, the controller 290 may adjust a screen ratio corresponding to a plurality of objects and a number of displayed objects according to a user interaction.

Figure 28A:
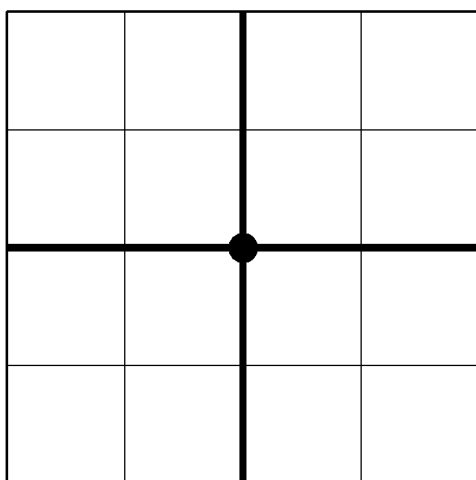
Figure 28B:
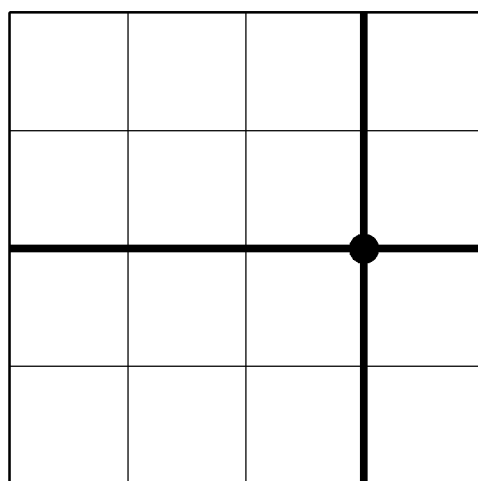

For example, as illustrated in FIG. 28A, while four objects are displayed, when a user interaction to touch the intersection point and move the intersection point one square in a rightward direction, the controller 290, as illustrated in FIG. 28B, may increase a size of the first object and the third object, and reduce a size of the second object and the fourth object.

Figure 28C:
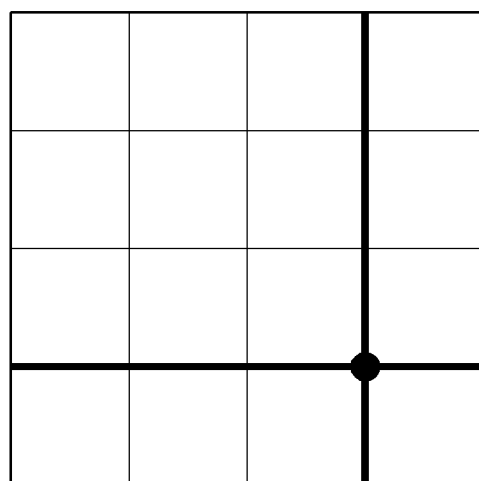

In addition, as illustrated in FIG. 28B, while four objects are displayed, when a user touches an intersection point and drags the point one square cell in a downward direction, the controller 290, as illustrated in FIG. 28C, may increase the size of the first object and the second object, and reduce the size of the third object and the fourth object.

Figure 28D:
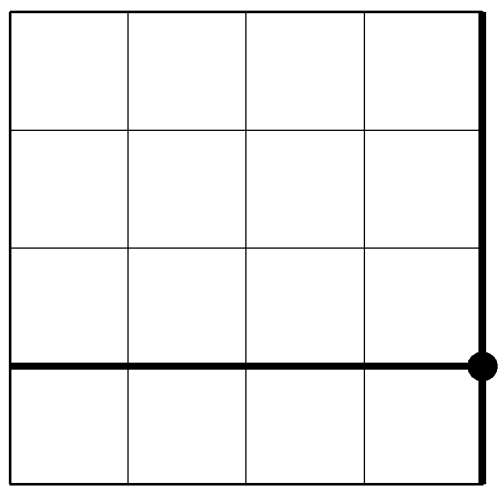

In addition, as illustrated in FIG. 28C, while four objects are displayed, when a user touches an intersection point and moves the point one square cell in a rightward direction, the controller 290, as illustrated in FIG. 28D, may increase the size of the first object and the third object and remove the second object and the fourth object from the screen.

Figure 28E:
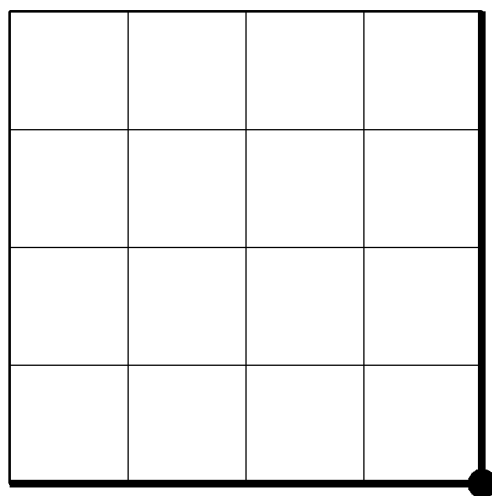

As illustrated in FIG. 28D, while two objects are displayed, when a user touches an intersection point and moves the point one square cell in a downward direction, the controller 290, as illustrated in FIG. 28E, may increase the size of the first object and remove the third object from the screen.

As described above, by touching and dragging the intersection point, a screen ratio of the objects and a number of objects which may perform a plurality of tasks may be controlled at the same time.

When a user touches an intersection point of an area where a plurality of objects displayed for an extended period of time (that is, a long press interaction), the controller 290 may control the display 230 to integrate a plurality of objects which share the intersection point, generate one new object, and display the object.

Figure 29A:
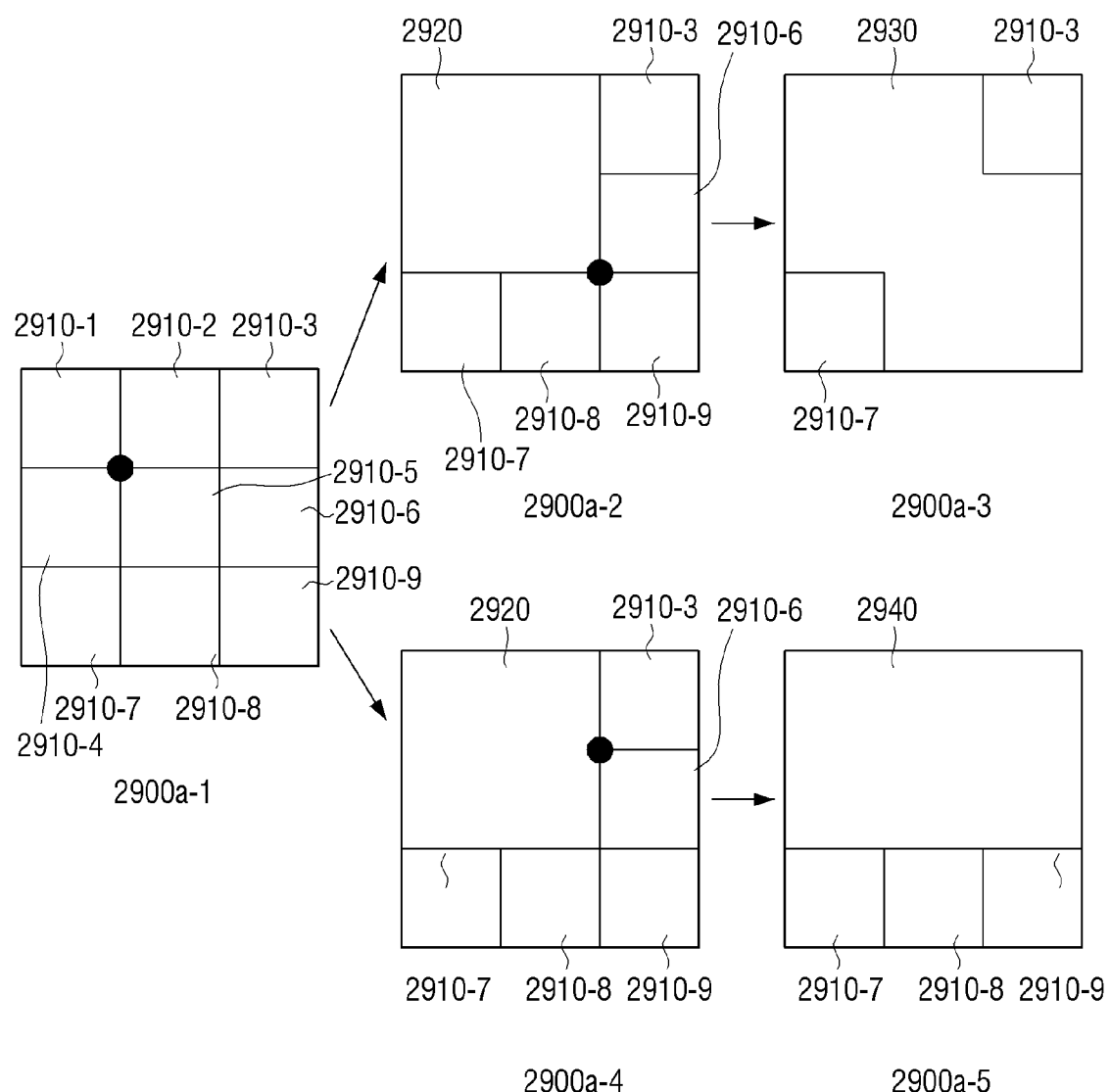

For example, as illustrated in FIG. 29A, while first to ninth objects 2910-1 to 2910-9 are displayed, when a user touches an intersection point of the first object 2910-1, the second object 2910-2, the fourth object 2910-4, and the fifth object 2910-5 for a preset time (2900*a*-1), the controller 290 may control the display 230 to display a tenth object 2920 incorporating the first object 2910-1, the second object 2910-2, the fourth object 2910-4, and the fifth object 2910-5 (2900*a*-2).

In addition, when a user touches an intersection point of the tenth object 2920, the sixth object 2910-6, the eighth object 2910-8, and the ninth object 2910-9 for a preset time (2900*a*-2), the controller 290 may control the display 230 to display a new eleventh object 2930 by integrating the tenth object 2920, the sixth object 2910-6, the eighth object 2910-8, and the ninth object 2910-9 (2900*a*-3).

Or, when a user touches an intersection point of the tenth object 2920, the third object 2910-3, and the sixth object 2910-6 for a preset time (2900*a*-4), the controller 290 may control the display 230 to display a new twelfth object 2940 by integrating the tenth object 2920, the third object 2910-3, and the sixth object 2910-6 (2900*a*-5).

As a non-limiting example, when a plurality of objects are icons for executing a plurality of applications, when a long press interaction is detected at an intersection point of the plurality of objects, the controller 290 may generate an upper folder containing the objects which share the intersection point.

Figure 29B:
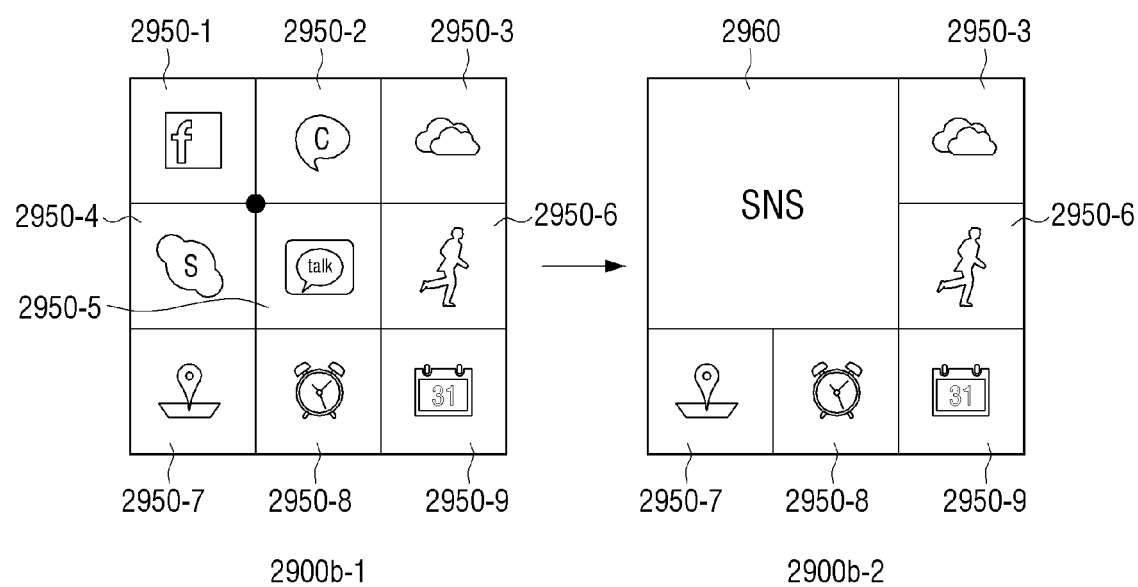

For example, as illustrated in FIG. 29B, while the first to ninth execution icons 2950-1 to 2950-9 are displayed, when a user long presses an intersection point of the first execution icon 2950-1, the second execution icon 2950-2, the fourth execution icon 2950-4, and the fifth execution icon 2950-5 (2900*b*-1), the controller 290 may control the display 230 to remove the first execution icon 2950-1, the second execution icon 2950-2, the fourth execution icon 2950-4, and the fifth execution icon 2950-5 from the screen, and display an SNS folder 2960 which is an upper folder of the first execution icon 2950-1, the second execution icon 2950-2, the fourth execution icon 2950-4, and the fifth execution icon 2950-5 (2900*b*-2). A folder name may be designated by a user.

Further, in case where a plurality of objects are a plurality of content icons, when a long press interaction is detected at an intersection point of the plurality of objects, the controller 290 may generate a playlist including the content which share an intersection point in which a long press interaction is detected.

Figure 29C:
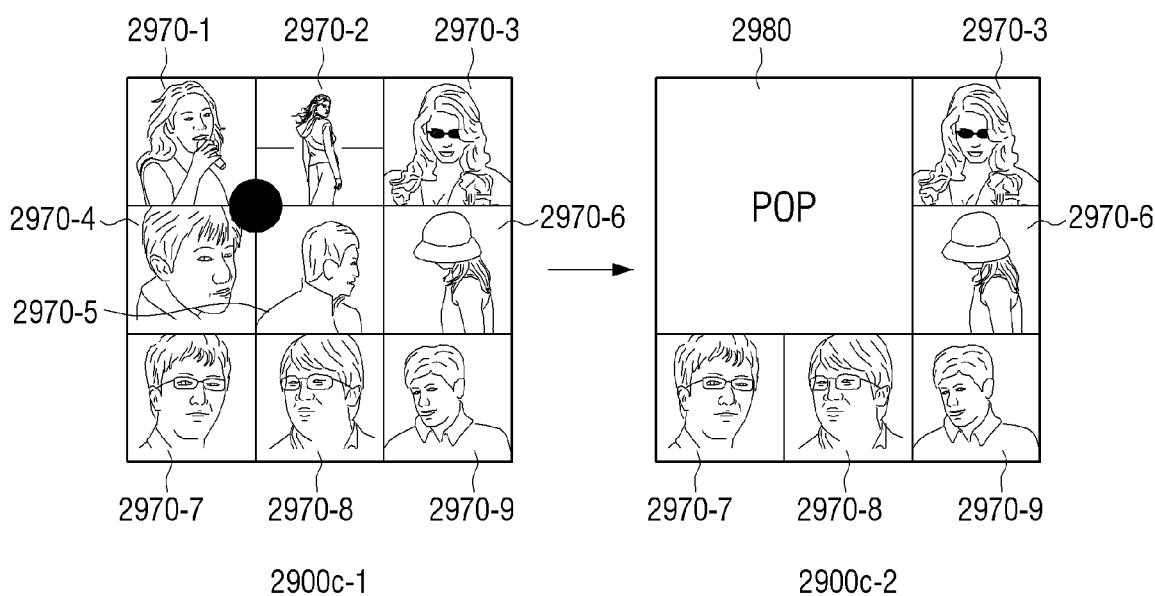

For example, as illustrated in FIG. 29C, while the first content to the ninth content icons 2960-1 to 2960-9 are displayed, when a user long presses an intersection point of the first contents 2960-1, the second contents icon 2960-2, the fourth contents icon 2960-4, and the fifth contents icon 2960-5 (2900*c*-1), the controller 290 may control the display 230 to remove the first contents icon 2960-1, the second contents icon 2960-2, the fourth contents icon 2950-4, and the fifth contents icon 2960-5 from the screen, and display a POP list 2970 which is a playlist which includes the first contents icon 2960-1, the second contents icon 2960-2, the fourth contents icon 2960-4, and the fifth contents icon 2960-5 (2900*c*-2). A name of the playlist may be designated by a user.

When a user touches and drags one of intersection points of a plurality of objects located at one side of the screen is detected, the controller 290 may adjust the number of objects displayed on the screen.

Figure 30A:
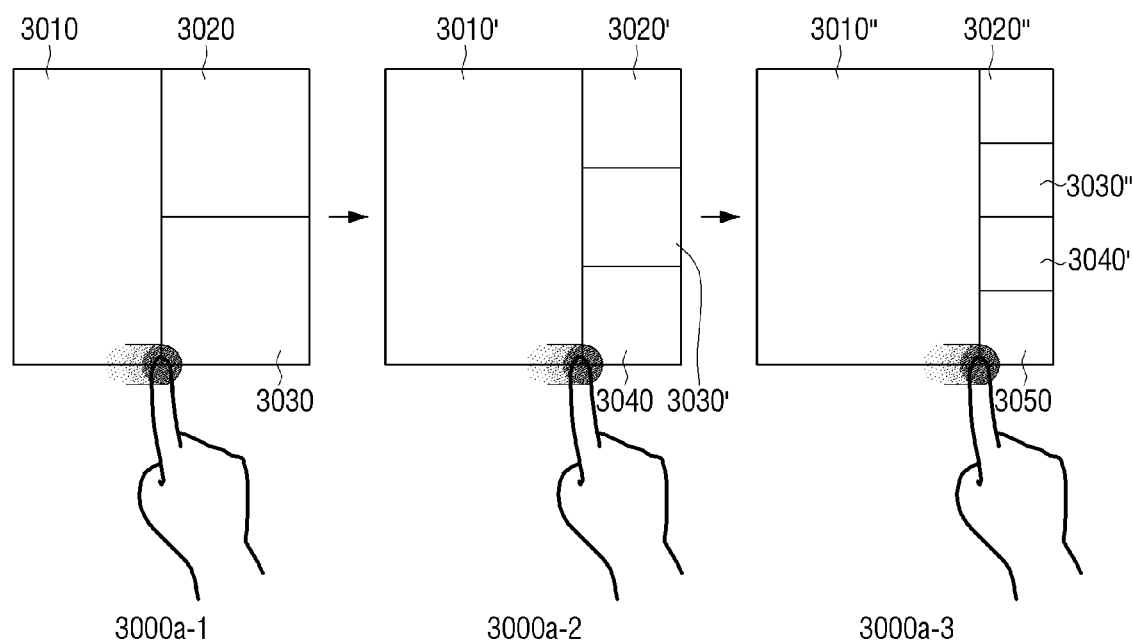

For example, as illustrated in FIG. 30A, while the first to the third objects 3010 to 3030 are displayed, when a user touches and drags the first object 3010 and the third object 3030 in a rightward direction (3000*a*-1), the controller 290 may control the display 230 to increase a size of the first object 3010, reduce a size of the second object 3020, and the third object 3030, and display the fourth object 3040 at a lower end of the third object 3030 (3000*a*-2).

In addition, while displaying the first to the fourth objects 3010-3040, when a user interaction to touches an intersection point of the first object 3010 and the fourth object 3040 and drags the point in a rightward direction (3000*a*-2), the controller 290 may control the display 230 to increase a size of the first object 3010, reduce the size of the second to fourth objects 3020' to 3040, and display the fifth object 3050 at a lower end of the fourth object 3040 (3000*a*-3).

Figure 30B:
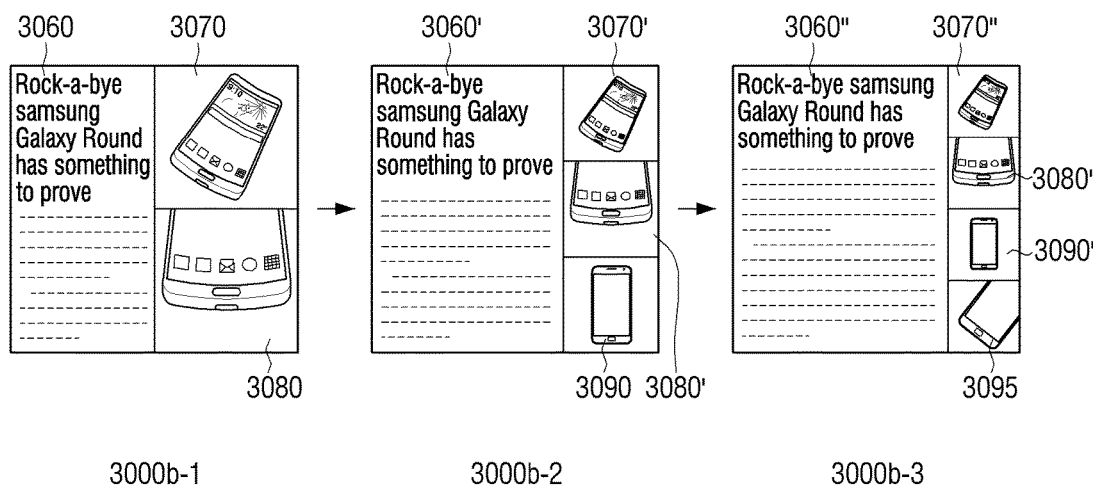

Further, as illustrated in FIG. 30B, while a news content 3060, a first photo content 3070, and a second photo content 3080 are displayed, when a user touches an intersection point of the news content 3060 and the second photo content 3080 and drags in a rightward direction (3000*b*-1), the controller 290 may control the display 230 to increase a size of the news content 3060, reduce sizes of the first photo content 3070 and the second photo content 3080, and display a new third photo content 3090 (3000*b*-2). In addition, when a user continues dragging in a rightward direction, the controller 290 may control the display 230 to generate and display a new fourth photo content 3905 (3000*b*-3). The first to fourth photo content 3070, 3080, 3090, and 3095 may be related to the news content 3060.

Figure 31A:
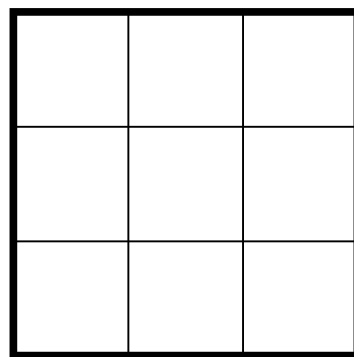
Figure 31A:
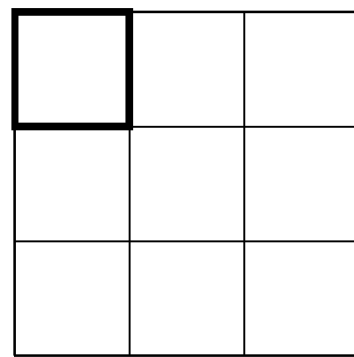
Figure 31A:
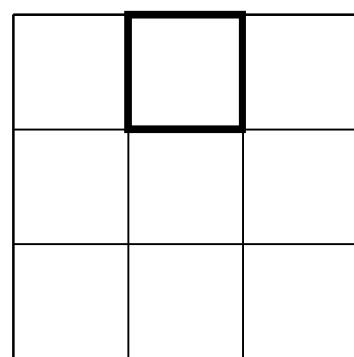
Figure 31A:
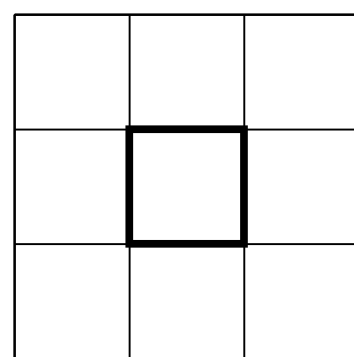

In addition, the controller 290 may provide different functions on a main object in accordance with a number of sides from among a plurality of sides included in the display 230 which are in contact with the main object. For example, as illustrated in FIG. 31A, the main object 3110 is in contact with four sides of the display 230, the main object 3120 is in contact with two sides of the display 230, the main object 3130 is in contact with one side of the display 230, and the object 3140 is in contact with no sides of the display. The controller 290 when a main object 3150 is in contact with four sides of the display 230, as illustrated in FIG. 31B, when a main object 3160 is in contact with two sides of the display 230, as illustrated in FIG. 31C, when a main object 3170 is in contact with one side of the display 230, as illustrated in FIG. 31D, when a main object 3180 is not in contact with the sides of the display 230 as illustrated in FIG. 31E, may provide different functions.

Figure 31B:
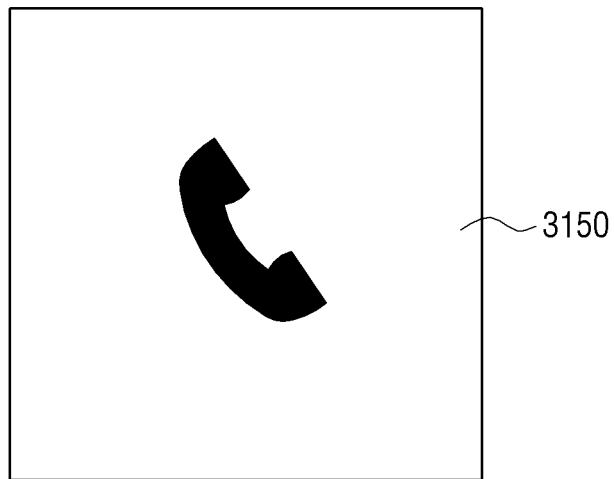
Figure 31C:
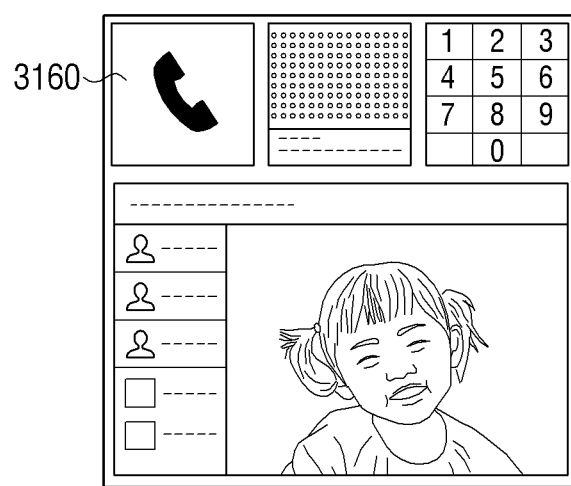
Figure 31D:
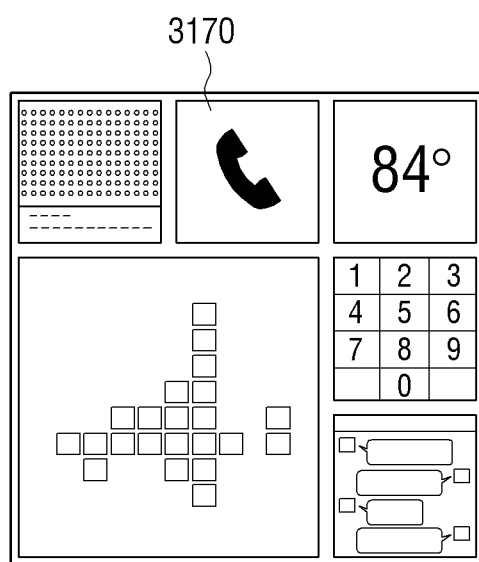
Figure 31E:
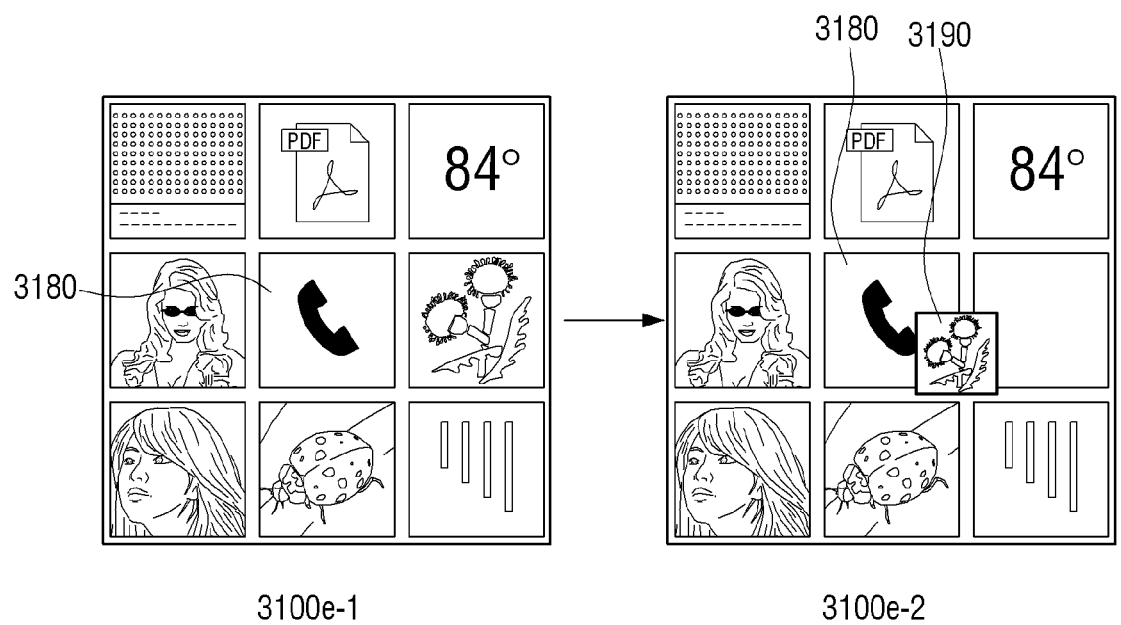

For example, when, as illustrated in FIG. 31B, a main object 3150 is an object, which corresponds to a telephone application and is in contact with four sides of the display 230, the controller 290 may control the user terminal device 200 to perform a telephone function. In addition, as illustrated in FIG. 31C, when a main object 3160 is in contact with two sides of the display 230, the controller 290 may control a pause of the telephone function of the user terminal device 200. In addition, as illustrated in FIG. 31D, when a main object 3170 is in contact with one side of the display 230, the controller 290 may enter a multi-tasking mode so that the user terminal device may perform not only the telephone function but also other functions at the same time. In addition, as illustrated in FIG. 31E, when a main object 3180 is not in contact with any sides of the display 230 (3100e-1), if a user drags another object 3190 to an area where the main object 3180 is displayed (3100e-2), the controller 290 may control the communicator 240 to share with a receiver of a phone call a content which corresponds to the another object 3190.

When a mode of the user terminal device 200 is a general mode and not a grid editing mode, if a user selects and drags one of a plurality of objects, the controller 290 may control the display 230 so that items on the selected object may be displayed on an area which corresponds to the dragging direction.

Figure 32A:
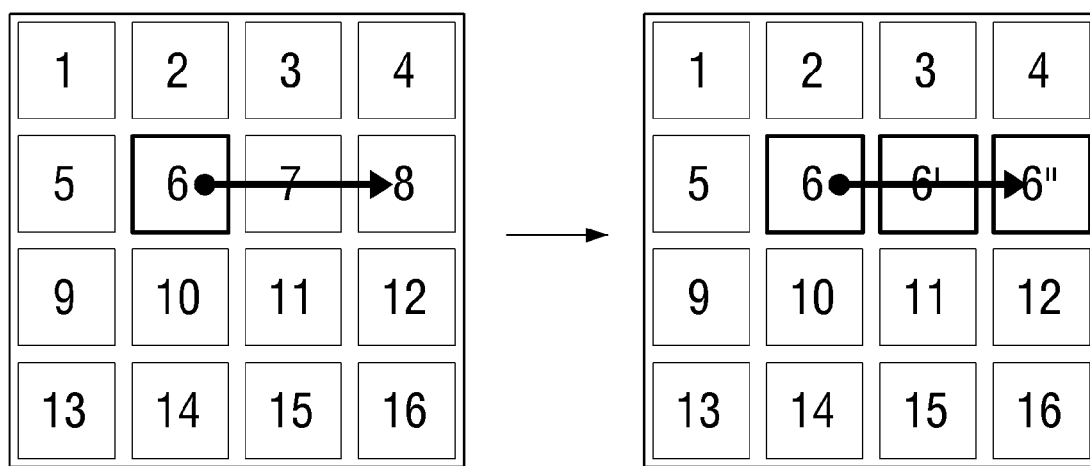

For example, as illustrated in FIG. 32A, while the first to the sixteenth objects are displayed, when a user drags the sixth object is detected (3200a-1), the controller 290 may control the display 230 to remove the seventh object and the eighth object from the screen, and display the items 6' and 6" corresponding to the sixth object on an area where the seventh object and the eighth object were displayed (3200a-2).

Figure 32B:
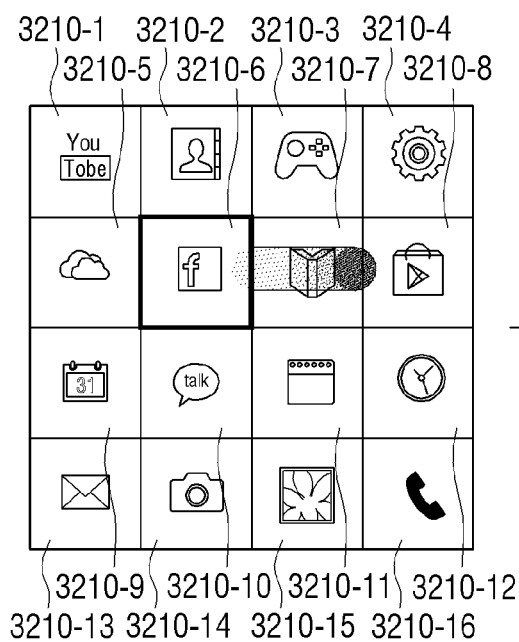
Figure 32B:
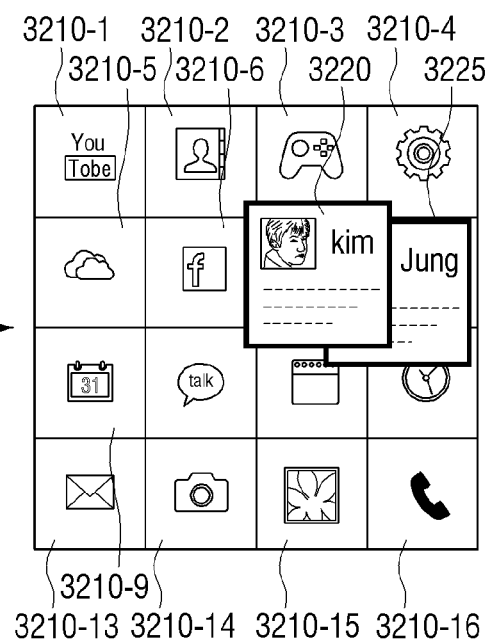

Referring to an exemplary embodiment, as illustrated in FIG. 32B, while displaying a plurality of objects 3210-1 to 3210-16 which correspond to a plurality of applications, when a user drags the sixth application 3210-6 which corresponds to the SNS application in a rightward direction (3200b-1), the controller 290 may control the display 230 to display recent updates 3220 and 3225 which are the execution items of the SNS application on an area where the seventh object 3210-7 and the eighth object 3210-8 are displayed (3200b-2). In this case, the recent updates 3220 and 3225 may have a size larger than one square cell, but this is merely exemplary, and the recent updates 3220 and 3225 may be displayed on one square cell respectively.

Figure 32C:
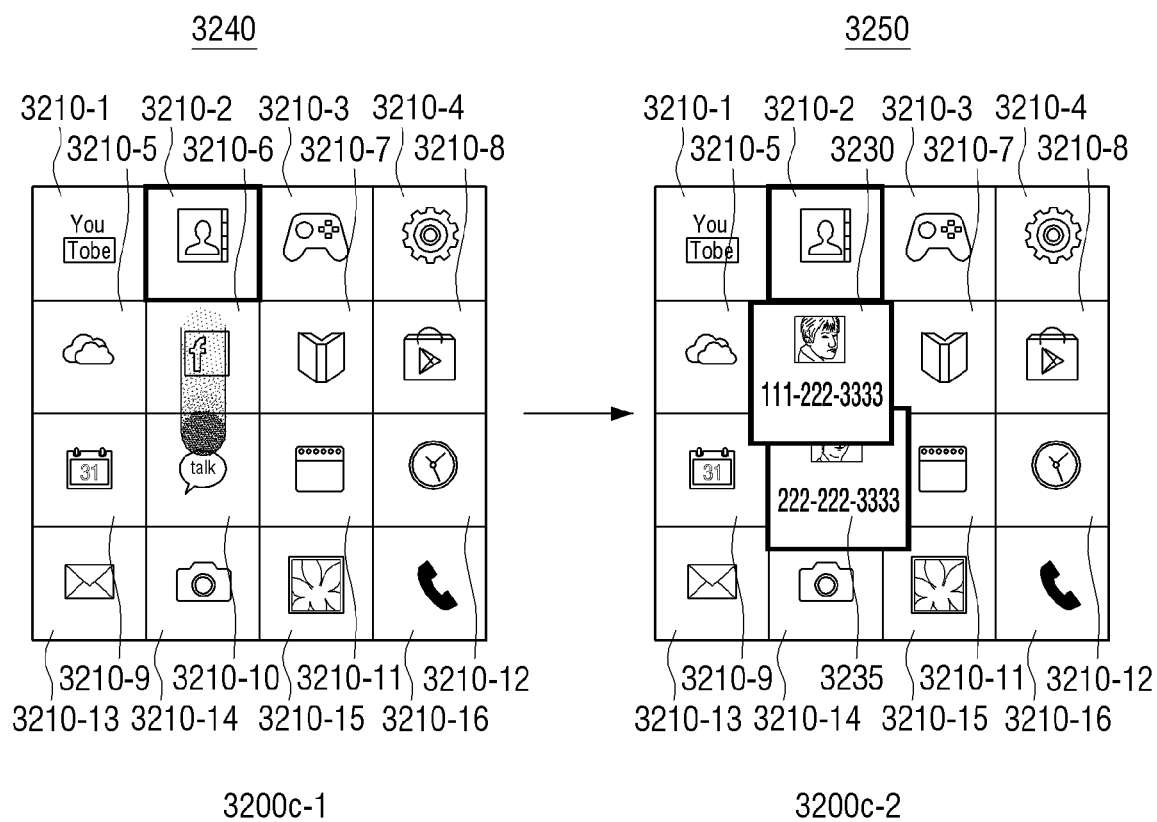

In addition, as illustrated in FIG. 32C, while a plurality of objects 3210-1 to 3210-16 which correspond to a plurality of applications are displayed, when a user drags the second application 3210-2 which corresponds to the contact list application in a downward direction (3200c-1), the controller 290 may control the display 230 to display information 3230 and 3235 on the recently contacted contacts which are the execution items of the contact list application at an area where the sixth object 3210-7 and the tenth object 3210-10 are displayed (3200c-2). The information 3230 and 3235 on the recently contacted contacts may have size larger than one square cell, but this is merely exemplary, and the information 3230 and 3235 on the recently contacted contact list may be displayed on one square cell respectively.

<Sharing Contents Among a Plurality of User Terminal Devices>

Figure 33:
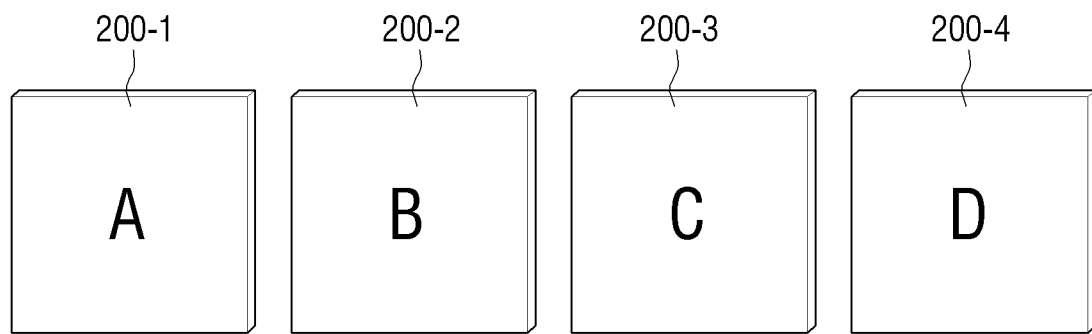
FIGS. 33 to 38 are views illustrating various functions using a plurality of user terminal devices according to one or more exemplary embodiments.

According to another exemplary embodiment, as illustrated in FIG. 33, a plurality of user terminal devices 200-1, 200-2, 200-3, and 200-4 having a display panel in a square shape may share contents when a preset condition is satisfied. To be specific, as there is a display panel in a square shape of which length of width and height is the same, when one side of a plurality of user terminal devices 200-1,200-2,200-3,200-4 is in contact with a side of another terminal devises regardless of direction, user terminal devices of which sides are in contact with may share contents.

At this time, the plurality of user terminal devices 200-1, 200-2, 200-3, and 200-4 may determine a proximity direction through various methods. As an exemplary embodiment, a plurality of user terminal devices 200-1, 200-2, 200-3, and 200-4 may determine the proximity direction using NFC communication technology. For example, each of a plurality of user terminal devices 200-1, 200-2, 200-3, and 200-4 may include four NFC chips 244 on four sides, and, when the NFC chips 244 which are included in the sides which are in contact with each other are tagged to each other, the proximity direction among the user terminal devices may be determined. As another exemplary embodiment, a plurality of user terminal devices 200-1, 200-2, 200-3, and 200-4 may determine the proximity direction among the user terminal devices using an infrared ray detector (not shown). For example, each of a plurality of user terminal devices 200-1, 200-2, 200-3, 200-4 may have four infrared ray detectors on respective four sides of the terminal devices, and determine the proximity direction among the user terminal devices thorough the infrared ray detector. In addition, the plurality of user terminal devices 200-1, 200-2, 200-3, and 200-4 may determine whether sides among the user terminal devices are in contact with each other using a touch detector. However, the above description is merely exemplary, and the proximity direction and whether sides among the user terminal devices are in contact with each other may be determined other means and methods.

A plurality of user terminal devices 200-1, 200-2, 200-3, and 200-4 may determine a connection state by determining whether sides which are in contact with each other, and display a sharing area in which the contents may be shared based on the connection state. In addition, when a user drags a contents icon displayed on one of the plurality of user terminal devices 200-1, 200-2, 200-3, and 200-4, contents which correspond to a contents icon in which the user interaction is detected may be shared with another user terminal device.

Figure 34A:
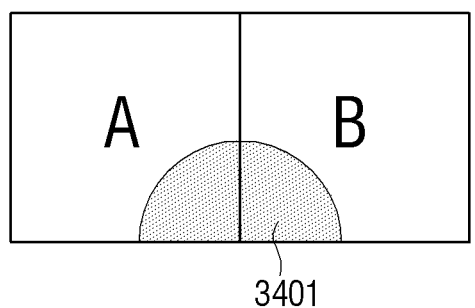

For example, when a right side of the first user terminal device 200-1 is in contact with a left side of the second user terminal device 200-2, the first user terminal device 200-1 and the second user terminal device 200-2 may determine a connection state through at least one detector, and as illustrated in FIG. 34A, and display a shared area 3401 at a lower end portion of the sides in contact with each other based on the determined connection state.

Figure 34B:
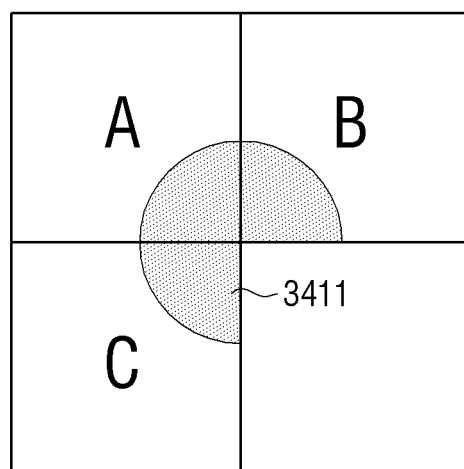

In addition, when the right side of the first user terminal device 200-1 is in contact with a left side of the second user terminal device 200-2, and a bottom side of the first user terminal device 200-1 is in contact with an upper side of the third user terminal device 200-3, the first to third user terminal devices 200-1 to 200-3 may determine a connection state through at least one detector, and, as illustrated in FIG. 34B, display a shared area 3411 at an area where the three user terminal devices are in contact with each other based on the determined connection state.

Figure 34C:
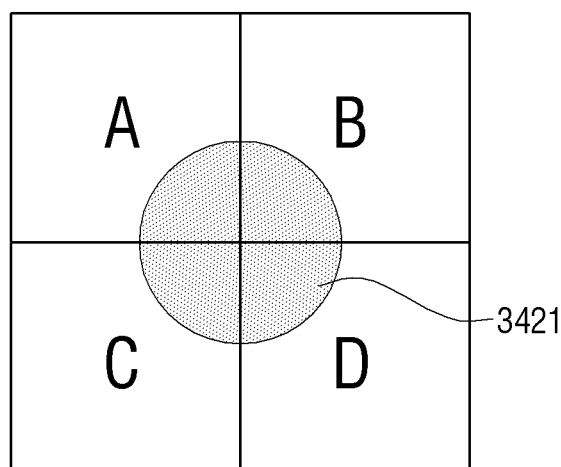

In addition, when the right side of the first user terminal device 200-1 is in contact with the left side of the second user terminal device 200-2, the bottom side of the first user terminal device 200-1 is in contact with an upper side of the third user terminal device 200-3, a bottom side of the second user terminal device 200-2 is in contact with an upper side of the fourth user terminal device 200-4, and a right side of the third user terminal device 200-3 is in contact with a left side of the fourth user terminal device 200-4, the first to fourth user terminal devices 200-1 to 200-4 may determine a connection state through at least one detector, and, as illustrated in FIG. 34C, display a shared area 3421 at an area where the four user terminal devices are in contact with each other, based on the determined connection state.

Figure 34D:
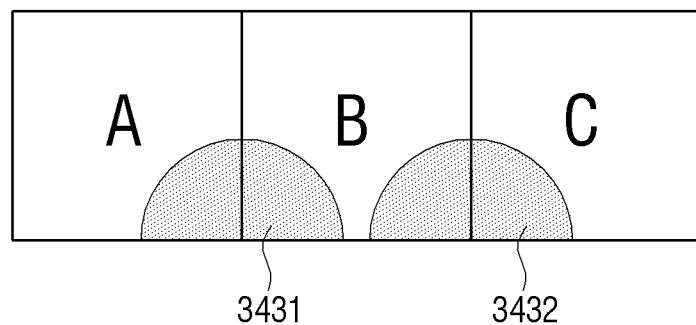

In addition, when the right side of the first user terminal device 200-1 is in contact with the left side of the second user terminal device 200-2, and a right side of the second user terminal device 200-2 is in contact with a left side of the third user terminal device 200-3, the first to third user terminal devices 200-1 to 200-3 may determine a connection state through at least one detector, and as illustrated in FIG. 34D, may display a shared area 3431 at a bottom area where a side of the first user terminal device 200-1 is in contact with the second user terminal device 200-2, and display a shared area 3432 at a bottom area where a side of the second user terminal device 200-2 is in contact with a line of the third user terminal device 200-3.

Figure 34E:
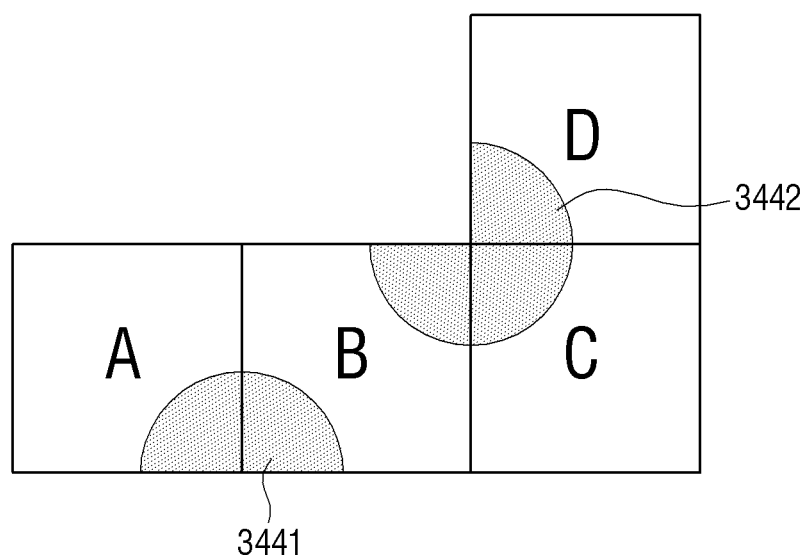

In addition, when the right side of the first user terminal device 200-1 is in contact with the left side of the second user terminal device 200-2, the right side of the second user terminal device 200-2 is in contact with the third user terminal device 200-3, and the upper side of the third user terminal device 200-3 is in contact with a bottom side of the fourth user terminal device 200-4, the first to fourth user terminal devices 200-1 to 200-4 may determine a connection state through at least one detector, and, as illustrated in FIG. 34E, may display a shared area 3441 at a bottom area of the side of the first user terminal device 200-1 which is in contact with a side of the second user terminal device 200-2, and display a shared area 3442 at an area where sides of the second to fourth user terminal devices 200-2 to 200-4 are in contact with each other.

Figure 35:
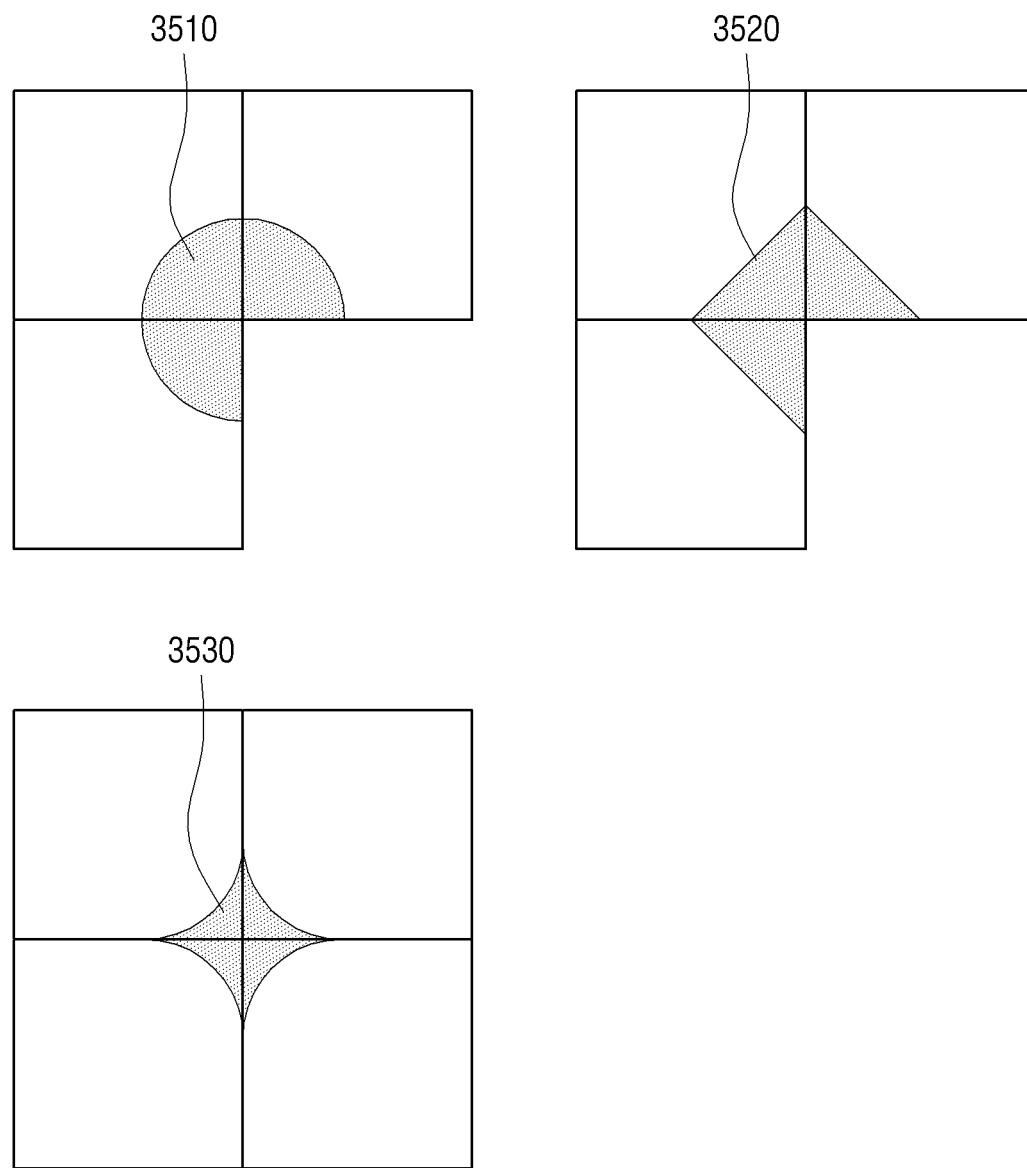

A shared area may be realized in various shapes. For example, as illustrated in FIG. 35, the user terminal devices may display a shared area as a fan shape (3510), a triangle shape (3520), and a shape which excludes a fan shape from a half circle (3530).

In addition, the plurality of user terminal devices 200-1, 200-2, 200-3, and 200-4, after being connected to each other, may display a shared area, and may share a content.

Figure 36A:
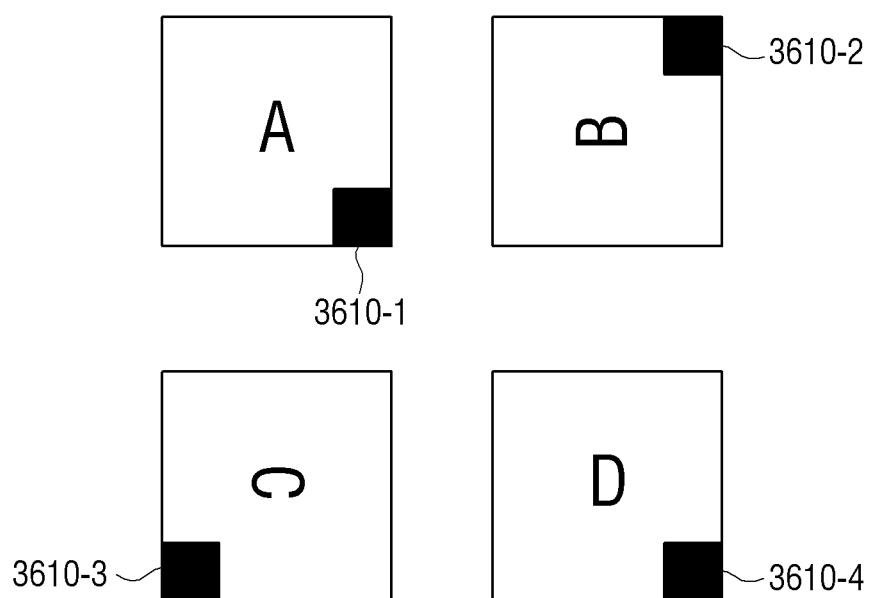
Figure 36B:
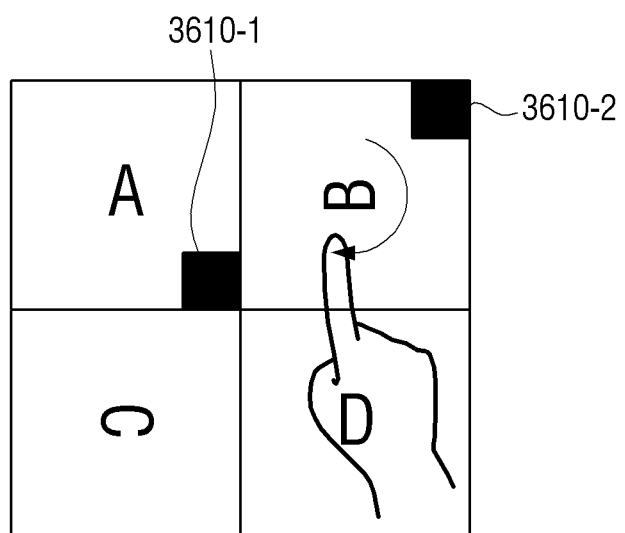
Figure 36C:
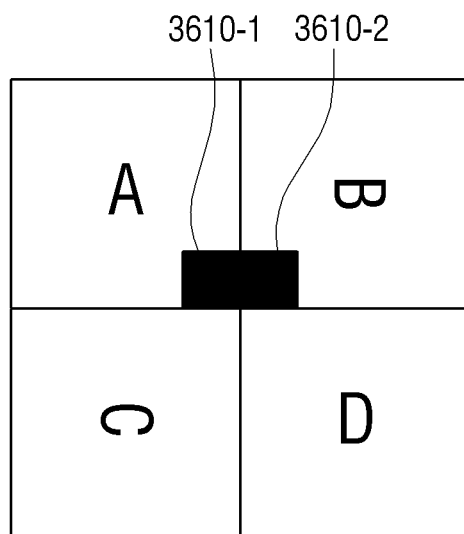

For example, as illustrated in FIG. 36A, when a first sharing area 3610-1 is displayed at a right bottom end portion of the first user terminal device 200-1, a second sharing area 3610-2 is displayed at a right upper end of the second user terminal device 200-2, a third sharing area 3610-3 is displayed at a left bottom end part of the third user terminal device 200-3, and a fourth sharing area 3610-4 is at a right bottom end of the fourth user terminal device 200-4, as illustrated in FIG. 36B, four user terminal devices 200-1 to 200-4 may be connected with each other. When the second user terminal device 200-2 is rotated at an angle of 180 in a clockwise direction, the first sharing area 3610-1 and the second sharing area 3610-2 may be connected with each other as illustrated in FIG. 36C. When the first sharing area 3610-1 is connected with the second sharing area 3610-2, one of the first user terminal device 200-1 and the second user terminal device 200-2 may transmit content to the other terminal device.

Figure 37A:
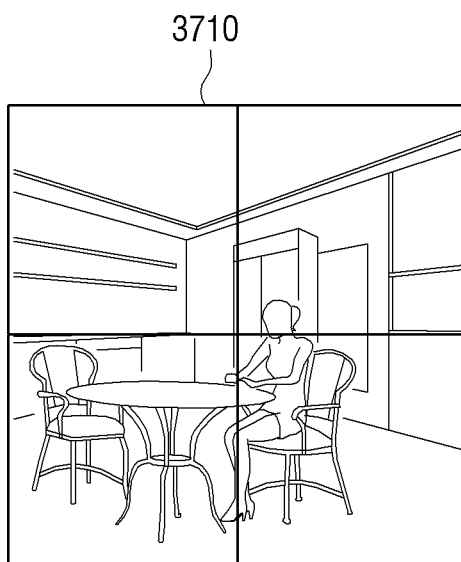
Figure 37B:
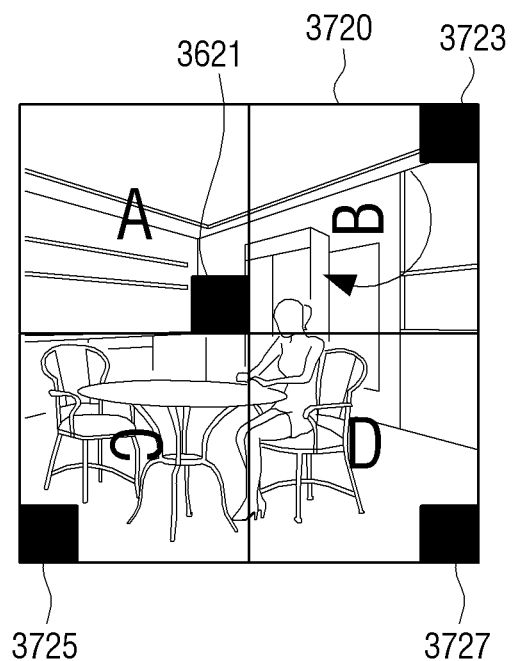
Figure 37C:
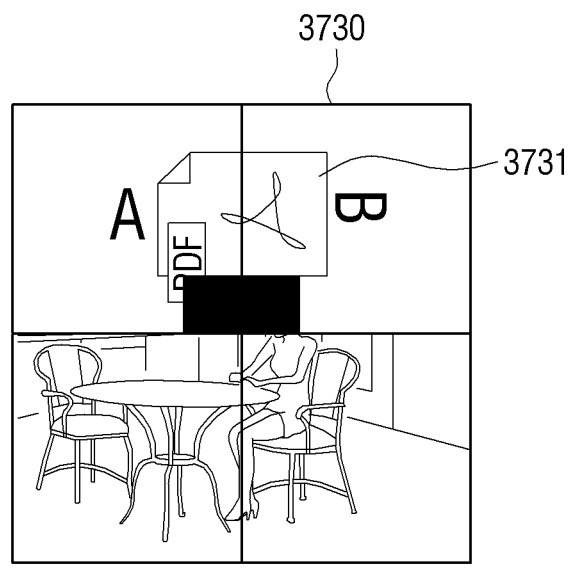
Figure 37D:
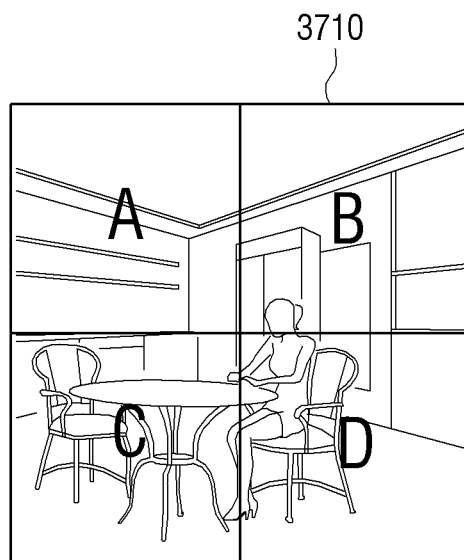

Referring to a detailed exemplary embodiment, as illustrated in FIG. 37A, the first to fourth user terminal devices 200-1 to 200-4 are displayed in proximity with each other, may display one image 3710. The image content 3710 may be stored in the second user terminal device 200-2. In case of operating as a sharing mode, the four user terminal devices 200-1 to 200-4, as illustrated in FIG. 37B, may display each of the sharing areas 3721, 3723, 3725, and 3727. When the second user terminal device 200-2 is rotated clockwise at an angle of 180 and the first and second sharing areas 3721 and 3723 are connected with each other as illustrated in FIG. 37C, the second user terminal device 200-2 may transmit data of the image content 3710 to the first user terminal device 200-1. While transmitting the data, an icon 3731 which indicates a file format of the image contents may be displayed. After completing file transmission, the first to fourth user terminal devices 200-1 to 200-4, as illustrated in FIG. 37D, may again display one image 3710.

In addition, when the plurality of user terminal devices 200-1 to 200-4 are connected to each other, the plurality of user terminal device 200-1 to 200-4 may provide a group playback function in various formats.

Figure 38:
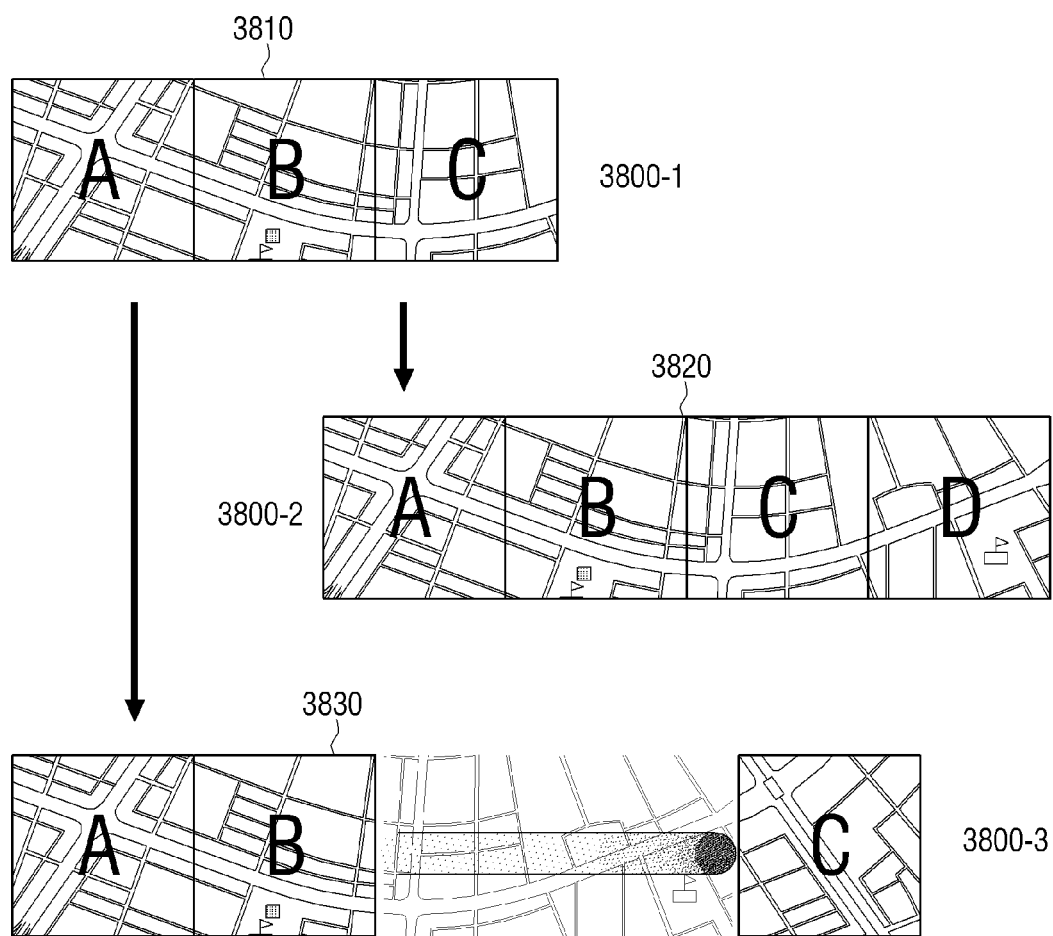

For example, as illustrated in FIG. 38, the first to third user terminal devices 200-1 to 200-3 are displaying a map screen regarding a specific area 3810 (3800-1). When the fourth user terminal device 200-4 is connected to a right side of the first to third user terminal devices 200-1 to 200-3, the fourth user terminal device 200-4 may display an additional portion west of the specific area 3820 (3800-2). Further, while the first to third user terminal devices 200-1 to 200-3 are displaying the map screen regarding the specific area 3810 (3800-1), when the third user terminal device 200-3 is pushed moves westward, the third user terminal device 200-3 may determine a distance from the second user terminal device 200-2 and display an area west of the specific area based on the distance.

As described above, by using a plurality of user terminal devices having a display panel in a square shape, various content may be shared and a group playback function is available.

<Folding Interaction>

According to an exemplary embodiment, when a folding action in which to fold a display more than a preset angle with reference to a hinge 310 is detected, the controller 290 may control the display 230 to change an object which is displayed on a plurality of square cells into another object and display the changed object. The controller 290, when the display is folded more than a preset angle using a bending detector 283, may detect that a folding interaction occurs.

Figure 39:
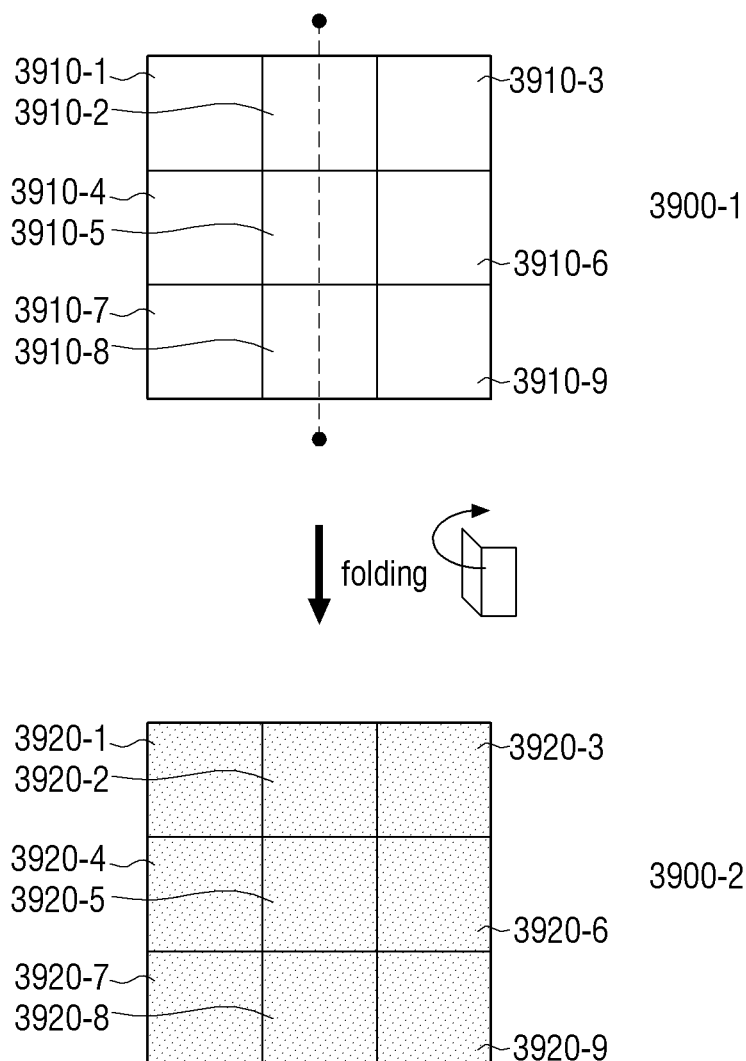
FIGS. 39 to 46B are views illustrating various functions of a user terminal device by a folding interaction, according to one or more exemplary embodiments.

For example, as illustrated in FIG. 39, while first to ninth objects 3910-1 to 3910-9 are displayed on a square cell (3900-1), when a folding interaction is detected, the controller 290 may control the display 230 to remove the first to ninth objects 3910-1 to 3910-9 from a display screen and display new tenth to eighteenth objects 3920-1 to 3920-9 (3900-2).

Further, after touching one of a plurality of square cells, when a folding interaction is detected, the controller 290 may change an object which is in a row including the touched square cell to another object, and not change objects which are present in other rows.

Figure 40A:
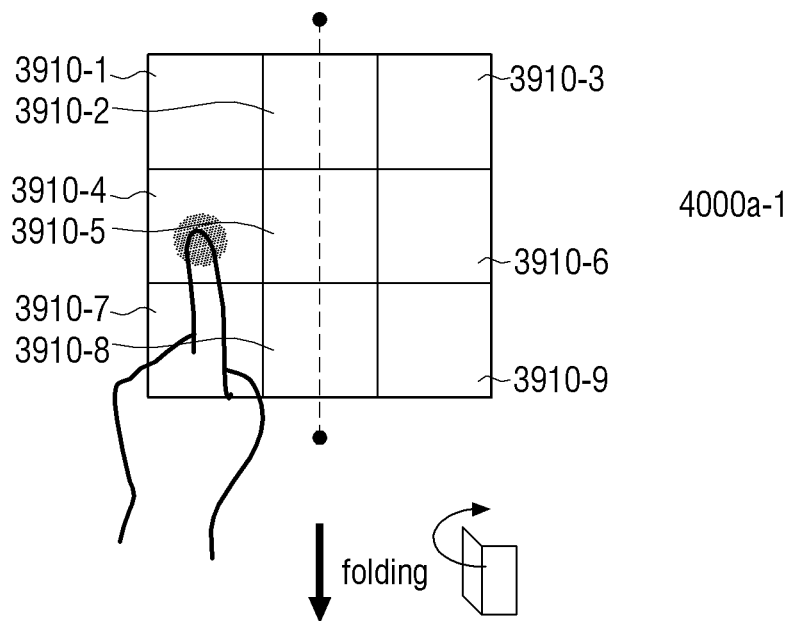
Figure 40A:
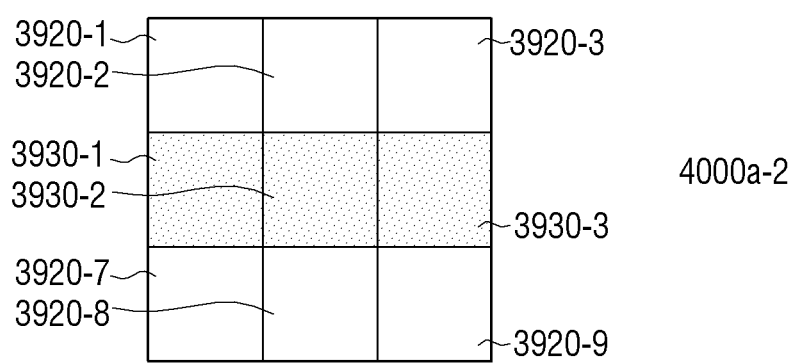

For example, as illustrated on 4000a-1 of FIG. 40A, while the first to ninth objects 3910-1 to 3910-9 are displayed, after the fourth object 3910-4 is touched, and then a folding interaction is detected, the controller 290, as illustrated in 4000a-2 of FIG. 40A, may control the display 230 to change the objects in the second row which includes the fourth object 3910-4 to new tenth to twelfth objects 3930-1 to 3930-3, and maintain objects which are displayed in the first and third rows.

Figure 40B:
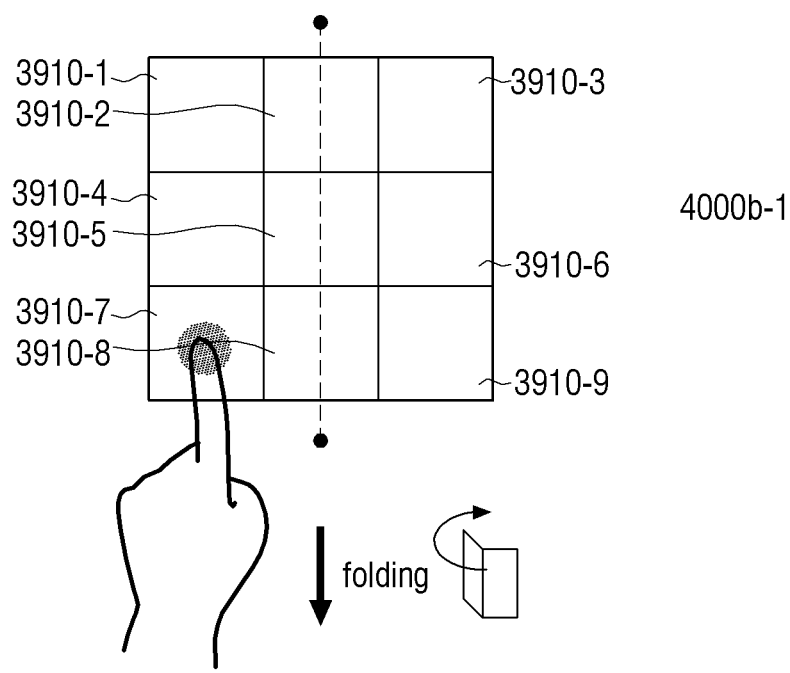
Figure 40B:
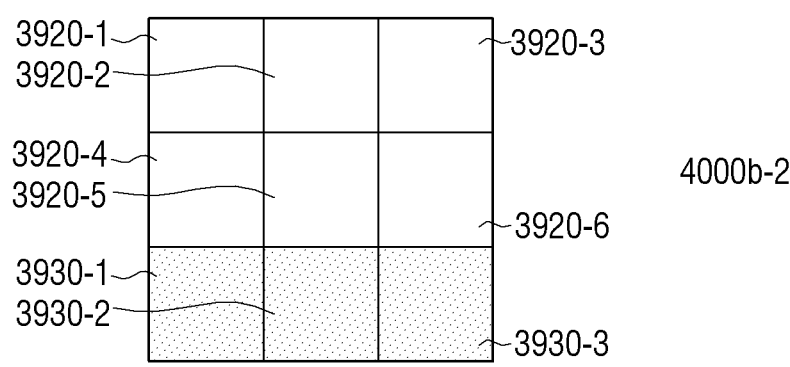

In addition, as illustrated on 4000b-1 of FIG. 40B, while the first to ninth objects 3910-1 to 3910-9 are displayed, after the seventh object 3910-7 is touched, a folding interaction is detected, the controller 290, as illustrated in 4000b-2 of FIG. 40B, may control the display 230 to change objects in the third row which includes the seventh object 3910-7 to new tenth object to twelfth object 3930-1 to 3930-3, and maintain an object displayed on the first and second row.

Figure 41A:
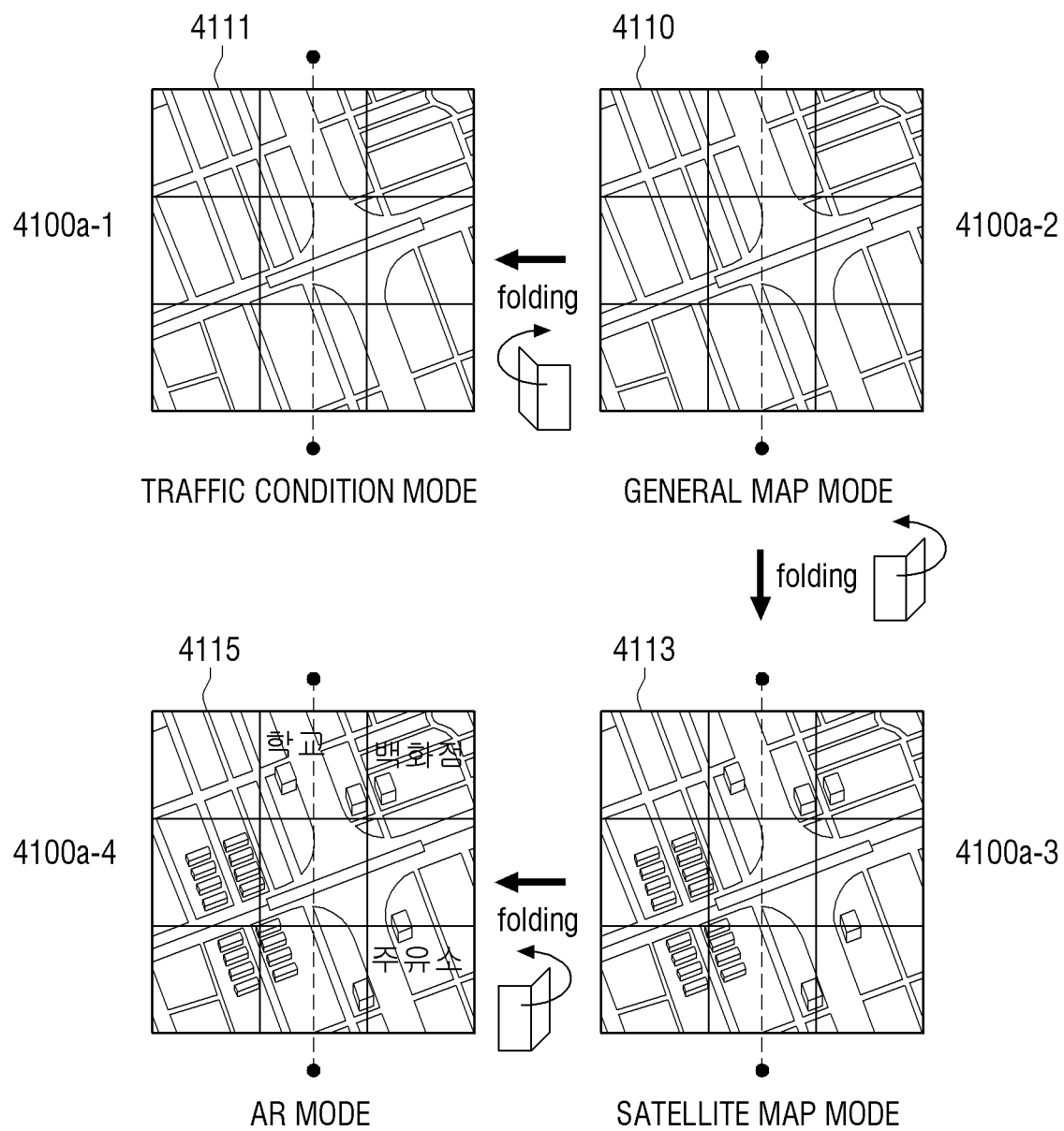

Referring to the exemplary embodiment, as illustrated in 4100a-2 of FIG. 41A, while a general map screen 4110 is displayed in the first to ninth square cells, when a folding interaction to turn a left display panel in a right display panel direction is detected, the controller 290, as illustrated in 4100a-1 of FIG. 41A, may change the general map mode 4110 which is displayed in a plurality of square cells to a traffic condition mode 4111. While the general map mode 4110 is displayed in the first to ninth square cells (4100a-2), when a folding interaction to fold the right display panel in the left display panel direction is detected, the controller 290, as illustrated in 4100a-3 of FIG. 41A, may change the general map mode 4110 to a satellite map mode 4113. In addition, while the satellite map mode 4113 is displayed in the first to ninth square cells (4100a-3), when a folding interaction to fold the right display panel in the left display panel direction is detected, the controller 290, as illustrated in 4100a-4 of FIG. 41A, may change the satellite map mode 4113 to an augmented reality (AR) mode 4115. That is, when a folding interaction is detected, the controller 290 may change a map display mode based on a direction of detected folding interaction.

Figure 41B:
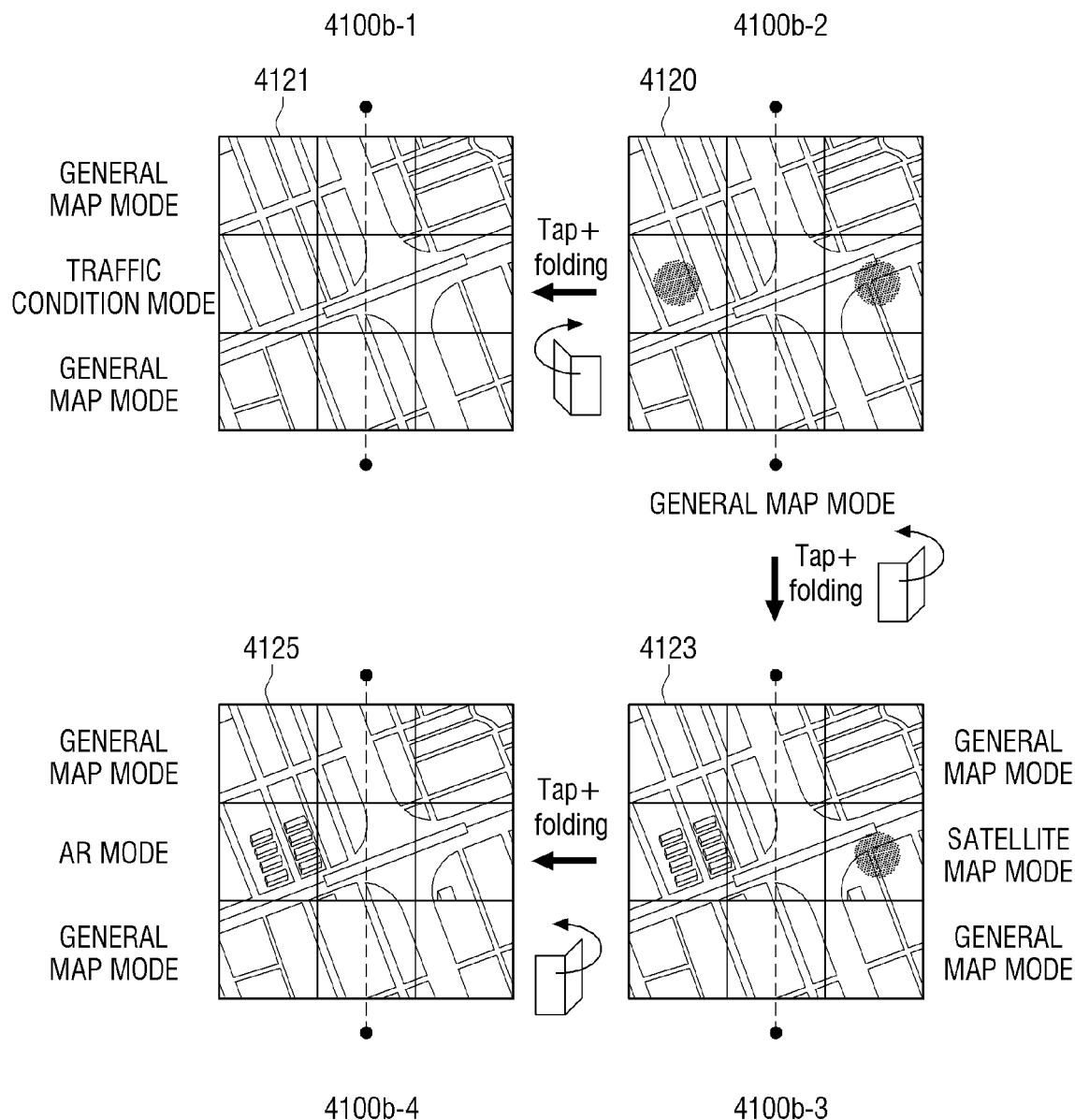

However, as illustrated in 4100b-2 of FIG. 41B, while the general map mode 4120 is displayed in the first to ninth square cells, after a touching of a square cell included in the second row, when a folding interaction to fold a left display channel in a right display panel direction is detected, the controller 290, as illustrated in 4100b-1 of FIG. 41B, may control the display 230 to maintain the first and the third rows in the general map mode, and display a screen 4121 in which the second row is changed to a traffic condition mode. Further, while the general map mode 4120 is displayed in the first to ninth square cells (4100b-2), after a square cell which is included in the second row is touched, when a folding interaction to fold the right display panel in the left display panel direction is detected, the controller 290, as illustrated in 4100b-3 of FIG. 41B, may control the display 230 to maintain the first and the third rows in the general map mode and change the second row of the screen 4123 to the satellite map mode. Further, while a screen 4123 which displays the general map mode and the satellite map mode at the same time in the first to ninth square cells is displayed (4100b-3), when a square cell included in the second row is touched and then the right display panel is folded towards the a left display panel, the controller 290, as illustrated in 4100b-4 of FIG. 41B, may control the display 230 to maintain the first row and the third row as the general map mode and change the second row of the screen 4125 to the AR mode. That is, after a specific square cell is touched, when a folding interaction is detected, the controller 290 may control the display 230 to change only rows which include the touched square cell.

Further, while a main content is displayed in a plurality of square cells, after a specific square cell is touched, when a folding interaction is detected, the controller 290 may provide different content or menus on columns which include the specific square cell according to a location of the touched specific square cell.

Figure 42A:
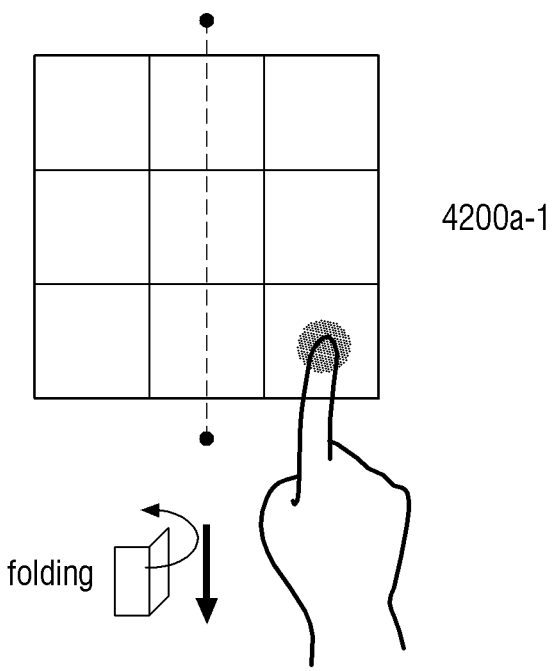
Figure 42A:
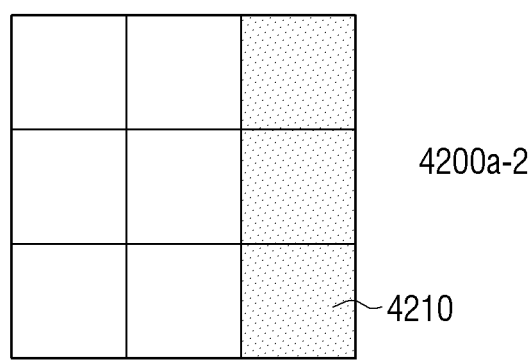
Figure 42B:
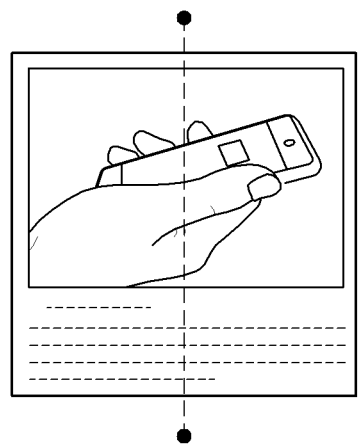
Figure 42B:
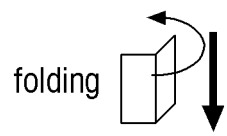
Figure 42B:
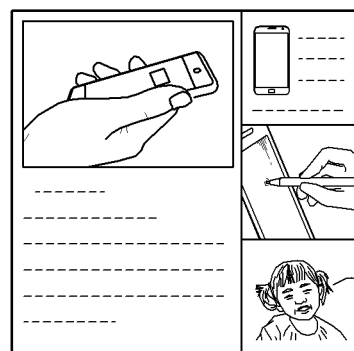

For example, as illustrated in FIG. 42A, while an image content is displayed in nine square cells, after the ninth square cell is touched (4200a-1), when a folding interaction is detected, the controller 290 may control the display 230 to display a content 4210 which is related to the image content on the third column (4200a-2). As a detailed exemplary embodiment, as illustrated in FIG. 42B, while a news content is displayed in nine square cells, after the ninth square cell is touched (4200b-1), when a folding interaction is detected, the controller 290 may control the display 230 to display three news items 4220 related to the news content on the third column (4200b-2).

Figure 43A:
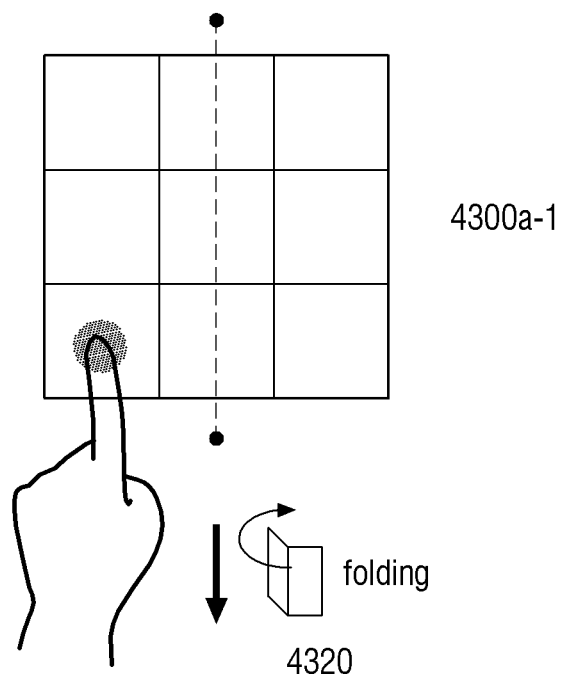
Figure 43A:
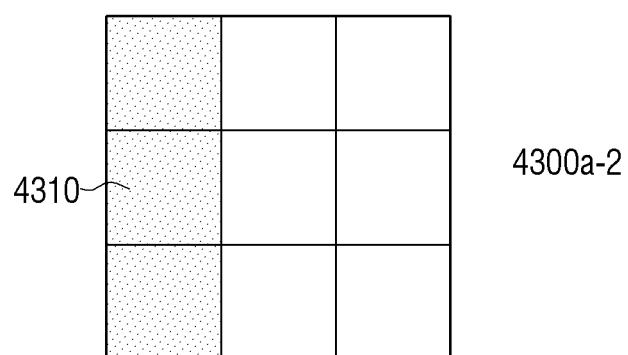
Figure 43B:
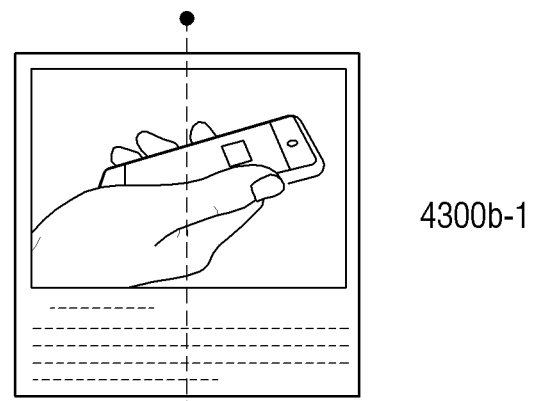
Figure 43B:
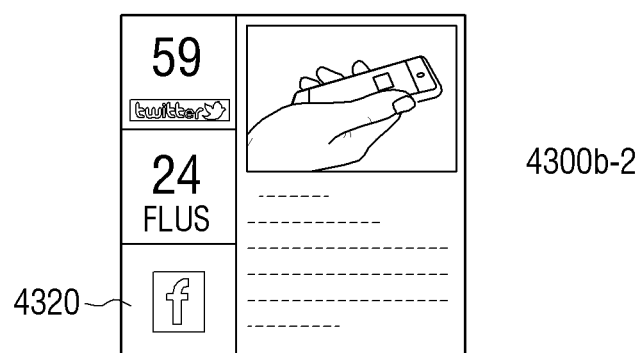

In addition, as illustrated in FIG. 43A, while an image content is displayed in nine square cells, after the seventh square cell is touched (4300a-1), when a folding interaction is detected, the controller 290 may control the display 230 to display a menu 4310 to control functions of the user terminal device on the first column (4300a-2). As a detailed exemplary embodiment, as illustrated in FIG. 43B, while news content is displayed in nine square cells, after the seventh square cell is touched (4300b-1), when a folding interaction is detected, the controller 290 may control the display 230 to display a menu 4320 regarding the user terminal device on the first column (4300b-2).

In addition, the controller 290 may divide or integrate a screen using a folding interaction and a rotation interaction.

Figure 44:
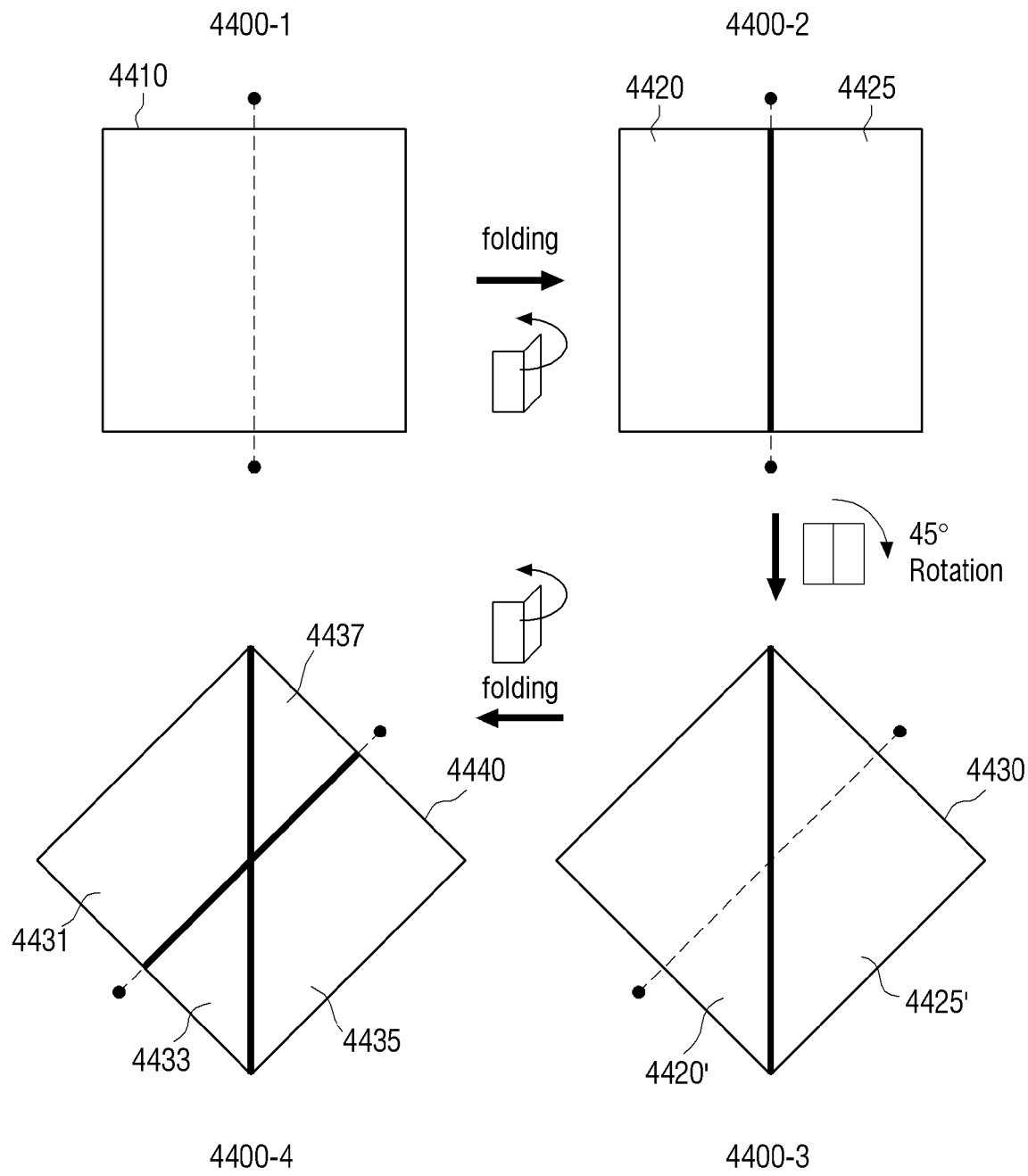

For example, as illustrated in 4400-1 of FIG. 44, while one image content 4410 is displayed, when a folding interaction is detected with reference to the hinge 310, the controller 290, as illustrated in 4400-2 of FIG. 44, may control the display 230 to split the display screen into two screens and display two image contents 4420, 4425. In addition, while two image contents 4420 and 4425 are displayed as in 4400-2 of FIG. 44, when a rotation interaction to rotate a display at an angle of 45 in a clockwise direction is detected by a detector (for example, a tilting detector, a gyro detector, an accelerator detector, or the like), the controller 290, as illustrated in 4400-3 of FIG. 44, may control the display 230 to rotate and display two image contents 4420' and 4425' so that split lines of two screens may be used. In addition, as in 4400-3 of FIG. 44, while two image contents 4420' and 4425' are split, when a folding interaction is detected, the controller 290, as illustrated in 4400-4 of FIG. 44, may control the display 230 to split the screen into four screens and display four image contents 4431, 4433, 4435, and 4437.

Figure 45:
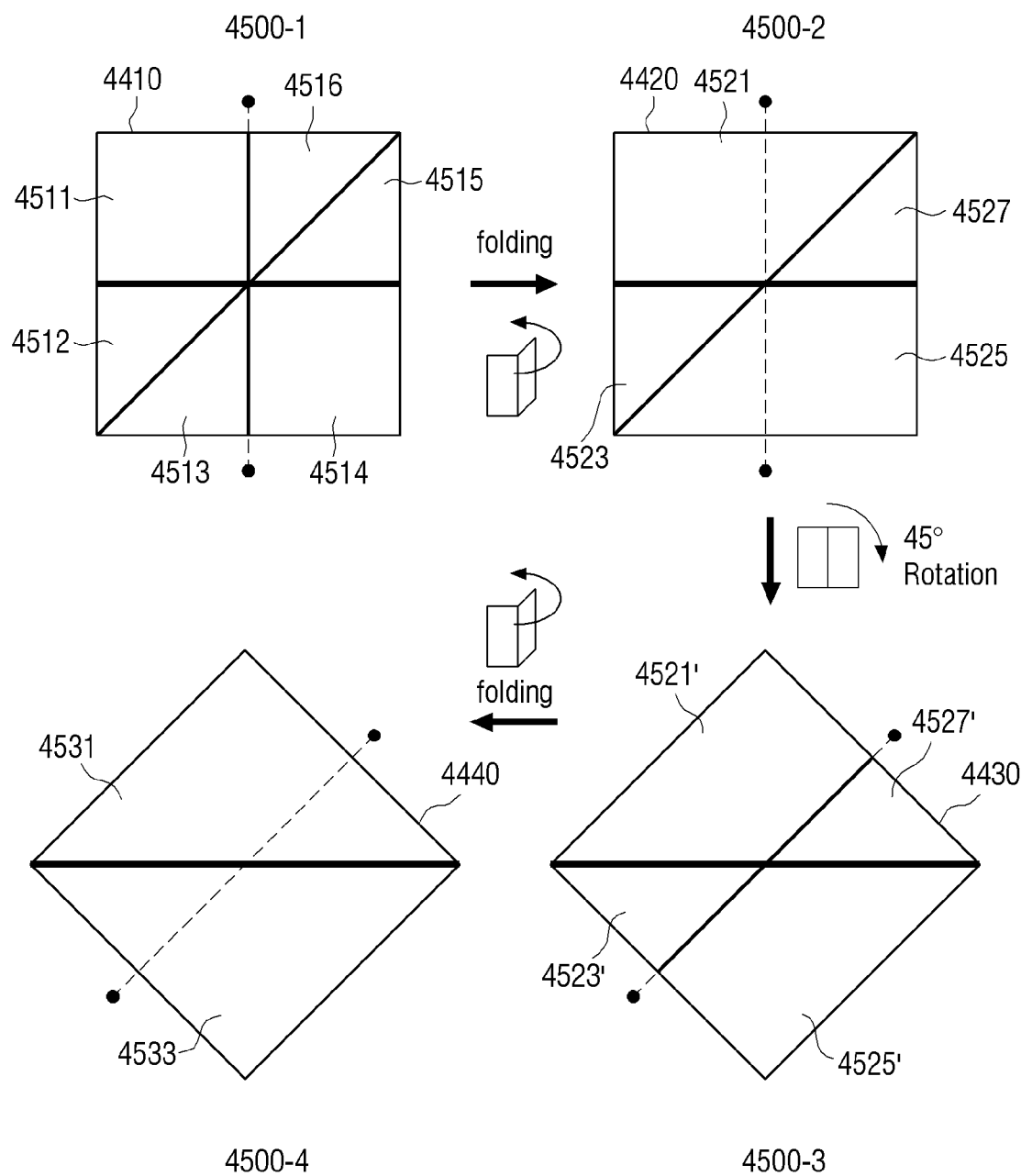

In addition, as illustrated in 4500-1 of FIG. 45, while six image contents 4511 to 4416 are displayed, when a folding interaction with reference to the hinge 310 is detected, the controller 290 may control the display 230 to remove the split line with reference to the hinge 310, as illustrated in 4500-2 of FIG. 45, and display four image contents 4521, 4523, 4525, and 4527. In addition, as illustrated in 4500-2 of FIG. 45, while the four image contents 4521, 4523, 4525, and 4527 are displayed, when a rotation interaction rotating a display at an angle of 45 in a clockwise direction is detected, the controller 290, as illustrated in 4500-3 of FIG. 45, may control the display 230 to maintain split lines of four screens and rotate and display four image contents 4521', 4523', 4525', and 4527'. In addition, as illustrated in 4500-3 of FIG. 45, while four image contents 4521', 4523', 4525', and 4527' are displayed, when a folding interaction is detected with reference to the hinge 310, the controller 290 may control the display 230 to remove the split line with reference to the hinge 310 and, as illustrated in 4500-4 of FIG. 45, display two image contents 4531 and 4533. Although image contents have been described, this is merely an example.

Figure 46A:
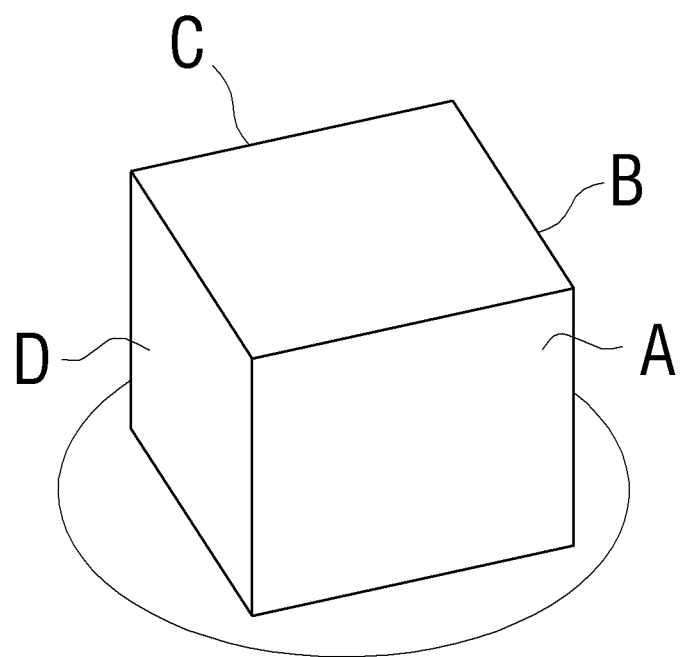
Figure 46A:
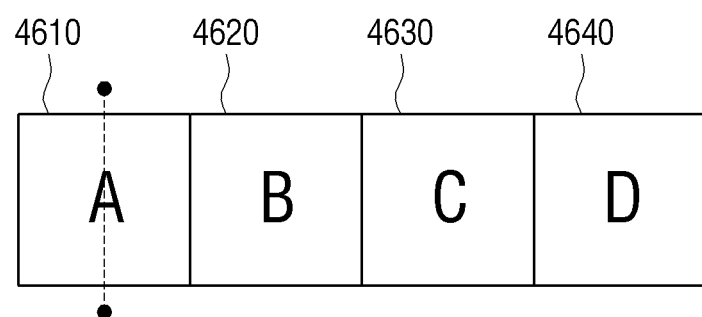
Figure 46B:
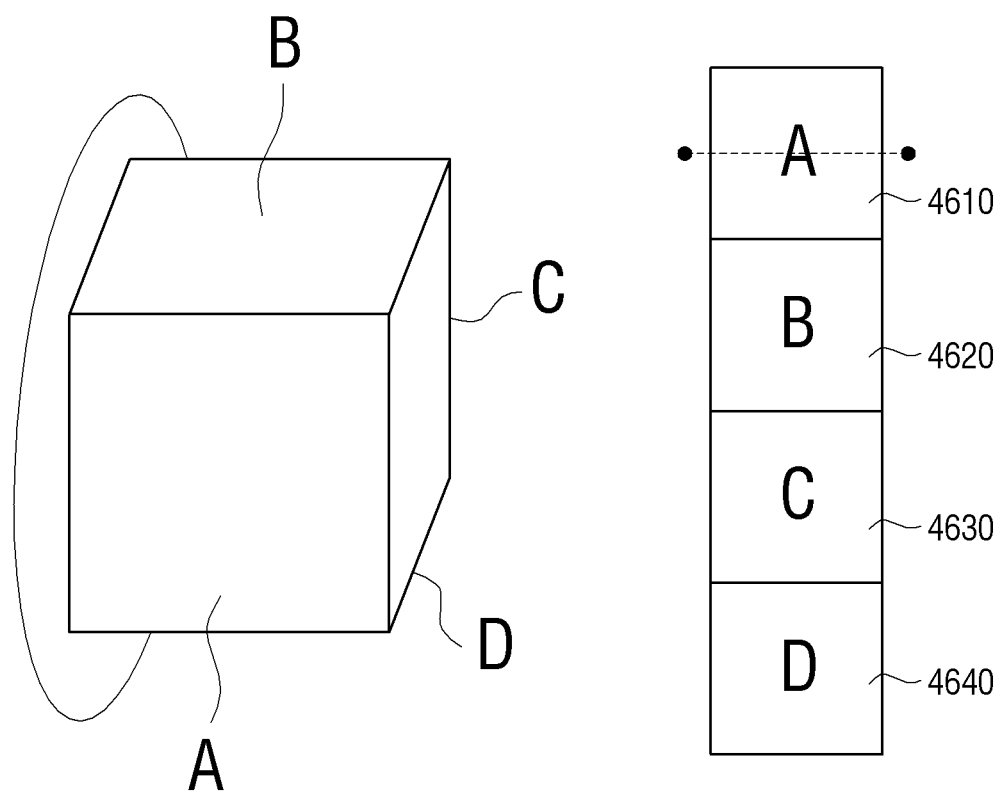

In addition, the controller 290 may change a screen according to a direction of the hinge 310 as if a third dimensional cube is rotated. For example, as illustrated in FIG. 46A, while the hinge 310 is in a vertical state, when a folding interaction is detected, the controller 290, as if a cube is rotated in a horizontal direction, may change a screen according to an order of "screen A->screen B->screen C->screen D->screen A-> . . . ". In addition, as illustrated in FIG. 46B, while the hinge 310 is in a horizontal state, when a folding interaction is detected, the controller 290, as if a cube is rotated in a vertical direction, may change a screen according to an order of "screen A->screen B->screen C->screen D->screen A-> . . . ". However, this is merely an example, and the order of screen change may be different depending on the directional state, i.e., vertical or horizontal, of the hinge 310.

Figure 47:
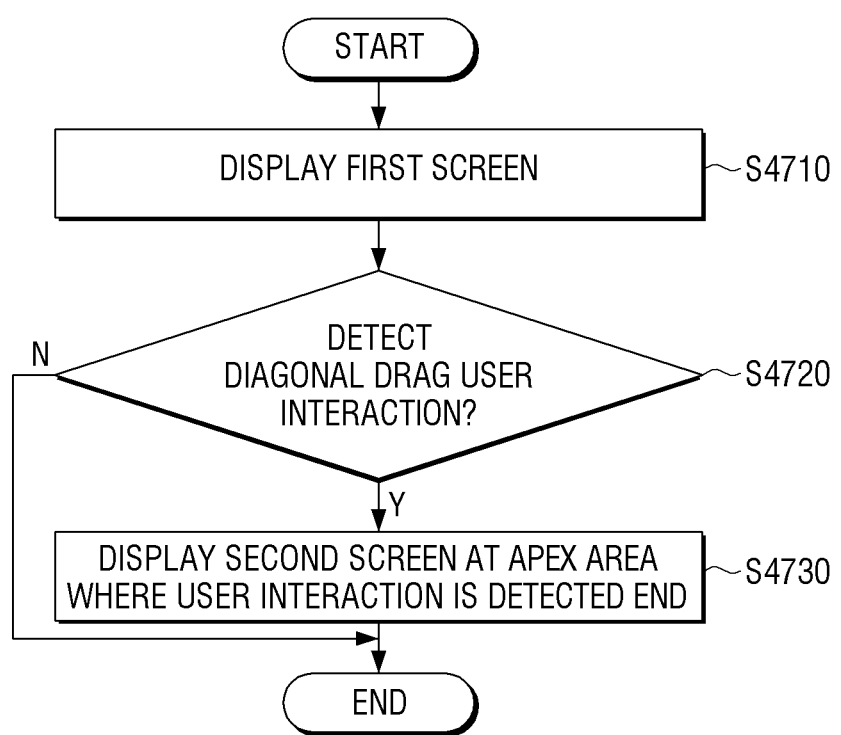
FIGS. 47 and 48 are flowcharts describing a method of displaying of a user terminal device, according to various exemplary embodiments.

Hereinafter, with reference to FIGS. 47 and 48, according to an exemplary embodiment, a method for displaying the user terminal device 200 will be described. FIG. 47 is a flowchart describing a display method of the user terminal device 100 according to a diagonal interaction according to an exemplary embodiment.

The user terminal device 100 displays the first screen (S4710). In this case, the first screen may be a square shape.

The user terminal device 100 determines whether a user interaction dragging one of the apexes of the first screen in a diagonal direction is detected (S4720).

When the diagonal dragging user interaction is detected (S4720-Y), the user terminal device 100 displays the second screen at an apex area in which a user interaction is detected (S4730). In this case, the user terminal device 100 may change a size of the second screen according to an amount of the user interaction, and change an amount of information displayed on the second screen according to the size of the second screen. In addition, the user terminal device 100 may display different types of content on the second screen according to a location of apex in which a user interaction is detected.

Figure 48:
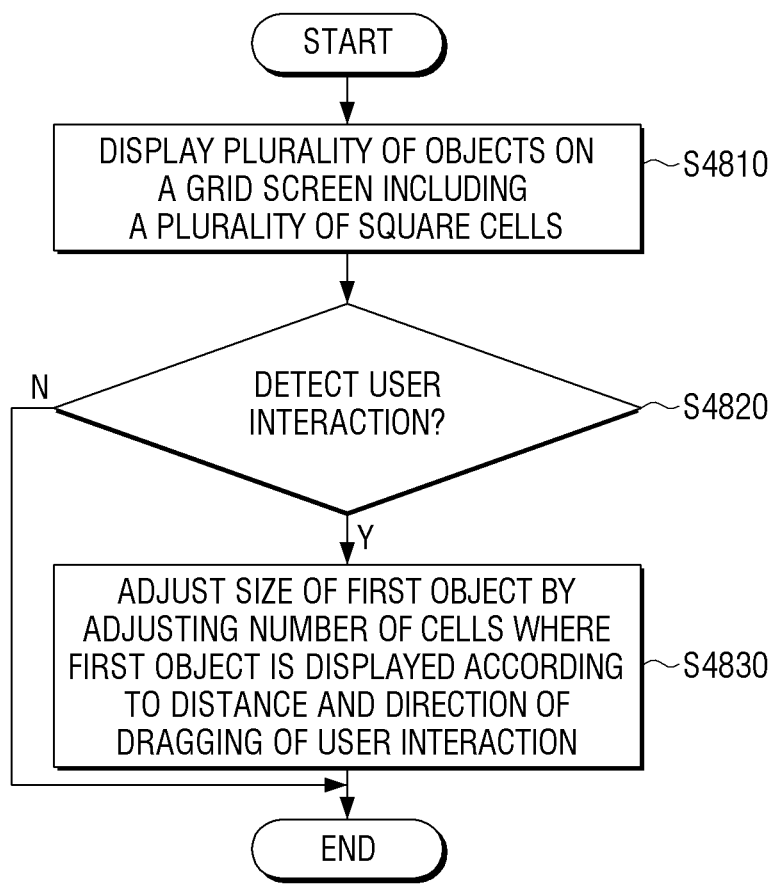

FIG. 48 is a flowchart describing a method for displaying the user terminal device 100 which displays a grid screen according to an exemplary embodiment.

First of all, the user terminal device 100 displays a plurality of objects on a grid screen which includes a plurality of square cells (S4810). The user terminal device 100 may include a display panel having a square shape.

In addition, the user terminal device 100 determines whether a user interaction is detected for a first object from among a plurality of objects (S4820). In this case, a user interaction may be a dragging interaction.

When a user interaction is detected (S4820-Y), the user terminal device 100 adjusts a size of the first object by adjusting the number of square cells in which the first object is displayed according to a dragging distance and direction of the user interaction (S4830). For example, when a first user interaction of touching the first object and then dragging the first object in an outward direction is detected, the user terminal device 100 may increase the size of the first object by increasing the number of square cells in which the first object is displayed. However, when a second user interaction of touching the first object and dragging the object in an inward direction, the user terminal device 100 may decrease the size of the first object by decreasing the number of square cell areas in which the first object is displayed.

<Changing a Display Orientation According to a User Interaction>

According to an exemplary embodiment, the user terminal device 200 may include a display 230 which displays at least two screens in at least two areas respectively, a detector 280 which detects a first user interaction, and a controller 290 which controls the display 230, based on the first user interaction detected by the detector 280, which rotates at least two screens respectively so that a display orientation of at least two screens may change.

In addition, the controller 290 may detect a second user interaction in one area out of the at least two areas, and change a display orientation of a screen which is displayed in the one area based on the second user interaction.

The first user interaction may include a vibration interaction, and the user terminal device 200 may determine a display orientation of the at least two screens based on a location where the vibration interaction occurs.

In addition, the first user interaction may include a touch interaction, and the controller 290 may determine a direction of a touch interaction, and determine a display orientation of the at least two screens based on a direction of a touch interaction.

In addition, the controller 290 may control a layout of the at least to screens to be fixed, regardless of a display orientation of the at least two screens.

Figure 58:
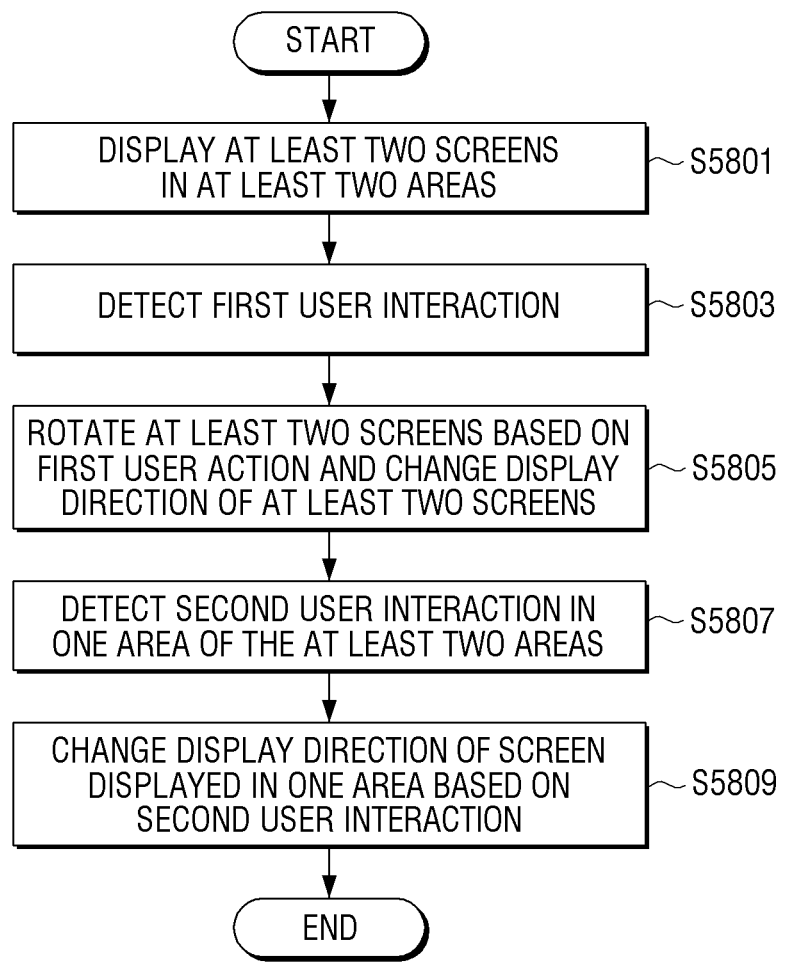
FIG. 58 is a flowchart describing a method of changing a display orientation of a user terminal device in response to a user interaction according to an exemplary embodiment.

FIGS. 49A to 50D are views illustrating that a display orientation of a screen changes based on a user interaction according to various exemplary embodiments, and FIG. 58 is a flowchart describing a method of changing 1 display orientation of the user terminal device 200 based on a user interaction, according to an exemplary embodiment.

Figure 49A:
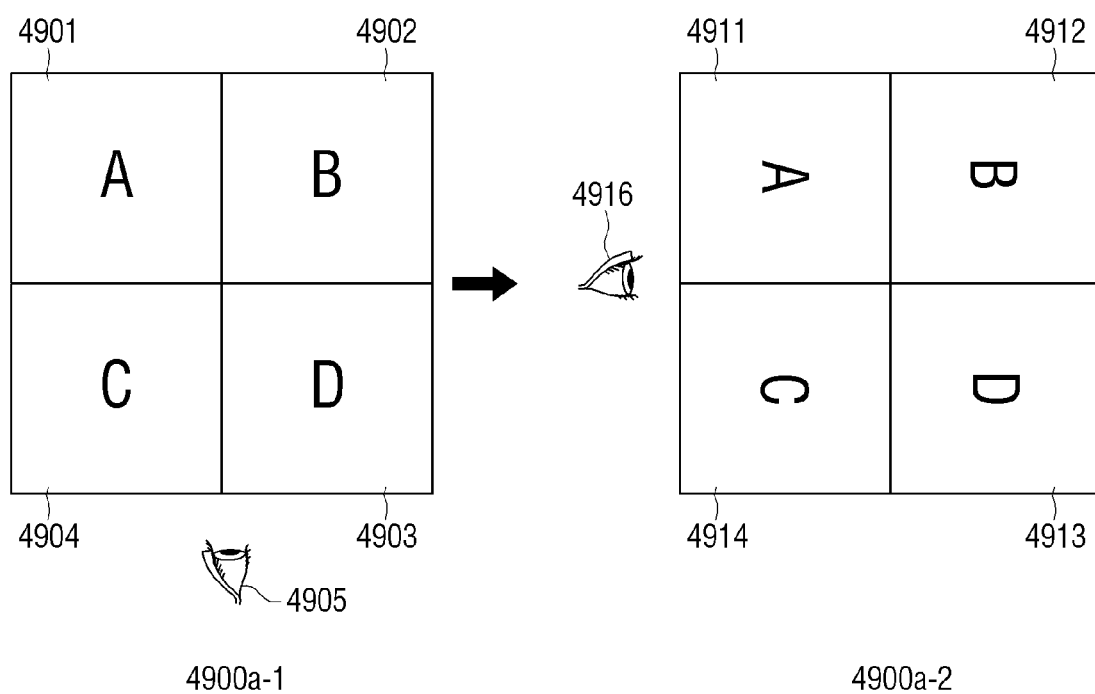
FIGS. 49A to 50B are views illustrating a changing of a display orientation of a screen in response to a user interaction according to one or more exemplary embodiments.

The user terminal device 200 may display at least two screens in at least two areas of the display 230 respectively (FIG. 58 (S5801)). For example, as illustrated in FIG. 49A, the display 230 may be divided into four areas. The four areas may be square shape cells. In the four divided areas, screens 4901, 4902, 4903, and 4904 may be displayed. In other words, in each of the four divided areas, a first screen, a second screen, a third screen, or a fourth screen 4901, 4902, 4903, and 4904 may be displayed.

A display orientation is toward the lower end 4905 of the display, and the first screen, the second screen, the third screen, and the fourth screen 4901, 4902, 4903, and 4904 are displayed with reference to a display orientation (4900a-1). The display orientation may be a standard for determining upward/downward/leftward/rightward when the first screen, the second screen, the third screen, and the fourth screen are displayed.

When a display orientation is the lower end 4905 of the display 230, the screens may be displayed from a position of a user who views the first screen, the second screen, the third screen, and the fourth screen 4901, 4902, 4903, and 4904 from the lower end 4905 of the display 230. An upper end of the first screen, the second screen, the third screen, and the fourth screen 4901, 4902, 4903, and 4904 may be in an upward direction of the display 230, and a lower end of the first screen, the second screen, the third screen, and the fourth screen 4901, 4902, 4903, and 4904 may be a downward direction of the display 230.

When a display orientation is toward an upper end of the display 230, screens may be displayed from a position of a user who views the first screen, the second screen, the third screen, and the fourth screen from an upper end of the display 230. An upper end of the first screen, the second screen, the third screen, and the fourth screen may be a lower end direction of the display 230, and the lower end of the first screen, the second screen, the third screen, and the fourth screen may be an upward direction of the display 230 (4900a-1).

When a display orientation is toward a left side 4916 of the display 230, the screens may be displayed from a position of a user who views the first screen, the second screen, the third screen, and the fourth screen 4911, 4912, 4913, and 4914 from the left side 4916 of the display 230, and an upper end of the first screen, the second screen, the third screen, and the fourth screen 4911, 4912, 4913, and

4914 may be a rightward direction of the display 230, and a lower end of the first screen, the second screen, the third screen, and the fourth screen 4911, 4912, 4913, and 4914 may be a leftward direction of the display 230.

When a display orientation is a right side of the display 230, screens may be displayed from a position of a user who views the first screen, the second screen, the third screen, and the fourth screen from a right side of the display 230, and an upper end of the first screen, the second screen, the third screen, and the fourth screen may be in a leftward direction of the display 230, and a lower end of the first screen, the second screen, the third screen, and the fourth screen may be in the rightward direction of the display 230.

The user terminal device 200 may detect a first user interaction (FIG. 58 (S5803)). The first user interaction may be a vibration interaction. In addition, the first user interaction may be a touch interaction.

While the first screen, the second screen, the third screen, and the fourth screen 4921, 4922, 4923, and 4925 are displayed with a display orientation of the lower end 4905 of the display, when the first user interaction to change a display orientation to a left side 4916 of the screen is detected, the user terminal device 200 may detect the first user interaction, and change a display orientation of at least two screens by rotating at least two screens respectively based on the first user interaction. In other words, the first screen, the second screen, the third screen, and the fourth screen 4901, 4902, 4903, and 4903 which are displayed in four areas may be rotated at 90 degrees in a clockwise direction and displayed with a changed display orientation.

As illustrated in 4900*a*-2 of FIG. 49A, in the four divided areas of the display, the first screen, the second screen, the third screen, and the fourth screen 4911, 4912, 4913, and 4914 are rotated by 90 degrees in a clockwise direction compared 4900*a*-1 and displayed. Each area may be a square cell. The controller 290 may rotate the first screen, the second screen, the third screen, and the fourth screen 4901, 4902, 4903, and 4904 which are displayed in each area of the first figure in a cell unit. In addition, the controller 290 may regard the first screen, the second screen, the third screen, and the fourth screen 4901, 4902, 4903, and 4904 which are displayed in the display 230 as if they are separate displays and may rotate the screens in a cell unit.

The first screen 4901 which is displayed in the display 230 is rotated and displayed in a clockwise direction at 90 degrees, the second screen 4902 is rotated and displayed in a clockwise direction at 90 degrees, the third screen 4903 is rotated and displayed in a clockwise direction at 90 degrees, and the fourth screen 4904 is rotated and displayed in a clockwise direction at 90 degrees.

Figure 49B:
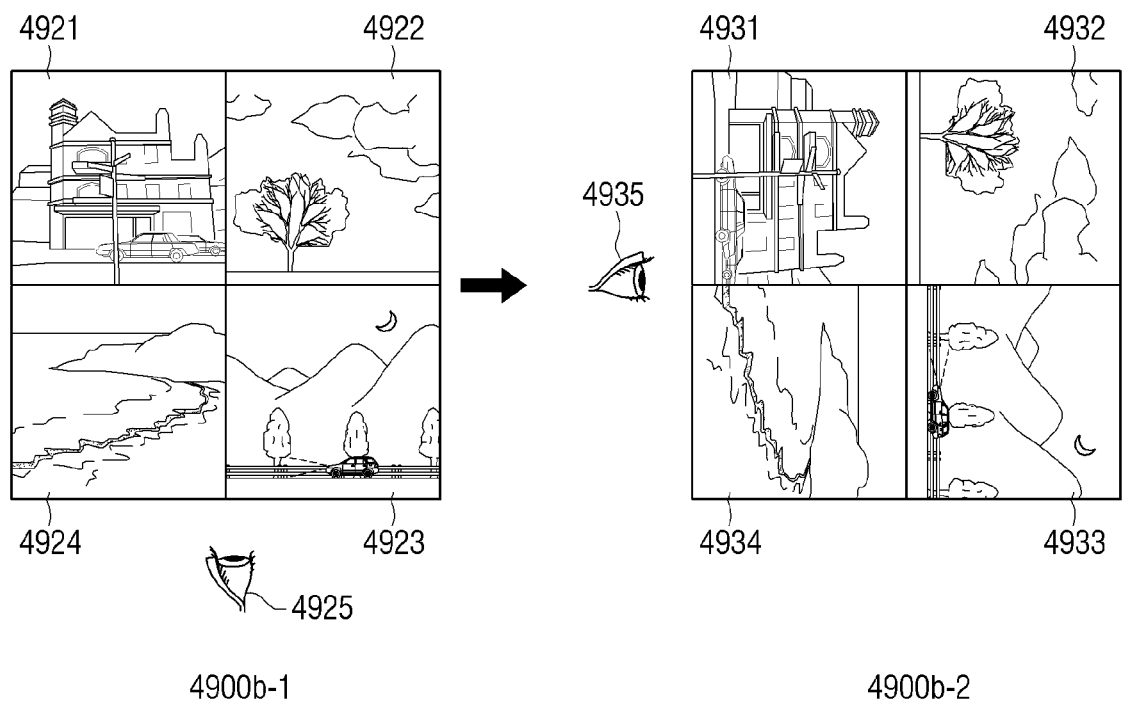

FIG. 49B illustrates that the display 230 is divided into four areas. The four areas may be square cells. In each square cell, the first screen, the second screen, the third screen, and the fourth screen 4921, 4922, 4923, and 4924 may be displayed.

The display orientation is a lower end 4925 of the display 230, and the first screen, the second screen, the third screen, and the fourth screen 4921, 4922, 4923, and 4924 may be displayed with reference to a display orientation (4900*b*-1). When a user changes a display orientation to a left side 4935 of the display 230, the first screen, the second screen, the third screen, and the fourth screen 4931, 4932, 4933, and 4934 may be rotated in a clockwise direction 90 degrees (4900*b*-2).

Further, the controller 290, with reference to a display orientation, may control the display 230 to rotate the first screen, the second screen, the third screen, and the fourth screen 4921, 4922, 4923, and 4924 which are displayed on the square cells within each cell unit. In other words, the controller 290 may regard the first screen, the second screen, the third screen, and the fourth screen 4921, 4922, 4923, and 4924 which are displayed in the display as if they are separate displays, and rotate the screens in a cell unit.

Figure 49C:
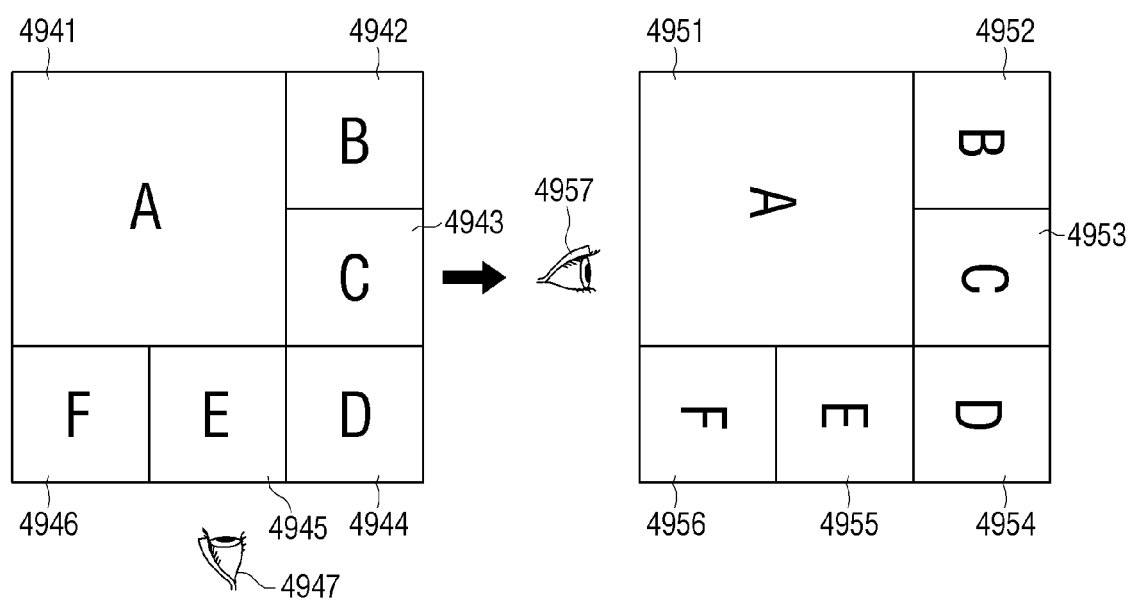

In FIG. 49C, one square cell having a different size and five square cells having the same size are displayed on the display 230. In each of the square cells, the first screen, the second screen, the third screen, the fourth screen, the fifth screen, and the sixth screen 4941, 4942, 4943, 4944, 4945, and 4946 are displayed. A display orientation is a lower end view 4947 of the display 230, and the first screen, the second screen, the third screen, the fourth screen, the fifth screen, and the sixth screen 4941, 4942, 4943, 4944, 4945, and 4946 are displayed with reference to a display orientation.

As illustrated in 4900*c*-1, while the first screen, the second screen, the third screen, the fourth screen, the fifth screen, and the sixth screen 4941, 4942, 4943, 4944, 4945, and 4946 are displayed in each square cell of the display 230, when a user changes a display orientation to a left side view 4957 of the display 230, the first screen, the second screen, the third screen, the fourth screen, the fifth screen, and the sixth screen 4941, 4942, 4943, 4944, 4945, and 4946 may be rotated in a clockwise direction 90 degrees.

As illustrated in 4900*c*-2, the first screen, the second screen, the third screen, the fourth screen, the fifth screen, and the sixth screen 4951, 4952, 4953, 4954, 4955, and 4956 are rotated in a clockwise direction 90 degrees and displayed in each square cell of the display 230.

The controller 290 may control the display 230 to rotate the first screen, the second screen, the third screen, the fourth screen, the fifth screen, and the sixth screen 4941, 4942, 4943, 4944, 4945, and 4946 which are displayed in each square cell within each cell unit. In other words, the controller 290 may control the display 230 to regard the first screen, the second screen, the third screen, the fourth screen, the fifth screen, and the sixth screen 4941, 4942, 4943, 4944, 4945, and 4946 as if they are separate displays and rotate the screens in each cell unit.

The first screen 4941 is rotated in a clockwise direction 90 degrees, the second screen 4942 is rotated in a clockwise direction 90 degrees, the third screen 4943 is rotated in a clockwise direction 90 degrees, the fourth screen 4944 is rotated in a clockwise direction 90 degrees, the fifth screen 4945 is rotated in a clockwise direction 90 degrees, and the sixth screen 4946 is rotated in a clockwise direction 90 degrees.

As a result, a layout of at least two screens may be fixed. In other words, the controller 290 may consider the first screen, the second screen, the third screen, the fourth screen, the fifth screen, and the sixth screen 4941, 4942, 4943, 4944, 4945, and 4946 which are displayed in the display 230 as if they are separate displays and rotate the screens in a cell unit, and control not to change a layout of the first screen, the second screen, the third screen, the fourth screen, the fifth screen, and the sixth screen 4941, 4942, 4943, 4944, 4945, and 4946 which are displayed in the display 230.

For example, in the 4900*c*-1 of FIG. 49C, a layout of the entire display screens which are displayed in the display 230 is that, with reference to the first screen 4941, the second screen 4942, the third screen 4943, the fourth screen 4944, the fifth screen 4945, and the sixth screen 4946 are disposed in a clockwise direction. Even of a display orientation is changed from a lower end view 4947 of the display 230 to a left side view 4957 of the display 230, the layout of the entire display screen may be maintained (4900*c*-2). In other words, a layout of the entire display screen may be that, the first screen 4951, the second screen 4952, the third screen 4953, the fourth screen 4954, the fifth screen 4955, and the sixth screen 4956 may be placed in a clockwise direction.

While at least two screens are displayed in at least two areas of the display 230, the user terminal device 200 may detect a second user interaction (FIG. 58 S5807) in one area out of at least two areas, and change a display orientation (FIG. 58 S5809) of a screen which is displayed in one area based on a second user interaction.

Figure 50A:
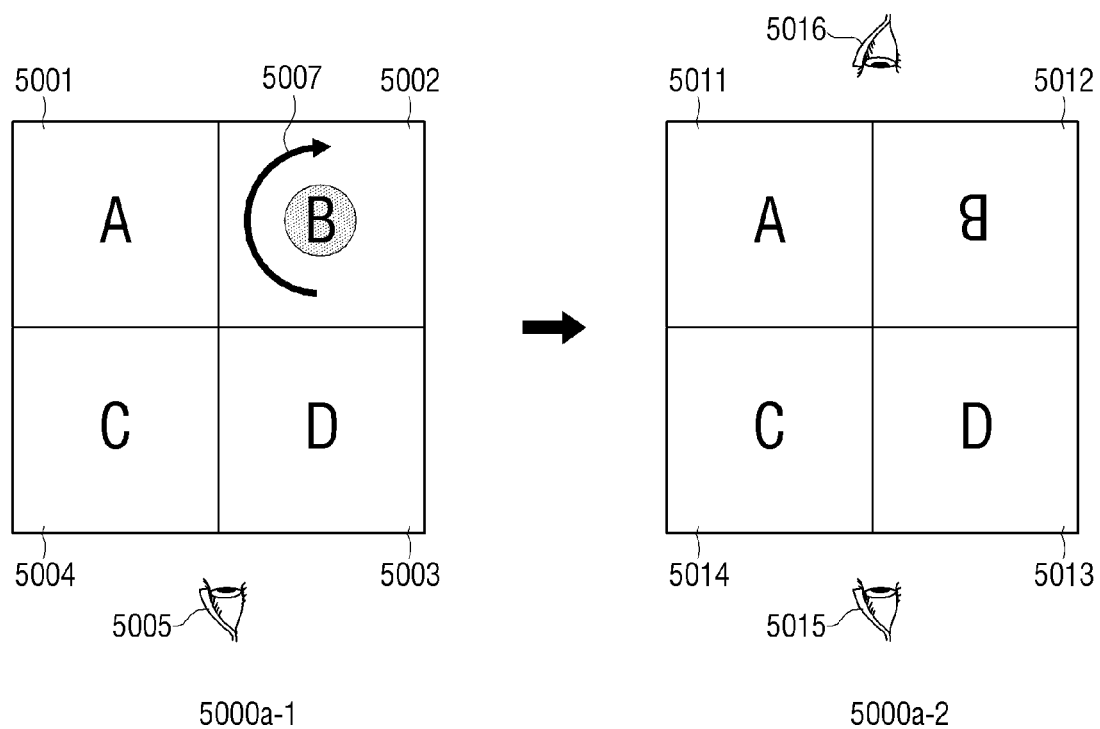

FIG. 50A illustrates that the display 230 is divided into four areas. Each area may be a square cell. While the display 230 is divided into four square cells, and screens are displayed in each square cell, when a second user interaction is detected, a display orientation may be changed for a cell from which the second user interaction is detected based on the second user interaction. A display orientation may be changed according to the second user interaction.

For example, in 5000*a*-1 of FIG. 50A, the display 230 is divided into four areas, and in each divided area, a first screen, a second screen, a third screen, and a fourth screen 5001, 5002, 5003, and 5004 are displayed. A display orientation is a lower end view 5005 of the display 230. Each divided area may be a square cell. In this state, when a second user interaction is detected in the second area out 5002 of a plurality of divided areas, the second screen 5002 in which the second user interaction is detected may be rotated and displayed.

5000*a*-2 of FIG. 50A illustrates that a display orientation of the second screen 5002 only is changed. The display 230 is divided into four areas. Each area may be a square cell. In each divided area, a first screen, a second screen, a third screen, and a fourth screen 5011, 5012, 5013, and 5014 are displayed. The first screen, the third screen, and the fourth screen 5011, 5013, and 5014 are displayed so that a display direction is toward a lower end 5015 of the display 230, and the second screen 5012 is displayed so that a display direction is toward an upper end 5016.

Figure 50B:
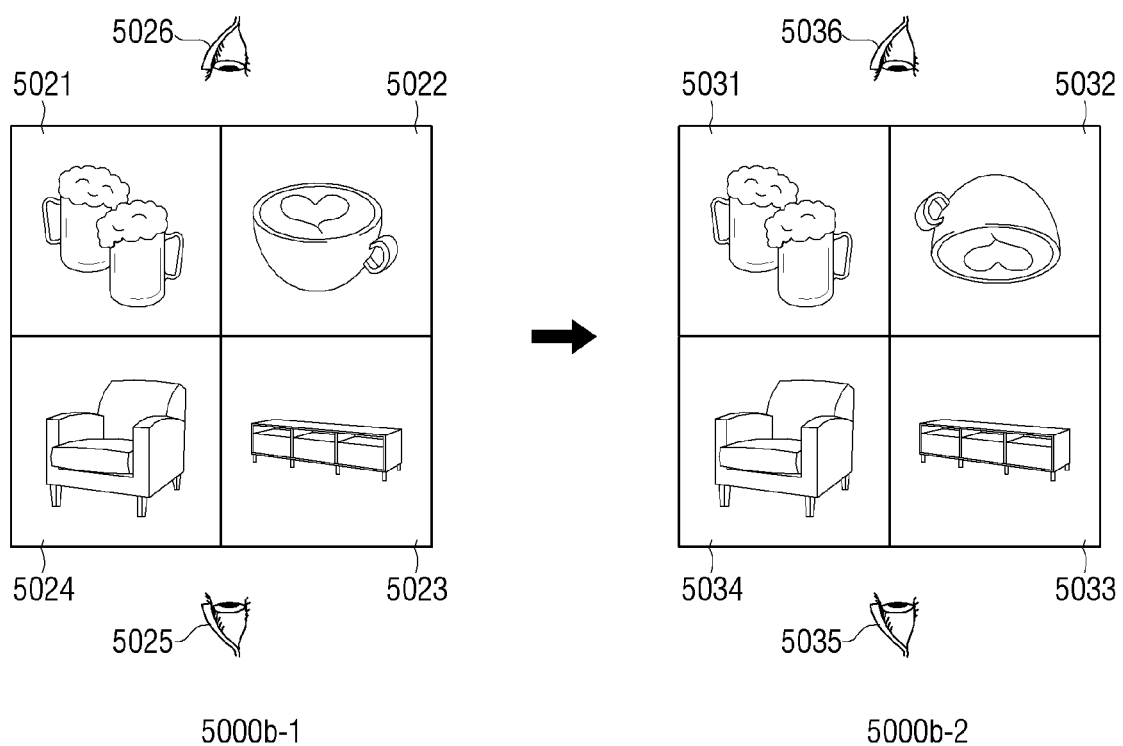

FIG. 50B illustrates that the display 230 is divided into four areas. Each area may be square cells. While the display 230 is divided into four square cells, and screens are displayed in each square cell, when the second user interaction is detected in one cell, a display orientation of only the cell in which the second user interaction is detected may be changed. A For example, in 5000*b*-1, a display screen is divided into four areas, and in each divided area, a first screen, a second screen, a third screen, and a fourth screen 5021, 5022, 5023, and 5024 are displayed. The display orientation of the screens is towards a lower end 5025 of the display 230.

Each divided area may be a square cell. In this state, when the second user interaction is sensed in a second area out of a plurality of divided areas, the second screen 5022 in which the second user interaction is detected may be rotated and displayed.

5000*b*-2 of FIG. 50B illustrates that a display orientation of only the second screen 5022 is changed from the first drawing. The display 230 is divided into four areas. Each area may be a square cell. In each divided area, a first screen, a second screen, a third screen, and a fourth screen 5031, 5032, 5033, and 5034 are displayed. The first screen, the third screen, and the fourth screen 5031, 5033, and 5034 are displayed by setting a display orientation to be a lower end view 5035 of the display 230, and the second screen 5032 is displayed so that a display orientation is an upper end view 5036 of the display 230.

A rotation direction of the second screen 5022 may be changed based on a direction of the second user interaction. Changing a rotation direction of a screen or a display orientation of the second screen based on the second user interaction will be described in greater detail below with reference to FIGS. 51A to 52D.

<Changing a Display Orientation in a Screen Off State According to a User Interaction>

Figure 59:
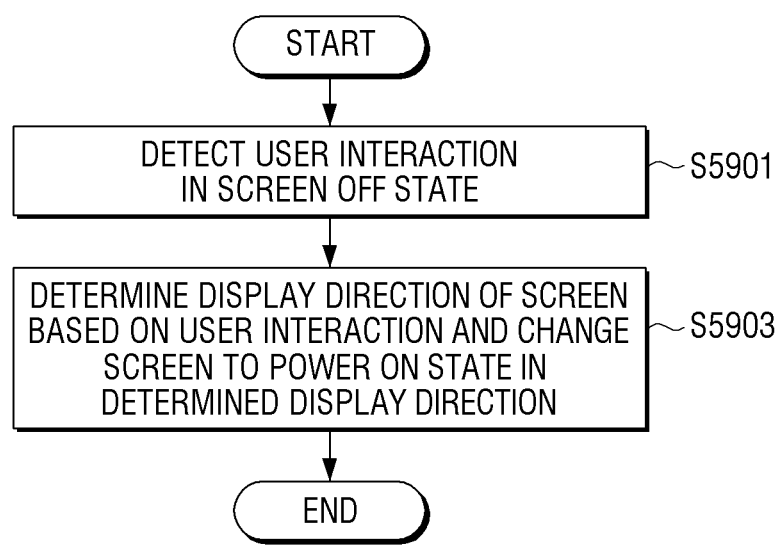
FIG. 59 is a flowchart describing a method of detecting a user interaction while a user terminal display screen is in a powered-off state, determining a display orientation in response to a user interaction, and changing a display screen to a powered-on state according to one or more exemplary embodiments.

FIG. 51A to 52D are views describing a detection of a user interaction while a display screen is in a powered-off state and a displaying of a display screen according to a user interaction. The views illustrate one or more exemplary embodiments in which a display orientation of a display screen is changed according to a direction of a user interaction, and FIG. 59 is a flowchart describing a method of detecting a user interaction while a display screen of a user terminal is in a powered-off state, determining a display orientation according to a user interaction, and changing a display screen to a powered-on state.

The user terminal device 200 may detect a user interaction when a screen is in a powered-off state (S5901). In other words, when a screen is in a powered-off state on the display 230 of the user terminal device 200, the user terminal device 200 may detect a user interaction. The user terminal device 200, even when a display screen is in a powered-off state, may maintain a powered-on state of the detector 280. When a user interaction is detected at the detector 280, the user terminal device 200 may determine a display orientation of a display screen based on the user interaction, and change a screen to a powered-on state based on the determined display orientation (S5903).

Figure 51A:
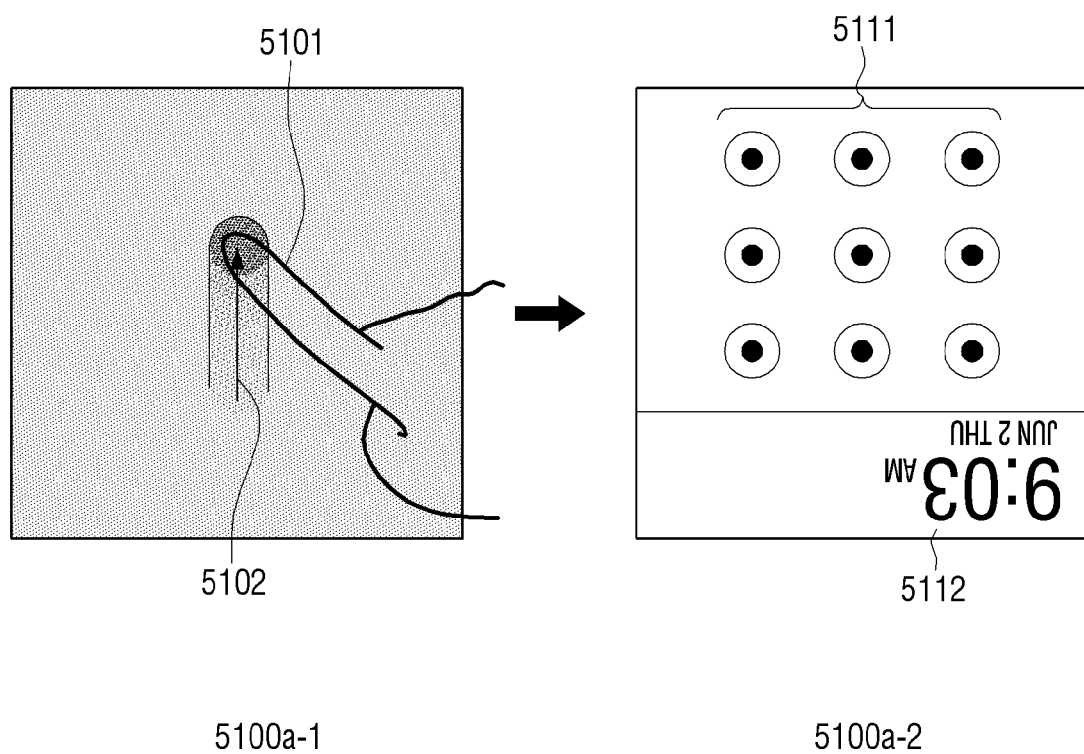
FIGS. 51A to 52D are views illustrating detection of a user interaction while a display screen is in a powered-off state and displaying of a display screen according to a user interaction, according to one or more exemplary embodiments.

In FIG. 51A, while a display screen is in a powered-off state (5100*a*-1), when a user touches a screen with a finger, and moves the finger from a lower end of a screen to an upper end while maintaining touch, the detector 280 may detect a user interaction from a lower end toward an upper end on a screen of the display. In other words, the detector 280 may detect a dragging interaction in an upward direction toward the upper end on the display screen.

When the user interaction is detected, the controller 290 turns the display screen to a powered-on state, and according to a user action which is detected, may determine a direction of the user interaction based on a signal which is output from the detector 280. At this time, a user interaction may be a dragging gesture. In addition, a user interaction may be a flick gesture. The controller 290 may determine a direction of a user interaction, and control the display 230 to display objects 5111 and 5112 on a display screen based on a direction of a user interaction (5100*a*-2).

For example, while a display screen is in a powered-off state, when a dragging interaction 5102 is detected on the display screen, the controller 290 may turn the display screen to a powered-on state and control the display 230 to display the objects 5111 and 5112. At this time, when a user interaction is in an upward direction toward an upper end, the controller 290 may control the display 230 to display an object oriented towards a user who views a screen from an upper end toward a lower end of a display screen. In other words, a display orientation of the objects 5111 and 5112 may be in an upward direction toward an upper end of the display 230.

Figure 51B:
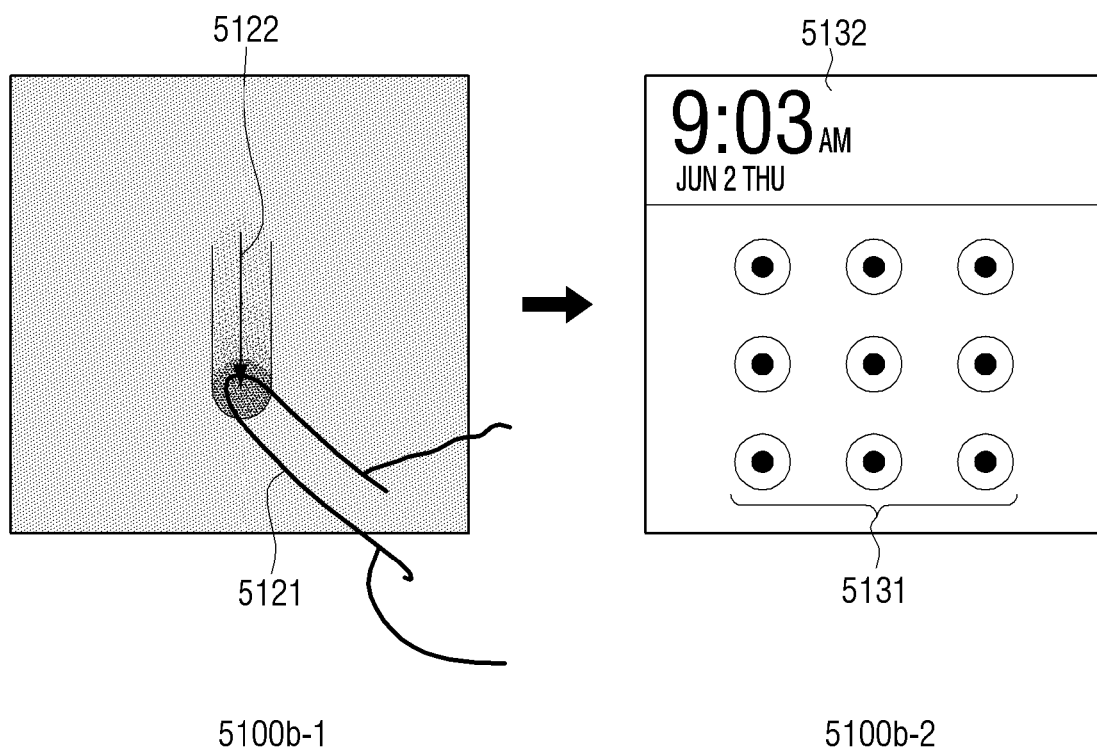

As illustrated in FIG. 51B, while the display screen is in a powered-off state, when a user touches a display screen with a finger, and moves the finger from an upper end to a lower end while maintaining the touch (5100*b*-1), the detector 280 may detect a user interaction toward a lower end on a display screen.

When a user interaction is detected, the controller 290 may turn the display screen to a powered-on state. In addition, the controller 290, according to a user interaction being detected, may determine a direction of a user interaction based on a signal which is output from the detector 280. At this time, a user interaction may be a dragging gesture. In addition, a user interaction may be a flick gesture. The controller 290 may determine a direction of a user interaction, and control the display 230 to display objects 5131 and 5132 on a display screen based on a direction of a user interaction.

For example, while a display screen is in a powered-off state, when a dragging interaction 5122 which is from an upper end toward a lower end on a display screen is detected, the controller 290 may control the display 230 to turn the display screen on and display the objects 5131 and 5132 on the display screen (5100*b*-2). At this time, when a user interaction is from an upper end toward a lower end, the controller 290 may control the display 230 to display an object in a position of a user who views a display screen from a lower end toward an upper end. That is, a display orientation of the objects 5131 and 5132 may be displayed with reference to a lower end direction of the display 230.

Figure 51C:
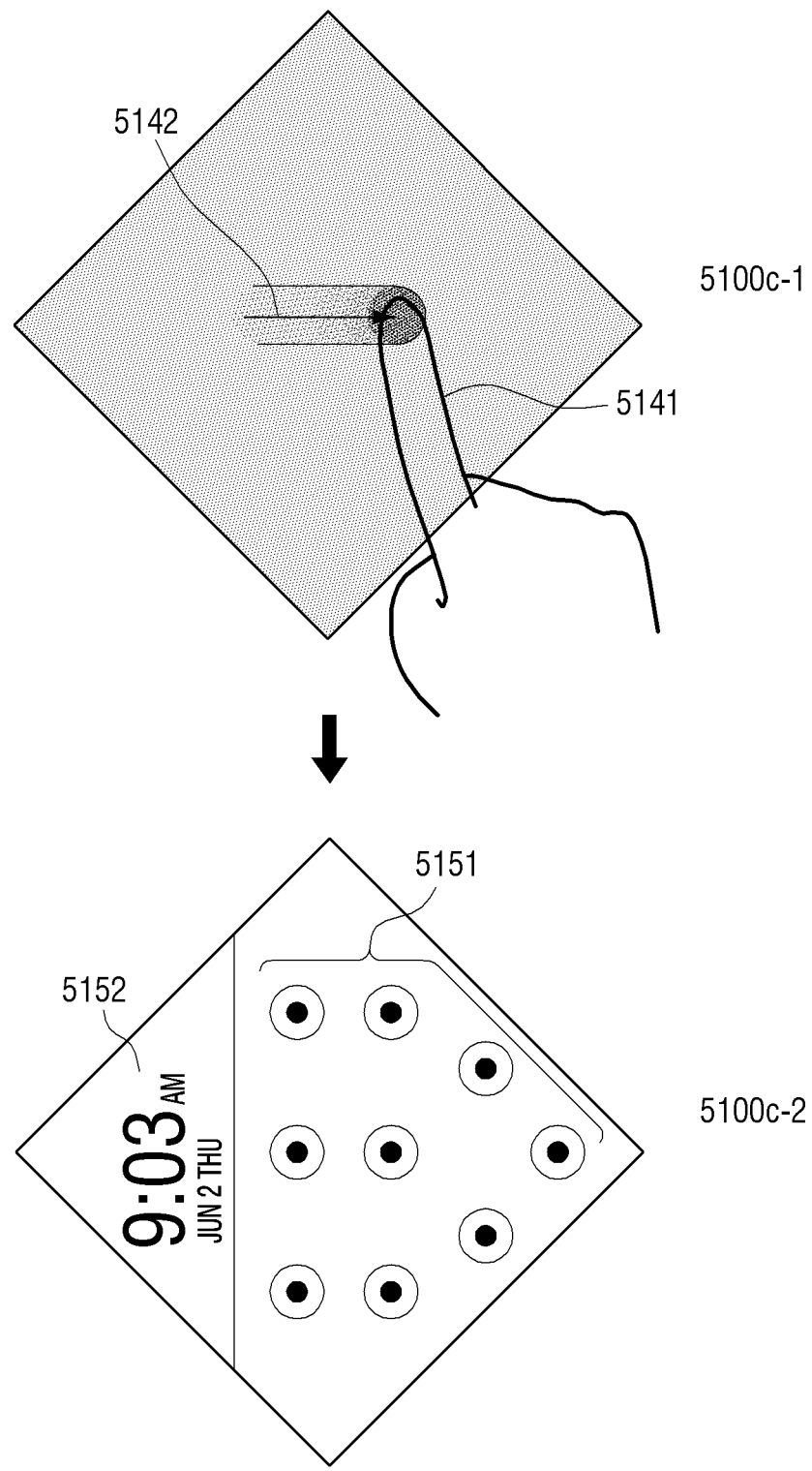

FIG. 51C illustrates that the user terminal device 200 is rotated at an angle of 45 degrees with reference to a horizontal axis or a longitudinal axis of the user terminal device 200, and a screen is displayed in a diamond shape.

While a display screen is in a powered-off state, when a user touches a screen with a finger and moves the finger from a left side to a right side while maintaining the touch, the detector 280 may detect a user interaction from a leftward to a rightward on the display screen.

When a user interaction is detected on a display screen, the controller 290 may turn a display screen to a powered-on state. In addition, the controller 290, as a user interaction is detected, may determine a direction of a user interaction based on a signal which is output from the detector 280. The controller 290 may determine a rotation state of a user terminal device through the detector 280.

A user interaction may be a dragging gesture. In addition, a user interaction may be a flick gesture. The controller 290 may determine a direction of a user interaction, and control the display 230 to display objects 5151 and 5152 on a display screen based on a direction of a user interaction and a rotation state of the user terminal device 200. In other words, while the user terminal device 200 is rotated at an angle of 45 degrees in a horizontal or longitudinal direction, when a user interaction is detected, the controller 290 may determine a display orientation of the objects 5151 and 5152 which are displayed on a display screen based on a user interaction and a rotation angle of a user terminal.

For example, while the display screen is in a powered-off state, when a user interaction 5142 to drag from a left side to a right side on a screen is detected, 5100*c*-1 the controller 290 may turn a display screen on and display the objects 5151 and 5152. When a direction of a user interaction is from a left side to a right side, the controller 290 may control the display 230 to display an object based on a position of a user who views a screen from a right side to a left side. A display orientation of the objects 5151 and 5152 may be a rightward direction (5100*c*-2).

Figure 51D:
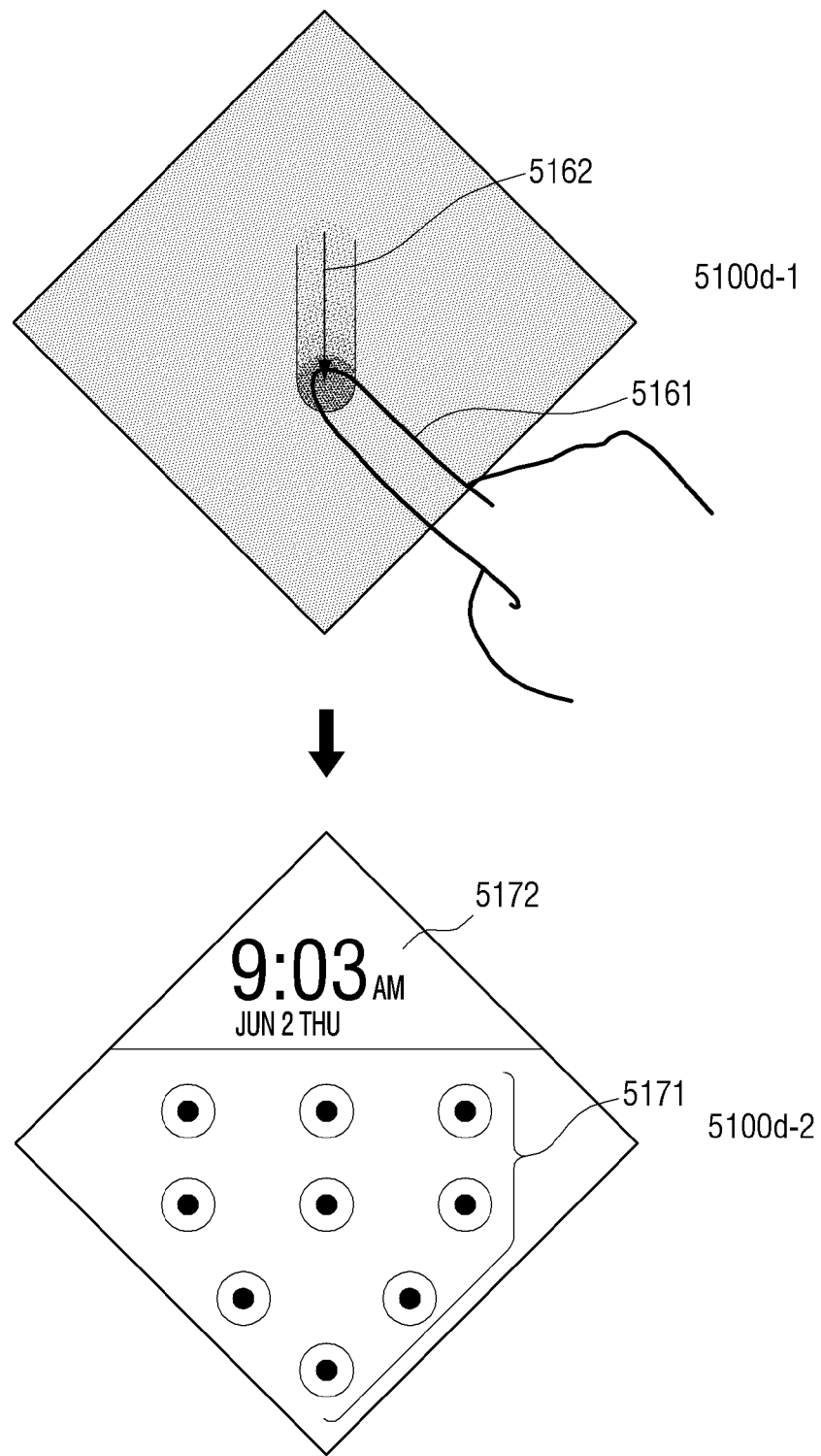

In FIG. 51D, the user terminal device 200 is rotated at an angle of 45 degrees with reference to a horizontal axis or a longitudinal axis of the user terminal device 200 and a display screen in a diamond shape is displayed.

While a display screen is in a powered-off state, when a user touches a screen with a finger and moves a finger from an upper end toward a lower end while maintaining the touch (5100*d*-1), the detector 280 may detect a user interaction from an upper end toward a lower end on the display screen.

When a user interaction is detected on a display screen, the controller 290 may turn the display screen on. In addition, the controller 290 may determine a direction of a user interaction based on a signal which is output from the detector 280 according to detection of a user interaction. The user interaction may be a dragging gesture. In addition, the user interaction may be a flick gesture. The controller 290 may determine a direction of a user interaction, and control the display 230 to display objects 5171 and 5172 based on a direction of a user interaction and a rotation state of a user terminal (5100*d*-2). That is, while the user terminal device 200 is rotated at an angle of 45 degrees with reference to a horizontal axis or a longitudinal axis, when a user interaction is detected, the controller 290 may determine a display orientation of an object which is displayed on a display screen based on a user interaction and a rotation angle of a user terminal.

For example, while a display screen is in a powered-off state, when a user interaction 5162 to drag a display screen from an upper end toward a lower end is detected, the controller 290 may control the display 230 to turn a display screen on and display the objects 5171 and 5172. At this time, when a direction of a user interaction is from an upper end toward a lower end, the controller 290 may control the display 230 with reference to a position of a user who views a display screen from an upper end toward a lower end. That is, a display orientation of the objects 5171 and 5172 may be displayed with reference to a lower end of the display screen.

Figure 52A:
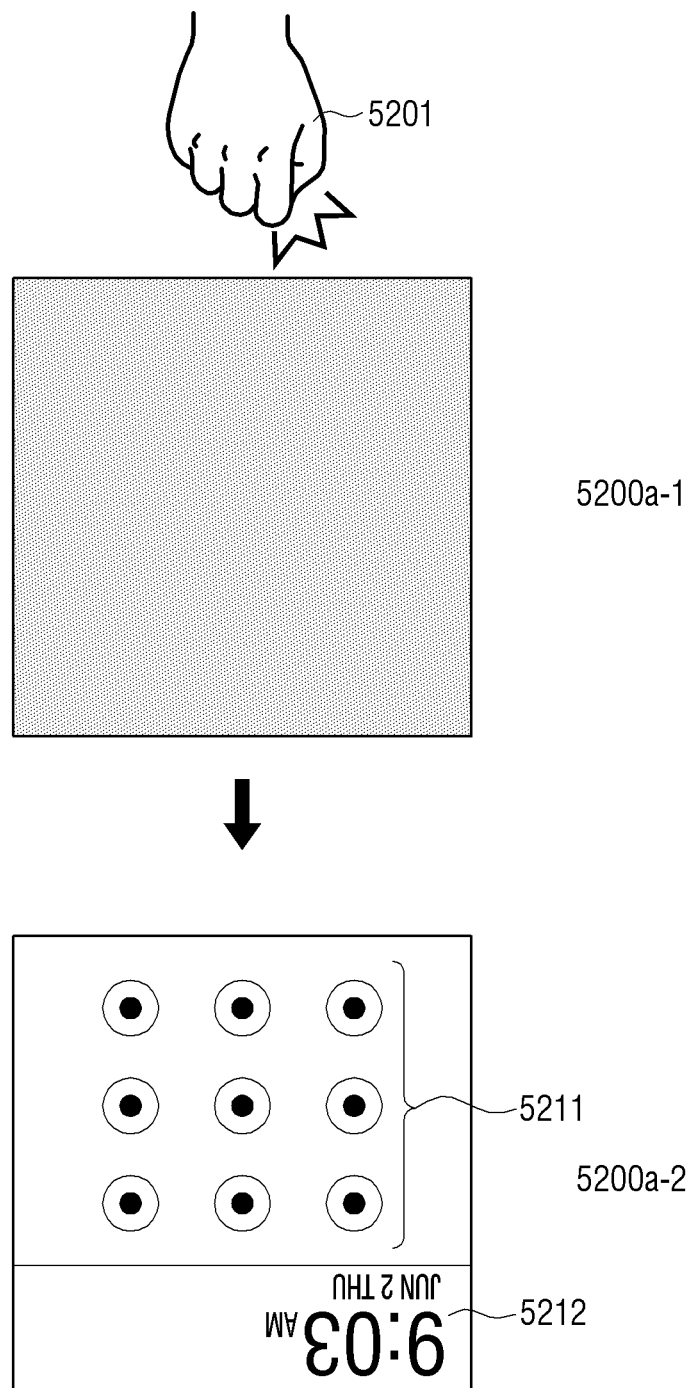

In addition, referring to FIG. 52A, while a display screen is turned off, when a user taps an upper end or an area adjacent to the upper end of the user terminal device 200 (5200*a*-1), the user terminal device 200 detects a vibration interaction, turns the screen on, determines a display orientation based on a detected location of the vibration interaction, and displays objects 5211 and 5212 on a display screen (5200*a*-2).

When a user taps the user terminal device 200, or taps an area adjacent to the user terminal device 200, the detector 280 may detect a vibration interaction, and output a corresponding signal. The controller 290 may receive the signal and determine a location and a direction where a vibration interaction is detected. The vibration interaction may be detected and processed by the user terminal device 200.

A location where a vibration interaction is detected may be at least one of an upper end, a lower end, a left side, a right side, an upper right corner, an upper left corner, a lower right corner, and a lower left corner of the user terminal device 200.

The controller 290 may determine a display orientation of the display screen based on a location where a vibration interaction is detected. The controller 290 may control the display 230 to turn a display screen on as the vibration interaction is detected, and display objects 5211 and 5212 on the display screen. The controller 290 may determine a display orientation of the objects 5211 and 5212 based on a location where the vibration interaction is detected.

For example, when a display screen is in a powered-off state, if a user taps an upper end or a point which is adjacent to the upper end of the user terminal device 200 (5200*a*-1), the controller 290 may detect a vibration interaction at an upper end of a display screen through the detector 280, turn the display screen on, and controls the display 230 to display the objects 5211 and 5212 (5200*a*-2).

When a vibration interaction is detected at an upper end of the user terminal device 200, the controller 290 may control the display 230 to display an object with reference to a position of a user who views a display screen from an upper end. In other words, a display orientation of the objects 5211 and 5212 may be displayed with reference to an upward direction.

Figure 52B:
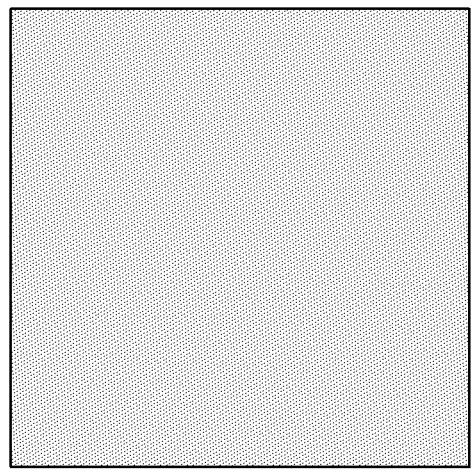
Figure 52B:
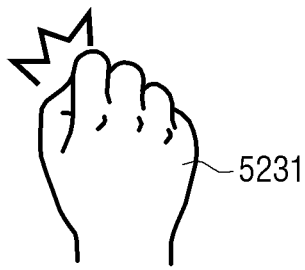
Figure 52B:
Figure 52B:
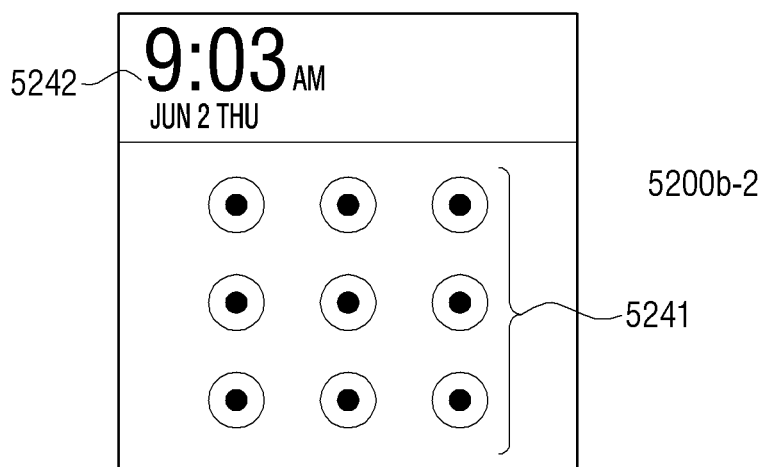

Referring to FIG. 52B, while a display screen is in a powered-off state, when a user taps a lower end or a part 5231 adjacent to a lower end of the user terminal device 200 (5200*b*-1), the user terminal device 200 detects a vibration interaction, turns a screen on based on a location where the vibration interaction is detected, determines a display orientation, and displays objects 5241 and 5242 on a display screen (5200*b*-2).

When a user taps the user terminal device 200 or a point adjacent to the user terminal device 200, the detector 280 may detect the vibration interaction and output a corresponding signal. The controller 290 may receive the signal and determine a location and a direction of the detected vibration interaction. The vibration interaction may be detected and processed by the user terminal device 200.

The controller 290 may determine a display orientation of the display screen based on a location where the vibration interaction is detected. The controller 290 may control the display 230 to turn the display screen on according to the detected vibration interaction and display objects 5241 and 5242 on the display screen. The controller 290, based on a location where the vibration interaction is detected, may determine a display orientation of the objects 5241 and 5242.

For example, while a display screen is turned off, when a user taps a lower end or a part adjacent to the lower end of the user terminal device 200 (5200*b*-1), the controller 290 may detect the vibration interaction through the detector 280, turn the display screen on, and control the display 230 to display the objects 5241 and 5242 (5200*b*-2). In this case, when a vibration interaction is detected at a lower end of the user terminal device 200, the controller 290 may control the display 230 to display an object with reference to a position of a user who views a screen from a lower end toward an upper end. That is, a display orientation of the objects 5241 and 5242 may be in a downward direction.

Figure 52C:
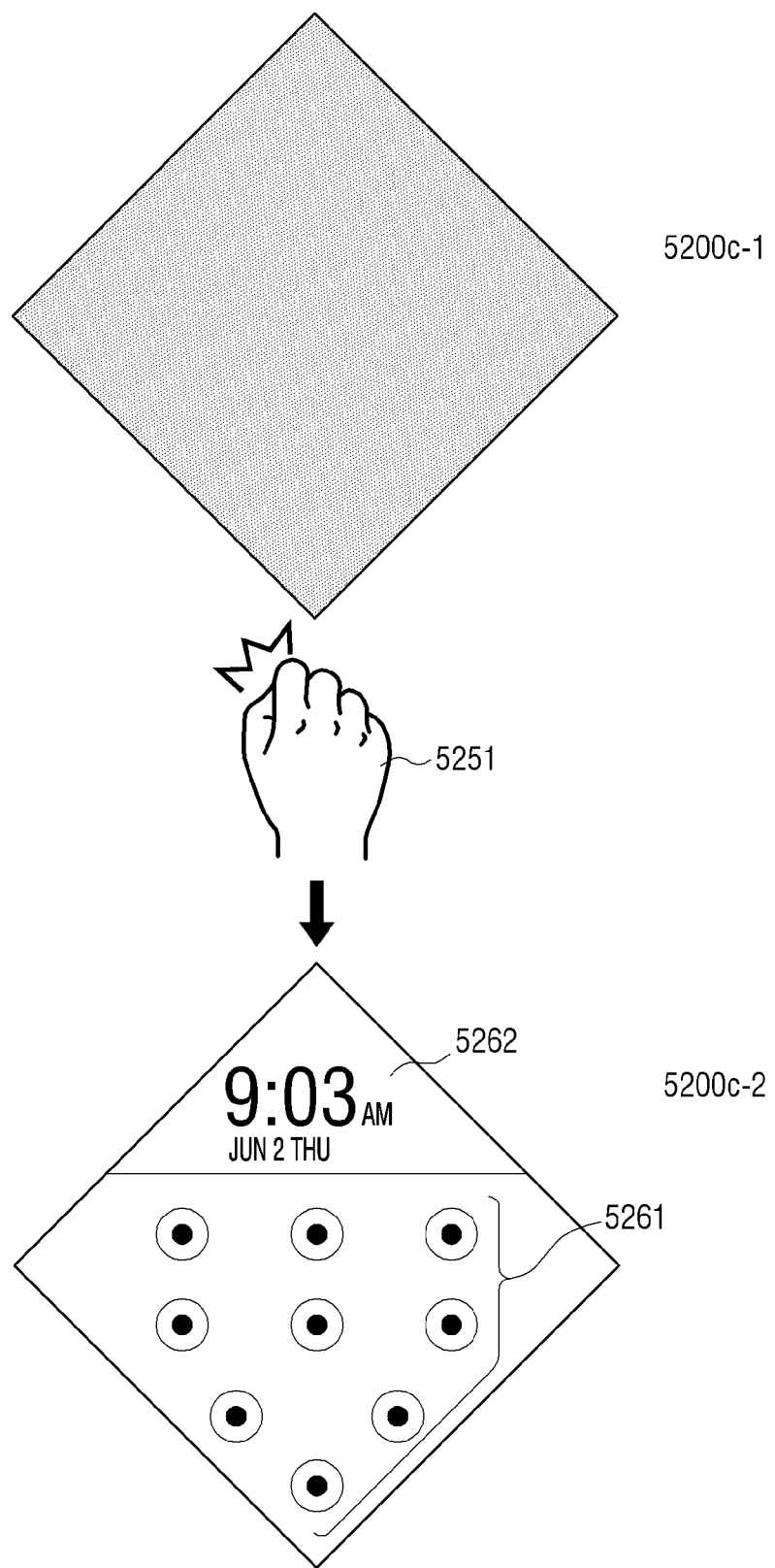

Referring to FIG. 52C, the user terminal device 200 is rotated at an angle of 45 with reference to a horizontal axis or a longitudinal axis of the user terminal device 200, and a display screen is displayed in a diamond shape. While the display screen is in a powered off state, when a user taps a lower end or a point 5251 adjacent to the lower end of the user terminal device 200 (5200*c*-1), the user terminal device 200 detects a vibration interaction, turns the screen on based on a location where the vibration interaction is detected, determines a display orientation, and displays objects 5261 and 5262 on the display screen (5200*c*-2).

When a user taps the user terminal device 200 or a point adjacent to the user terminal device 200, the detector 280 may detect a vibration interaction and output a corresponding signal. The controller 290 may receive a signal and determine a location and a direction where the vibration interaction is detected.

As the vibration interaction is detected, the controller 290 may control the display 230 to turn a display screen on and display objects 5261 and 5262 on the display screen. The controller 290 may determine a display orientation of the objects 5261 and 5262 based on a location where the vibration interaction is detected.

For example, while a display screen is in a powered-off state, when a user taps a lower end or a point adjacent to the lower end of the user terminal device 200 (5200*c*-1), the controller 290 may detect a vibration interaction through the detector 280, turn the display screen on, and control the display 230 to display the objects 5261 and 5262 (5200*c*-2). At this time, when a vibration interaction is detected at a lower end of the user terminal device 200, the controller 290 may control the display 230 to display an object with reference to a position of a user who views a display screen from a lower end toward an upper end. That is, a display orientation of the objects 5261 and 5262 may be toward a downward direction.

Figure 52D:
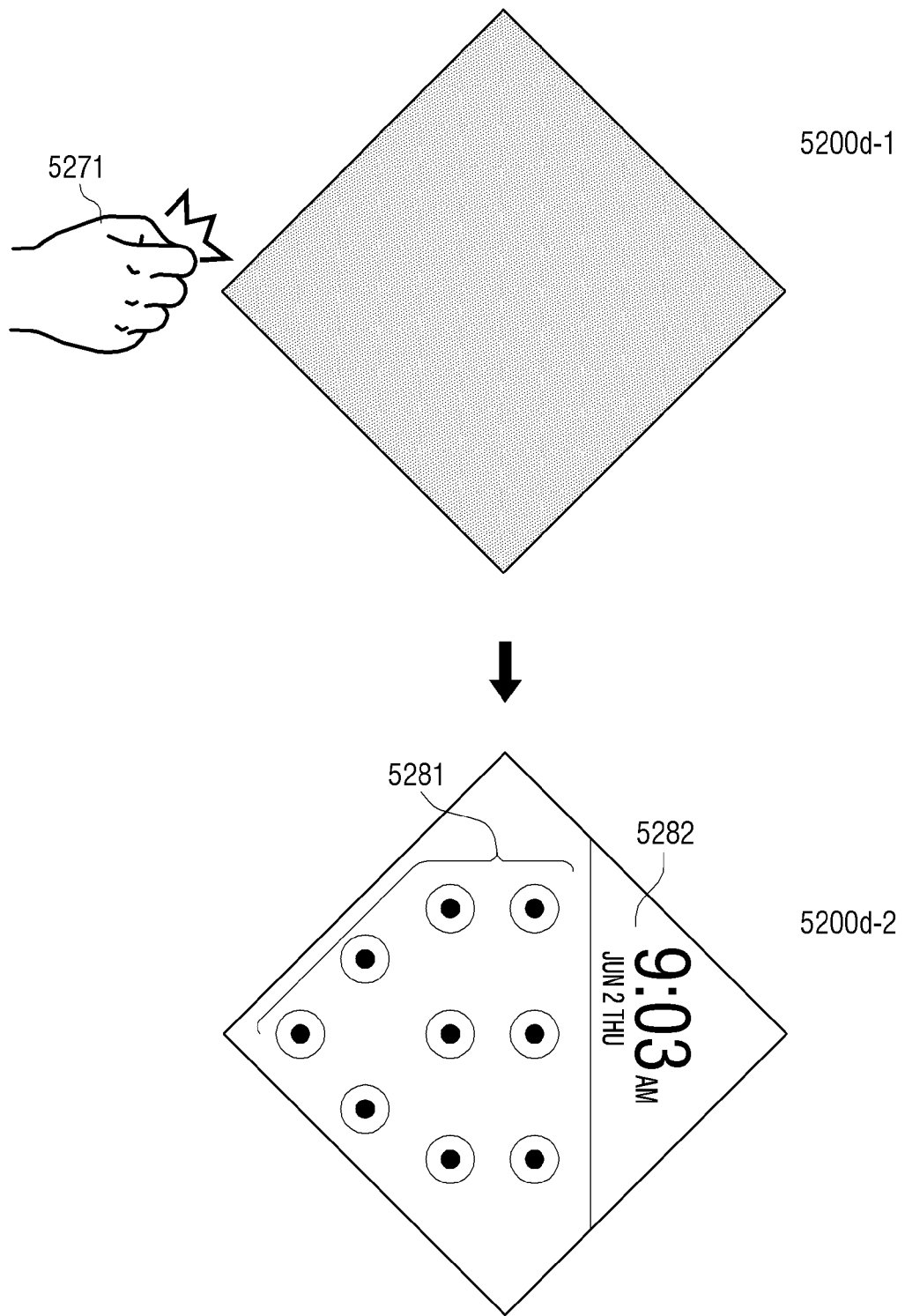

Referring to FIG. 52D, the user terminal device 200 is rotated at an angle of 45 degrees with reference to a horizontal axis or a longitudinal axis of the user terminal device 200, and the display screen is displayed in a diamond shape. While a display screen is turned off, when a user taps a left side or a part 5271 adjacent to the left side of the user terminal device 200 (5200*d*-1), the user terminal device 200 may detect a vibration interaction, turn a screen on based on a location where the vibration interaction is detected, determine a display orientation, and display objects 5281 and 5282 on a display screen (5200*d*-2).

The controller 290, when the vibration interaction is detected, may control the display 230 to turn the display screen on and display objects 5281 and 5282 on the display screen. The controller 290 may determine a display orientation of the objects 5281 and 5282 based on a location where the vibration interaction is detected.

For example, while a display screen is turned off, when a user taps a left side or a point 5271 adjacent to a left side of the user terminal device 200 (5200*d*-1), the controller 290 may detect a vibration through the detector 280, turn a display screen on, and control the display 230 to display the objects 5281 and 5282 (5200*d*-2). When a vibration interaction is detected at a lower end of the user terminal device 200, the controller 290 may control the display 230 to display objects 5281 and 5282 in a position of a user to view a display screen from a left side toward a right side. That is, a display orientation of the objects 5281 and 5282 may be leftward.

The user terminal device 200, while a display screen is in a powered-off state, may detect a user's touch on an edge part of the user terminal device 200, turn a screen on based on a location where the touch is detected, determine a display orientation, and display a display screen. The edge part of the user terminal device 200 may be a bezel area. While a screen of the user terminal device 200 is in a powered-off state, when a user touches a bezel area, the user terminal device 200 may detect a touch interaction, determine a display orientation based on the touch interaction, and display a display screen.

For example, while a screen is in a powered-off state, when a user touches a bezel area in an upper end of the user terminal device 200, the user terminal device 200 may turn the screen on and display a display screen oriented upward.

While a screen is in a powered-off state, when a user touches a bezel area at a lower end of the user terminal device 200, the user terminal device 200 may turn a screen to a powered-on state, and display a display screen oriented downward.

While a screen is in a powered-off state, when a user touches a left bezel area of the user terminal device 200, the user terminal device 200 may turn a screen on and display a display screen oriented leftward.

While a screen is in a powered-off state, when a user touches a right bezel area of the user terminal device 200, the user terminal device 200 may turn a screen on and display a display screen oriented rightward.

<Detection of a User Interaction>

Figure 53:
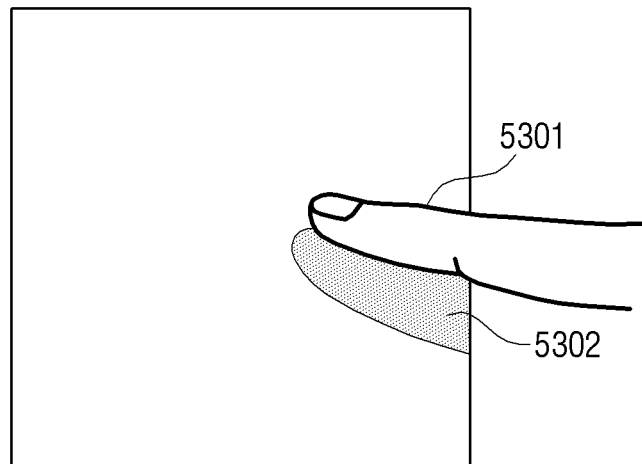
FIG. 53 is a view illustrating detection of an approach direction of a user's finger on a display screen according to one or more exemplary embodiments.

FIG. 53 is a view illustrating a detection of an approach direction of a user's finger on a display screen according to one or more exemplary embodiments.

In FIG. 53, a user's finger 5301 which is adjacent to the display screen is displayed. When the user's finger 5301 approaches the display screen, a shadow area 5302 which corresponds to the finger 5301 may be generated on the display screen. The detector 280 may detect the shadow area 5302 which is generated on the display screen.

When the shadow area 5302 is generated, the controller 290 may determine a location of the shadow area based on a signal which is output from the detector 280. In addition, the controller 290 may determine a direction of approach of the user's finger 5301 from the shadow image and determine a display orientation based on the shadow.

For example, when a user's finger approaches a display screen from a right side of a display screen, a shadow area 5302 may be generated at a right side of the display screen. The controller 290 may determine, based on the generated shadow area, that a user's finger approaches from the right side of the display screen, and determine a display orientation with reference to the right side of the display screen.

<Division of a Display Screen and Change of Display Orientation According to a User Interaction>

Figure 54A:
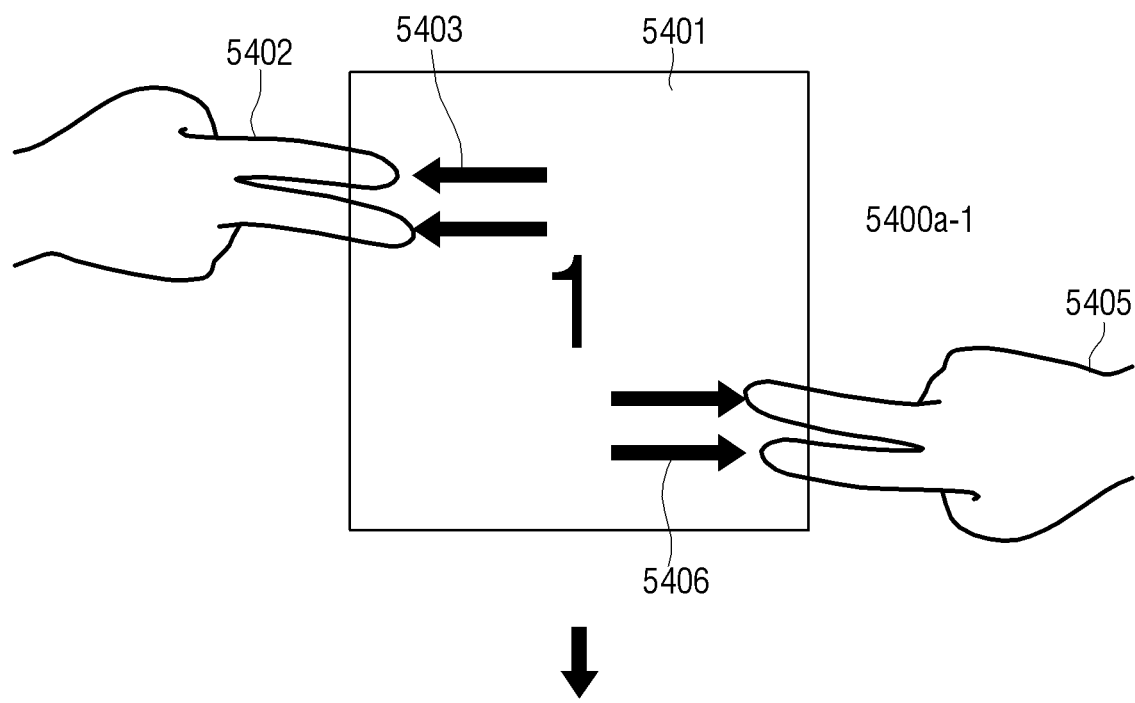
FIGS. 54A and 54B are views illustrating a display screen divided into two areas in response to a user interaction according to one or more exemplary embodiments.
Figure 54A:
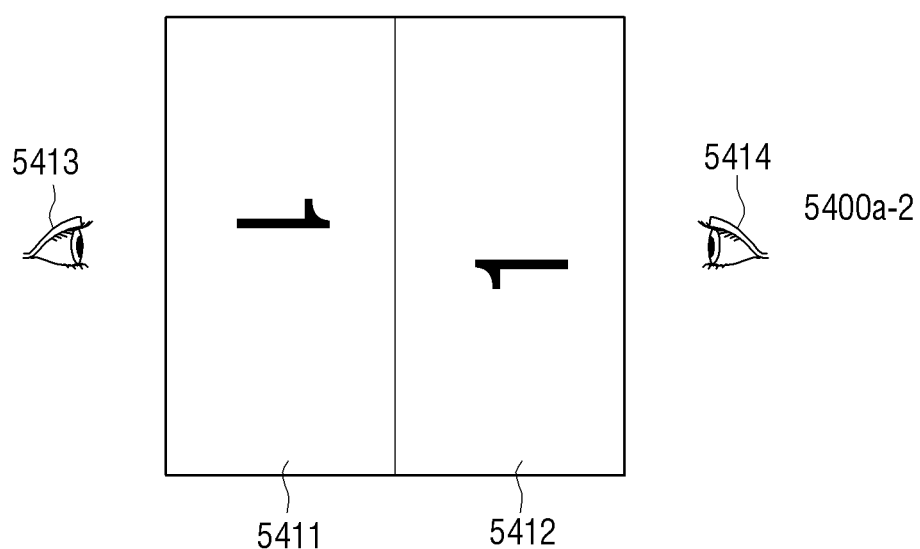
Figure 54B:
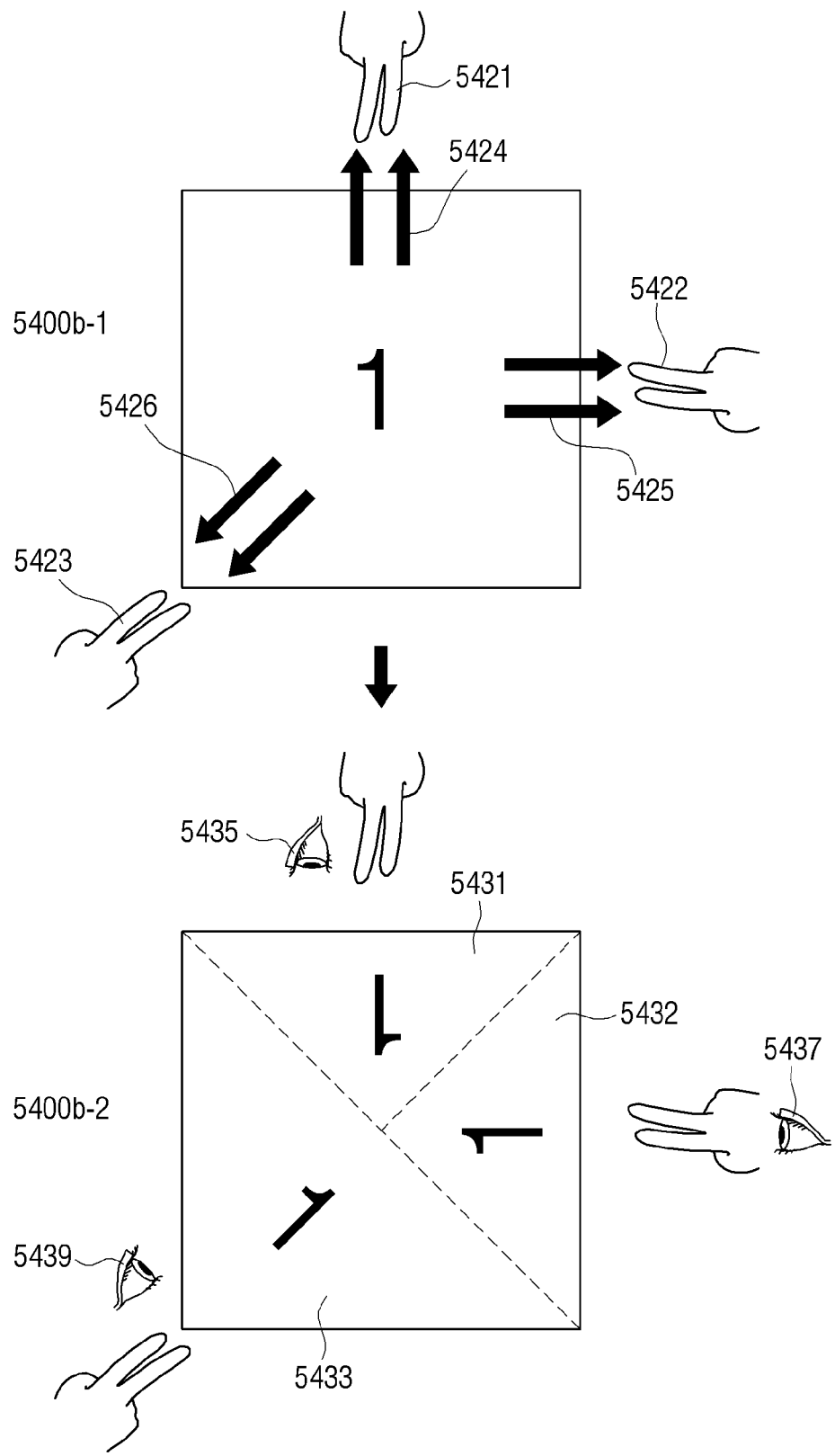

FIGS. 54A and 54B illustrate a display screen divided into two areas according to a user interaction, according to one or more exemplary embodiments. FIG. 54A illustrates a display screen 5401 which is composed of a single area is divided into two areas according to a user interaction, and FIG. 60 is a flowchart describing a process where the display screen is divided into two areas according to a user interaction.

Figure 60:
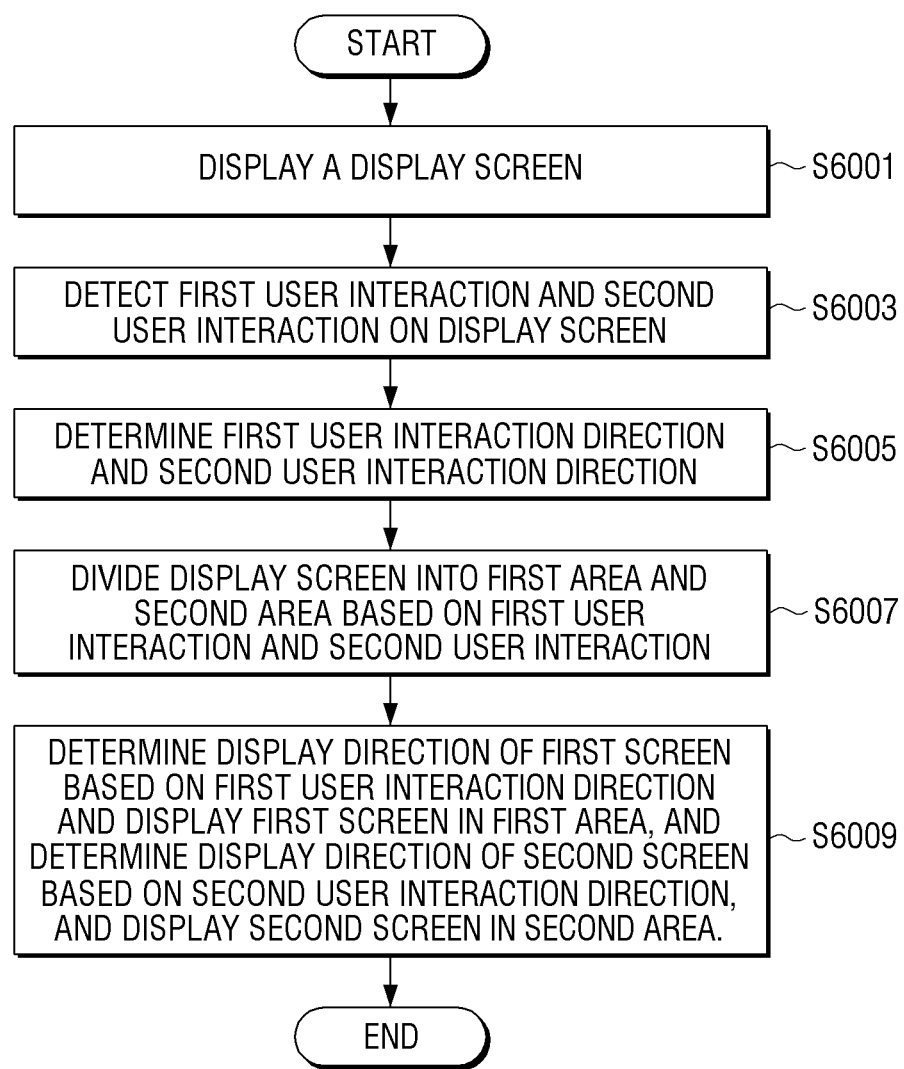
FIG. 60 is a flowchart describing a process where a display screen is divided into two areas according to a user interaction according to one or more exemplary embodiments.

Referring to FIG. 60, the user terminal device 200 displays a display screen (S6001). When user interactions occur in different directions at a same time on the display screen 5401, the user terminal device 200 detects a first user interaction and a second user interaction on a display (S6003). The user terminal device 200 may determine a direction of the first user interaction and a direction of the second user interaction based on the detected signal (S6005).

The user terminal device 200, based on the first user interaction and the second user interaction, may divide the display screen into a first area and a second area (S6007). The user terminal device 200, based on a direction of the first user interaction, may determine a display orientation of the first screen and display the first screen on the first area, determine a display orientation of the second screen and display the second screen on the second area (S6009). A display screen is in a square shape, and if at least one user interaction out of the first user interaction and the second user interaction is toward a corner direction of the display screen, the user terminal device 200 may divide the display screen into triangular shapes. In addition, when at least one user interaction out of the first user interaction and the second user interaction is toward a side of a display screen, the user terminal device 200 may divide a display screen into a rectangular shapes.

A user interaction may be a multi touch interaction.

For example, as illustrated in FIG. 54A, while a display screen is displayed, when two users drag a display screen in a right and left directions using two or more fingers 2 5402 and 5405 (5400a-1), the controller 290 may detect a first user interaction 5403 and a second user interaction 5406 at the same time, and control the display 230 to divide the display screen 5410 into two areas 5411 and 5412 based on the first user interaction 5403 and the second user interaction 5406 (5400a-2). When the first user interaction or the second user interaction is toward a side of a display screen, the display screen may be divided into rectangular shapes.

In the divided areas, a first screen and a second screen 5411 and 5412 may be displayed respectively. The controller 290, based on a direction of the first user interaction 5403, may determine a display orientation of the first screen 5411 to be leftward 5413. The controller 290, based on a direction of the second user interaction 5406, may determine a display orientation of the second screen 5412 to be a rightward 5414.

FIG. 54B illustrates that a display screen which is composed of a single area is divided into three areas according to a user interaction. When user interactions occur at the same time on the display screen in different directions 5422, 5424, and 5426, the detector 280 may detect the user interaction, and the controller 290 may control the display 230 to divide the display screen into three areas 5431, 5432, and 5433 based on the detected signal.

The controller 290, based on a direction of a user interaction, may determine a display orientation. The user interaction may be a multi touch interaction. The divided areas 5431, 5432, and 5433 may be triangular or square shaped.

For example, while a display screen is displayed, when three users drag a display screen in directions of a corner 5426 at a left lower end, a right direction 5425, and an upper end direction 5424, using respective two fingers 5423, 5428, and 5421 (5400b-1), the display screen may be divided into three areas.

In the divided area, a first screen, a second screen, and a third screen 5431, 5432, and 5433 may be displayed (5400b-2). The controller 290, based on a direction of a user interaction, may determine a display orientation of a content displayed on the divided area to be an upward direction 5435, a rightward direction 5437, and a left lower end direction 5439.

Figure 61:
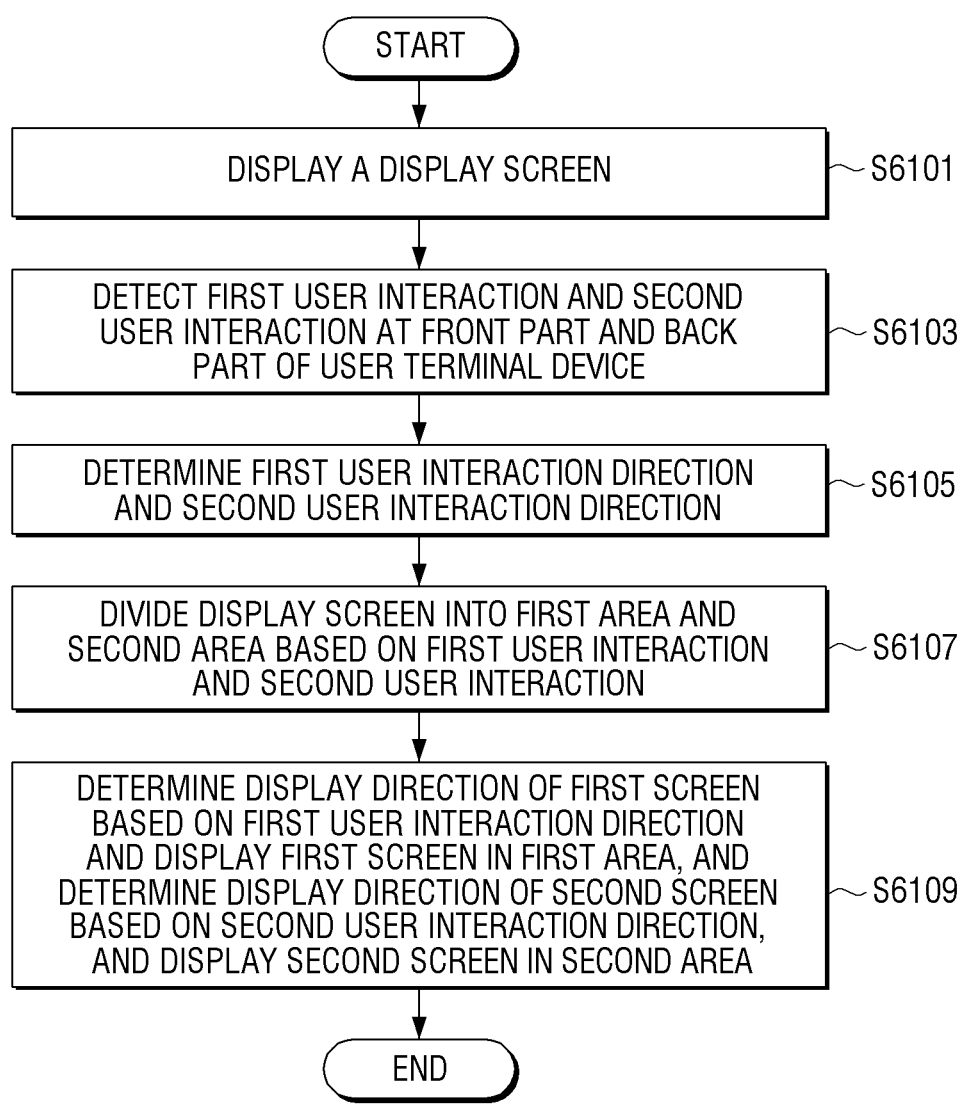
FIG. 61 is a flowchart describing a process where a display screen is divided in response to a user interaction which is detected at a front part and a back part of the user terminal at a same time according to one or more exemplary embodiments.

FIGS. 55A to 55E illustrate detecting user interactions at the same time at a front part and a back part of the user terminal device 200, and dividing a display screen in response to the user interactions. The user interaction may be a dragging interaction. FIG. 61 is a flowchart describing a process where a display screen is divided in response to a user interaction which is detected at the front part and the back part of the user terminal at the same time.

Referring to FIG. 61, the user terminal device 200 displays a display screen (S6101). When a user touches and drags 5505 a front part 5501 and a back part 5502 of the user terminal device at a same time using fingers 5503 and 5504, the user terminal device 200 may detect a first user interaction and a second user interaction (S6103) at the front part and the back part of the user terminal device 200 at the same time. In other words, the detector 280 of the user terminal device 200 may detect a user interaction at the same time at both sides of the user terminal device 200, and the controller 290 may control such that a predetermined operation or function to be performed in response to the user interaction. Herein, "at the same time" means that at least a portion of the touch and drag on the front and back parts 5501 and 5502 overlap in time.

The user terminal device 200 may determine a direction of a first user interaction and a second user interaction based on a detected signal (S6105). The user terminal device 200, based on the first user interaction and the second user interaction, may divide a display screen into a first area and a second area (S6107).

A display screen may be a square shape, and when at least one user interaction out of the first user interaction and the second user interaction is toward a corner direction of the display screen, the user terminal device 200 may divide a display screen into triangular shapes. In addition, when at least one user interaction out of the first user interaction and the second user interaction is toward a side of a display screen, the display screen may be divided into rectangular shapes.

The user terminal device 200, based on a direction of the first user interaction, determines a display orientation of the first screen and displays the first screen on the first area, and determines a display orientation of the second screen and displays the second screen on the second area (S6109).

Figure 55A:
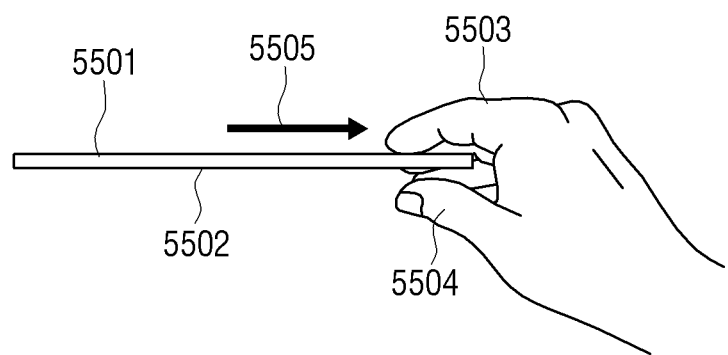
FIGS. 55A to 55E are views illustrating detecting a user interaction at a front part and a back part of the user terminal, and dividing a display screen in response to a user interaction according to one or more exemplary embodiments.

FIG. 55A illustrates a user terminal device 200, which may detect a user interaction from a front side and a back side, is viewed from a side. On a front side 5501 of the user terminal device 200, a display screen may be displayed, and a first user interaction may be detected. On a back side 5502, a second user interaction may be detected. The first user interaction and the second user interaction may be dragging interactions by a user's fingers 5503 and 5504.

Figure 55B:
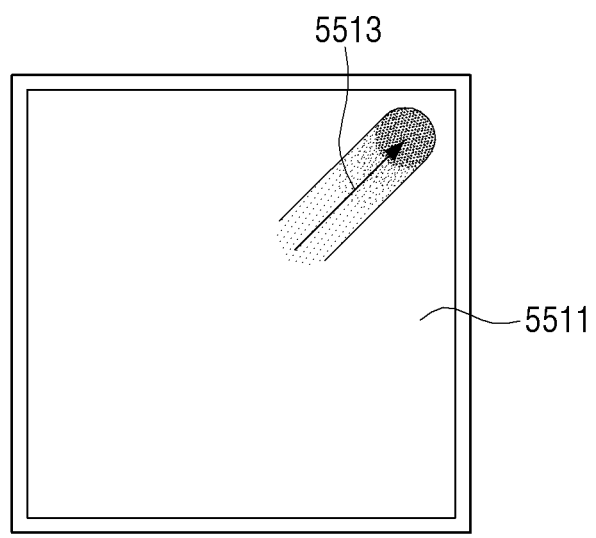

FIG. 55B illustrates that a display screen of the user terminal device 200 which includes a front part and a back part detects a user interaction 5513. The user interaction may be detected at the back side (not shown) at the same time.

Figure 55C:
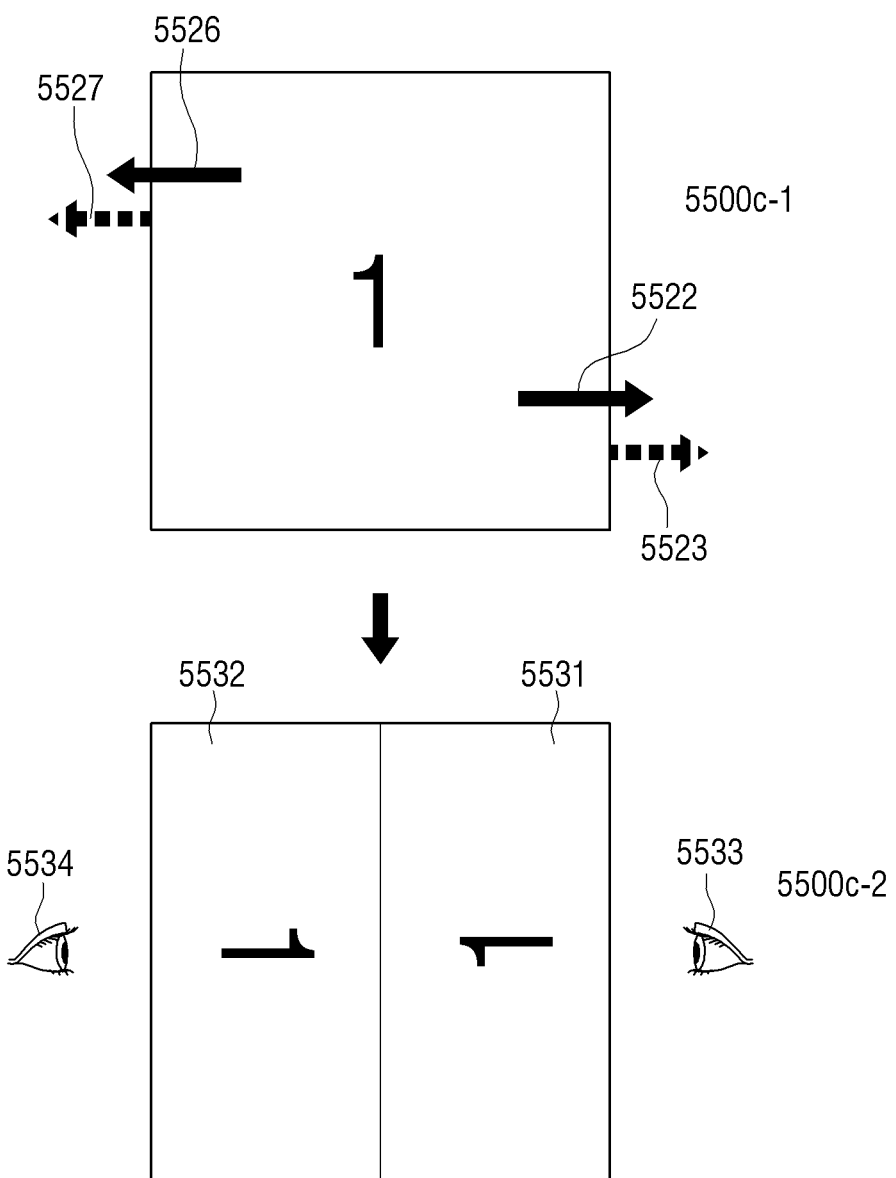

FIG. 55C illustrates a process where a display screen is divided into two areas in response to the first user interaction and the second user interaction which are detected at a front part and a back part at a same time. At the front part and the back part of the user terminal device 200, when a first user interaction 5526 and 5527 and a second user interaction 5522 and 5523 occur in different directions on a front and back part of the user device 200 at the same time (5500c-1), the detector 280 may detect the first user interaction and the second user interaction, and the controller 290 may divide a display screen into two areas based on a detected signal. In the two areas, a first screen 5532 and a second screen 5531 are displayed, and the controller 290 may determine a display orientation based on a direction of a user interaction (5500c-2).

For example, at the front part and the back part of the user terminal device 200, when dragging interactions 5526 and 5527 toward a left side are detected, and, at the same time, dragging interactions 5522 and 5523 toward a right side are detected on the front part and the back part of the user terminal device 200 (5500c-1), the controller 290 may divide a display screen into two areas (5500c-2). In this case, in each divided area, a first screen 5532 and a second screen 5531 may be displayed. The controller 290, based on a direction of a user interaction, may determine a display orientation of the first screen and the second screen. For example, a display orientation of the first screen 5532 may be towards a left side 5534, and a display orientation of the second screen 5531 may be towards a right side 5533.

Figure 55D:
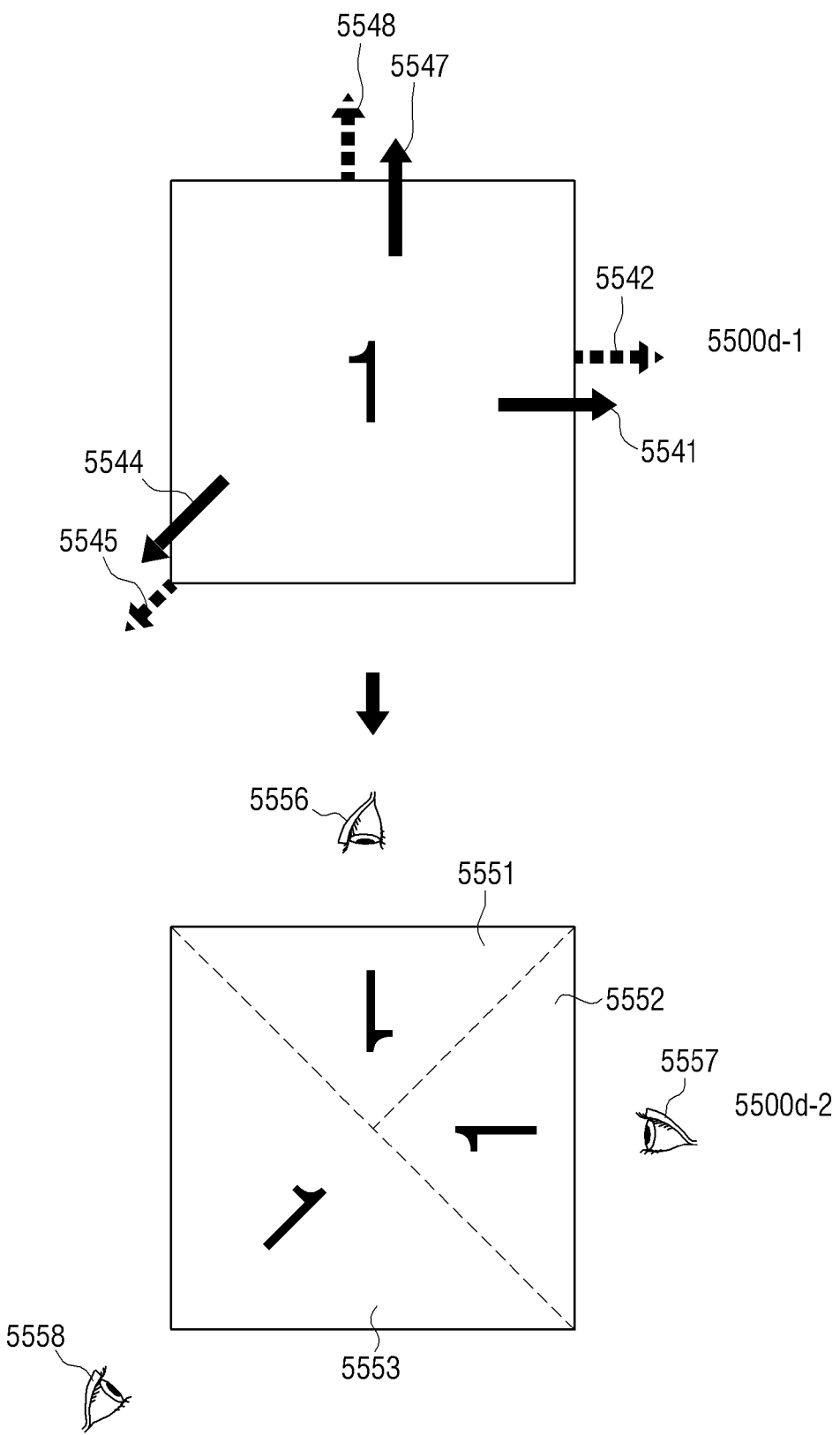

FIG. 55D illustrates a process where a display screen is divided into three areas in response to a first user interaction, a second user interaction, and a third user interaction which are detected on the front part and the back part at the same time. On the front part and the back part of the user terminal device 200, when user interactions 5547 and 5548, 5542 and 5543, and 5544 and 5545 occur in different directions at the same time (5500d-1), the detector 280 may detect the user interactions, and the controller 290 may divide a display screen into three areas based on a detection signal (5500d-2). The controller 290 may determine a display orientation based on a direction of a user interaction. At least one user interaction is toward a corner direction of a display screen, the controller 290 may control the display 230 to divide a display screen in a triangle shape. In other words, as the user interactions 5544 and 5545 are toward a corner direction, the first screen, the second screen, and the third screen 5551, 5552, and 5553 may be a triangle shape.

For example, at a front part and a back part of the user terminal device 200, when dragging user interactions 5547 and 5548 which are toward an upper end are detected, at the same time as dragging user actions 5541 and 5542 which are toward a left side are detected, and, at the same time, as dragging user interactions 5544 and 5545 toward a left lower end are detected, the controller 290 may divide a display screen into three areas (5500d-2).

In the divided area, first screen, second screen, and third screen 5551, 5552, and 5553 may be displayed respectively, and a display orientation may be determined based on a direction of the user interaction. A display orientation of a first screen 5551 may be upward 5556. A display orientation of a second screen 5552 may be rightward 5557. A display orientation of a third screen 5553 may be leftward 5558.

Figure 55E:
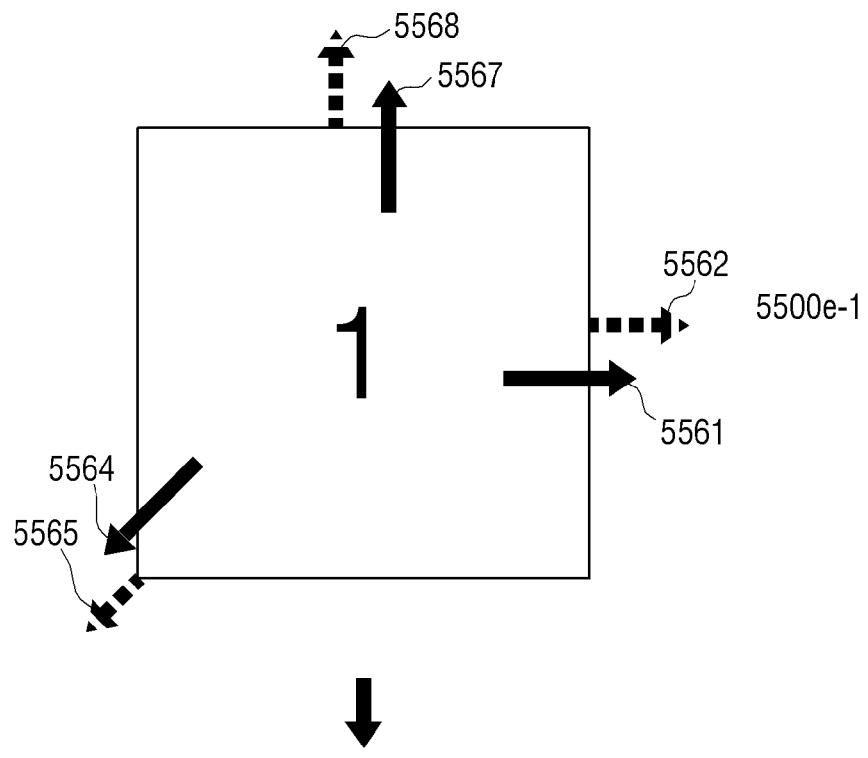
Figure 55E:
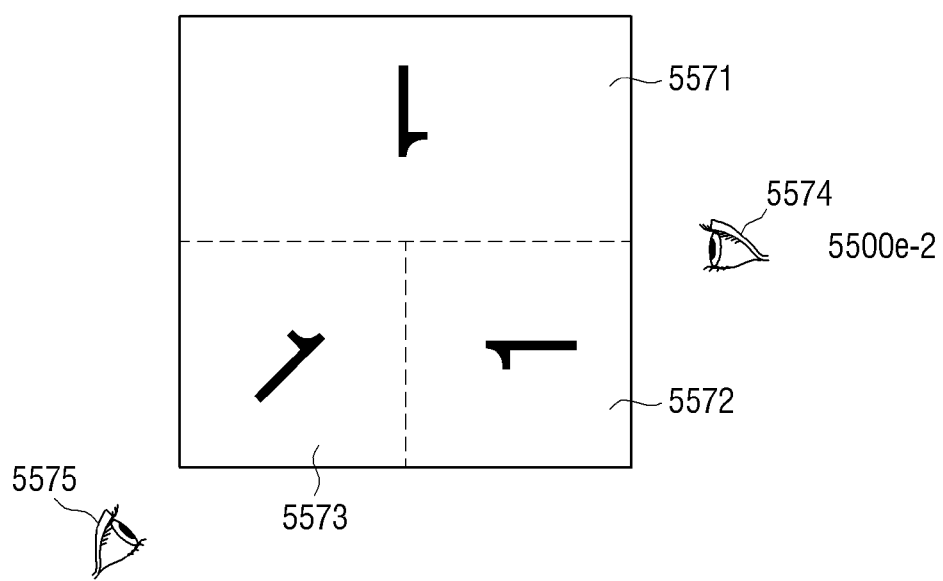

FIG. 55E illustrates a process of dividing a display screen into three areas in response to the user interactions which are detected at a front part and a back part at a same time. When user interactions 5567 and 5568, 5561 and 5562, and 5564 and 5565 occur at the same time in different directions on a front part and a back part of the user terminal device 200 (5500e-1), the detector 280 may detect a user interaction, and the controller 290 may divide a display screen into three areas based on a detected signal. In the divided areas, a first screen 5571, a second screen 5572, and a third screen 5573 may be displayed (5500e-2). The controller 290 may determine a display orientation based on a direction of a user interaction. The divided areas 5571, 5572, and 5573 may be in a square shape.

For example, at a front part and a pack part of the user terminal device 200, when dragging interactions 5567 and 5568 toward an upper end are detected, at the same time, as dragging interactions 5561 and 5562 toward a right side, and at the same time as dragging interactions 5564 and 5565 toward a left lower end, the controller 290 may divide a display screen into three areas.

In the divided areas, a first screen 5571, a second screen 5572, and a third screen 5573 may be displayed, and a display orientation may be determined based on a direction of a user interaction. A display orientation of the divided area 5571 may be upward 5576. A display orientation of the divided area 5572 may be rightward 5574. A display orientation of the divided area 5573 may be downward left 5575.

Figure 56A:
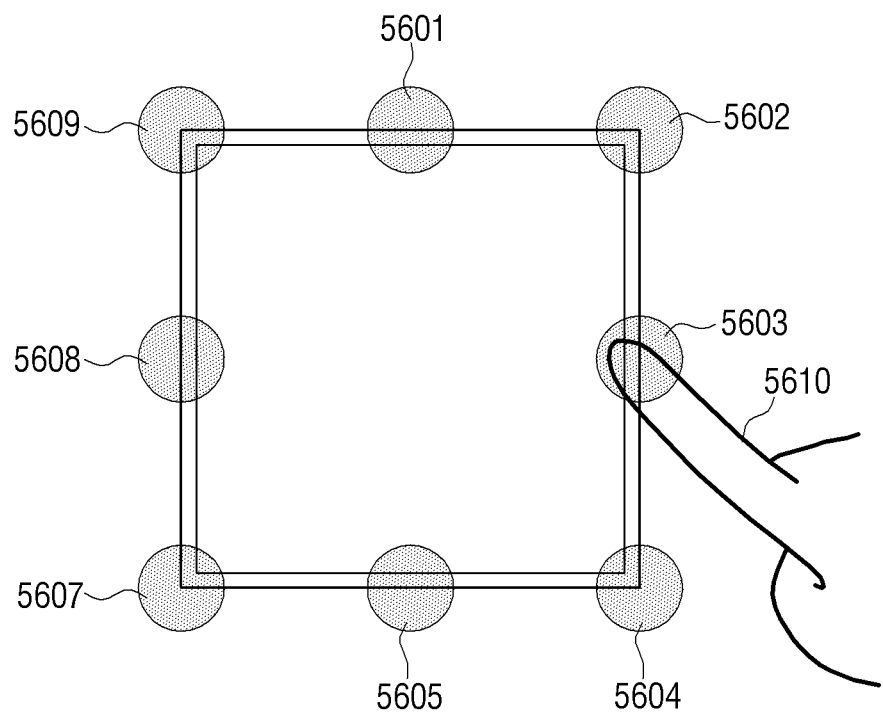
FIGS. 56A to 56C are views illustrating dividing a display screen in response to a user interaction detected at upper, lower, left, and right sides and corner areas of the user terminal, according to one or more exemplary embodiments.
Figure 56B:
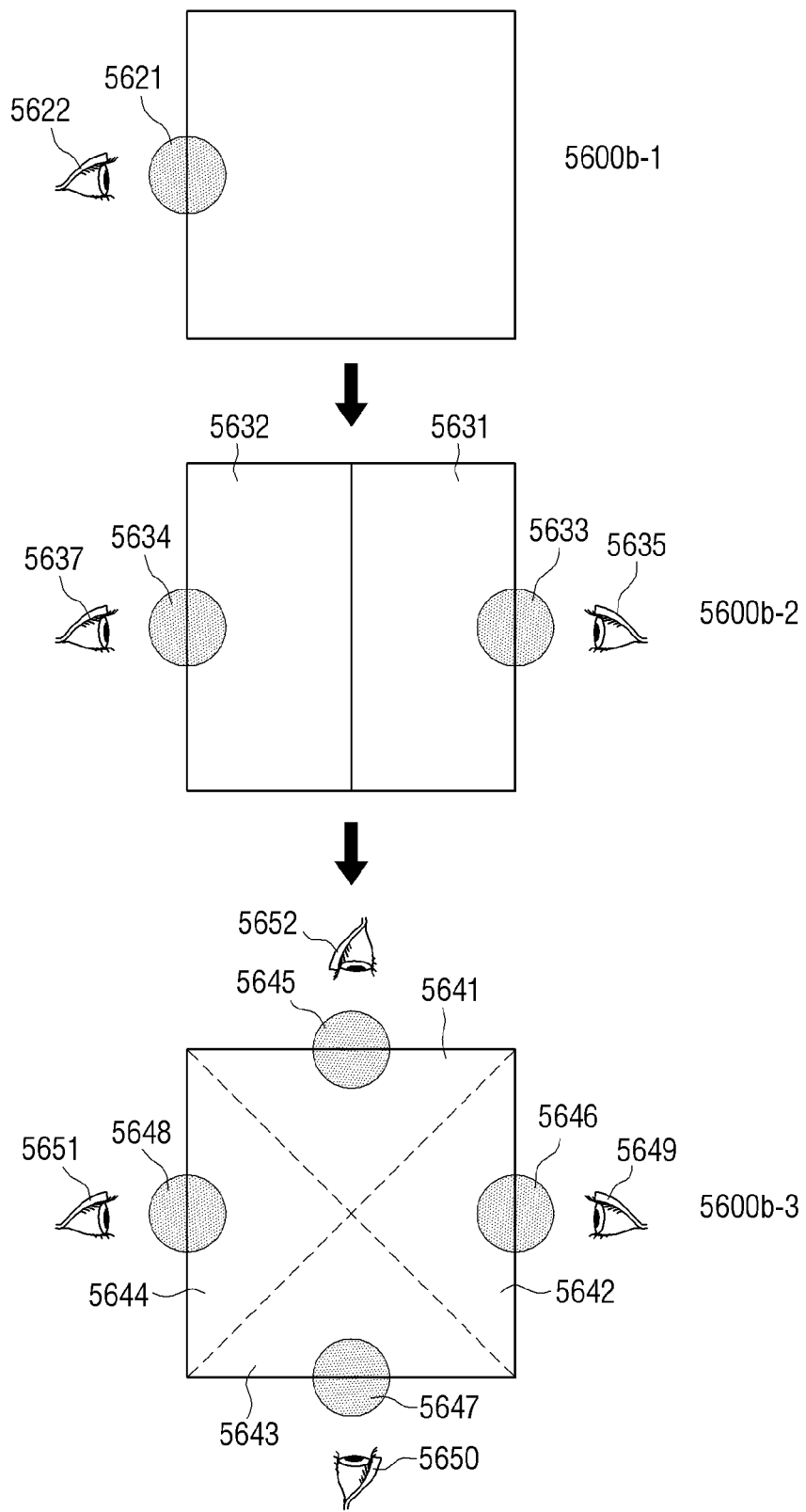
Figure 56C:
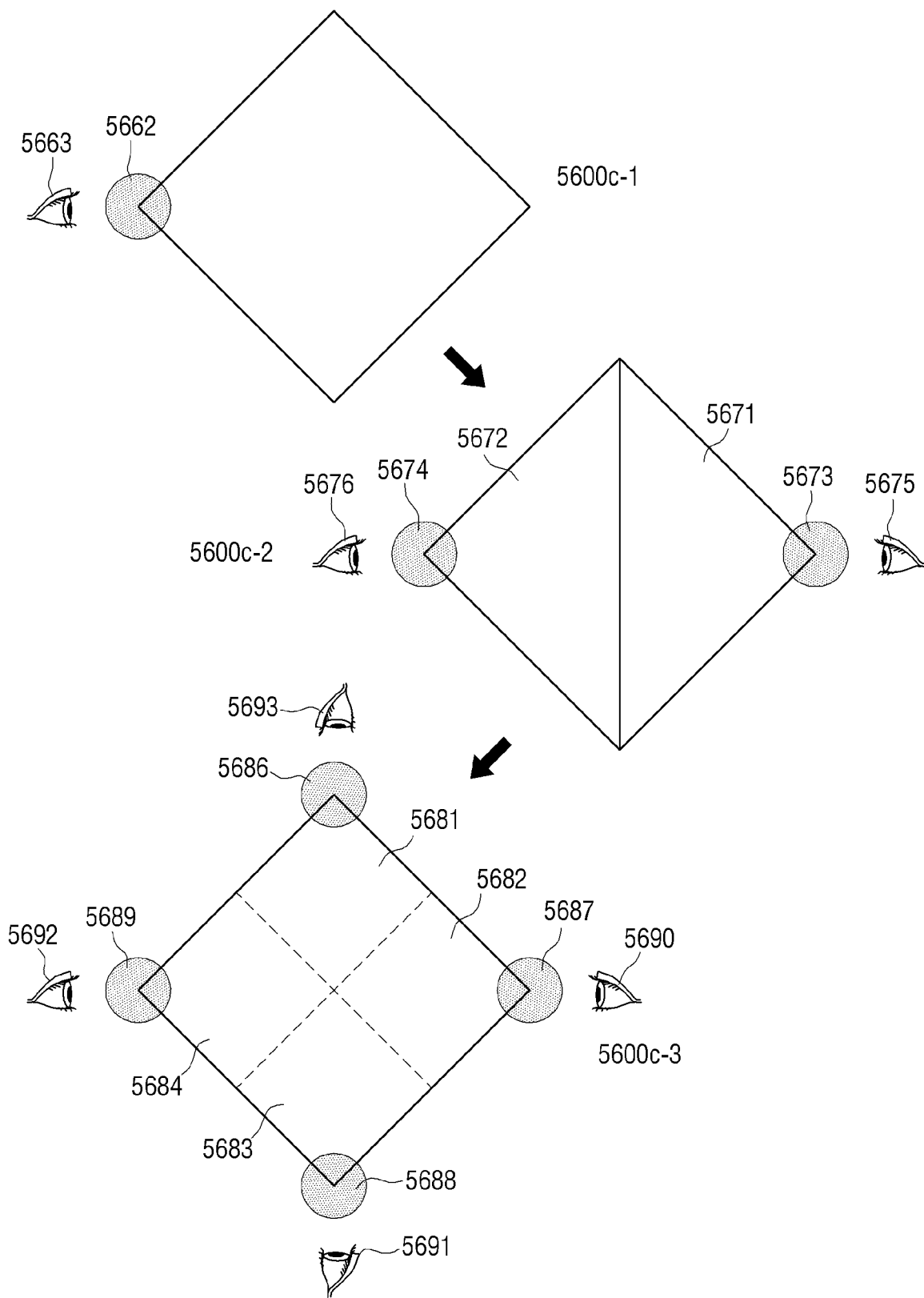

FIGS. 56A to 56C are views illustrating dividing a display screen in response to a user interaction detected at upper, lower, left, and right sides and corner areas of the user terminal. A user interaction may be a touch interaction or a vibration gesture, such as a tap.

FIG. 56A illustrates a touch interaction which is detected at upper, lower, left, or right sides 5601, 5605, 5608, and 5603 of the user terminal device 200, or the four corner areas 5602, 5604, 5607, and 5609. The upper, lower, left, and right sides 5601, 5605, 5608, and 5603 may be part of one or more bezels of the user terminal device 200. When a touch occurs by a user, the detector 280 may detect a user interaction 5610 on at least one area out of the upper, lower, left, and right sides 5601, 5605, 5608, and 5603, and the four corner areas 5602, 5604, 5607, and 5609. The controller 290, in response to a detected user interaction, may control the display 230 to divide a display screen into a plurality of areas.

FIG. 56B is a view illustrating that a display screen is divided as a user sequentially touches 5621 the four sides of the user terminal device 200.

In the first drawing 5600*b*-1, the controller 290, in response to a first user interaction which is detected at a left side 5621 of the user terminal, may control the display 230 to display a display screen oriented leftward 5622.

In the second drawing 5600*b*-2, while a first user interaction is detected at a left side 5634 of a display screen, when a second user interaction is detected at a right side 5633, the controller 290 may control the display 230 to divide a display screen into two areas 5632 and 5631. A display orientation of divided area 5632 may be set to be a left side 5637 based on a location where the first user interaction is detected. A display orientation 5635 of divided area 5631 may be towards a right side 5635 based on a location where the second user interaction is detected.

In the third drawing 5600*b*-2, while a first user interaction is detected at a left side 5648 of a display screen and a second user interaction is detected at a right side 5646, when a third user interaction is detected at an upper side 5645, and a fourth user interaction is detected at a lower side 5647, the controller 290 may control a display 230 to divide a display screen into four areas 5644, 5642, 5647, and 5641. The controller 290 may determine second division areas 5644, 5642, 5641, and 5643 with reference to first division areas 5632 and 5631. The controller 290 may control the display 230 to divide a display screen 5640 evenly, and include at least a part 5644 and 5642 of the second divided area in the first divided area. In other words, the second divided areas 5644 and 5642 may be included within the divided areas 5632 and 5631.

A display orientation of a divided area 5644 is set based on a location 5648 where a first user interaction is detected, and the display orientation may be leftward 5651. A display orientation of a divided area 5642 may be a right side 5649 based on a location 5646 where the second user interaction is detected. A display orientation of a division area 5643 may be downward 5650 based on a location where a third user interaction is detected. A display orientation of a divided area 5641 may be upward 5652 based on a location 5645 where a user interaction is detected.

FIG. 56C is a view illustrating a process where, while the user terminal device 200 is rotated at an angle of 45 with reference to a horizontal axis or a longitudinal direction, a display screen is divided in response to a touch interaction which is detected at a corner.

In the first drawing 5600*c*-1, as a user touches a left corner 5662 of a user terminal, the controller 290 may control the display 230 to set leftward 5663 as a display orientation and display a display screen.

In the second drawing 5600*c*-2, while a first user interaction is detected at a left corner 5674 of a display screen, when a second user interaction is detected at a right corner 5673, the controller 290 may control the display 230 to divide a display screen into two areas 5672 and 5671. A display orientation 5676 of the divided area 5672 may be leftward 5676 based on a location where the first user interaction is detected. A display orientation of the divided area 5671 may be rightward 5675 based on a location where a second user interaction is detected.

In the third drawing 5600*c*-3, while a first user interaction is detected at a left corner 5689 of a display and a second user interaction is detected at a right corner 5687, when a third user interaction is detected at an upper corner 5686 and a fourth user interaction is detected at a lower corner 5688, the controller 290 may control the display 230 to divide a display screen into four areas 5684, 5682, 5681, and 5683.

The controller 290, with reference to first divided areas 5672 and 5671, may determine second divided areas 5684, 5682, 5681, and 5683. The controller 290 may evenly divide the display screen between the second divided areas, and control the display 230 to include at least part of 5684 and 5682 of the second divided areas in the first divided areas 5672 and 5671, respectively. In other words, the second divided areas 5684 and 5682 may be included in the first divided areas 5672 and 5671.

A display orientation of a divided area 5684 may be leftward 5692 based on a location 5689 where a first user interaction is detected. A display orientation of a divided area 5682 may be rightward 5690 based on a location 5687 where a second user interaction is detected. A display orientation of a divided area 5681 may be upward 5693 based on a location 5686 where a third user interaction is detected. A display orientation of the divided area 5683 may be downward 5691 based on a location 5688 where a fourth user interaction is detected.

<Rule for Dividing a Display Screen>

Figure 57A:
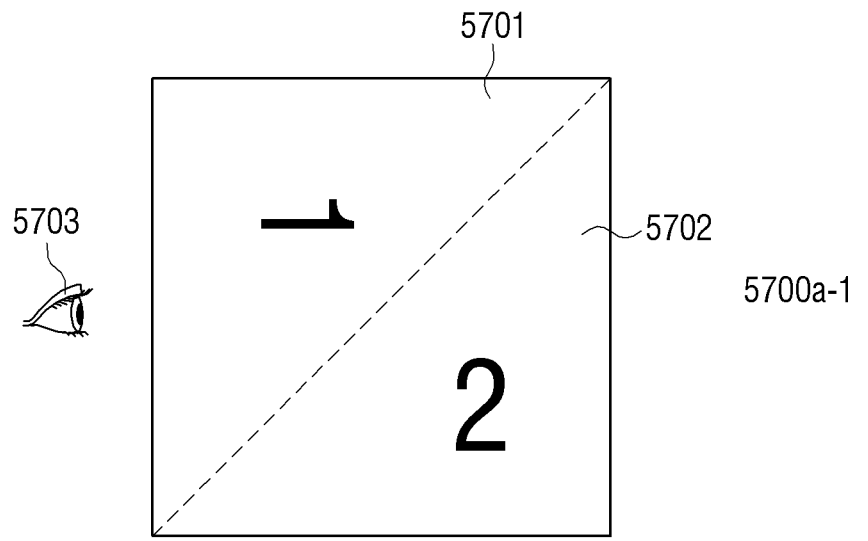
FIGS. 57A to 57C are views illustrating various rules in the case when a divided display screen is further divided according to one or more exemplary embodiment.
Figure 57A:
Figure 57A:
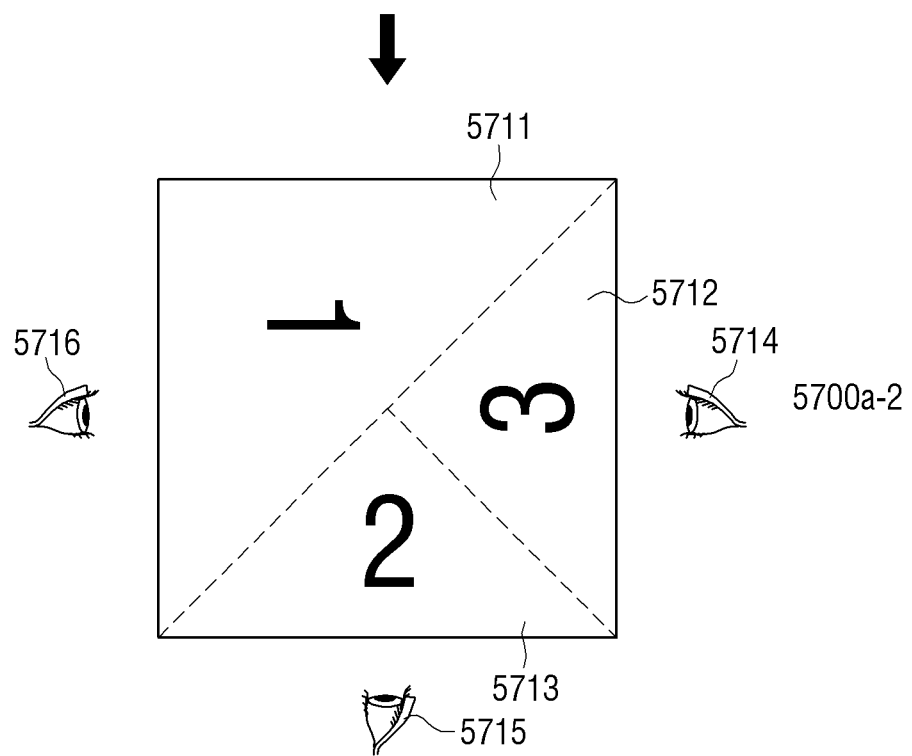
Figure 57B:
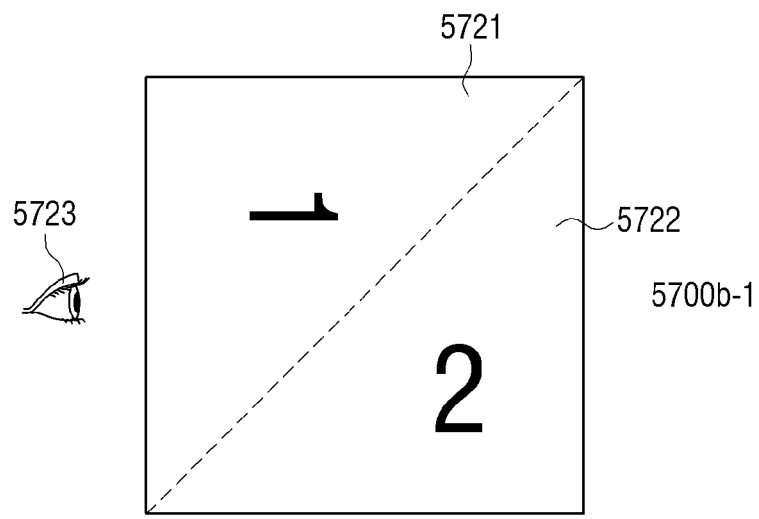
Figure 57C:
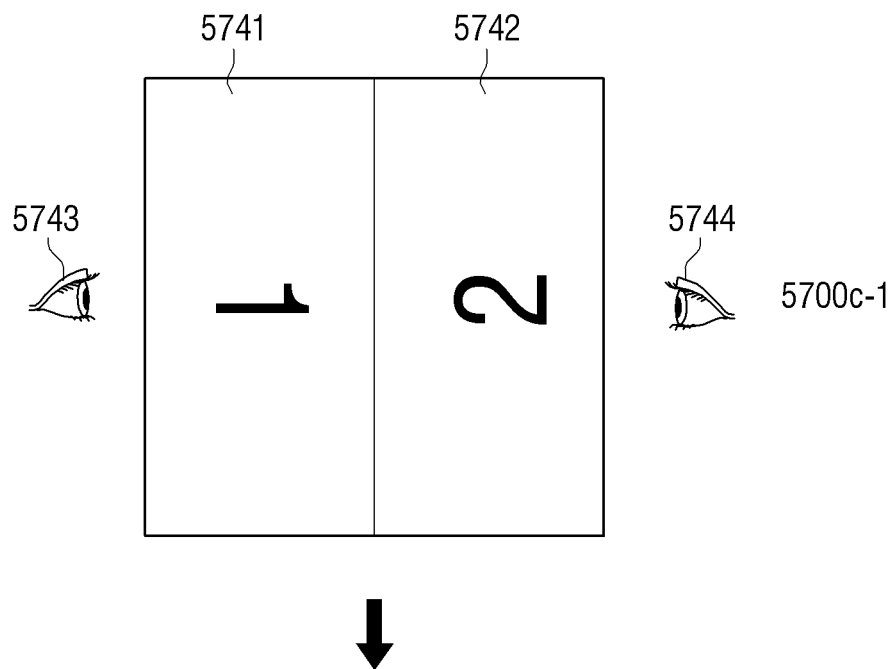
Figure 57C:
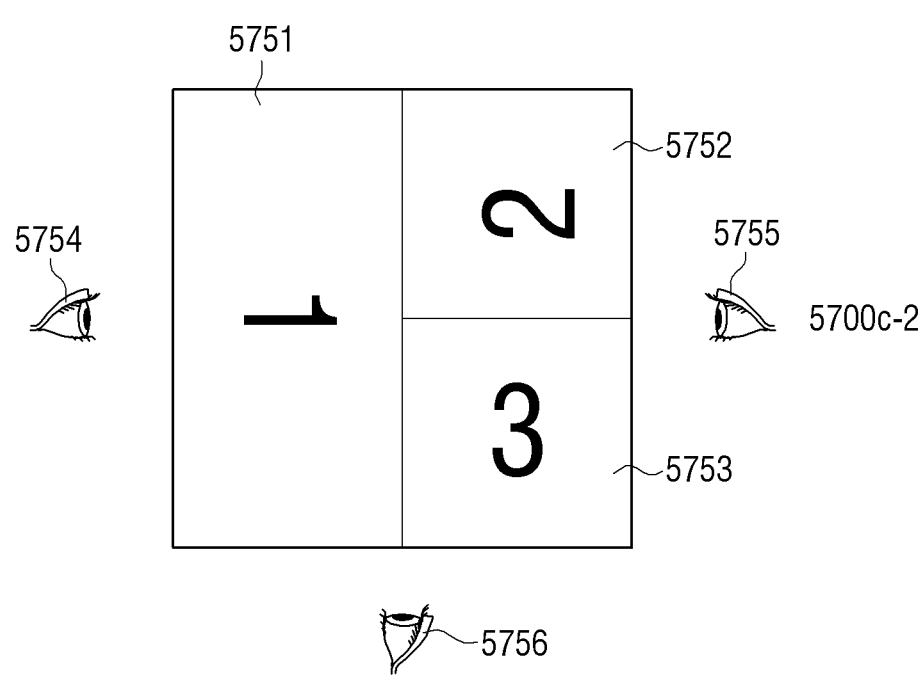

FIGS. 57A to 57C are views illustrating various rules for further dividing a display screen which has already been divided according to one or more exemplary embodiments.

Referring to FIG. 57A, a display screen is divided into two areas 5701 and 5702. In the divided area, a first screen 5701 and a second screen 5702 may be displayed (5700*a*-1). A display orientation of the first screen is leftward 5703. A display orientation of the second screen is downward 5704.

While a display screen is divided into two areas, when a third user interaction is detected in a right side of a display screen, the controller 290 may generate a new divided area 5712 in an area where the third user interaction is detected (5700*a*-2).

The new divided area 5712 may be generated with reference to the former divided areas 5711 and 5713. The new divided area 5712 may be generated by minimizing changes in the former divided areas 5711 and 5713. A location and an area of a new divided area may be determined with reference to an order of generating divided areas.

For example, while a display screen is displayed as a single display screen with reference to a display orientation 5703, when a second user interaction is detected at a lower end 5704 of the display screen, the controller 290 may control the display 230 to divide a display screen into two areas 5701 and 5702.

A display orientation of a divided area 5701 may be maintained in the same manner as the former display orientation 5703. The orientation of the divided area 5702 may be downward 5704 in which the second user interaction is detected. The divided areas 5701 and 5702 can be divided evenly.

While a display screen is divided into two areas 5701 and 5702 evenly, when a third user interaction is detected, the controller 290 may control the display 230 to divide a display screen into three areas. The controller 290, in order to divide a display screen into three areas, may determine a size of a division area with reference to an order that a user interaction is detected. In addition, the controller 290 may control the display 230 to maintain the earlier areas as large as possible.

For example, while a display screen is divided into two areas 5701 and 5702 evenly, when a third user interaction is detected in the area 5702, the controller 290 may control the display 230 to maintain the area 5701 as it is, and divide the area 5702 into two areas 5713 and 5712. Accordingly, a display screen may be divided into three areas 5711, 5712, and 5713, a display orientation of the area 5711 may be leftward 5715, a display orientation of the area 5712 may be rightward 5714, and a display orientation of the area 5713 may be downward 5715.

Referring to FIG. 57B, a display screen is divided into two areas 5721 and 5722 (5700*b*-1). A display orientation of the divided area 5721 is leftward 5723. A display orientation of the divided area 5722 is downward 5724. While a display screen is divided into two areas 5721 and 5722, when a user interaction is detected at an upper end of a display screen 5730, the controller 290 may control the display 230 such that a new divided area 5733 is generated at an area where a user interaction is detected on the display screen (5700*b*-2).

The new divided area 5733 may be generated with reference to the former divided areas 5721 and 5722. A location and size of the new divided area may be determined with reference to an order of which the divided areas are generated. The new divided area 5733 may be generated by minimizing changes of the former divided areas 5721 and 5722.

For example, while a display screen is displayed as a single display screen with reference to the display orientation 5723, when a second user interaction is detected at a lower end 5724 of the display screen, the controller 290 may control the display 230 to divide a display screen into two areas 5721 and 5722.

A display orientation of the divided area 5721 may be maintained in the same manner as the existing display orientation. A display orientation of the divided area 5722 may be downward towards where the second user interaction is detected. The divided areas 5721 and 5722 may be divided evenly.

While a display screen is divided evenly into the two areas 5721 and 5722, when a third user interaction is detected, the controller 290 may control the display 230 to divide the display screen into three areas (5700*b*-2). The controller 290, in order to divide a display screen into three areas, may determine a size of a divided area with reference to an order that a user interaction is detected. In addition, the controller 290 may control the display 230 to additionally divide the area while maintaining the former divided areas.

For example, when a display screen is divided evenly into two areas 5721 and 5722, when a third user interaction is detected within an area 5721, the controller 290 divides an area so that a firstly generated area 5731 is in the largest size, and divides an area 5733 and an area 5732 smaller than the area 5731. Accordingly, a display screen is divided into three areas 5731, 5732, and 5733, a display orientation of the area 5731 is leftward 5734, a display orientation of the area 5732 is downward 5713, and a display orientation of the area 5733 is upward 5736.

Referring to FIG. 57C, a display screen is divided into two areas 5741 and 5742 (5700*c*-1). A display orientation of divided area 5741 is leftward 5743. A display orientation of a divided area 5742 is rightward 5744. While a display screen is divided into two areas 5741 and 5742, when a user interaction is detected at a lower end 5756 of a display screen, the controller 29 may control the display 230 to generate a new divided area 5753 at an area where a user interaction is detected on the display screen (5700*c*-2). The new divided area 5753 may be generated with reference to the former divided areas 5741 and 5742. The new divided area 5753 may be generated while minimizing changes to the divided areas 5741, 5742 which were generated before. A position and size of the new divided area may be determined with reference to an order that divided areas are generated.

For example, while a display screen is displayed as a single display with reference to a display orientation 5743, when a second user interaction is detected at a right side 5743 of the display screen, the controller 290 may control the display 230 to divide the display screen into two areas 5741 and 5742 (5700*c*-1).

A display orientation of a divided area 5741 may be maintained in the same manner as the former display orientation. A display orientation of the divided area 5742 may be a right side 5744 in which a second user interaction is detected. The divided areas 5741 and 5742 may be divided in the same size.

While a display screen is divided into two areas 5741 and 5742 evenly, when a third user interaction is detected, the controller 290 may control the display 230 to divide the display screen into three areas 5751, 5752, and 5753 (5700*c*-2). The controller 290 may determine size of the divided area with reference to an order that a user interaction is detected. In addition, the controller 290 may control the display 230 to additionally divide the area 5742 while maintaining the former divided area 5741 as much as possible.

For example, while a display screen is divided into two areas 5741 and 5742 evenly, when a third user interaction is detected at an area 5756, the controller 290 may control the display 230 to maintain the area 5741 as it is, and divide the area 5742 into two areas 5752 and 5753.

Accordingly, a display screen is divided into three areas 5751, 5752, and 5753, a display orientation of the area 5751 is leftward 5754 of a display screen 5750, a display direction of the area 5752 is rightward 5755 of a display screen 5750, and a display orientation of the area 5753 is downward 5715.

\<Changing a Display Orientation in a Lock Screen and a Notification Screen\>

Figure 62A:
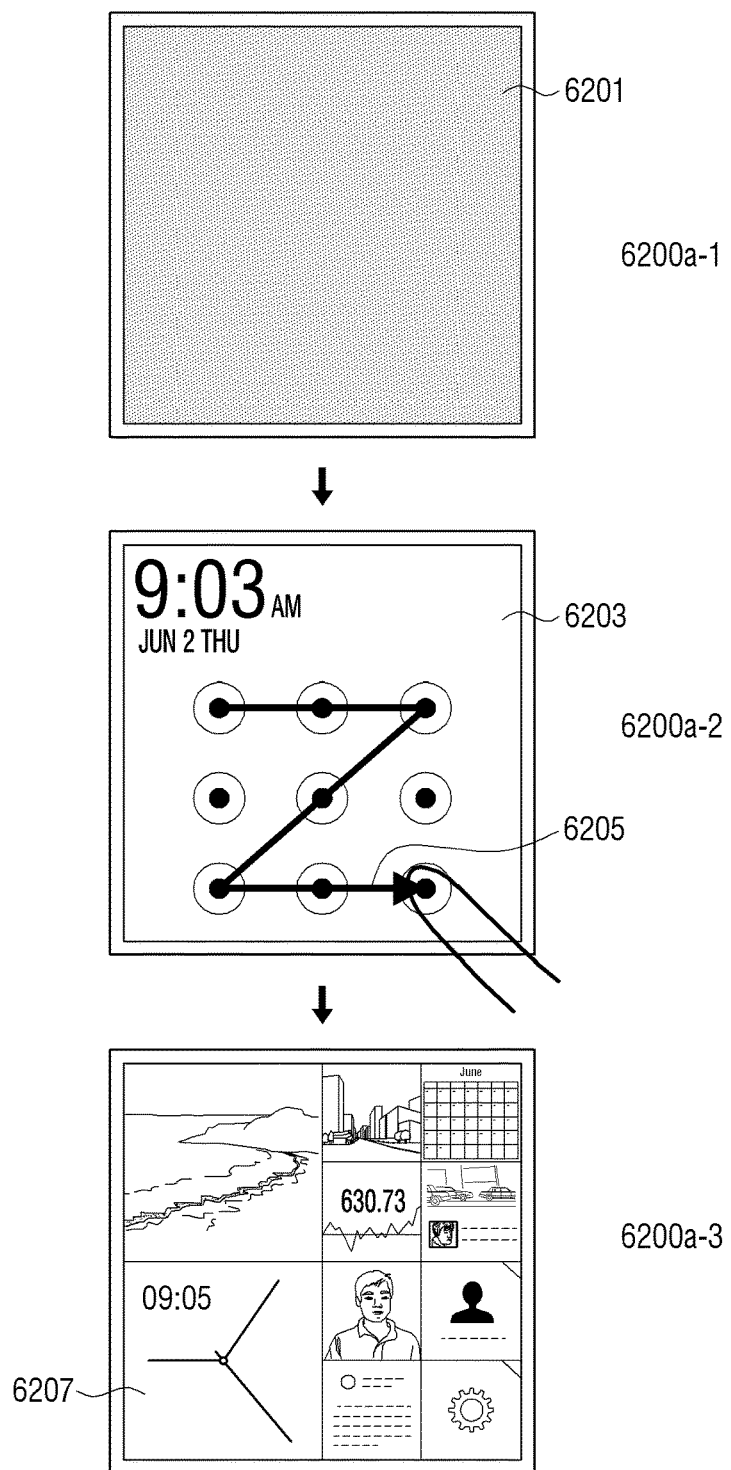
FIGS. 62A to 63B are views illustrating a display orientation of the second screen being determined and displayed in response to a user interaction while the first screen is displayed on the display according to one or more exemplary embodiments.
Figure 62B:
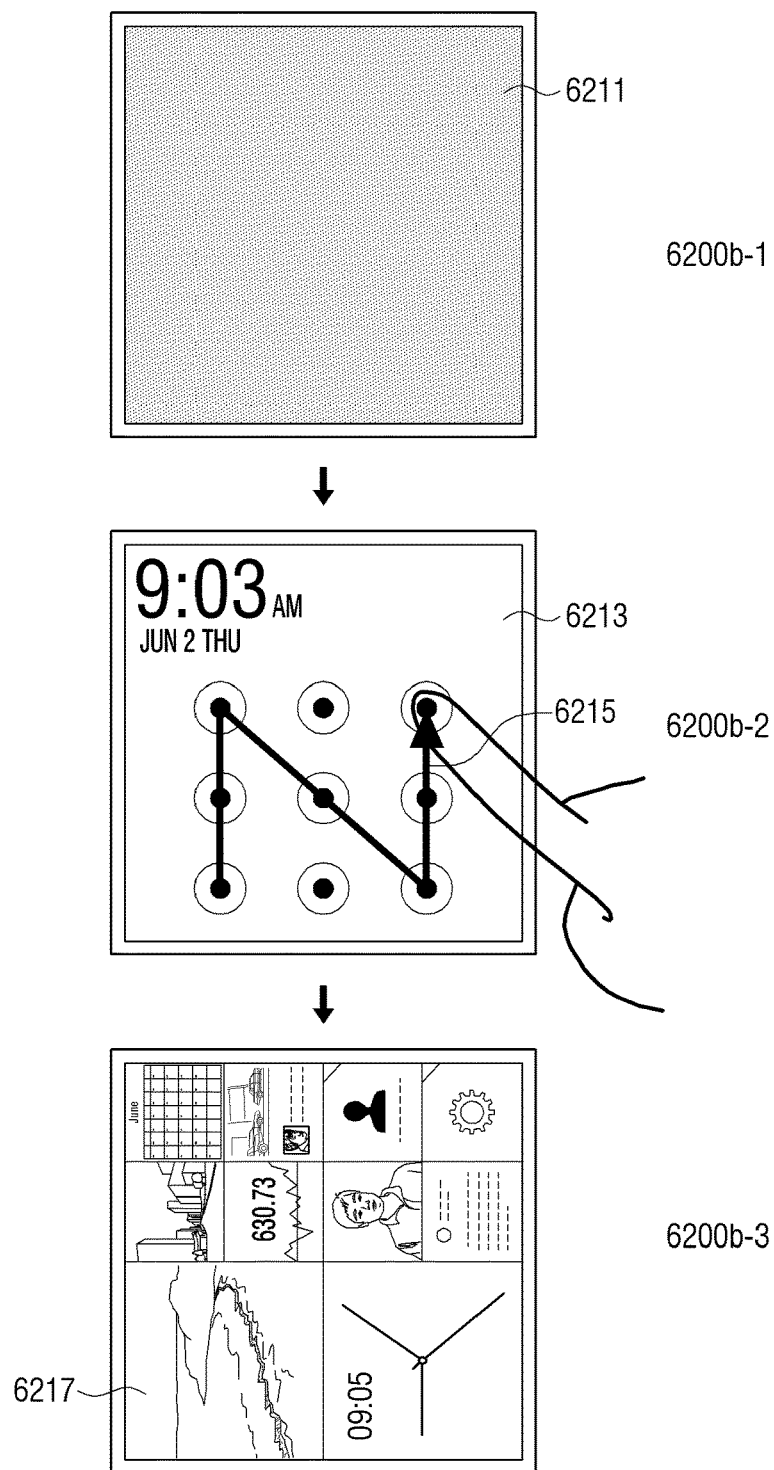
Figure 62C:
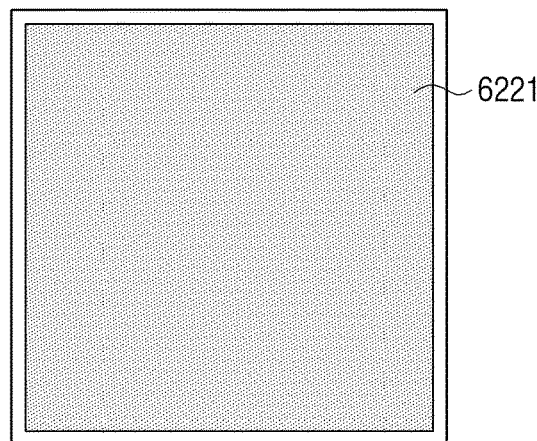
Figure 62C:
Figure 62C:
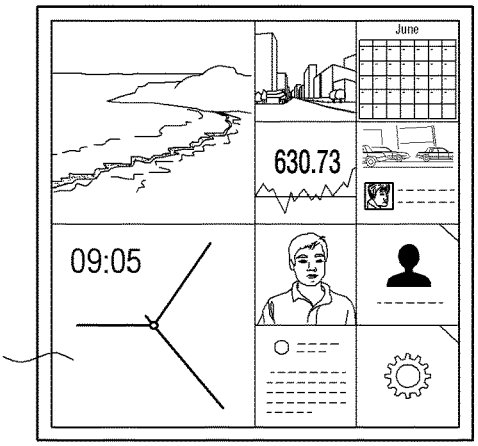
Figure 63A:
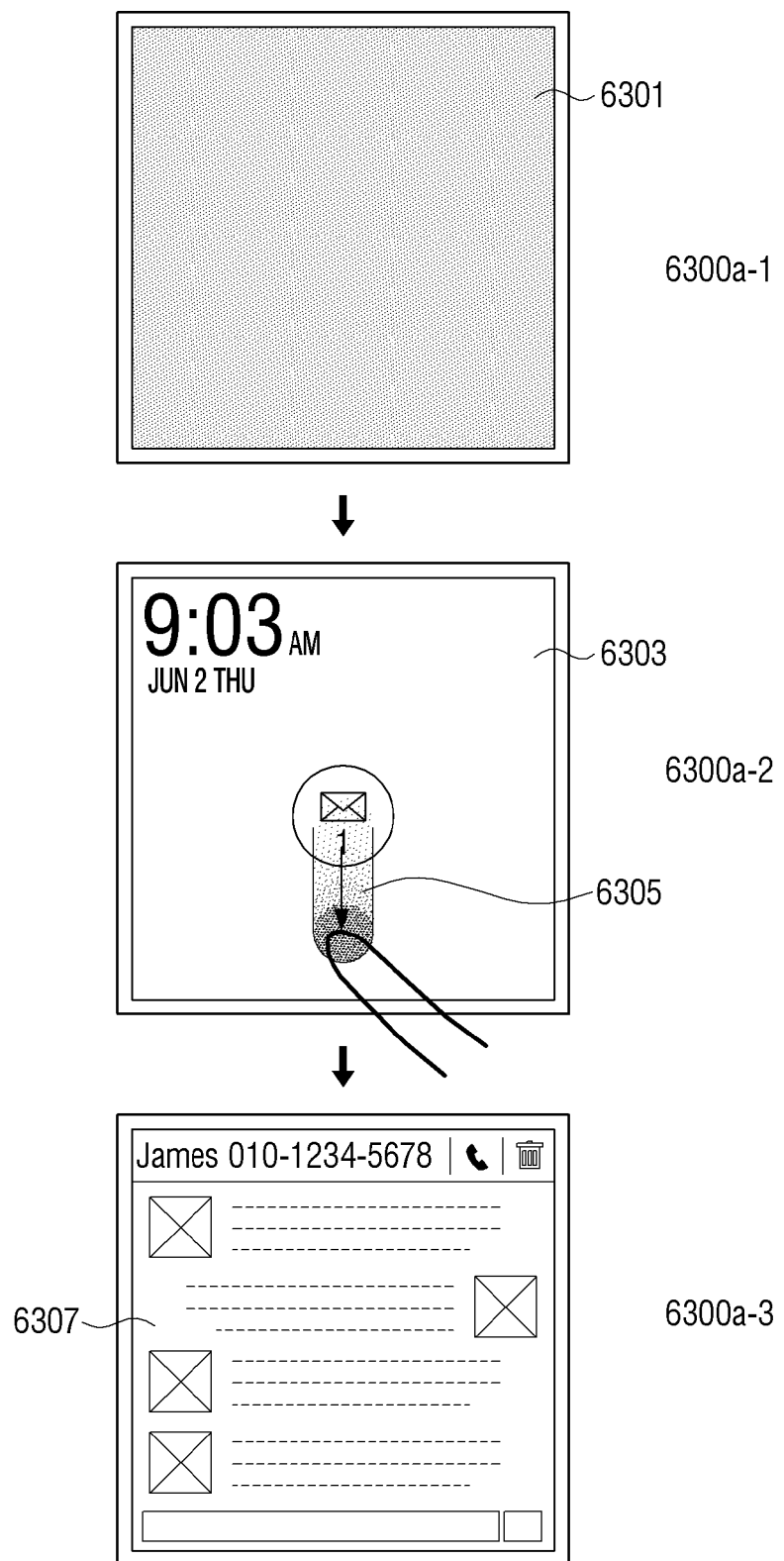
Figure 63B:
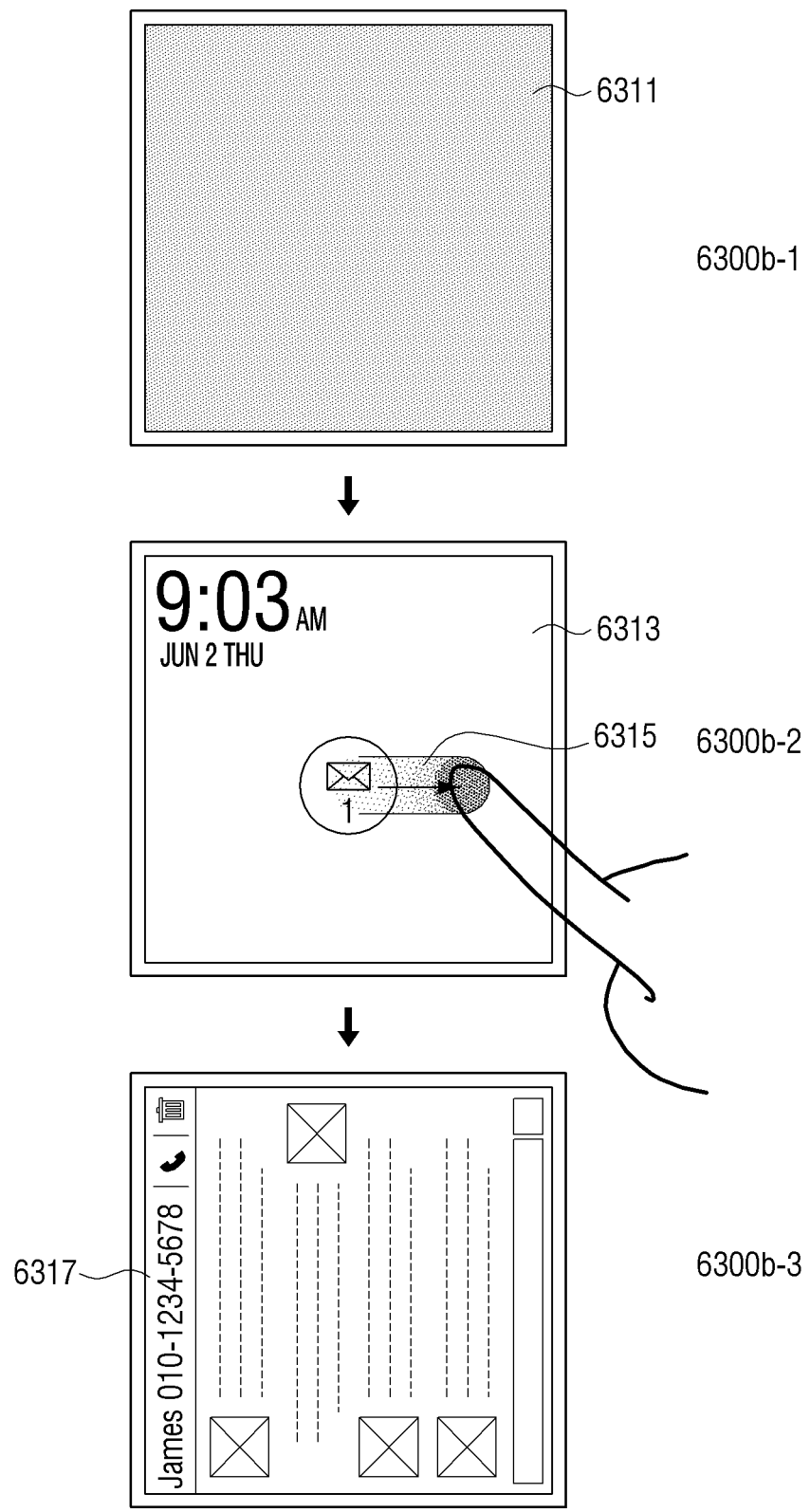
Figure 64:
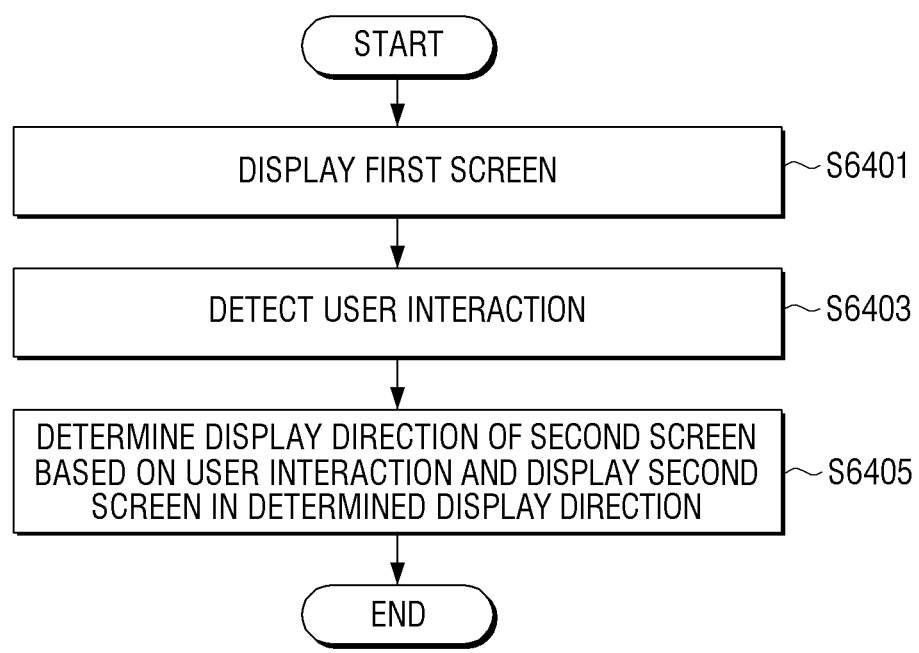
FIG. 64 is a flowchart illustrating a method for displaying a second screen in response to a user interaction, while the first screen is displayed in a user terminal device according to one or more exemplary embodiments.

FIGS. 62A to 63B are views illustrating a display orientation of a second screen being determined and displayed based on a user interaction while a first screen is displayed on the display 230, and FIG. 64 is a flowchart illustrating a method for displaying a second screen based on a user interaction, while the first screen is displayed in the user terminal device 200.

Referring to FIG. 64, the user terminal device 200, when event occurs while a screen is in a power offed state, may display a first screen (S6401). The first screen may be a lock screen or a notification screen. A display orientation of the first screen may be determined based on a display orientation before the first screen is displayed.

While the first screen is displayed on the display 230, the user terminal device 200 may detect a user interaction (S6403). The user terminal device 200, based on the user interaction, may determine a display orientation or direction of a second screen, and display the second screen with the determined display orientation (S6405).

Referring to FIG. 62A, 6200*a*-1 illustrates the display 230 of the user terminal device 200. The display 230 may be in a powered-off state 6201. The screen powered-off state 6201 may be a black screen state. The user terminal device 200, in a screen powered-off state, may detect a user interaction on the display 230.

While a screen is in a powered-off state, when an event occurs in the user terminal device 200, a first screen may be displayed in the display 230. An event may occur when a user presses a hardware button (not shown) of the user terminal device 200 or a sensor is operated.

The first screen may be a lock screen. In 6200*a*-2, a lock screen 6203 is displayed in the display 230. The lock screen 6203 may receive a pattern 6205 to unlock the user terminal device 200. A display orientation of the first screen may be determined based on a display orientation before the first screen is displayed.

For example, if a display orientation is a downward, when the user terminal device 200 is changed to a screen off state, when the screen is tuned on, the controller 290 may control the display 230 to display a lock screen in the downward direction.

If a display orientation of the user terminal device 200 is in a rightward direction, when the display is changed to a screen off state when the screen is turned on, the controller 290 may control the display 230 to display a lock screen in a rightward display orientation.

If a display orientation is upward, when the user terminal device 200 is changed to a screen off state, and when the screen is turned on, the controller 290 may control the display 230 to display a lock screen in the upward direction.

If a display orientation is in a leftward direction when the user terminal device 200 is changed to a screen off state, when the screen is turned on, the controller 290 may control the display 230 to display a lock screen in the leftward direction.

When a user is positioned at a lower end of the user terminal device 200, and a user drags "Z" to unlock the device (6200*a*-2), the controller 290 may unlock the user terminal device 200 (6200*a*-3).

A direction of a user interaction is a right side, and, while a first screen is displayed on the display 230, the detector 280 may detect a user interaction. The controller 290 may detect that a direction of a user interaction from a right side 6205, determine a display orientation to be a right side, and display a second screen 6208 on the display 230.

Referring to FIG. 62B, in 6200*b*-1, the display 230 of the user terminal device 200 is illustrated. The display 230 may be a screen off state 6211. The screen off state 6211 may be a black screen state. The detector 280 may detect an event while a screen is in a powered-off state.

In a screen off state, when an event occurs at the user terminal device, the controller 290 may control the display 230 to display a first screen 6200*b*-2. An even may occur when a user presses a hardware button (not shown) of a user terminal device or a sensor is activated.

The first screen may be a lock screen 6213. In 6200*b*-2, a lock screen 6213 is displayed in the display 230. The lock screen may receive a pattern 6215 to unlock the user terminal device 200. As described above, the display orientation of the first screen may be determined based on a display orientation before the screen was powered-off.

When a user is positioned at a right side of the user terminal device 200, and drags in shape "Z" to unlock the device (6200*b*-2), the user terminal device 200 may be unlocked.

While a direction of a user interaction is from a rightward direction, and a first screen is displayed on a display, the detector 280 may detect a user interaction. The controller 290 may detect that a direction of a user interaction is rightward through the detector 280, determine rightward as a display orientation, and display a second screen 6217 on the display 230.

A pattern to unlock the user terminal device 200 may be read in the same manner regardless of locations at which a user enters a pattern to unlock the user terminal device 200. For example, when a pattern shape to unlock is "Z", when a user enters "Z" on a lock screen, the user terminal device 200 may be unlocked. In addition, when a user enters "Z" which is a shape that "Z" is rotated at an angle of 90 degrees in a clockwise direction, a user terminal device may be unlocked.

In other words, the user terminal device 200, when reading a pattern to unlock, may recognize a pattern based on a relative coordinate instead of an absolute coordinate.

Referring to FIG. 62C, 6200*c*-1 illustrates the display 230 of the user terminal device 200. The display 230 may be a screen off state 6221. The screen off state 6221 may be a black screen state. The detector 280, in a screen off state, may detect a user interaction in the display 230.

In a screen off state, when an event occurs in the user terminal device 200, the first screen may be displayed in the display 230 (6200*c*-2). An event may occur when a user presses a hardware button (not shown) of the user terminal device 200, or a sensor is operated.

The first screen may be a lock screen 6223. In the second drawing, a lock screen 6223 is displayed in the display 230. The lock screen may receive a pattern 6225 to unlock the user terminal device 200. A display orientation of the first screen may be determined based on a previous display orientation, as described above.

When a user enters a predetermined pattern to unlock the device (6200*c*-2), the user terminal device 200 may be unlocked.

A direction of a user interaction is downward direction, and while a first screen is displayed in the display, the detector 280 may detect a user interaction (6200*c*-2). The controller 290 may detect that a direction of a user interaction is downward through the detector 280, determine a downward direction as a display orientation, and display a second screen 6227 on the display 230 (6200*c*-3).

Referring to FIG. 63A, in 6300*a*-1, the display 230 of the user terminal device 200 is illustrated. The display 230 may be a screen off state 6301. The screen off state 6301 may be a black screen state. The detector 280 may detect a user interaction in the display while the screen is in a screen off state.

While a screen is in a powered-off state, when an event occurs in the user terminal device 200, a first screen may be displayed on the display (6300*a*-2). An event may occur when a request for a call is received or a message is received.

The first screen may be a notification screen notifying that a message is received. In 6200*a*-2, a notification screen 6303 is displayed. A display orientation of the first screen may be determined based on a previous display orientation as described above.

While a first screen is displayed in the display 230, the detector 280 may detect a user interaction. For example, while a notification screen 6303 is displayed on the display 230, when a user drags toward a lower end direction 6305 of the display 230 (6300*a*-2), the controller 290 may detect through the detector 280 that a direction of a user interaction is a downward direction, determine a display orientation as a downward direction, and control the display 230 to display a second screen 6307 (6300*a*-3).

Referring to FIG. 63B, in 6300*b*-1, the display 230 of the user terminal device 200 is illustrated. The display 230 may be a screen off state 6311. The screen off state 6301 may be a black screen state. The user terminal device 200, while a screen is in a powered-off state, may detect a user interaction in the display 230.

In a screen off state, when an event occurs in the user terminal device 200, a first screen may be displayed in the display 230 (6300*b*-2). An event may occur when a request for a call or a message is received from an outside source.

The first screen may be a notification screen which notifies that a message is received. In 6300*b*-2, a notification screen 6313 is displayed in the display 230. A display orientation of the first screen may be determined based on a previous display orientation, as described above.

While a first screen is displayed in the display 230, the detector 280 may detect a user interaction. For example, when a notification screen 6313 is displayed in the display 230, when a user drags the display 230 in a rightward direction 6315 (6300*b*-2), the controller 290 may detect that a direction of a user interaction is a rightward direction through the detector 280, determine the rightward direction as a display orientation, and control the display 230 to display a second screen 6317 oriented rightward (6300*b*-3).

As described above, according to various exemplary embodiments, a user may perform various functions through a user terminal device which has a display panel in a square shape. Accordingly, user convenience and satisfaction may be improved.

In addition, a method for displaying a user terminal device according to the various exemplary embodiments may be realized as a program and provided to a user terminal device. To be specific, a non-transitory computer readable medium in which a program which includes a method of controlling a terminal device is stored therein may be provided.

The non-transitory computer-recordable medium is not a medium configured to temporarily store data such as a register, a cache, or a memory but an apparatus-readable medium configured to semi-permanently store data. For example, the above-described various applications or programs may be stored in the non-transitory apparatus-readable medium such as a compact disc (CD), a digital versatile disc (DVD), a hard disc, a Blu-ray disc, a universal serial bus (USB), a memory card, or a read only memory (ROM), and the like. Furthermore, it is understood that one or more components or elements of the above-described apparatuses and methods may include software and/or hardware, and may be implemented, for example, as at least one processor, a memory, circuitry, etc.

The foregoing exemplary embodiments and advantages are merely exemplary and are not to be construed as limiting the inventive concept. The exemplary embodiments can be readily applied to other types of device or apparatus. Also, the description of the exemplary embodiments is intended to be illustrative, and not to limit the scope of the inventive concept, and many alternatives, modifications, and variations will be apparent to those skilled in the art.

What is claimed is:

1. A displaying method of a user terminal device, the displaying method comprising:
    displaying at least a first screen in a first area of at least two areas of a single display of the user terminal device and a second screen in a second area of the at least two areas of the single display of the user terminal device, wherein the first screen and the second screen have a positional layout in the single display in which the first screen and the second screen are contiguous to each other;
    detecting a first user interaction by the user terminal device;
    based on the first user interaction, changing a first display orientation of the first screen and a second display orientation of the second screen by rotating the first screen and the second screen while maintaining the positional layout in which the first screen and the second screen are contiguous to each other;
    after the first screen and the second screen have been rotated, detecting a second user interaction in the first area;
    changing the first display orientation of the first screen based on the second user interaction while maintaining the second display orientation of the second screen and maintaining the positional layout in which the first screen and the second screen are contiguous to each other;
    detecting a third user interaction and a fourth user interaction that are performed at overlapping times, wherein the third user interaction comprises first dragging interactions on a back side of the user terminal device and on a display area at a front side of the user terminal device, and the fourth user interaction comprises second dragging interactions on the back side of the user terminal device and on the display area at the front side of the user terminal device;
    determining a first direction of the third user interaction and a second direction of the fourth user interaction that are performed at the overlapping times;
    dividing the display area into a third area and a fourth area based on the first direction of the third user interaction and the second direction of the fourth user interaction;
    determining the first display orientation of the first screen based on the first direction of the third user interaction;
    displaying the first screen having the first display orientation on the third area;
    determining the second display orientation of the second screen based on the second direction of the fourth user interaction; and
    displaying the second screen having the second display orientation on the fourth area.

2. The displaying method of claim 1, wherein the first user interaction comprises a vibration interaction, and
    wherein the changing the first display orientation of the first screen and the second display orientation of the second screen comprises:
        determining a location where the vibration interaction occurs; and
        determining the first display orientation and the second display orientation based on the determined location of the vibration interaction.

3. The displaying method of claim 1, wherein the first user interaction comprises a touch interaction, and
    wherein the changing the first display orientation of the first screen and the second display orientation of the second screen comprises:
        determining a direction of the touch interaction; and
        determining the first display orientation and the second display orientation based on the determined direction of the touch interaction.

4. The displaying method of claim 1, wherein the display and each of the first screen and the second screen are substantially square.

5. A displaying method of a user terminal device, the displaying method comprising:
    displaying a first screen in a display area of a display located at a front side of the user terminal device;
    detecting a first user interaction and a second user interaction that are performed at overlapping times, wherein the first user interaction comprises first dragging interactions on a back side of the user terminal device and on the display area at the front side of the user terminal device, and the second user interaction comprises second dragging interactions on the back side of the user terminal device and on the display area at the front side of the user terminal device;

determining a first direction of the first user interaction and a second direction of the second user interaction;

dividing the display area into a first area and a second area based on the first direction of the first user interaction and the second direction of the second user interaction;

determining a first display orientation of a second screen based on the first direction of the first user interaction;

displaying the second screen having the first display orientation on the first area;

determining a second display orientation of a third screen based on the second direction of the second user interaction; and displaying the third screen having the second display orientation on the second area.

6. A user terminal device, comprising:

a single display configured to display a first screen in a first area of at least two areas of the single display and a second screen in a second area of the at least two areas of the single display, wherein the first screen and the second screen have a positional layout in the single display in which the first screen and the second screen are contiguous to each other;

a detector configured to detect a first user interaction; and a controller configured to, based on the first user interaction, control the display to change a first display orientation of the first screen and a second display orientation of the second screen by rotating the first screen and the second screen while maintaining the positional layout in which the first screen and the second screen are contiguous to each other, wherein the detector is further configured to, after the first screen and the second screen have been rotated, detect a second user interaction in the first area, the controller is further configured to, based on the second user interaction being detected in the first area, control the display to change the first display orientation of the first screen while maintaining the second display orientation of the second screen and maintaining the positional layout in which the first screen and the second screen are contiguous to each other, the detector is further configured to detect a third user interaction and a fourth user interaction that are performed at overlapping times, wherein the third user interaction comprises first dragging interactions on a back side of the user terminal device and on a display area at a front side of the user terminal device, and the fourth user interaction comprises second dragging interactions on the back side of the user terminal device and on the display area at the front side of the user terminal device, and the controller is further configured to:
  determine a first direction of the third user interaction and a second direction of the fourth user interaction that are performed at the overlapping times;
  divide the display area into a third area and a fourth area based on the first direction of the third user interaction and the second direction of the fourth user interaction;
  determine the first display orientation of the first screen based on the first direction of the third user interaction;
  control the display to display the first screen having the first display orientation on the third area;
  determine the second display orientation of the second screen based on the second direction of the fourth user interaction; and
control the display to display the second screen having the second display orientation on the fourth area.

7. The user terminal device of claim 6, wherein:

the first user interaction comprises a vibration interaction; and the controller is further configured to determine a location where the vibration interaction occurs, and determines the first display orientation and the second display orientation based on the determined location of the vibration interaction.

8. The user terminal device of claim 6, wherein:

the first user interaction comprises a touch interaction; and the controller is further configured to determine a direction of the touch interaction, and determine the first display orientation and the second display orientation based on the determined direction of the touch interaction.

* * * * *